United States Patent
Sikuljak et al.

(10) Patent No.: US 11,064,696 B2
(45) Date of Patent: Jul. 20, 2021

(54) USE OF AN INSECTICIDAL CARBOXAMIDE COMPOUND AGAINST PESTS ON CULTIVATED PLANTS

(71) Applicant: BASF Agrochemical Products B.V., EA Arnhem (NL)

(72) Inventors: Tatjana Sikuljak, Mannheim (DE); Robert Reinhard, Limburgerhof (DE); Klaus Daeschner, Maikammer (DE); Alejandro Arevalo, Cary, NC (US)

(73) Assignee: BASF AGROCHEMICAL PRODUCTS B.V., Arnhem (NL)

( * ) Notice: Subject to any disclaimer, the term of this patent is extended or adjusted under 35 U.S.C. 154(b) by 101 days.

(21) Appl. No.: 15/563,120

(22) PCT Filed: Apr. 6, 2016

(86) PCT No.: PCT/EP2016/057502
§ 371 (c)(1),
(2) Date: Sep. 29, 2017

(87) PCT Pub. No.: WO2016/162371
PCT Pub. Date: Oct. 13, 2016

(65) Prior Publication Data
US 2018/0199570 A1    Jul. 19, 2018
US 2019/0021322 A9   Jan. 24, 2019

Related U.S. Application Data

(60) Provisional application No. 62/143,847, filed on Apr. 7, 2015.

(30) Foreign Application Priority Data

Dec. 18, 2015 (EP) ..................................... 15201358

(51) Int. Cl.
*A01N 37/46* (2006.01)
(52) U.S. Cl.
CPC .................................. *A01N 37/46* (2013.01)
(58) Field of Classification Search
CPC ...................................................... A01N 36/46
USPC ........................................................ 514/563
See application file for complete search history.

(56) References Cited

U.S. PATENT DOCUMENTS

| 2011/0137068 A1* | 6/2011 | Aoki | ...................... A01N 37/46 560/43 |
| 2011/0201687 A1 | 8/2011 | Kobayashi et al. | |
| 2016/0345581 A1* | 12/2016 | Soergel | ................ C07D 403/12 |

FOREIGN PATENT DOCUMENTS

| EP | 2319830 A1 | 5/2011 |
| EP | 2529620 A1 | 12/2012 |
| JP | 2011-157294 A | 8/2011 |
| JP | 2011-157295 A | 8/2011 |
| JP | 2011-157296 A | 8/2011 |
| JP | 2015-131815 A | 7/2015 |
| JP | 2015-166386 A | 9/2015 |
| JP | 2015-199758 A | 11/2015 |
| WO | PCT-2005/073165 A1 | 8/2005 |
| WO | PCT-2007/013150 A1 | 2/2007 |
| WO | PCT-2010/018714 A1 | 2/2010 |
| WO | PCT-2010/018857 A1 | 2/2010 |
| WO | PCT-2010/046380 A2 | 4/2010 |
| WO | PCT-2010/046420 A2 | 4/2010 |
| WO | PCT-2010/046463 A1 | 4/2010 |
| WO | PCT-2011/151261 A2 | 12/2011 |
| WO | PCT-2014/053395 A1 | 4/2014 |
| WO | PCT-2014/119752 A1 | 8/2014 |
| WO | PCT-2015/055752 A1 | 4/2015 |
| WO | PCT-2015/055755 A1 | 4/2015 |
| WO | PCT-2015/055757 A1 | 4/2015 |
| WO | PCT-2015/133603 A1 | 9/2015 |
| WO | PCT-2016/059240 A1 | 4/2016 |
| WO | PCT-2016/142456 A1 | 9/2016 |
| WO | PCT-2016/166252 A1 | 10/2016 |

OTHER PUBLICATIONS

International Search Report and Written Opinion for PCT Patent Application No. PCT/EP2016/057502, dated Jun. 23, 2016, 18 pages.

Nakao, et al., "Minireview: Mode of action of meta-diamide insecticides", Pesticide Biochemistry and Physiology, vol. 121, Jun. 2015, pp. 39-46.

* cited by examiner

*Primary Examiner* — Yevgeny Valenrod

(74) *Attorney, Agent, or Firm* — Marshall, Gerstein & Borun LLP

(57) ABSTRACT

Described herein are agricultural methods for controlling pests on and/or increasing the plant health of a cultivated plant, with at least one modification, using a pesticidal carboxamide compound or a mixtures thereof. In particular, methods of controlling harmful insects, which are resistant to an insecticidal trait of the plant, are provided. In addition, the use of a pesticidal carboxamide compound or mixtures thereof for protecting a plant, plant propagation material, seeds or the locus of growth, against the attack or infestation by pests, wherein the plant has been modified by mutagenesis or genetic engineering, and for controlling pests that are resistant to an insecticidal trait of the plant are described.

21 Claims, No Drawings

USE OF AN INSECTICIDAL CARBOXAMIDE COMPOUND AGAINST PESTS ON CULTIVATED PLANTS

CROSS-REFERENCE TO RELATED APPLICATIONS

This application is a U.S. National Phase Application of International Patent Application No. PCT/EP2016/057502, filed Apr. 6, 2016, which claims the benefit of priority to U.S. Provisional Patent Application Ser. No. 62/143,847, filed Apr. 7, 2015, and to European Patent Application No. 15201358.7, filed Dec. 18, 2016, the entire contents of which are hereby incorporated by reference herein.

BACKGROUND

Pests, in particular insects from the order of Lepidoptera, destroy growing and harvested crops and attack wooden dwelling and commercial structures, thereby causing large economic loss to the food supply and to property. A particular important threat in connection with Lepidoptera, particular leaf eating caterpillars, is defoliation of the plants, which typically results in a decrease of the yield. In connection with soybean, it has e.g. been found that, when the pods begin to form and fill out, any foliage loss greater than 20% will decrease the yield (G. Andrews et al., Insect control guides for cotton, soybeans, corn, grain sorghum, wheat, sweet potatoes and pastures, Mississippi State University Extension Service, Publication 2471, 64 pp. (2009)). It is known in the art that row crops, such as wheat, maize, rice, soybean, and cotton, in particular soybean, are particularly vulnerable in terms of the attack or infestation by Lepidoptera selected from the group consisting of *Anticarsia* (=*Thermesia*) spp., *Chrysodeixis* (=*Pseudoplusia*) spp., *Helicoverpa* spp., and *Spodoptera* (=*Lamphygma*) spp. The most important species include *Anticarsia gemmatalis, Chlysodeixis includens* (=*Pseudoplusia includens*), *Helicoverpa armigera* (=*Heliothis armigera*), *Spodoptera frugiperda, Spodoptera eridania*, and *Spodoptera cosmioides*.

The relevance of *Anticarsia gemmatalis, Pseudoplusia includens, Spodoptera frugiperda, Spodoptera eridania*, and *Spodoptera cosmioides* for defoliation of soybean genotypes is analyzed by R. C. O. de Freitas Bueno et al. in Pest Manag. Sci. 2011; 67: 170-174. It is said therein that *Anticarsia gemmatalis* was originally the most important defoliator insect occurring on soybean crops, but that nowadays *Pseudoplusia includens, Spodoptera frugiperda, Spodoptera eridania*, and *Spodoptera cosmioides* are also considered to be key pests by Brazilian soybean growers.

In recent years, there were also numerous reports in the media regarding the growing threat of *Helicoverpa armigera* to Brazilian cotton, corn and soybean crops.

According to O. Bernardi et al. (Crop Protection 2014; 58: 33-40), it has been observed that *Spodoptera frugiperda, Spodoptera eridania*, and *Spodoptera cosmioides* have caused significant damage on soybean in Brazil. It has been found that these *Spodoptera* species also have a low susceptibility to genetically modified soybeans expressing cry1Ac protein. It is concluded that the cry1Ac expressing soybeans show poor control of these *Spodoptera* species, and that, consequently, other control tactics must be used in combination with MON 87701 x MON 89788 soybean in the field for the efficient management of these *Spodoptera* species.

Similar problems are to be expected in connection with genetically modified soybeans expressing cry1F or a combination of cry1F and cry1Ac (e.g. DAS 81419) for the reason that cry1F in many species interacts with the known receptor for cry1Ac indicating a similar insecticidal activity, which may contribute to cross-resistance to both toxins (Center for Environmental Risk Assessment, ILSI Research Foundation, Washington D.C., USA, 2013: "A Review of the Environmental Safety of the Cry1F Protein").

Accordingly, there is an acute need for pesticides and pesticidal mixtures for controlling the above mentioned pests on the above mentioned row crops, including plants, which have been modified by mutagenesis or genetic engineering, and plants, which have not been modified by mutagenesis or genetic engineering. In particular, there is a need for pesticides and pesticidal mixtures for controlling the above mentioned pests on row crops, which have been modified by mutagenesis or genetic engineering, in particular on soybean plants, which have been modified by mutagenesis or genetic engineering.

SUMMARY

It is therefore an object of the present invention to provide a pesticidal mixture, which is suitable for controlling pests, in particular from the orders of Lepidoptera, Coleoptera or Thysanoptera, preferably Lepidoptera and more preferably any one of the above mentioned Lepidoptera genera and species, or combinations thereof, which are of particular relevance in connection with wheat, maize, rice, soybean, and cotton plants. And in particular in connection with soybean plants, especially in connection with soybean plants, which have been modified by mutagenesis or genetic engineering, e.g. insect resistant soybeans expressing cry1Ac, cry1F, or a combination thereof.

In this connection, it is also an object of the invention to provide a pesticidal compound or a pesticidal mixture, which overcome insect resistance problems in connection with the herein mentioned pests. As used herein, the term "insect resistance" refers to insect resistance against other pesticides and pesticidal mixtures or insect resistance against an insecticidal trait of a plant.

Furthermore, it is an object of the invention to provide a pesticidal mixture, which can be applied in lower dosage rates compared to other pesticides and pesticidal mixtures in order to avoid unfavorable environmental or toxicological effects.

With regard to the pests *Anticarsia gemmatalis, Chlysodeixis includens* (=*Pseudoplusia includens*), *Helicoverpa armigera* (=*Heliothis armigera*), *Spodoptera cosmioides, Spodoptera eridania*, and *Spodoptera frugiperda*, which are typically present on soybeans, it is another object of the present invention to provide pesticides, which are suitable for selective pest control, if infestation with one or more of these pests occurs.

In a first aspect, the present invention relates to a method for controlling pests on and/or increasing the plant health of a cultivated plant with at least one modification (hereinafter abbreviated as "cultivated plant") as compared to a respective non-modified control plant.

The method comprises the application of a pesticidal carboxamide compound (alone or in the form of a mixture comprising such pesticidal carboxamide compound) to a cultivated plant, parts of such plant, plant propagation material, or at its locus of growth.

In a further aspect, the present invention relates to a method for controlling pests and/or increasing the plant health of a cultivated plant with at least one modification as compared to the respective non-modified control plant, comprising the application of an pesticidal carboxamide compound (again, alone or in the form a mixture comprising such pesticidal carboxamide compound) to a cultivated plant, parts of such plant, plant propagation material, or at its locus of growth, wherein said cultivated plant is selected from a group of certain plants with specific modifications as defined further below.

The methods of the invention relating to cultivated plants are particularly suitable for efficiently controlling arthropodal pests such as arachnids, myriapedes and insects as well as nematodes on cultivated plants. Preferably, the term pests embrace animal pests (such as insects, acarids or nematodes). Relevant animal pests of different genera and species are provided further below.

In another aspect, the present invention relates to the use of a pesticidal carboxamide compound alone or in the form of a pesticidal mixture comprising such pesticidal carboxamide compound for protecting a cultivated plant, modified plant propagation material, or its locus of growth, against the attack or infestation by pests.

In still another aspect, the present invention relates to the use of a pesticidal carboxamide compound in pesticidally effective amounts for protecting cultivated plants from row crops such as cotton, corn or soybean plants, the plant propagation material thereof or their locus of growth.

In still another aspect, the present invention relates to a method for controlling pests, which method comprises the application of a pesticidally effective amount of an pesticidal carboxamide compound to a row crop plant (such as corn, cotton or soybean plant), the plant propagation material thereof or at its locus of growth, also on the pests or their food supply, habitat or breeding grounds.

In still another aspect, the present invention relates to the method of application or the use of a pesticidal carboxamide compound in pesticidally effective amounts for protecting cultivated plants from row crops such as cotton, corn or soybean plants, the plant propagation material thereof or their locus of growth from the infestionsby pests, wherein the pests are selected from the orders of Lepidoptera, Coleoptera or Thysanoptera, and combinations thereof.

In yet another aspect, the present invention relates to the use of an pesticidal carboxamide compound in pesticidally effective amounts for protecting a soybean plant, the plant propagation material thereof, or its locus of growth, against the attack or infestation by pests selected from the group consisting of *Anticarsia gemmatalis, Chlysodeixis includens (=Pseudoplusia includens), Spodoptera cosmioides, Spodoptera eridania, Spodoptera frugiperda*, and combinations thereof.

In yet another aspect, the present invention relates to a method for controlling pests, which method comprises the application of a pesticidally effective amount of an pesticidal carboxamide compound to a soybean plant, the plant propagation material thereof or its locus of growth; the pests or their food supply, habitat or breeding grounds, wherein the pests are selected from the group consisting of *Anticarsia gemmatalis, Chrysodeixis includens (=Pseudoplusia includens), Spodoptera cosmioides, Spodoptera eridania, Spodoptera frugiperda*, and combinations thereof.

The above objects may be achieved by a pesticidal active carboxamide compound, and the uses and methods comprising the application of said compound as defined hereinafter.

It has surprisingly been found that the pesticidal mixture according to the invention is suitable for controlling the above mentioned pests, in particular *Anticarsia (=Thermesia)* spp., *Chrysodeixis (=Pseudoplusia)* spp., *Helicoverpa* spp., and *Spodoptera (=Lamphygma)* spp., especially *Anticarsia gemmatalis, Chlysodeixis includens (=Pseudoplusia includens), Helicoverpa armigera (=Heliothlis armigera), Spodoptera frugiperda, Spodoptera eridania,* and *Spodoptera cosmioides*. Accordingly, plants selected from wheat, maize, rice, soybean, and cotton plants, in particular soybean plants may effectively be protected against defoliation by these pests, and a decrease of the yields can thus be prevented. In this connection, it is an important advantage of the method according to the present invention that the method is also suitable for controlling the above mentioned pests, if they have become resistant against conventional pesticides or pesticidal mixtures, or against the insecticidal trait of a plant.

Furthermore, it has been found that the development of a resistance against the insecticidal trait of a plant can be prevented, if the plants are treated with the pesticidal carboxamide compound of the invention. Moreover, the method according to the invention is suitable for controlling pests, against which the insecticidal trait of a plant is not effective, so that a complementary insecticidal activity can advantageously be used.

It is another advantage of the pesticidal method according to the present invention that the carboxamide compound and its mixtures can be applied in lower dosage rates compared to other pesticides and pesticidal mixtures.

Furthermore, there are special interests in connection with cultivated plants with at least one modification.

It has been observed that cultivated plants with at least one modification, for example a modification providing herbicide tolerance, are more susceptible to attack or infestation by pests than plants, which have not been modified.

Furthermore, it has been observed that cultivated plants with a modification, which provides insect resistance, can be particularly susceptible to certain pests against which the produced toxin is not effective. Moreover, the pests can develop resistance against the toxin, which is produced by the plant.

Accordingly, there is a need for pesticides and pesticidal mixtures for controlling pests on cultivated plants with at least one or even more modifications.

In this connection, it is also an object of the invention to provide a pesticide or pesticidal mixture, which is suitable for controlling pests, which are resistant to the insecticidal trait of the cultivated plant. It is another object of the invention to provide a pesticide or pesticidal mixture, which prevents pests to become resistant to the insecticidal trait of the cultivated plant.

Furthermore, it is an object of the invention to provide a pesticide or pesticidal mixture, which can be applied in lower dosage rates compared to other pesticides and pesticidal mixtures in order to avoid unfavorable environmental or toxicological effects.

It is yet another object of the invention to provide a pesticide or pesticidal mixture, which improves the health of a plant, a process which is commonly and hereinafter referred to as "plant health". The term plant health comprises various sorts of improvements of plants that are not connected to the control of pests and which do not embrace the reduction of negative consequences of harmful insects. The term "plant health" is to be understood to denote a condition of the plant and/or its products which is determined by several indicators alone or in combination with each other such as yield (e.g. increased biomass and/or increased content of valuable ingredients), plant vigor (e.g. improved plant growth and/or greener leaves ("greening effect"), quality (e.g. improved content or composition of certain ingredients) and tolerance to abiotic and/or biotic stress. The above identified indicators for the health condition of a plant may be interdependent or may result from each other.

DETAILED DESCRIPTION

It has been found that the above objects can be achieved by methods applying or the use of a pesticidal active carboxamide compound I selected from i) compound i) of formula (I)

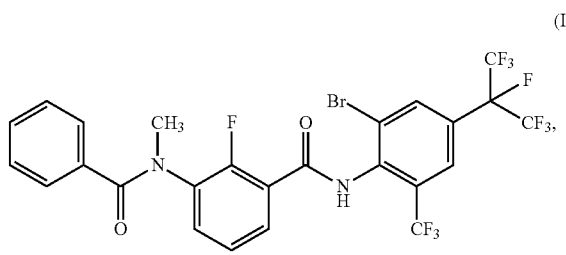

ii) compound ii) of formula (Ia)

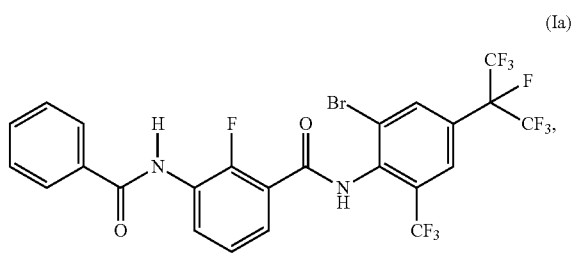 [SMILES: O=C(Nc1cccc(C(=O)Nc2c(Br)cc(C(F)(C(F)(F)F)C(F)(F)F)cc2C(F)(F)F)c1F)c1ccccc1]

or
iii) mixtures comprising the carboxamide compounds i) and ii),
or the tautomers, enantiomers, diastereomers or salts thereof,
alone or in mixtures comprising such pesticidal active carboxamide compound.

Preferred methods and uses according to of this invention comprise compound i) of formula (I) as pesticidal active carboxamide compound I. Preferred embodiments of this invention are the methods or the use of the pesticidal active carboxamide compound i) of formula (I) or the tautomers, enantiomers, diastereomers or salts thereof, alone or in mixtures comprising such pesticidal active carboxamide compound.

Other embodiments of this invention are the methods or the use of the pesticidal active carboxamide compound ii) of formula (Ia) or the tautomers, enantiomers, diastereomers or salts thereof, alone or in mixtures comprising such pesticidal active carboxamide compound.

Still other embodiments of this invention are the methods or the use of pesticidal active mixtures comprising the carboxamide compounds i) of formula (I) and ii) of formula (Ia) or the tautomers, enantiomers, diastereomers or salts thereof, alone or in mixtures comprising such pesticidal active carboxamide compound mixtures.

Unless explicitly said otherwise, the terms "compound i) of formula (I)", "compound (ii) of formula (Ia), or "mixture comprising the carboxamide compounds (i) and (ii)" also include the respective salts, tautomers, stereoisomers, and N-oxides of the carboxamide compounds.

In case of certain cultivated plants, the above objects may be achieved by the use or application of the pesticidal active carboxamide compound I, preferably compound i) of formula (I) alone. The application of the pesticidal active carboxamide compound I, preferably compound i) of formula (I) as only one active agent can be advantageous in terms of practicability and also in connection with insect resistance management.

It has furthermore been found that the above objects can be achieved by a pesticidal mixture comprising the pesticidal active carboxamide compound I, preferably compound i) of formula (I) and another pesticidal active ingredient, whereas the uses and methods comprising the application of said mixture as defined hereinafter.

In case that the pesticidal effectiveness of the pesticidal mixture of the invention as well as of the pesticidal active carboxamide compound I, preferably compound i) of formula (I) alone can be enhanced by the insecticidal trait of the plant, this may be considered as a synergistic effect.

The application of a mixture comprising pesticidal active carboxamide compound I, preferably compound i) of formula (I), including the simultaneous, that is joint or separate, application of pesticidal active carboxamide compound I, preferably compound i) of formula (I) and the other pesticidal active ingredient or their successive application on cultivated plants may allow enhanced control of animal pests, compared to the control rates that are possible by application on non-cultivated plants.

For certain plants with specific modifications as described herein after, the use of the pesticidal active carboxamide compound I, preferably compound i) of formula (I), alone may also display a synergistic effect between the trait of the cultivated plant and the applied pesticidal active carboxamide compound I, preferably compound i) of formula (I). For these plants with specific modifications, also the mixture comprising pesticidal active carboxamide compound I, preferably compound i) of formula (I), and another pesticidal active compound may advantageously be used.

As mentioned above, the pesticidal active carboxamide compound I, preferably compound i) of formula (I), or a mixture comprising such pesticidal active carboxamide compound I, preferably compound i) of formula (I), may be useful in methods of controlling harmful insects by treating cultivated plants, parts of such plants or their locus of growth, wherein the plant has at least one insecticidal trait, and wherein the harmful insects are resistant to an insecticidal trait of the plant.

The carboxamide compound I

Carboxamide derivatives showing generally pesticidal activity have been described previously. WO200573165 and WO2010018714 describe carboxamide compounds, their preparation and their use as pest control agents. WO2007013150, JP2011-157294, JP2011-157295 and JP2011-157296 describe mixtures of carboxamides with other active ingredients.

Preparation of the pesticidal active carboxamide compound I, preferably compound i) of formula (I), can further be accomplished according to standard methods of organic chemistry, e.g. by the methods or working examples described in WO 2010/018857 without being limited to the routes given therein.

The carboxamide compound i) of formula (I), which has been provisionally approved under the common name broflanilide, has been described in combination with fungicidal active compounds in PCT/EP2014/072189 or with insecticidal active compounds in PCT/EP2014/072183.

However, methods and uses applying the pesticidal carboxamide compound I, preferably compound i) of formula (I), on cultivated plant, alone or in combination with selected other pesticidal active ingredients, have not been described previously.

The prior art does not disclose such methods and uses of the pesticidal carboxamide compound I, preferably compound i) of formula (I), or pesticidal mixtures comprising such selected carboxamide compound on cultivated plant showing unexpected results.

The carboxamide compound I, preferably the compound i) of formula (I), includes its tautomers, racemic mixtures, individual pure enantiomers and diasteroemers and the optically active mixtures.

Pests

The carboxamide compound i) of formula (I) is especially suitable for efficiently combating animal pests such as arthropods, gastropods and nematodes including but not limited to:

insects from the order of Lepidoptera, for example *Achroia grisella*, *Acleris* spp. such as *A. fimbriana*, *A. gloverana*, *A. variana*; *Acrolepiopsis assectella*, *Acronicta major*, *Adoxophyes* spp. such as *A. cyrtosema*, *A. orana*; *Aedia leucomelas*, *Agrotis* spp. such as *A. exclamationis*, *A. fucosa*, *A. ipsilon*, *A. orthogoma*, *A. segetum*, *A. subterranea*; *Alabama argillacea*, *Aleurodicus dispersus*, *Alsophila pometaria*, *Ampelophaga rubiginosa*, *Amyeois transitella*, *Anacampsis sarcitella*, *Anagasta kuehniella*, *Anarsia lineatella*, *Anisota senatoria*, *Antheraea pernyi*, *Anticarsia* (=*Thermesia*) spp. such as *A. gemmatalis*; *Apamea* spp., *Aproaerema modicella*, *Archips* spp. such as *A. argyrospila*, *A. fuscocupreanus*, *A. rosana*, *A. xyoseanus*; *Argyresthia conjugella*, *Argyroploce* spp., *Argyrotaenia* spp. such as *A. veutinana*; *Athetis mindara*, *Austroasca viridigrisea*, *Autographa gamma*, *Autographa nigrisigna*, *Barathra brassicae*, *Bedellia* spp., *Bonagota salubricola*, *Borbo cinnara*, *Bucculatrix thurberiella*, *Bupalus piniarius*, *Busseola* spp.; *Cacoecia* spp. such as *C. murinana*, *C. podana*; *Cactoblastis cactorum*, *Cadra cautela*, *Calingo braziliensis*, *Caloptilis theivora*, *Capua reticulana*, *Carposina* spp. such as *C. niponensis*, *C. sasakii*; *Cephus* spp., *Chaetocnema aridula*, *Cheimatobia brumata*, *Chilo* spp. such as *C. indicus*, *C. suppressalis*, *C. partellus*; *Choreutis pariana*, *Choristoneura* spp. such as *C. conflictana*, *C. fumiferana*, *C. longicellana*, *C. murinana*, *C. occidentalis*, *C. rosaceany*; *Chrysodeixis* (=*Pseudopusia*) spp. such as *C. eriosoma*, *C. includens*; *Cirphis unipuncta*, *Clysia ambiguela*, *Cnaphalocerus* spp., *Cnaphalocrocis medinalis*, *Cnephasia* spp., *Cochyis hospes*, *Coleophora* spp., *Colias eurytheme*, *Conopomorpha* spp., *Conotrachelus* spp., *Copitarsia* spp., *Corcyra cephalonica*, *Crambus caliginosellus*, *Crambus teterrellus*, *Crocidosema* (=*Epinotia*) *aporema*, *Cydalima* (=*Diaphania*) *perspectalis*, *Cydia* (=*Carpocapsa*) spp. such as *C. pomonella*, *C. latiferreana*; *Dalaca noctuides*, *Datana integerrima*, *Dasychira pinicola*, *Dendrolimus* spp. such as *D. pini*, *D. spectabilis*, *D. sibiricus*; *Desmia funeralis*, *Diaphania* spp. such as *D. nitidalis*, *D. hyalinata*; *Diatraea grandiosella*, *Diatraea saccharalis*, *Diphthera festiva*, *Earias* spp. such as *E. insulana*, *E. vittella*; *Ecdytolopha aurantianu*, *Egira* (=*Xylomyges*) *curalis*, *Elasmopalpus lignosellus*, *Eldana saccharina*, *Endopiza viteana*, *Ennomos subsignaria*, *Eoreuma loftini*, *Ephestia* spp. such as *E. cautella*, *E. elutella*, *E. kuehniella*; *Epinotia aporema*, *Epiphyas postvittana*, *Eramnis tiliaria*, *Erionota thrax*, *Etiella* spp., *Eulia* spp., *Eupoecilia ambiguella*, *Euproctis chrysorrhoea*, *Euxoa* spp., *Evetria bouliana*, *Faronta albilinea*, *Feltia* spp. such as *F. subterranean*; *Galleria mellonella*, *Gracillaria* spp., *Grapholita* spp. such as *G. funebrana*, *G. molesta*, *G. inopinata*; *Halysidota* spp., *Harrisina americana*, *Hedylepta* spp., *Helicoverpa* spp. such as *H. armigera* (=*Heliothis armigera*), *H. zea* (=*Heliothis zea*); *Heliothis* spp. such as *H. assulta*, *H. subflexa*, *H. virescens*; *Hellula* spp. such as *H. undalis*, *H. rogatalis*; *Helocoverpa gelotopoeon*, *Hemileuca oliviae*, *Herpetogramma licarsisalis*, *Hibernia defoliaria*, *Hofmannophila pseudospretella*, *Homoeosoma electellum*, *Homona magnanma*, *Hypena scabra*, *Hyphantria cunea*, *Hyponomeuta padella*, *Hyponomeuta malinellus*, *Kakivoria flavofasciata*, *Keiferia lycopersicella*, *Lambdina fiscellaria fiscellaria*, *Lambdina fiscellaria lugubrosa*, *Lamprosema indicata*, *Laspeyresia molesta*, *Leguminivora glycinivorella*, *Lerodea eufala*, *Leucinodes orbonalis*, *Leucoma salicis*, *Leucoptera* spp. such as *L. coffeella*, *L. scitella*; *Leuminivora lycinivorella*, *Lithocolletis blancardella*, *Lithophane antennata*, *Llattia octo* (=*Amyna axis*), *Lobesia botrana*, *Lophocampa* spp., *Loxagrotis albicosta*, *Loxostege* spp. such as *L. sticticalis*, *L. cereralis*; *Lymantria* spp. such as *L. dispar*, *L. monacha*; *Lyonetia clerkella*, *Lyonetia prunifoliella*, *Malacosoma* spp. such as *M. americanum*, *M. californicum*, *M. constrictum*, *M. neustria*; *Mamestra* spp. such as *M. brassicae*, *M. configurata*; *Mamstra brassicae*, *Manduca* spp. such as *M. quinquemaculata*, *M. sexta*; *Marasmia* spp, *Marmara* spp., *Maruca testulalis*, *Megalopyge lanata*, *Melanchra picta*, *Melanitis leda*, *Mocis* spp. such as *M. lapites*, *M. repanda*; *Mocis latipes*, *Monochroa fragariae*, *Mythimna separata*, *Nemapogon cloacella*, *Neoleucinodes elegantalis*, *Nepytia* spp., *Nymphula* spp., *Oiketicus* spp., *Omiodes indicata*, *Omphisa anastomosalis*, *Operophtera brumata*, *Orgyia pseudotsugata*, *Oria* spp., *Orthaga thyrisalis*, *Ostrinia* spp. such as *O. nubilalis*; *Oulema oryzae*, *Paleacrita vernata*, *Panolis flammea*, *Parnara* spp., *Papaipema nebris*, *Papilio cresphontes*, *Paramyelois transitella*, *Paranthrene regalis*, *Paysandisia archon*, *Pectinophora* spp. such as *P. gossypiella*; *Peridroma saucia*, *Perileucoptera* spp., such as *P. coffeella*; *Phalera bucephala*, *Phryganidia californica*, *Phthorimaea* spp. such as *P. operculella*; *Phyllocnistis citrella*, *Phyllonorycter* spp. such as *P. blancardella*, *P. crataegella*, *P. issikii*, *P. ringoniella*; *Pieris* spp. such as *P. brassicae*, *P. rapae*, *P. napi*; *Pilocrocis tripunctata*, *Plathypena scabra*, *Platynota* spp. such as *P. flavedana*, *P. idaeusalis*, *P. stultana*; *Platyptilia carduidactyla*, *Plebejus argus*, *Plodia interpunctella*, *Plusia* spp, *Plutella maculipennis*, *Plutella xylostella*, *Pontia protodica*, *Prays* spp., *Prodenia* spp., *Proxenus lepigone*, *Pseudaletia* spp. such as *P. sequax*, *P. unipuncta*; *Pyrausta nubilalis*, *Rachiplusia nu*, *Richia albicosta*, *Rhizobius ventralis*, *Rhyacionia frustrana*, *Sabulodes aegrotata*, *Schizura concinna*, *Schoenobius* spp., *Schreckensteinia festaliella*, *Scirpophaga* spp. such as *S. incertulas*, *S. innotata*; *Scotia segetum*, *Sesamia* spp. such as *S. inferens*, *Seudyra subflava*, *Sitotroga cerealella*, *Sparganothis pilleriana*, *Spilonota lechriaspis*, *S. ocellana*, *Spodoptera* (=*Lamphygma*) spp. such as *S. cosmoides*, *S. eridania*, *S. exigua*, *S. frugiperda*, *S. latisfascia*, *S. littoralis*, *S. litura*, *S. omithogalli*; *Stigmella* spp., *Stomopteryx subsecivella*, *Strymon bazochii* *Sylepta derogata*, *Synanthedon* spp. such as *S. exitiosa*, *Tecia solanivora*, *Telehin licus*, *Thaumatopoea pityocampa*, *Thaumatotibia* (=*Cryptophlebia*) *leucotreta*, *Thaumetopoea pityocampa*, *Thecla* spp., *Theresimima ampelophaga*, *Thyrinteina* spp, *Tildenia inconspicuella*, *Tinea* spp. such as *T. cloacella*, *T. pellionella*; *Tineola bisselliella*, *Tortrix* spp. such as *T. viridana*; *Trichophaga tapetzella*, *Trichoplusia* spp. such as *T. ni*; *Tuta*

(=*Scrobipalpula*) *absoluta*, *Udea* spp. such as *U. rubigalis, U. rubigalis; Virachola* spp., *Yponomeuta padella*, and *Zeiraphera canadensis*;

insects from the order of Coleoptera, for example *Acalymma vittatum, Acanthoscehdes obtectus, Adoretus* spp., *Agelastica alni, Agrilus* spp. such as *A. anxius, A. planipennis, A. sinuatus; Agriotes* spp. such as *A. fuscicollis, A. lineatus, A. obscurus; Alphitobius diaperinus, Amphimallus solstitialis, Anisandrus dispar, Anisoplia austriaca, Anobium punctatum, Anomala corpulenta, Anomala rufocuprea, Anoplophora* spp. such as *A. glabripennis; Anthonomus* spp. such as *A. eugenii, A. grandis A. pomorum; Anthrenus* spp., *Aphthona euphoridae, Apion* spp., *Apogonia* spp., *Athous haemorrhoidalis, Atomaria* spp. such as *A. linearis; Attagenus* spp., *Aulacophora femoralis, Blastophagus piniperda, Blitophaga undata, Bruchidius obtectus, Bruchus* spp. such as *B. lentis, B. pisorum, B. rufimanus; Byctiscus betulae, Callidiellum rufpenne, Callopistria floridensis, Callosobruchus chinensis, Cameraria ohridella, Cassida nebulosa, Cerotoma trifurcata, Cetonia aurata, Ceuthorhynchus* spp. such as *C. assimilis, C. napi; Chaetocnema tibialis, Cleonus mendicus, Conoderus* spp. such as *C. vespertinus; Conotrachelus nenuphar, Cosmopolites* spp., *Costelytra zealandica, Crioceris asparagi, Cryptolestes ferrugineus, Cryptorhynchus lapathi, Ctenicera* spp. such as *C. destructor; Curculio* spp., *Cylindrocopturus* spp., *Cyclocephala* spp., *Dactylispa balyi, Dectes texanus, Dermestes* spp., *Diabrotica* spp. such as *D. undecimpunctata, D. speciosa, D. longicornis, D. semipunctata, D. virgifera; Diaprepes abbreviates, Dichocrocis* spp., *Dicladispa armigera, Diloboderus abderus, Diocalandra frumenti* (*Diocalandra stigmaticollis*), *Enaphalodes rufulus, Epilachna* spp. such as *E. varlvestis, E. vigintioctomaculata; Epitrix* spp. such as *E. hirtipennis, E. similars; Eutheola humilis, Eutinobothrus brasiliensis, Faustinus cubae, Gibbium psylloides, Gnathocerus cornutus, Hellula undalis, Heteronychus arator, Hylamorpha elegans, Hylobius abietis, Hylotrupes bajulus, Hypera* spp. such as *H. brunneipennis, H. postica; Hypomeces squamosus, Hypothenemus* spp., *Ips typographus, Lachnosterna consanguinea, Lasioderma serricorne, Latheticus oryzae, Lathridius* spp., *Lema* spp. such as *L. bilineata, L. melanopus; Leptinotarsa* spp. such as *L. decemlineata; Leptispa pygmaea, Limonius californicus, Lissorhoptrus oryzophilus, Lixus* spp., *Luperodes* spp., *Lyctus* spp. such as *L. bruneus; Liogenys fuscus, Macrodactylus* spp. such as *M. subspinosus; Maladera matrida, Megaplatypus mutates, Megascelis* spp., *Melanotus communis, Meligethes* spp. such as *M. aeneus; Melolontha* spp. such as *M. hippocastani, M. meloontha; Metamasius hemipterus, Microtheca* spp., *Migdolus* spp. such as *M. fryanus, Monochamus* spp. such as *M. alternatus; Naupactus xanthographus, Niptus hololeucus, Oberia brevis, Oemona hirta, Oryctes rhinoceros, Oryzaephilus surnamensis, Oryzaphagus oryzae, Otiorrhynchus sulcatus, Otiorrhynchus ovatus, Otiorrhynchus sulcatus, Oulema melanopus, Oulema oryzae, Oxycetonia jucunda, Phaedon* spp. such as *P. brassicae, P. cochleariae; Phoracantha recurva, Phyllobius pyri, Phyllopertha horticola, Phyllophaga* spp. such as *P. helleri; Phyllotreta* spp. such as *P. chrysocephala, P. nemorum, P. striolata, P. vittula; Phyllopertha horticola, Popillia japonica, Premnotrypes* spp., *Psacothea hilars, Psylliodes chrysocephala, Prostephanus truncates, Psylliodes* spp., *Ptinus* spp., *Pulga saltona, Rhizopertha dominica, Rhynchophorus* spp. such as *R. billineatus R. ferrugineus, R. palmarum. R. phoenicis, R. vulneratus; Saperda candida, Scolytus schevyrewi, Scyphophorus acupunctatus, Sitona lineatus, Sitophilus* spp. such as *S. granaria, S. oryzae, S. zeamais; Sphenophorus* spp. such as *S. levis; Stegobium paniceum, Sternechus* spp. such as *S. subsignatus; Strophomorphus ctenotus, Symphyletes* spp., *Tanymecus* spp., *Tenebrio molitor, Tenebrioides mauretanicus, Tribolium* spp. such as *T. castaneum; Trogoderma* spp., *Tychius* spp., *Xylotrechus* spp. such as *X. pyrrhoderus*; and, *Zabrus* spp. such as *Z. tenebrioides*;

insects from the order of *Diptera* for example *Aedes* spp. such as *A. aegypti, A. albopictus, A. vexans; Anastrepha ludens, Anopheles* spp. such as *A. albimanus, A. crucians, A. freeborni, A. gambiae, A. leucosphyrus, A. maculipennis, A. minimus, A. quadrimaculatus, A. sinensis; Bactrocera invadens, Bibio hortulanus, Calliphora erythrocephala, Calliphora vicina, Ceratitis capitata, Chrysomyia* spp. such as *C. bezziana, C. hominivorax, C. macellaria; Chrysops atlanticus, Chrysops discalis, Chrysops silacea, Cochliomyia* spp. such as *C. hominivorax; Contarnia* spp. such as *C. sorghicola; Cordylobia anthropophaga, Culex* spp. such as *C. nigripalpus, C. pipiens, C. quinquefasciatus, C. tarsalis, C. tritaeniorhynchus; Culicoides furens, Culiseta inornata, Culiseta melanura, Cuterebra* spp., *Dacus cucurbitae, Dacus oleae, Dasineura brassicae, Dasineura oxycoccana, Delia* spp. such as *D. antique, D. coarctata, D. platura, D. radicum; Dermatobia hominis, Drosophila* spp. such as *D. suzukii, Fannia* spp. such as *F. caniculars; Gastraphilus* spp. such as *G. intestinalis; Geomyza tipunctata, Glossina* spp. such as *G. fuscipes, G. morsitans, G. palpalis, G. tachinoides; Haematobia irritans, Haplodiplosis equestris, Hippelates* spp., *Hylemyia* spp. such as *H. platura; Hypoderma* spp. such as *H. lineata; Hyppobosca* spp., *Hydrellia philippina, Leptoconops torrens, Liriomyza* spp. such as *L. sativae, L. trifolii; Lucilia* spp. such as *L. caprina, L. cuprina, L. sericata; Lycoria pectoralis Mansonia titillanus, Mayetiola* spp. such as *M. destructor; Musca* spp. such as *M. autumnalis, M. domestica; Muscina stabulans, Oestrus* spp. such as *O. ovis; Opomyza florum, Oscinella* spp. such as *O. frit; Orseolia oryzae, Pegomya hysocyami, Phlebotomus argentipes, Phorbia* spp. such as *P. antiqua, P. brassicae, P. coarctata; Phytomyza gymnostoma, Prosimulium mixtum, Psila rosae, Psorophora columbiae, Psorophora discolor, Rhagoletis* spp. such as *R. cerasi, R. cingulate, R. indifferens, R. mendax, R. pomonella; Rivellia quadrifasciata, Sarcophaga* spp. such as *S. haemorrhoidalis; Simulium vittatum, Sitodiplosis mosellana, Stomoxys* spp. such as *S. calcitrans; Tabanus* spp. such as *T. atratus, T. bovinus, T. lineola, T. similis; Tannia* spp., *Thecodiplosis japonensis, Tipula oleracea, Tipula paludosa*, and *Wohfahrta* spp;

insects from the order of Thysanoptera for example, *Baliothrips biformis, Dichromothrips corbetti, Dichromothrips* ssp., *Echinothrips americanus, Enneothrips flavens, Frankliniella* spp. such as *F. fusca, F. occidentalis, F. tritici; Heliothrips* spp., *Hercinothrips femoralis, Kakothrips* spp., *Microcephalothrips abdominalis, Neohydatothrips samayunkur, Pezothrips kellyanus, Rhipiphorothrips cruentatus, Scirtothrips* spp. such as *S. citri, S. dorsalis, S. perseae; Stenchaetothinps* spp, *Taeniothrips cardamoni, Taeniothrips inconsequens, Thrips* spp. such as *T. imagines, T. hawaiiensis T. oryzae, T. palmi, T. parvispinus, T. tabaci*;

insects from the order of Hemiptera for example, *Acizzia jamatonica, Acrosternum* spp. such as *A. hilare; Acyrthosipon* spp. such as *A. onobrychis, A. pisum; Adelges laricis, Adelges tsugae, Adelphocoris* spp., such as *A. rapidus, A. superbus; Aeneolamia* spp., *Agonoscena* spp., *Aulacorthum solani, Aleurocanthus woglumi, Aleurodes* spp., *Aleurodicus disperses, Aleurolobus barodensis, Aleurothrixus* spp., *Amrasca* spp., *Anasa tristis, Antestiopsis* spp., *Anuraphis cardui, Aonidiella* spp., *Aphanostigma piri, Aphidula nas-* turtii, Aphis spp. such as A. craccivora, A. fabae, A. forbesi, A. gossypii, A. grossulariae, A. maidiradicis, A. pomi, A. sambuci, A. schneideri, A. spiraecola; Arboridia apicalis, Arilus critatus, Aspidiella spp., Aspidiotus spp., Atanus spp., Aulacaspis yasumatsui, Aulacorthum solani, Bactericera cockerelli (Paratrioza cockerelli), Bemisia spp. such as B. argentifolii, B. tabaci (Aleurodes tabaci); Blissus spp. such as B. leucopterus; Brachycaudus spp. such as B. cardui, B. helichrysi, B. persicae, B. prunicola; Brachycolus spp., Brachycorynella asparagi, Brevicoryne brassicae, Cacopsylla spp. such as C. fulguralis, C. pyricola (Psylla piri); Calligypona marginata, Calocors spp., Campylomma livida, Capitophorus horni, Carneocephala fulgida, Cavelerius spp., Ceraplastes spp., Ceratovacuna lanigera, Ceroplastes cerferus, Cerosipha gossypii, Chaetosiphon fragaefolii, Chionaspis tegalensis, Chlorita onukii, Chromaphis jugandicola, Chrysomphalus ficus, Cicadulina mbila, Cimex spp. such as C. hemipterus, C. lectularius; Coccomytilus hali, Coccus spp. such as C. hesperidum, C. pseudomagnoliarum; Corythucha arcuata, Creontiades dilutus, Cryptomyzus ribis, Chrysomphalus aonidum, Cryptomyzus ribis, Ctenarytaina spatulata, Cyrtopeltis notatus, Dalbulus spp., Dasynus piperis Dialeurodes spp. such as D. citrifoii; Dalbulus maidis, Diaphorina spp. such as D. citri; Diaspis spp. such as D. bromeliae; Dichelops furcatus, Diconocoris hewetti, Doralis spp., Dreyfusia nordmannianae, Dreyfusia piceae, Drosicha spp., Dysaphis spp. such as D. plantaginea, D. pyri, D. radicola; Dysaulacorthum pseudosolani, Dysdercus spp. such as D. cingulatus, D. intermedius; Dysmicoccus spp., Edessa spp., Geocoris spp., Empoasca spp. such as E. fabae, E. solana; Epidiaspis leperii, Eriosoma spp. such as E. lanigerum, E. pyricola; Erythroneura spp., Eurygaster spp. such as E. integriceps; Euscelis bilobatus, Euschistus spp. such as E. heros, E. impictiventris E. servus; Fiorinia theae, Geococcus coffeae, Glycaspis brimblecombei, Halyomorpha spp. such as H. halys; Heliopeltis spp., Homalodisca vitripennis (=H. coagulata), Horcias nobilellus, Hyalopterus pruni, Hyperomyzus lactucae, Icerya spp. such as I. purchase; Idiocerus spp., Idioscopus spp., Laodelphax striatellus, Lecanium spp., Lecanoideus floccissimus, Lepidosaphes spp. such as L. ulmi; Leptocorisa spp., Leptoglossus phyllopus, Lipaphis erysimi, Lygus spp. such as L. hesperus, L. lineolaris, L. pratensis; Maconellicoccus hirsutus, Marchalina hellenica, Macropes excavatus, Macrosiphum spp. such as M. rosae, M. avenae, M. euphorbiae; Macrosteles quadrilineatus, Mahanarva fimbriolata, Megacopta cribraria, Megoura viciae, Melanaphis pyrarius, Melanaphis sacchari, Melanocallis (=Tinocallis) caryaefoliae, Metcafiella spp., Metopolophium dirhodum, Monellia costalis, Monelliopsis pecanis, Myzocallis coryli, Murgantia spp., Myzus spp. such as M. ascalonicus, M. cerasi, M. nicotianae, M. persicae, M. varians; Nasonovia ribis-nigri, Neotoxoptera formosana, Neomegalotomus spp, Nephotettik spp. such as N. malayanus, N. nigropictus, N. parvus, N. virescens; Nezara spp. such as N. viridula; Nilaparvata lugens, Nysius huttoni, Oebalus spp. such as O. pugnax; Oncometopia spp., Orthezia praelonga, Oxycaraenus hyalinipennis, Para bemisia myricae, Parlatoria spp., Parthenolecanium spp. such as P. corni, P. persicae; Pemphigus spp. such as P. bursarius, P. populivenae; Peregrinus maidis, Perkinsiella saccharicida, Phenacoccus spp. such as P. aceris, P. gossypii; Phloeomyzus passerinii, Phorodon humuli, Phylloxera spp. such as P. devastatrix, Piesma quadrata, Piezodorus spp. such as P. guildinii; Pinnaspis aspidistrae, Planococcus spp. such as P. citri, P. ficus; Prosapia bicincta, Protopulvinaria pyriformis, Psallus seriatus, Pseudacysta persea, Pseudaulacaspis pentagona, Pseudococcus spp. such as P. comstocki; Psylla spp. such as P. mali; Pteromalus spp., Pulvinaria amygdali, Pyrila spp., Quadraspidiotus spp., such as Q. perniciosus; Quesada gigas, Rastrococcus spp., Reduvius senilis, Rhizoecus americanus, Rhodnius spp., Rhopalomyzus ascalonicus, Rhopalosiphum spp. such as R. pseudobrassicas, R. insertum, R. maidis, R. padi; Sagatodes spp., Sahlbergella singularis, Saissetia spp., Sappaphis mala, Sappaphis mali, Scaptocoris spp., Scaphoides titanus, Schizaphis graminum, Schizoneura lanuginosa, Scotinophora spp., Selenaspidus articulatus, Sitobion avenae, Sogata spp., Sogatella furcifera, Solubea insularis, Spissistilus festinus (=Stictocephala festina), Stephanitis nashi, Stephanitis pyrioides, Stephanitis takeyai, Tenalaphara malayensis, Tetraleurodes perseae, Therioaphis maculate, Thyanta spp. such as T. accerra, T. perditor; Tibraca spp., Tomaspis spp., Toxoptera spp. such as T. aurantii; Trialeurodes spp. such as T. abutilonea, T. ricin, T. vaporariorum; Triatoma spp., Trioza spp., Typhlocyba spp., Unaspis spp. such as U. citri, U. yanonensis; and Viteus vitifolii;

Insects from the order Hymenoptera for example Acanthomyops interjectus, Athalia rosae, Atta spp. such as A. capiguara, A. cephalotes, A. cephalotes, A. laevigata, A. robusta, A. sexdens, A. texana, Bombus spp., Brachymyrmex spp., Camponotus spp. such as C. floridanus, C. pennsylvanicus, C. modoc; Cardiocondyla nuda, Chalibion sp, Crematogaster spp., Dasymutila occidentalis, Diprion spp., Dolichovespula maculata, Dorymyrmex spp., Dryocosmus kuriphilus, Formica spp., Hoplocampa spp. such as H. minuta, H. testudinea; Iridomyrmex humilis, Lasius spp. such as L. niger, Linepithema humile, Liometopum spp., Leptocybe invasa, Monomorium spp. such as M. pharaonis, Monomorium, Nylandria fulva, Pachycondyla chinensis, Paratrechina longicorns, Paravespula spp., such as P. germanica, P. pennsylvanica, P. vulgaris; Pheidole spp. such as P. megacephala; Pogonomyrmex spp. such as P. barbatus, P. californcus, Polistes rubiginosa, Prenolepis impairs, Pseudomyrmex gracilis, Schelipron spp., Sirex cyaneus, Solenopsis spp. such as S. geminata, S.invicta, S. molesta, S. richteri, S. xyloni, Sphecius speciosus, Sphex spp., Tapinoma spp. such as T. melanocephalum, T. sessile; Tetramorium spp. such as T. caespitum, T. bicarinatum, Vespa spp. such as V. crabro; Vespula spp. such as V. squamosal; Wasmannia auropunctata, Xylocopa sp;

Insects from the order Orthoptera for example Acheta domesticus, Calliptamus italicus, Chortoicetes terminifera, Ceuthophilus spp., Diastrammena asynamora, Dociostaurus maroccanus, Gryllotalpa spp. such as G. africana, G. gryllotalpa; Gryllus spp., Hieroglyphus daganensis, Kraussaria angulifera, Locusta spp. such as L. migratoria, L. pardalina; Melanoplus spp. such as M. bivittatus, M. femurrubrum, M. mexicanus, M. sanguinipes, M. spretus; Nomadacris septemfasciata, Oedaleus senegalensis, Scapteriscus spp., Schistocerca spp. such as S. Americana, S. gregaria, Stemopelmatus spp., Tachycines asynamorus, and Zonozerus variegatus;

Pests from the Class Arachnida for example Acari, e.g. of the families Argasidae, Ixodidae and Sarcoptidae, such as Amblyomma spp. (e.g. A. americanum, A. variegatum, A. maculatum), Argas spp. such as A. persicu), Boophilus spp. such as B. annulatus, B. decoloratus, B. microplus, Dermacentor spp. such as D.silvarum, D. anderson, D. variabilis, Hyalomma spp. such as H. truncatum, Ixodes spp. such as I. ricinus, I. rubicundus, I. scapularis I. holocyclus, I. pacificus, Rhipicephalus sanguineus, Ornithodorus spp. such as O. moubata, O. hermsi, O. turicata, Ornithonyssus bacoti, Otobius megnin, Dermanyssus gallinae, Psoroptes spp. such as *P. ovis*, *Rhipicephalus* spp. such as *R. sanguineus*, *R. appendiculatus*, *Rhipicephalus evetsi*, *Rhizoglyphus* spp., *Sarcoptes* spp. such as *S. scabiei* and Family Eriophyidae including *Aceria* spp. such as *A. sheldoni*, *A. anthocoptes*, *Acallitus* spp., *Aculops* spp. such as *A. lycopersici*, *A. pelekassi Aculus* spp. such as *A. schechtendali*; *Colomerus vitis*, *Epitrimerus pyri*, *Phyllocoptruta oleivora*; *Eriophytes ribis* and *Eriophyes* spp. such as *Eriophyes sheldoni* Family Tarsonemidae including *Hemitarsonemus* spp., *Phytonemus pallidus* and *Polyphagotarsonemus latus*, *Stenotarsonemus* spp. *Steneotarsonemus spinki*; Family Tenuipalpidae including *Brevipalpus* spp. such as *B. phoenicis*; Family Tetranychidae including *Eotetranychus* spp., *Eutetranychus* spp., *Oligonychus* spp., *Petrobia latens*, *Tetranychus* spp. such as *T. cinnabarinus*, *T. evans*, *T. kanzawai*, *T. pacificus*, *T. phaseulus*, *T. telarius* and *T. urticae*; *Bryobia praetiosa*; *Panonychus* spp. such as *P. ulmi*, *P. citri Metatetranychus* spp. and *Oligonychus* spp. such as *O. pratensis*, *O. perseae*, *Vasates lycopersici*, *Raoiella indica*, Family Carpoglyphidae including *Carpoglyphus* spp.; *Penthaleidae* spp. such as *Halotydeus destructor* Family Demodicidae with species such as *Demodex* spp.; Family Trombicidea including *Trombicula* spp.; Family Macronyssidae including *Ornothonyssus* spp.; Family Pyemotidae including *Pyemotes tritici*; *Tyrophagus putrescentiae*; Family Acaridae including *Acarus siro*; Family Araneida including *Latrodectus mactans*, *Tegenaria agrestis*, *Chiracanthium* sp, *Lycosa* sp *Achaearanea tepidariorum* and *Loxosceles reclusa*;

Pests from the Phylum Nematoda, for example, plant parasitic nematodes such as root-knot nematodes, *Meloidogyne* spp. such as *M. hapla*, *M. incognita*, *M. javanica*; cyst-forming nematodes, *Globodera* spp. such as *G. rostochiensis*; *Heterodera* spp. such as *H. avenae*, *H. glycines*, *H. schachtii*, *H. trifoli*; Seed gall nematodes, *Anguina* spp.; Stem and foliar nematodes, *Aphelenchoides* spp. such as *A. besseyi*; Sting nematodes, *Belonolaimus* spp. such as *B. longicaudatus*; Pine nematodes, *Bursaphelenchus* spp. such as *B. lignicolus*, *B. xylophilus*; Ring nematodes, *Criconema* spp., *Criconemella* spp. such as *C. xenoplax* and *C. ornata*; and, *Criconemoides* spp. such as *Criconemoides informis*; *Mesocriconema* spp.; Stem and bulb nematodes, *Ditylenchus* spp. such as *D. destructor*, *D. dipsaci*; Awl nematodes, *Dolichodorus* spp.; Spiral nematodes, *Heliocotylenchus multicinctus*; Sheath and sheathoid nematodes, *Hemicycliophora* spp. and *Hemicriconemoides* spp.; *Hirshmanniella* spp.; Lance nematodes, *Hoploalmus* spp.; False rootknot nematodes, *Nacobbus* spp.; Needle nematodes, *Longidorus* spp. such as *L. elongatus*; Lesion nematodes, *Pratylenchus* spp. such as *P. brachyurus*, *P. neglectus*, *P. penetrans*, *P. curvitatus*, *P. goodeyi*; Burrowing nematodes, *Radopholus* spp. such as *R. simiis*; *Rhadopholus* spp.; *Rhodopholus* spp.; Reniform nematodes, *Rotylenchus* spp. such as *R. robustus*, *R. reniformis*; *Scutellonema* spp.; Stubby-root nematode, *Trichodorus* spp. such as *T. obtusus*, *T. primtivus*; *Paratrichodorus* spp. such as *P. minor*; Stunt nematodes, *Tylenchorhynchus* spp. such as *T. claytoni*, *T. dubius*; Citrus nematodes, *Tylenchulus* spp. such as *T. semipenetrans*; Dagger nematodes, *Xphinema* spp.; and other plant parasitic nematode species;

Insects from the order Isoptera for example *Calotermes flavicollis*, *Coptotermes* spp. such as *C. formosanus*, *C. gestroi*, *C. acinaciforms*; *Cornitermes cumulans*, *Cryptotermes* spp. such as *C. brevis*, *C. cavifrons*; *Globitermes sulfureus*, *Heterotermes* spp. such as *H. aureus*, *H. longiceps*, *H. tenuis*; *Leucotermes flavipes*, *Odontotermes* spp., *Incisitermes* spp. such as *I. minor*, *I. snyder*, *Marginitermes hubbardi*, *Mastotermes* spp. such as *M. darwiniensis* Neocapritermes spp. such as *N. opacus*, *N. parvus*; *Neotermes* spp., *Procornitermes* spp., *Zootermopsis* spp. such as *Z. angusticollis*, *Z. nevadensis*, *Reticulitermes* spp. such as *R. hesperus*, *R. tibialis*, *R. speratus*, *R. flavipes*, *R. grassei*, *R. lucifugus*, *R. santonensis*, *R. virginicus*; *Termes natalensis*, Insects from the order Blattaria for example *Blatta* spp. such as *B. orientalis*, *B. lateralis*; *Blattella* spp. such as *B. asahinae*, *B. germanica*; *Leucophaea maderae*, *Panchlora nivea*, *Periplaneta* spp. such as *P. americana*, *P. australasiae*, *P. brunnea*, *P. fuligginosa*, *P. japonica*; *Supella longipalpa*, *Parcoblatta pennsylvanica*, *Eurycotis floridana*, *Pycnoscelus surinamensis*, Insects from the order Siphonoptera for example *Cediopsylla simples*, *Ceratophyllus* spp., *Ctenocephalides* spp. such as *C. felis*, *C. canis*, *Xenopsylla cheopis*, *Pulex irritans*, *Trichodectes canis*, *Tunga penetrans*, and *Nosopsyllus fasciatus*, Insects from the order Thysanura for example *Lepisma saccharina*, *Ctenolepisma urbana*, and *Thermobia domestica*, Pests from the class Chilopoda for example *Geophilus* spp., *Scutigera* spp. such as *Scutigera coleoptrata*;

Pests from the class Diplopoda for example *Blaniulus guttulatus*, *Julus* spp., *Narceus* spp., Pests from the class Symphyla for example *Scutigerella immaculata*, Insects from the order Dermaptera, for example *Forficula auricularia*, Insects from the order Collembola, for example *Onychiurus* spp., such as *Onychiurus armatus*, Pests from the order Isopoda for example, *Armadillidium vulgare*, *Oniscus asellus*, *Porcellio scaber*, Insects from the order Phthiraptera, for example *Damalinia* spp., *Pediculus* spp. such as *Pediculus humanus capitis*, *Pediculus humanus corporis*, *Pediculus humanus humanus*; *Pthirus pubis*, *Haematopinus* spp. such as *Haematopinus eurysternus*, *Haematopinus suis*; *Linognathus* spp. such as *Linognathus vituli*; *Bovicola bovis*, *Menopon gallinae*, *Menacanthus stramineus* and *Solenopotes capillatus*, *Trichodectes* spp., Examples of further pest species which may be controlled by the compound I, preferably compound i) of formula (I) include: from the Phylum Mollusca, class Bivalvia, for example, *Dreissena* spp.; class Gastropoda, for example, *Arion* spp., *Biomphalaria* spp., *Bulinus* spp., *Deroceras* spp., *Galba* spp., *Lymnaea* spp., *Oncomelania* spp., *Pomacea canaliclata*, *Succinea* spp.; from the class of the helminths, for example, *Ancylostoma duodenale*, *Ancylostoma ceylanicum*, *Acylostoma braziliensis*, *Ancylostoma* spp., *Ascarislubricoides*, *Ascaris* spp., *Brugia malayi*, *Brugia timori*, *Bunostomum* spp., *Chabertia* spp., *Clonorchis* spp., *Cooperia* spp., *Dicrocoelium* spp., *Dictyocaulus filaria*, *Diphyllobothrium latum*, *Dracunculus medinensis*, *Echinococcus granulosus*, *Echinococcus multilocularis*, *Enterobius vermicularis*, *Facioa* spp., *Haemonchus* spp. such as *Haemonchus contortus*; *Heterakis* spp., *Hymenolepis nana*, *Hyostrongulus* spp., *Loa loa*, *Nematodirus* spp., *Oesophagostomum* spp., *Opisthorchis* spp., *Onchocerca volvulus*, *Ostertagia* spp., *Paragonimus* spp., *Schistosomen* spp., *Strongyloides fuelleborni*, *Strongyloides stercora lis*, *Stronyloides* spp., *Taenia saginata*, *Taenia solium*, *Trichinella spiralis*, *Trichinella nativa*, *Trichinella britovi*, *Trichinella nelsoni*, *Trichinella pseudopsiralis*, *Trichostrongulus* spp., *Trichuris trichiura*, *Wuchereria bancrofti*.

Besides compound i) of formula (I) also the carboxamide compound ii) of formula (Ia) and mixtures comprising compound i) of formula (I) and compound ii) of formula (Ia)

are suitable for efficiently combating animal pests such as arthropods, gastropods and nematodes as set out above.

For the avoidance of doubt: Mixtures comprising the carboxamide compounds i) and ii) are mixtures comprising both compound i) of formula (I) and compound ii) of formula (Ia).

Application Methods, Plants and Crops

The compounds I, preferably compound i) of formula (I), are suitable for use in protecting crops, plants, plant propagation materials, such as seeds, or its locus of growth, from attack or infestation by animal pests. Therefore, the present invention also relates to a plant protection method, which comprises contacting crops, plants, plant propagation materials, such as seeds, or its locus of growth, to be protected from attack or infestation by animal pests, with a pesticidally effective amount of the compound I, preferably compound i) of formula (I).

The compound I, preferably compound i) of formula (I), are also suitable for use in combating or controlling animal pests.

Therefore, the present invention also relates to a method of combating or controlling animal pests, which comprises contacting the animal pests, their habitat, breeding ground, or food supply, or the crops, plants, plant propagation materials, such as seeds, or soil, or the area, material or environment in which the animal pests are growing or may grow, with a pesticidally effective amount of the compound i) of formula (I).

The present invention also relates to a method of combating or controlling animal pests, which comprises contacting the animal pests, their habitat, breeding ground, or food supply, or the crops, plants, plant propagation materials, such as seeds, or soil, or the area, material or environment in which the animal pests are growing or may grow, with a pesticidally effective amount of compound ii) of formula (Ia).

The present invention also relates to a method of combating or controlling animal pests, which comprises contacting the animal pests, their habitat, breeding ground, or food supply, or the crops, plants, plant propagation materials, such as seeds, or soil, or the area, material or environment in which the animal pests are growing or may grow, with a pesticidally effective amount of mixtures comprising the carboxamide compounds i) and ii).

The compounds I, preferably compound i) of formula (I), are effective through both contact and ingestion. Furthermore, the compounds I, preferably compound i) of formula (I), can be applied to any and all developmental stages, such as egg, larva, pupa, and adult.

The compound I, preferably compound i) of formula (I), can be applied as such or in form of compositions comprising them as defined above. Furthermore, the compound I, preferably compound i) of formula (I), can be applied together with a mixing partner as defined above or in form of compositions comprising said mixtures as defined above. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active compound I, preferably compound i) of formula (I), to the furrow, and closing the furrow. Foliar application refers to the application of the pesticidally active compound I, preferably compound i) of formula (I), to plant foliage, e.g. through spray equipment. For foliar applications, it can be advantageous to modify the behavior of the pests by use of pheromones in combination with the compound I, preferably compound i) of formula (I). Suitable pheromones for specific crops and pests are known to a skilled person and publicly available from databases of pheromones and semiochemicals, such as http://www.pherobase.com.

As used herein, the term "contacting" includes both direct contact (applying the compounds/mixtures/compositions directly on the animal pest or plant—typically to the foliage, stem or roots of the plant) and indirect contact (applying the compounds/mixtures/compositions to the locus, i.e. habitat, breeding ground, plant, seed, soil, area, material or environment in which a pest is growing or may grow, of the animal pest or plant).

The term "animal pest" includes arthropods, gastropods, and nematodes. Preferred animal pests according to the invention are arthropods, preferably insects and arachnids, in particular insects. Insects, which are of particular relevance for crops, are typically referred to as crop insect pests.

The term "crop" refers to both, growing and harvested crops.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called Stevia); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

The term "plant" is to be understood as including wild type plants and plants, which have been modified by either conventional breeding, or mutagenesis or genetic engineering, or by a combination thereof.

Plants, which have been modified by mutagenesis or genetic engineering, and are of particular commercial importance, include alfalfa, rapeseed (e.g. oilseed rape), bean, carnation, chicory, cotton, eggplant, eucalyptus, flax, lentil, maize, melon, papaya, petunia, plum, poplar, potato, rice, soybean, squash, sugar beet, sugarcane, sunflower, sweet pepper, tobacco, tomato, and cereals (e.g. wheat), in particular maize, soybean, cotton, wheat, and rice. In plants, which have been modified by mutagenesis or genetic engineering, one or more genes have been mutagenized or integrated into the genetic material of the plant. The one or more mutagenized or integrated genes are preferably selected from pat, epsps, cry1Ab, bar, cry1Fa2, cry1Ac, cry34Ab1, cry35AB1, cry3A, cryF, cry1F, mcry3a, cry2Ab2, cry3Bb1, cry1A.105, dfr, barnase, vip3Aa20, barstar, als, bxn, bp40, asn1, and ppo5. The mutagenesis or integration of the one or more genes is performed in order to improve certain properties of the plant. Such properties, also known as traits, include abiotic stress tolerance, altered growth/yield, disease resistance, herbicide tolerance, insect resistance, modified product quality, and pollination control. Of these properties, herbicide tolerance, e.g. imidazolinone tolerance, glyphosate tolerance, or glufosinate tolerance, is of particular importance. Several plants have been rendered tolerant to herbicides by mutagenesis, for example Clearfield® oilseed rape being tolerant to imidazolinones, e.g. imazamox. Alternatively, genetic engineering methods have been used to render plants, such as soybean, cotton, corn, beets and oil seed rape, tolerant to herbicides, such as glyphosate and glufosinate, some of which are commercially available under the trade names RoundupReady® (glyphosate) and Libertylink® (glufosinate). Furthermore, insect resistance is of importance, in particular lepidopteran insect resistance and coleopteran insect resistance. Insect resistance is typically achieved by modifying plants by integrating cry and/or vip genes, which were isolated from *Bacillus thuringiensis* (Bt), and code for the respective Bt toxins. Genetically modified plants with insect resistance are commercially available under trade names including WideStrike®, Bollgard®, Agrisure®, Herculex®, YieldGard®, Genuity®, and Intacta®. Plants may be modified by mutagenesis or genetic engineering either in terms of one property (singular traits) or in terms of a combination of properties (stacked traits). Stacked traits, e.g. the combination of herbicide tolerance and insect resistance, are of increasing importance. In general, all relevant modified plants in connection with singular or stacked traits as well as detailed information as to the mutagenized or integrated genes and the respective events are available from websites of the organizations "International Service for the Acquisition of Agribiotech Applications (ISAAA)" and "Center for Environmental Risk Assessment (CERA)".

The term "plant propagation material" refers to all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be transplanted after germination or after emergence from soil, may also be included. These plant propagation materials may be treated prophylactically with a plant protection mixture either at or before planting or transplanting.

The term "seed" embraces seeds and plant propagules of all kinds including but not limited to true seeds, seed pieces, suckers, corms, bulbs, fruit, tubers, grains, cuttings, cut shoots and the like, and means in a preferred embodiment true seeds.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary for the various compounds/mixtures/compositions used in the invention. A pesticidally effective amount of the compositions will also vary according to the prevailing conditions such as desired pesticidal effect and duration, weather, target species, locus, mode of application, and the like.

In the case of soil treatment, in furrow application or of application to the pests dwelling place or nest, the quantity of active ingredient ranges from 0.0001 to 500 g per 100 m$^2$, preferably from 0.001 to 20 g per 100 m$^2$.

For use in treating crop plants, e.g. by foliar application, the rate of application of the active ingredients of this invention may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The compounds I, preferably compound i) of formula (I), are particularly suitable for use in the treatment of seeds in order to protect the seeds from insect pests, in particular from soil-living insect pests, and the resulting seedling's roots and shoots against soil pests and foliar insects. The present invention therefore also relates to a method for the protection of seeds from insects, in particular from soil insects, and of the seedling's roots and shoots from insects, in particular from soil and foliar insects, said method comprising treating the seeds before sowing and/or after pregermination with the compound I, preferably compound i) of formula (I). The protection of the seedling's roots and shoots is preferred. More preferred is the protection of seedling's shoots from piercing and sucking insects, chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the compound I, preferably compound i) of formula (I), is carried out by spraying or by dusting the seeds before sowing of the plants and before emergence of the plants.

The present invention also comprises seeds coated with or containing the active compound I, preferably compound i) of formula (I). The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

Suitable seed is for example seed of cereals, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/ squash, cabbage, iceberg lettuce, pepper, cucumbers, melons, *Brassica* species, melons, beans, peas, garlic, onions, carrots, tuberous plants such as potatoes, sugar cane, tobacco, grapes, petunias, geranium/pelargoniums, pansies and impatiens.

In addition, the active compound I, preferably compound i) of formula (I), may also be used for the treatment of seeds from plants, which have been modified by mutagenisis or genetic engineering, and which e.g. tolerate the action of herbicides or fungicides or insecticides. Such modified plants are described herein in detail elsewhere.

Preferences

Application methods, which are of particular relevance in connection with the mixture of the invention are described in detail further below. Preferences of particular importance are provided in the following.

In one aspect, the present invention relates to the use of the carboxamide compound i) of formula (I) for protecting a cultivated plant, cultivated plant propagation material, or its locus of growth, against the attack or infestation by pests.

In another aspect, the present invention relates to the use of the carboxamide compound ii) of formula (Ia) for protecting a cultivated plant, cultivated plant propagation material, or its locus of growth, against the attack or infestation by pests.

In still another aspect, the present invention relates to the use of mixtures comprising the carboxamide compounds i) and ii) for protecting a cultivated plant, cultivated plant propagation material, or its locus of growth, against the attack or infestation by pests.

In another aspect, the present invention relates to a method for controlling pests, which method comprises the application of a pesticidally effective amount of the carboxamide compound compound i) of formula (I) to a cultivated plant, cultivated plant propagation material, or its locus of growth; the pests or their food supply, habitat or breeding grounds.

In another aspect, the present invention relates to a method for controlling pests, which method comprises the application of a pesticidally effective amount of the carboxamide compound ii) of formula (Ia) to a cultivated plant, cultivated plant propagation material, or its locus of growth; the pests or their food supply, habitat or breeding grounds.

In another aspect, the present invention relates to a method for controlling pests, which method comprises the application of a pesticidally effective amount of a mixture comprising the carboxamide compounds i) and ii) to a cultivated plant, cultivated plant propagation material, or its locus of growth; the pests or their food supply, habitat or breeding grounds.

The application of the carboxamide compound I, preferably compound i) of formula (I) in connection with the above use or method includes both contact with the cultivated plant or cultivated plant propagation material and contact with its locus of growth. The term "locus of growth" is to be understood as the locus, where the plant is growing, in particular the soil or water, in which the plant is growing.

Furthermore, the methods of the present invention relates in one embodiment to the application to the pests or their food supply, habitat or breeding grounds.

In a preferred embodiment of the above use or method comprising the application of the carboxamide compound i) of formula (I), it is applied to the plants, in particular parts of the plants such as the foliage.

In another embodiment of the above use or method comprising the application of the carboxamide compound ii) of formula (Ia), it is applied to the plants, in particular parts of the plants such as the foliage.

In another embodiment of the above use or method comprising the application of a mixture comprising the carboxamide compounds i) and ii), it is applied to the plants, in particular parts of the plants such as the foliage.

In a particularly preferred embodiment of the above use or method, the carboxamide compound i) of formula (I) is applied to the foliage of the plants, preferably in an amount of from 1 g to 100 g per hectare, more preferably in an amount of from 10 g to 50 g per hectare.

In another embodiment of the above use or method, the carboxamide compound ii) of formula (Ia) is applied to the foliage of the plants, preferably in an amount of from 1 g to 100 g per hectare, more preferably in an amount of from 10 g to 50 g per hectare.

In still another embodiment of the above use or method, the mixture comprising the carboxamide compounds i) and ii) is applied to the foliage of the plants, preferably in an amount of from 1 g to 100 g per hectare, more preferably in an amount of from 10 g to 50 g per hectare.

In an alternative preferred embodiment of the above use or method, the carboxamide compound i) of formula (I) is applied to the plant propagation material, preferably the seeds of a plant.

In another embodiment of the above use or method, the carboxamide compound ii) of formula (Ia) is applied to the plant propagation material, preferably the seeds of a plant.

In another embodiment of the above use or method, the mixture comprising the carboxamide compounds i) and ii) is applied to the plant propagation material, preferably the seeds of a plant.

In a particularly preferred embodiment of the above use or method, the carboxamide compound i) of formula (I) is applied to the seeds of the plants, preferably in an amount of from 1 g to 5 kg per 100 kg of seed, in particular from 1 g to 1000 g per 100 kg of seed.

In another embodiment of the above use or method, the carboxamide compound ii) of formula (Ia) is applied to the seeds of the plants, preferably in an amount of from 1 g to 5 kg per 100 kg of seed, in particular from 1 g to 1000 g per 100 kg of seed.

In still another embodiment of the above use or method, the mixture comprising the carboxamide compounds i) and ii) is applied to the seeds of the plants, preferably in an amount of from 1 g to 5 kg per 100 kg of seed, in particular from 1 g to 1000 g per 100 kg of seed.

In case the carboxamide compound I, preferably compound i) of formula (I) is applied in a mixture with another agriculturally active ingredient, the components of the mixture can be—as mentioned above—applied simultaneously, jointly or separately, or in succession, that is immediately one after another and thereby creating the mixture "in situ" on the desired location, e.g. the plant, the sequence, in the case of separate application, generally not having any effect on the result of the control measures.

The application methods, uses and mixtures of the present invention are particularly useful for controlling insects of the orders Lepidoptera, Coleoptera and Thysanoptera.

The application methods, uses and mixtures of the present invention are especially suitable for efficiently combating pests like insects from the order of the lepidopterans (Lepidoptera), beetles (Coleoptera) and thrips (Thysanoptera).

In a preferred embodiment of the above use or method comprising the application of the mixture of the invention, the pests are selected from insects from the order of Lepidoptera, preferably from the group consisting of *Anticarsia*

(=*Thermesia*) spp., *Chrysodeixis* (=*Pseudoplusia*) spp., *Helicoverpa* spp., *Spodoptera* (=*Lamphygma*) spp., and combinations thereof, more preferably from the group consisting of *Helicoverpa* spp., *Spodoptera* spp., and combinations thereof, most preferably from *Helicoverpa armigera* (=*Heliothis armigera*), *Spodoptera* spp., and combinations thereof, in particular from *Helicoverpa armigera* (=*Heliothlis armigera*), *Spodoptera frugiperda*, *Spodoptera cosmioides*, and combinations thereof.

In another preferred embodiment, the pests are selected from the group consisting of *Anticarsia gemmatalis, Chlysodeixis includens* (=*Pseudoplusia includens*), *Helicoverpa armigera* (=*Heliothis armigera*), *Spodoptera frugiperda, Spodoptera eridania, Spodoptera cosmioides*, and combinations thereof, and are preferably selected from *Spodoptera eridania, Spodoptera cosmioides*, or a combination thereof, and are particularly preferably *Spodoptera cosmioides*.

In another preferred embodiment, the pests are *Anticarsia gemmatalis*.

In another preferred embodiment, the pests are *Chrysodeixis includens* (=*Pseudoplusiaincludens*).

In another preferred embodiment, the pests are *Helicoverpa armigera* (=*Heliothlis armigera*).

In another preferred embodiment, the pests are *Spodoptera frugiperda*.

In another preferred embodiment, the pests are *Spodoptera eridania*.

In another preferred embodiment, the pests are *Spodoptera cosmioides*.

As outlined above, the above mentioned pests are of particular importance in connection with certain plants.

In one embodiment of the above use or method comprising the application of the carboxamide compound i) of formula (I), the plant is a plant, which has been modified by conventional breeding, i.e. a plant, which has not been modified by mutagenesis or genetic engineering.

In another embodiment of the above use or method comprising the application of the carboxamide compound ii) of formula (Ia), the plant is a plant, which has been modified by conventional breeding, i.e. a plant, which has not been modified by mutagenesis or genetic engineering.

In another embodiment of the above use or method comprising the application of a mixture comprising the carboxamide compounds i) and ii), the plant is a plant, which has been modified by conventional breeding, i.e. a plant, which has not been modified by mutagenesis or genetic engineering.

Preferably, the plant, which has not been modified by mutagenesis or genetic engineering, is selected from the group consisting of wheat, maize, rice, soybean, and cotton, and is more preferably a soybean plant.

In another embodiment of the above use or method comprising the application of the mixture of the invention, the plant is a plant, which has been modified by mutagenesis or genetic engineering, preferably by genetic engineering.

In a more preferred embodiment of such the embodiment, in the plant, which has been modified by mutagenesis or genetic engineering, one or more genes have been mutagenized or integrated into the genetic material of the plant, which are selected from pat, epsps, cry1Ab, bar, cry1Fa2, cry1Ac, cry34Ab1, cry35AB1, cry3A, cryF, cry1F, mcry3a, cry2Ab2, cry3Bb1, cry1A.105, dfr, barnase, vip3Aa20, barstar, als, bxn, bp40, asn1, and ppo5.

In another more preferred embodiment, the plant, which has been been modified by mutagenesis or genetic engineering, exhibits one or more traits selected from the group consisting of abiotic stress tolerance, altered growth/yield, disease resistance, herbicide tolerance, insect resistance, modified product quality, and pollination control. Preferably, the plant exhibits herbicide tolerance, insect resistance or a combination thereof.

In a preferred embodiment of the use or method as defined above, the plant is a plant, which has been modified by mutagenesis or genetic engineering, and which corresponds to any one of rows A1 to A385 of table A.

TABLE A

| No. | Crop, latin name | Event Name | Event Code | Tradename | Trait (Trait type)/Gene | Company |
|---|---|---|---|---|---|---|
| A1 | Alfalfa *Medicago sativa* | J101 | MON-ØØ1Ø1-8 | Roundup Ready ™ Alfalfa | HT (Gly)/cp4 epsps (aroA:CP4) | Monsanto |
| A2 | Alfalfa *Medicago sativa* | J101 × J163 | MON-ØØ1Ø1-8 × MON-ØØ163-7 | Roundup Ready ™ Alfalfa | HT (Gly)/cp4 epsps (aroA:CP4) HT (Gly)/cp4 epsps (aroA:CP4) | Monsanto |
| A3 | Alfalfa *Medicago sativa* | J163 | MON-ØØ163-7 | Roundup Ready ™ Alfalfa | HT (Gly)/cp4 epsps (aroA:CP4) | Monsanto |
| A4 | Alfalfa *Medicago sativa* | KK179 | MON-ØØ179-5 | Not available | ST (Lignin)/ccomt (inverted repeat) | Monsanto |
| A5 | Argentine Canola *Brassica napus* | 23-18-17 (Event 18) | CGN-89111-8 | Laurical ™ Canola | ST (Oil)/te (thioesterase) | Monsanto |
| A6 | Argentine Canola *Brassica napus* | 23-198 (Event 23) | CGN-89465-2 | Laurical ™ Canola | ST (Oil)/te (thioesterase) | Monsanto |
| A7 | Argentine Canola *Brassica napus* | 61061 | DP-Ø61Ø61-7 | not available | HT (Gly)/gat4621 | Dupont |
| A8 | Argentine Canola *Brassica napus* | 73496 | DP-Ø73496-4 | Optimum ® Gly canola | HT (Gly)/gat4621 | Dupont |
| A9 | Argentine Canola *Brassica napus* | GT200 (RT200) | MON-89249-2 | Roundup Ready ™ Canola | HT (Gly)/EPSPS HT (Gly)/goxv247 | Monsanto |
| A10 | Argentine Canola *Brassica napus* | GT73 (RT73) | MON-ØØØ73-7 | Roundup Ready ™ Canola | HT (Gly)/EPSPS HT (Gly)/goxv247 | Monsanto |
| A11 | Argentine Canola *Brassica napus* | HCN10 (Topas 19/2) | not available | Liberty Link ™ Independence ™ | HT (Glu)/bar | Bayer Crop Science |
| A12 | Argentine Canola *Brassica napus* | HCN28 (T45) | ACS-BNØØ8-2 | InVigor ™ Canola | HT (Glu)/pat (syn) | Bayer Crop Science |
| A13 | Argentine Canola *Brassica napus* | HCN92 (Topas 19/2) | ACS-BNØØ7-1 | Liberty Link ™ Innovator ™ | HT (Glu)/bar | Bayer Crop Science |

TABLE A-continued

| No. | Crop, latin name | Event Name | Event Code | Tradename | Trait (Trait type)/Gene | Company |
|---|---|---|---|---|---|---|
| A14 | Argentine Canola *Brassica napus* | MON88302 | MON-883Ø2-9 | TruFlex ™ Roundup Ready ™ Canola | HT (Gly)/cp4 epsps (aroA:CP4) | Monsanto |
| A15 | Argentine Canola *Brassica napus* | MON88302 × MS8 × RF3 | MON-883Ø2-9 × ACS-BNØØ5-8 × ACS-BNØØ3-6 | not available | HT (Gly)/cp4 epsps (aroA:CP4) HT (Glu)/bar PC (MS)/barnase PC (FR)/barstar | Monsanto |
| A16 | Argentine Canola *Brassica napus* | MON88302 × RF3 | MON-883Ø2-9 × ACS-BNØØ3-6 | not available | HT (Gly)/cp4 epsps (aroA:CP4) HT (Glu)/bar PC (FR)/barstar | Monsanto |
| A17 | Argentine Canola *Brassica napus* | MPS961 | not available | Phytaseed ™ Canola | ST (P)/phyA | BASF |
| A18 | Argentine Canola *Brassica napus* | MPS962 | not available | Phytaseed ™ Canola | ST (P)/phyA | BASF |
| A19 | Argentine Canola *Brassica napus* | MPS963 | not available | Phytaseed ™ Canola | ST (P)/phyA | BASF |
| A20 | Argentine Canola *Brassica napus* | MPS964 | not available | Phytaseed ™ Canola | ST (P)/phyA | BASF |
| A21 | Argentine Canola *Brassica napus* | MPS965 | not available | Phytaseed ™ Canola | ST (P)/phyA | BASF |
| A22 | Argentine Canola *Brassica napus* | MS1 (B91-4) | ACS-BNØØ4-7 | InVigor ™ Canola | HT (Glu)/bar PC (MS)/barnase | Bayer Crop Science |
| A23 | Argentine Canola *Brassica napus* | MS1 × RF1 (PGS1) | ACS-BNØØ4-7 × ACS-BNØØ1-4 | InVigor ™ Canola | HT (Glu)/bar PC (MS)/barnase PC (FR)/barstar | Bayer Crop Science |
| A24 | Argentine Canola *Brassica napus* | MS1 × RF2 (PGS2) | ACS-BNØØ4-7 × ACS-BNØØ2-5 | InVigor ™ Canola | HT (Glu)/bar PC (MS)/barnase PC (FR)/barstar | Bayer Crop Science |
| A25 | Argentine Canola *Brassica napus* | MS1 × RF3 | ACS-BNØØ4-7 × ACS-BNØØ3-6 | Invigor ™ Canola | HT (Glu)/bar PC (MS)/barnase PC (FR)/barstar | Bayer Crop Science |
| A26 | Argentine Canola *Brassica napus* | MS8 | ACS-BNØØ5-8 | InVigor ™ Canola | HT (Glu)/bar PC (MS)/barnase | Bayer Crop Science |
| A27 | Argentine Canola *Brassica napus* | MS8 × RF3 | ACS-BNØØ5-8 × ACS-BNØØ3-6 | InVigor ™ Canola | HT (Glu)/bar PC (MS)/barnase PC (FR)/barstar | Bayer Crop Science |
| A28 | Argentine Canola *Brassica napus* | MS8 × RF3 × GT73 (RT73) | ACS-BNØØ5-8 × ACS-BNØØ3-6 × MON-ØØØ73-7 | not available | HT (Glu)/bar PC (MS)/barnase PC (FR)/barstar HT (Gly)/EPSPS HT (Gly)/goxv247 | Bayer Crop Science |
| A29 | Argentine Canola *Brassica napus* | OXY-235 | ACS-BNØ11-5 | Navigator ™ Canola | HT (Ox)/bxn | Bayer Crop Science |
| A30 | Argentine Canola *Brassica napus* | PHY14 | not available | not available | HT (Glu)/bar PC (MS)/barnase PC (FR)/barstar | Bayer Crop Science |
| A31 | Argentine Canola *Brassica napus* | PHY23 | not available | not available | HT (Glu)/bar PC (MS)/barnase PC (FR)/barstar | Bayer Crop Science |
| A32 | Argentine Canola *Brassica napus* | PHY35 | not available | not available | HT (Glu)/bar PC (MS)/barnase PC (FR)/barstar | Bayer Crop Science |
| A33 | Argentine Canola *Brassica napus* | PHY36 | not available | not available | HT (Glu)/bar PC (MS)/barnase PC (FR)/barstar | Bayer Crop Science |
| A34 | Argentine Canola *Brassica napus* | RF1 (B93-101) | ACS-BNØØ1-4 | InVigor ™ Canola | HT (Glu)/bar PC (FR)/barstar | Bayer Crop Science |
| A35 | Argentine Canola *Brassica napus* | RF2 (B94-2) | ACS-BNØØ2-5 | InVigor ™ Canola | HT (Glu)/bar PC (FR)/barstar | Bayer Crop Science |
| A36 | Argentine Canola *Brassica napus* | RF3 | ACS-BNØØ3-6 | InVigor ™ Canola | HT (Glu)/bar PC (FR)/barstar | Bayer Crop Science |
| A37 | Argentine Canola *Brassica napus* | 45A37, 46A40 | 45A37, 46A40 | not available | ST (Oil)/fad2 (mutant) | Pioneer |
| A38 | Argentine Canola *Brassica napus* | 46A12, 46A16 | 46A12, 46A16 | not available | ST (Oil)/fad2 (mutant) | Pioneer |
| A39 | Argentine Canola *Brassica napus* | NS738, NS1471, NS1473 | NS738, NS1471, NS1473 | Clearfield Canola | HT (Imi)/als (mutant) | Pioneer |
| A40 | Bean *Phaseolus vulgaris* | EMB6X 5.1 | EMB-PVØ51-1 | not available | VR (BGMV)/ac1 (sense and anti-sense) | Embrapa |
| A41 | Carnation *Dianthus caryophyllus* | 11 (7442) | FLO-Ø7442-4 | Moondust ™ | ST (Color)/dfr ST (Color)/hfl (f3'5'h) | Florigene Pty. Ltd. |

TABLE A-continued

| No. | Crop, latin name | Event Name | Event Code | Tradename | Trait (Trait type)/Gene | Company |
|---|---|---|---|---|---|---|
| A42 | Carnation *Dianthus caryophyllus* | 11363 (1363A) | FLO-11363-1 | Moonshadow ™ | ST (Color)/dfr<br>ST (Color)/bp40 (f3'5'h) | Florigene Pty. Ltd. |
| A43 | Carnation *Dianthus caryophyllus* | 1226A (11226) | FLO-11226-8 | Moonshade ™ | ST (Color)/dfr<br>ST (Color)/bp40 (f3'5'h) | Florigene Pty. Ltd. |
| A44 | Carnation *Dianthus caryophyllus* | 123.2.2 (40619) | FLO-4Ø619-7 | Moonshade ™ | ST (Color)/dfr<br>ST (Color)/hfl (f3'5'h) | Florigene Pty. Ltd. |
| A45 | Carnation *Dianthus caryophyllus* | 123.2.38 (40644) | FLO-4Ø644-4 | Moonlite ™ | ST (Color)/dfr<br>ST (Color)/hfl (f3'5'h) | Florigene Pty. Ltd. |
| A46 | Carnation *Dianthus caryophyllus* | 123.8.12 | FLO-4Ø689-6 | Moonaqua ™ | ST (Color)/dfr<br>ST (Color)/bp40 (f3'5'h) | Florigene Pty. Ltd. |
| A47 | Carnation *Dianthus caryophyllus* | 123.8.8 (40685) | FLO-4Ø685-1 | Moonvista ™ | ST (Color)/dfr<br>ST (Color)/bp40 (f3'5'h) | Florigene Pty. Ltd. |
| A48 | Carnation *Dianthus caryophyllus* | 1351A (11351) | FLO-11351-7 | Moonshade ™ | ST (Color)/dfr<br>ST (Color)/bp40 (f3'5'h) | Florigene Pty. Ltd. |
| A49 | Carnation *Dianthus caryophyllus* | 1400A (11400) | FLO-114ØØ-2 | Moonshade ™ | ST (Color)/dfr<br>ST (Color)/bp40 (f3'5'h) | Florigene Pty. Ltd. |
| A50 | Carnation *Dianthus caryophyllus* | 15 | FLO-ØØØ15-2 | Moondust ™ | ST (Color)/dfr<br>ST (Color)/hfl (f3'5'h) | Florigene Pty. Ltd. |
| A51 | Carnation *Dianthus caryophyllus* | 16 | FLO-ØØØ16-3 | Moondust ™ | ST (Color)/dfr<br>ST (Color)/hfl (f3'5'h) | Florigene Pty. Ltd. |
| A52 | Carnation *Dianthus caryophyllus* | 19Ø7 | IFD-199Ø7-9 | Moonique ™ | ST (Color)/dfr<br>ST (Color)/bp40 (f3'5'h)<br>ST (Color)/sfl (f3'5'h)<br>HT (SU)/surB | Suntory Ltd. |
| A53 | Carnation *Dianthus caryophyllus* | 25947 | IFD-25947-1 | Moonpearl ™ | ST (Color)/bp40 (f3'5'h)<br>ST (Color)/dfr<br>ST (Color)/dfr-diaca<br>HT (SU)/surB | Suntory Ltd. |
| A54 | Carnation *Dianthus caryophyllus* | 25958 | IFD-25958-3 | Moonberry ™ | ST (Color)/bp40 (f3'5'h)<br>ST (Color)/dfr<br>ST (Color)/dfr-diaca<br>HT (SU)/surB | Suntory Ltd. |
| A55 | Carnation *Dianthus caryophyllus* | 264Ø7 | IFD-264Ø7-2 | Moonvelvet ™ | ST (Color)/hfl (f3'5'h)<br>ST (Color)/cytb5<br>HT (SU)/surB | Suntory Ltd. |
| A56 | Carnation *Dianthus caryophyllus* | 4 | FLO-ØØØØ4-9 | Moondust ™ | ST (Color)/dfr<br>ST (Color)/hfl (f3'5'h) | Florigene Pty. Ltd. |
| A57 | Carnation *Dianthus caryophyllus* | 66 | FLO-ØØØ66-8 | not available | ST (Ripe)/acc (truncated) | Florigene Pty. Ltd. |
| A58 | Carnation *Dianthus caryophyllus* | 959A (11959) | FLO-11959-3 | Moonshade ™ | ST (Color)/dfr<br>ST (Color)/bp40 (f3'5'h) | Florigene Pty. Ltd. |
| A59 | Carnation *Dianthus caryophyllus* | 988A (11988) | FLO-11988-7 | Moonshade ™ | ST (Color)/dfr<br>ST (Color)/bp40 (f3'5'h) | Florigene Pty. Ltd. |
| A60 | Chicory *Cichorium intybus* | RM3-3 | not available | Seed Link ™ | HT (Glu)/bar<br>PC (MS)/barnase | Bejo Zaden BV |
| A61 | Chicory *Cichorium intybus* | RM3-4 | not available | Seed Link ™ | HT (Glu)/bar<br>PC (MS)/barnase | Bejo Zaden BV |
| A62 | Chicory *Cichorium intybus* | RM3-6 | not available | Seed Link ™ | HT (Glu)/bar<br>PC (MS)/barnase | Bejo Zaden BV |
| A63 | Cotton *Gossypium hirsutum* | 19-51a | DD-Ø1951A-7 | not available | HT (SU)/S4-hrA | Dupont |
| A64 | Cotton *Gossypium hirsutum* | 281-24-236 | DAS-24236-5 | not available | IR (BL)/cry1F | Dow |
| A65 | Cotton *Gossypium hirsutum* | 281-24-236 × 3006-210-23 (MXB-13) | DAS-24236-5 × DAS-21Ø23-5 | WideStrike ™ Cotton | IR (BL)/cry1F<br>IR (BL)/cry1Ac | Dow |
| A66 | Cotton *Gossypium hirsutum* | 3006-210-23 | DAS-21Ø23-5 | not available | IR (BL)/Cry1Ac | Dow |

TABLE A-continued

| No. | Crop, latin name | Event Name | Event Code | Tradename | Trait (Trait type)/Gene | Company |
|---|---|---|---|---|---|---|
| A67 | Cotton Gossypium hirsutum | 3006-210-23 × 281-24-236 × MON1445 | DAS-21Ø23-5 × DAS-24236-5 × MON-Ø1445-2 | WideStrike ™ Roundup Ready ™ Cotton | HT (Gly)/cp4 epsps (aroA:CP4) IR (BL)/cry1F IR (BL)/cry1Ac HT (Glu)/bar | Monsanto |
| A68 | Cotton Gossypium hirsutum | 3006-210-23 × 281-24-236 × MON88913 | DAS-21Ø23-5 × DAS-24236-5 × MON-88913-8 | Widestrike ™ Roundup Ready Flex ™ Cotton | HT (Gly)/cp4 epsps (aroA:CP4) IR (BL)/cry1F IR (BL)/cry1Ac HT (Glu)/bar | Dow & Monsanto |
| A69 | Cotton Gossypium hirsutum | 3006-210-23 × 281-24-236 × MON88913 × COT102 | DAS-21Ø23-5 × DAS-24236-5 × MON-88913-8 × SYN-IR1Ø2-7 | Widestrike ™ × Roundup Ready Flex ™ × VIP-COT ™ Cotton | IR (BL)/cry1Ac IR (BL)/vip3A(a) IR (BL)/cry1F HT (Gly)/cp4 epsps (aroA:CP4) HT (Glu)/pat | Dow |
| A70 | Cotton Gossypium hirsutum | 31707 | not available | BXN ™ Plus Bollgard ™ Cotton | HT (Ox)/bxn IR (BL)/cry1Ac | Monsanto |
| A71 | Cotton Gossypium hirsutum | 31803 | not available | BXN ™ Plus Bollgard ™ Cotton | HT (Ox)/bxn IR (BL)/cry1Ac | Monsanto |
| A72 | Cotton Gossypium hirsutum | 31807 × 31808 | not available | not available | 2HT (Ox)/bxn 2IR (BL)/cry1Ac / / | Monsanto |
| A73 | Cotton Gossypium hirsutum | 31807 | not available | BXN ™ Plus Bollgard ™ Cotton | HT (Ox)/bxn IR (BL)/cry1Ac | Monsanto |
| A74 | Cotton Gossypium hirsutum | 31808 | not available | BXN ™ Plus Bollgard ™ Cotton | HT (Ox)/bxn IR (BL)/cry1Ac | Monsanto |
| A75 | Cotton Gossypium hirsutum | 42317 | not available | BXN ™ Plus Bollgard ™ Cotton | HT (Ox)/bxn IR (BL)/cry1Ac | Monsanto |
| A76 | Cotton Gossypium hirsutum | BNLA-601 | not available | not available | IR (BL)/cry1Ac | Central Institute for Cotton Research and University of Agricultural Sciences Dharwad (India) |
| A77 | Cotton Gossypium hirsutum | BXN10211 (10211) | BXN-1Ø211-9 | BXN ™ Cotton | HT (Ox)/bxn | Monsanto |
| A78 | Cotton Gossypium hirsutum | BXN10215 (10215) | BXN-1Ø215-4 | BXN ™ Cotton | HT (Ox)/bxn | Monsanto |
| A79 | Cotton Gossypium hirsutum | BXN10222 (10222) | BXN-1Ø222-2 | BXN ™ Cotton | HT (Ox)/bxn | Monsanto |
| A80 | Cotton Gossypium hirsutum | BXN10224 (10224) | BXN-1Ø224-4 | BXN ™ Cotton | HT (Ox)/bxn | Monsanto |
| A81 | Cotton Gossypium hirsutum | COT102 (IR102) | SYN-IR1Ø2-7 | VIPCOT ™ Cotton | IR (BL)/vip3A(a) | Syngenta |
| A82 | Cotton Gossypium hirsutum | COT102 × COT67B | SYN-IR1Ø2-7 × SYN-IR67B-1 | VIPCOT ™ Cotton | IR (BL)/vip3A(a) IR (BL)/cry1Ab | Syngenta |
| A83 | Cotton Gossypium hirsutum | COT102 × COT67B × MON88913 | SYN-IR1Ø2-7 × SYN-IR67B-1 × MON-88913-8 | VIPCOT ™ Roundup Ready Flex ™ Cotton | IR (BL)/vip3A(a) IR (BL)/cry1Ab | Syngenta |
| A84 | Cotton Gossypium hirsutum | COT102 × MON15985 | SYN-IR1Ø2-7 × MON-15985-7 | Bollgard ® III | IR (BL)/vip3A(a) IR (BL)/cry1Ac IR (BL)/cry2Ab2 | Monsanto |
| A85 | Cotton Gossypium hirsutum | COT102 × MON15985 × MON88913 | SYN-IR1Ø2-7 × MON-15985-7 × MON-88913-8 | Bollgard ® III × Roundup Ready ™ Flex ™ | IR (BL)/vip3A(a) IR (BL)/cry1Ac IR (BL)/cry2Ab2 HT (Gly)/cp4 epsps (aroA:CP4) | Monsanto |
| A86 | Cotton Gossypium hirsutum | COT67B (IR67B) | SYN-IR67B-1 | not available | IR (BL)/cry1Ab | Syngenta |
| A87 | Cotton Gossypium hirsutum | Event1 | not available | JK 1 | IR (BL)/cry1Ac | JK Agri Genetics Ltd. (India) |
| A88 | Cotton Gossypium hirsutum | GFM Cry1A | GTL-GFM311-7 | not available | IR (BL)/cry1Ab-Ac | Nath Seeds/Global Transgenes Ltd (India) |
| A89 | Cotton Gossypium hirsutum | GHB119 | BCS-GHØ05-8 | not available | HT (Glu)/bar IR (BL)/cry2Ae | Bayer Crop Science |

TABLE A-continued

| No. | Crop, latin name | Event Name | Event Code | Tradename | Trait (Trait type)/Gene | Company |
|---|---|---|---|---|---|---|
| A90 | Cotton Gossypium hirsutum | GHB614 | BCS-GHØØ2-5 | GlyTol ™ | HT (Gly)/2mepsps | Bayer Crop Science |
| A91 | Cotton Gossypium hirsutum | GHB614 × LLCotton25 | BCS-GHØØ2-5 × ACS-GHØØ1-3 | GlyTol ™ Liberty Link ™ | HT (Gly)/2mepsps HT (Glu)/bar | Bayer Crop Science |
| A92 | Cotton Gossypium hirsutum | GHB614 × LLCotton25 × MON15985 | BCS-GHØØ2-5 × ACS-GHØØ1-3 × MON-15985-7 | not available | HT (Gly)/2mepsps HT (Glu)/bar IR (BL)/cry1Ac IR (BL)/cry2Ab2 | Bayer Crop Science |
| A93 | Cotton Gossypium hirsutum | GHB614 × MON15985 | BCS-GHØØ2-5 × MON-15985-7 | not available | HT (Gly)/2mepsps IR (BL)/cry1Ac IR (BL)/cry2Ab2 | Bayer Crop Science |
| A94 | Cotton Gossypium hirsutum | GHB614 × T304-40 × GHB119 | BCS-GHØØ2-5 × BCS-GHØØ4-7 × BCS-GHØØ5-8 | Glytol ™ × Twinlink ™ | HT (Gly)/2mepsps HT (Glu)/bar IR (BL)/cry1Ab IR (BL)/cry2Ae | Bayer Crop Science |
| A95 | Cotton Gossypium hirsutum | GK12 | not available | not available | IR (BL)/cry1Ab-Ac | Chinese Academy of Agricultural Sciences |
| A96 | Cotton Gossypium hirsutum | LLCotton25 | ACS-GHØØ1-3 | Fibermax ™ Liberty Link ™ | HT (Glu)/bar | Bayer Crop Science |
| A97 | Cotton Gossypium hirsutum | LLCotton25 × MON15985 | ACS-GHØØ1-3 × MON-15985-7 | Fibermax ™ Liberty Link ™ Bollgard II ™ | HT (Glu)/bar IR (BL)/cry1Ac IR (BL)/cry2Ab2 | |
| A98 | Cotton Gossypium hirsutum | MLS 9124 | not available | not available | IR (BL)/cry1C | Metahelix Life Sciences Pvt. Ltd (India) |
| A99 | Cotton Gossypium hirsutum | MON 887Ø1-3 | MON88701 | not available | HT (Dic)/dmo HT (Glu)/bar | Monsanto |
| A100 | Cotton Gossypium hirsutum | MON1076 | MON-89924-2 | Bollgard ™ Cotton | IR (BL)/cry1Ac | Monsanto |
| A101 | Cotton Gossypium hirsutum | MON1445 | MON-Ø1445-2 | Roundup Ready ™ Cotton | HT (Gly)/cp4 epsps (aroA:CP4) | Monsanto |
| A102 | Cotton Gossypium hirsutum | MON15985 | MON-15985-7 | Bollgard II ™ Cotton | IR (BL)/cry1Ac IR (BL)/cry2Ab2 | Monsanto |
| A103 | Cotton Gossypium hirsutum | MON15985 × MON1445 | MON-15985-7 × MON-Ø1445-2 | Roundup Ready ™ Bollgard II ™ Cotton | HT (Gly)/cp4 epsps (aroA:CP4) IR (BL)/cry1Ac IR (BL)/cry2Ab2 | Monsanto |
| A104 | Cotton Gossypium hirsutum | MON1698 | MON-89383-1 | Roundup Ready ™ Cotton | HT (Gly)/cp4 epsps (aroA:CP4) | Monsanto |
| A105 | Cotton Gossypium hirsutum | MON531 | MON-ØØ531-6 | Bollgard ™ Cotton, Ingard ™ | IR (BL)/cry1Ac | Monsanto |
| A106 | Cotton Gossypium hirsutum | MON531 × MON1445 | MON-Ø531-6 × MON-Ø1445-2 | Roundup Ready ™ Bollgard ™ Cotton | HT (Gly)/cp4 epsps (aroA:CP4) IR (BL)/cry1Ac | Monsanto |
| A107 | Cotton Gossypium hirsutum | MON757 | MON-ØØ757-7 | Bollgard ™ Cotton | IR (BL)/cry1Ac | Monsanto |
| A108 | Cotton Gossypium hirsutum | MON88913 | MON-88913-8 | Roundup Ready ™ Flex ™ Cotton | HT (Gly)/cp4 epsps (aroA:CP4) | Monsanto |
| A109 | Cotton Gossypium hirsutum | MON88913 × MON15985 | MON-88913-8 × MON-15985-7 | Roundup Ready ™ Flex ™ Bollgard II ™ Cotton | HT (Gly)/cp4 epsps (aroA:CP4) IR (BL)/cry1Ac IR (BL)/cry2Ab2 | Monsanto |
| A110 | Cotton Gossypium hirsutum | Ngwe Chi 6 Bt | not available | Ngwe Chi 6 Bt | | Cotton and Sericulture Department (Myanmar) |
| A111 | Cotton Gossypium hirsutum | SGK321 | not available | not available | IR (BL)/cry1A IR (BRun)/CpTI | Chinese Academy of Agricultural Sciences |
| A112 | Cotton Gossypium hirsutum | T303-3 | BCS-GHØØ3-6 | not available | IR (BL)/cry1Ab HT (Glu)/bar | Bayer Crop Science |
| A113 | Cotton Gossypium hirsutum | T304-40 | BCS-GHØØ4-7 | not available | IR (BL)/cry1Ab HT (Glu)/bar | Bayer Crop Science |
| A114 | Cotton Gossypium hirsutum | T304-40 × GHB119 | BCS-GHØØ4-7 × BCS-GHØØ5-8 | TwinLink ™ Cotton | IR (BL)/cry1Ab HT (Glu)/bar | Bayer Crop Science |
| A115 | Cotton Gossypium hirsutum | 81910 | DAS-81910-7 | not available | HT (2,4-D)/aad-12 HT (Glu)/pat | Dow |
| A116 | Creeping Bentgrass Agrostis stolonifera | ASR368 | SMG-368ØØ-2 | Roundup Ready ™ Creeping Bentgrass | HT (Gly)/cp4 epsps (aroA:CP4) | Monsanto |

TABLE A-continued

| No. | Crop, latin name | Event Name | Event Code | Tradename | Trait (Trait type)/Gene | Company |
|---|---|---|---|---|---|---|
| A117 | Eggplant *Solanum melongena* | Bt Brinjal Event EE1 | Bt Brinjal Event EE1 | BARI Bt Begun-1, -2, -3 and -4 | IR (BL)/cry1Ac | Maharashtra Hybrid Seed Company (MAHYCO) |
| A118 | Flax *Linum usitatissimum* | FP967 (CDC Triffid) | CDC-FLØØ1-2 | CDC Triffid Flax | HT (SU)/als | University of Saskatchewan |
| A119 | Lentil *Lens culinaris* | RH44 | RH44 | not available | HT (Imi)/als (mutant) | BASF |
| A120 | Maize *Zea mays* | 32138 | DP-32138-1 | 32138 SPT maintainer | PC (FR)/ms45 PC (MS)/zm-aa1 | Dupont |
| A121 | Maize *Zea mays* | 3272 | SYN-E3272-5 | Enogen ™ | ST (CA)/amy797E | Syngenta |
| A122 | Maize *Zea mays* | 3272 × Bt11 | SYN-E3272-5 × SYN-BTØ11-1 | not available | ST (CA)/amy797E IR (BL)/cry1Ab HT (Glu)/pat | Syngenta |
| A123 | Maize *Zea mays* | 3272 × Bt11 × GA21 | SYN-E3272-5 × SYN-BTØ11-1 × MON-ØØØ21-9 | not available | ST (CA)/amy797E IR (BL)/cry1Ab HT (Glu)/pat HT (Gly)/mepsps | Syngenta |
| A124 | Maize *Zea mays* | 3272 × Bt11 × MIR604 | SYN-E3272-5 × SYN-BTØ11-1 × SYN-IR6Ø4-5 | not available | ST (CA)/amy797E IR (BL)/cry1Ab HT (Glu)/pat IR (Col)/mcry3A | Syngenta |
| A125 | Maize *Zea mays* | 3272 × BT11 × MIR604 × GA21 | SYN-E3272-5 × SYN-BTØ11-1 × SYN-IR6Ø4-5 × MON-ØØØ21-9 | not available | ST (CA)/amy797E IR (BL)/cry1Ab HT (Glu)/pat IR (Col)/mcry3A HT (Gly)/mepsps | Syngenta |
| A126 | Maize *Zea mays* | 3272 × GA21 | SYN-E3272-5 × MON-ØØØ21-9 | not available | ST (CA)/amy797E HT (Gly)/mepsps | Syngenta |
| A127 | Maize *Zea mays* | 3272 × MIR604 | SYN-E3272-5 × SYN-IR6Ø4-5 | not available | ST (CA)/amy797E IR (Col)/mcry3A | Syngenta |
| A128 | Maize *Zea mays* | 3272 × MIR604 × GA21 | SYN-E3272-5 × SYN-IR6Ø4-5 × MON-ØØØ21-9 | not available | ST (CA)/amy797E IR (Col)/mcry3A HT (Gly)/mepsps | Syngenta |
| A129 | Maize *Zea mays* | 33121 | DP-Ø33121-3 | not available | IR (BL)/cry2Ae IR (BL)/cry1A IR (BL)/vip3Aa20 HT (Glu)/pat | Dupont |
| A130 | Maize *Zea mays* | 4114 | DP-ØØ4114-3 | not available | IR (BL)/cry1F IR (Col)/cry34Ab1 IR (Col)/cry35Ab1 HT (Glu)/pat | Dupont |
| A131 | Maize *Zea mays* | 5307 | SYN-Ø53Ø7-1 | Agrisure ® Duracade ™ | IR (Col)/ecry3.1Ab | Syngenta |
| A132 | Maize *Zea mays* | 5307 × MIR604 × Bt11 × TC1507 × GA21 | SYN-Ø53Ø7-1 × SYN-IR6Ø4-5 × SYN-BTØ11-1 × DAS-Ø15Ø7-1 × MON-ØØØ21-9 | Agrisure ® Duracade ™ 5122 | IR (Col)/ecry3.1Ab IR (Col)/mcry3A IR (BL)/cry1Ab HT (Glu)/pat IR (BL)/cry1Fa2 HT (Gly)/mepsps | Syngenta |
| A133 | Maize *Zea mays* | 5307 × MIR604 × Bt11 × TC1507 × GA21 × MIR162 | SYN-Ø53Ø7-1 × SYN-IR6Ø4-5 × SYN-BTØ11-1 × DAS-Ø15Ø7-1 × MON-ØØØ21-9 × SYN-IR162-4 | Agrisure ® Duracade ™ 5222 | IR (Col)/ecry3.1Ab IR (Col)/mcry3A IR (BL)/cry1Ab HT (Glu)/pat IR (BL)/cry1Fa2 HT (Gly)/mepsps IR (BL)/vip3Aa20 | Syngenta |
| A134 | Maize *Zea mays* | 59122 | DAS-59122-7 | Herculex ™ RW | HT (Glu)/pat IR (Col)/cry34Ab1 IR (Col)/cry35Ab1 | Dow |
| A135 | Maize *Zea mays* | 59122 × GA21 | DAS-59122-7 × MON-ØØØ21-9 | not available | HT (Glu)/pat IR (Col)/cry34Ab1 IR (Col)/cry35Ab1 HT (Gly)/mepsps | Syngenta |
| A136 | Maize *Zea mays* | 59122 × MIR604 | DAS-59122-7 × SYN-IR6Ø4-5 | not available | HT (Glu)/pat IR (Col)/cry34Ab1 IR (Col)/cry35Ab1 IR (Col)/mcry3A | Syngenta |
| A137 | Maize *Zea mays* | 59122 × MIR604 × GA21 | DAS-59122-7 × SYN-IR6Ø4-5 × MON-ØØØ21-9 | not available | HT (Glu)/pat IR (Col)/cry34Ab1 IR (Col)/cry35Ab1 IR (Col)/mcry3A HT (Gly)/mepsps | Syngenta |
| A138 | Maize *Zea mays* | 59122 × MIR604 × TC1507 | DAS-59122-7 × SYN-IR6Ø4-5 × DAS-Ø15Ø7-1 | not available | HT (Glu)/pat IR (Col)/cry34Ab1 IR (Col)/cry35Ab1 | Syngenta |

TABLE A-continued

| No. | Crop, latin name | Event Name | Event Code | Tradename | Trait (Trait type)/Gene | Company |
|---|---|---|---|---|---|---|
| A139 | Maize Zea mays | 59122 × MIR604 × TC1507 × GA21 | DAS-59122-7 × SYN-IR6Ø4-5 × DAS-Ø15Ø7-1 × MON-ØØØ21-9 | not available | IR (Col)/mcry3A IR (BL)/cry1Fa2 HT (Glu)/pat IR (Col)/cry34Ab1 IR (Col)/cry35Ab1 IR (Col)/mcry3A IR (BL)/cry1Fa2 HT (Gly)/mepsps | Syngenta |
| A140 | Maize Zea mays | 59122 × MON810 | DAS-59122-7 × MON-ØØ81Ø-6 | not available | HT (Glu)/pat IR (Col)/cry34Ab1 IR (Col)/cry35Ab1 IR (BL)/cry1Ab | Dupont |
| A141 | Maize Zea mays | 59122 × MON810 × NK603 | DAS-59122-7 × MON-ØØ81Ø-6 × MON-ØØ6Ø3-6 | not available | HT (Glu)/pat IR (Col)/cry34Ab1 IR (Col)/cry35Ab1 IR (BL)/cry1Ab HT (Gly)/cp4 epsps (aroA:CP4) | Dupont |
| A142 | Maize Zea mays | 59122 × MON88017 | DAS-59122-7 × MON-88Ø17-3 | not available | HT (Glu)/pat IR (Col)/cry34Ab1 IR (Col)/cry35Ab1 IR (Col)/cry3Bb1 HT (Gly)/cp4 epsps (aroA:CP4) | Monsanto & Dow |
| A143 | Maize Zea mays | 59122 × NK603 | DAS-59122-7 × MON-ØØ6Ø3-6 | Herculex ™ RW Roundup Ready ™ 2 | HT (Glu)/pat IR (Col)/cry34Ab1 IR (Col)/cry35Ab1 HT (Gly)/cp4 epsps (aroA:CP4) | Dupont |
| A144 | Maize Zea mays | 59122 × TC1507 × GA21 | DAS-59122-7 × DAS-Ø15Ø7-1 × MON-ØØØ21-9 | not available | HT (Glu)/pat IR (Col)/cry34Ab1 IR (Col)/cry35Ab1 IR (BL)/cry1Fa2 HT (Gly)/mepsps | Syngenta |
| A145 | Maize Zea mays | 676 | PH-ØØØ676-7 | not available | HT (Glu)/pat PC (MS)/dam | Dupont |
| A146 | Maize Zea mays | 678 | PH-ØØØ678-9 | not available | HT (Glu)/pat PC (MS)/dam | Dupont |
| A147 | Maize Zea mays | 680 | PH-ØØØ68Ø-2 | not available | HT (Glu)/pat PC (MS)/dam | Dupont |
| A148 | Maize Zea mays | 98140 | DP-Ø9814Ø-6 | Optimum ™ GAT ™ | HT (SU)/zm-hra HT (Gly)/gat4621 | Dupont |
| A149 | Maize Zea mays | 98140 × 59122 | DP-Ø9814Ø-6 × DAS-59122-7 | not available | HT (Glu)/pat IR (Col)/cry34Ab1 IR (Col)/cry35Ab1 HT (SU)/zm-hra HT (Gly)/gat4621 | Dow & Dupont |
| A150 | Maize Zea mays | 98140 × TC1507 | DP-Ø9814Ø-6 × DAS-Ø15Ø7-1 | not available | HT (SU)/zm-hra HT (Gly)/gat4621 IR (BL)/cry1Fa2 HT (Glu)/pat | Dow & Dupont |
| A151 | Maize Zea mays | 98140 × TC1507 × 59122 | DP-Ø9814Ø-6 × DAS-Ø15Ø7-1 × DAS-59122-7 | not available | HT (Glu)/pat IR (Col)/cry34Ab1 IR (Col)/cry35Ab1 HT (SU)/zm-hra HT (Gly)/gat4621 IR (BL)/cry1Fa2 | Dow & Dupont |
| A152 | Maize Zea mays | Bt10 | not available | Bt10 | IR (BL)/cry1Ab HT (Glu)/pat | Syngenta |
| A153 | Maize Zea mays | Bt11 (X4334CBR, X4734CBR) | SYN-BTØ11-1 | Agrisure ™ CB/LL | IR (BL)/cry1Ab HT (Glu)/pat | Syngenta |
| A154 | Maize Zea mays | Bt11 × 59122 | SYN-BTØ11-1 × DAS-59122-7 | not available | HT (Glu)/pat IR (Col)/cry34Ab1 IR (Col)/cry35Ab1 IR (BL)/cry1Ab | Syngenta |
| A155 | Maize Zea mays | Bt11 × 59122 × GA21 | SYN-BTØ11-1 × DAS-59122-7 × MON-ØØØ21-9 | not available | HT (Glu)/pat IR (Col)/cry34Ab1 IR (Col)/cry35Ab1 IR (BL)/cry1Ab HT (Gly)/mepsps | Syngenta |
| A156 | Maize Zea mays | Bt11 × 59122 × MIR604 | SYN-BTØ11-1 × DAS-59122-7 × SYN-IR6Ø4-5 | not available | HT (Glu)/pat IR (Col)/cry34Ab1 IR (Col)/cry35Ab1 IR (BL)/cry1Ab IR (Col)/mcry3a | Syngenta |

TABLE A-continued

| No. | Crop, latin name | Event Name | Event Code | Tradename | Trait (Trait type)/Gene | Company |
|---|---|---|---|---|---|---|
| A157 | Maize<br>*Zea mays* | Bt11 ×<br>59122 ×<br>MIR604 ×<br>GA21 | SYN-BTØ11-1 ×<br>DAS-59122-7 ×<br>SYN-IR6Ø4-5 ×<br>MON-ØØØ21-9 | not available | HT (Glu)/pat<br>IR (Col)/cry34Ab1<br>IR (Col)/cry35Ab1<br>IR (BL)/cry1Ab<br>IR (Col)/mcry3a<br>HT (Gly)/mepsps | Syngenta |
| A158 | Maize<br>*Zea mays* | Bt11 ×<br>59122 ×<br>MIR604 ×<br>TC1507 | SYN-BTØ11-1 ×<br>DAS-59122-7 ×<br>SYN-IR6Ø4-5 ×<br>DAS-Ø15Ø7-1 | not available | HT (Glu)/pat<br>IR (Col)/cry34Ab1<br>IR (Col)/cry35Ab1<br>IR (BL)/cry1Ab<br>IR (BL)/cry1Fa2<br>IR (Col)/mcry3a | Syngenta |
| A159 | Maize<br>*Zea mays* | BT11 ×<br>59122 ×<br>MIR604 ×<br>TC1507 ×<br>GA21 | SYN-BTØ11-1 ×<br>DAS-59122-7 ×<br>SYN-IR6Ø4-5 ×<br>DAS-Ø15Ø7-1 ×<br>MON-ØØØ21-9 | Agrisure ® 3122 | HT (Glu)/pat<br>IR (Col)/cry34Ab1<br>IR (Col)/cry35Ab1<br>IR (BL)/cry1Ab<br>IR (BL)/cry1Fa2<br>IR (Col)/mcry3a<br>HT (Gly)/mepsps | Syngenta |
| A160 | Maize<br>*Zea mays* | Bt11 ×<br>59122 ×<br>TC1507 | SYN-BTØ11-1 ×<br>DAS-59122-7 ×<br>DAS-Ø15Ø7-1 | not available | HT (Glu)/pat<br>IR (Col)/cry34Ab1<br>IR (Col)/cry35Ab1<br>IR (BL)/cry1Ab<br>IR (BL)/cry1Fa2 | Syngenta |
| A161 | Maize<br>*Zea mays* | Bt11 ×<br>59122 ×<br>TC1507 ×<br>GA21 | SYN-BTØ11-1 ×<br>DAS-59122-7 ×<br>DAS-Ø15Ø7-1 ×<br>MON-ØØØ21-9 | not available | HT (Glu)/pat<br>IR (Col)/cry34Ab1<br>IR (Col)/cry35Ab1<br>IR (BL)/cry1Ab<br>IR (BL)/cry1Fa2<br>HT (Gly)/mepsps | Syngenta |
| A162 | Maize<br>*Zea mays* | Bt11 ×<br>GA21 | SYN-BTØ11-1 ×<br>MON-ØØØ21-9 | Agrisure ™<br>GT/CB/LL | HT (Gly)/mepsps<br>IR (BL)/cry1Ab<br>HT (Glu)/pat | Syngenta |
| A163 | Maize<br>*Zea mays* | Bt11 ×<br>MIR162 | SYN-BTØ11-1 ×<br>SYN-IR162-4 | Agrisure ®<br>Viptera ™ 2100 | IR (BL)/cry1Ab<br>(truncated)<br>HT (Glu)/pat<br>IR (BL)/vip3Aa20 | Syngenta |
| A164 | Maize<br>*Zea mays* | Bt11 ×<br>MIR162 ×<br>GA21 | SYN-BTØ11-1 ×<br>SYN-IR162-4 ×<br>MON-ØØØ21-9 | Agrisure ®<br>Viptera ™ 3110 | IR (BL)/cry1Ab<br>HT (Glu)/pat<br>IR (BL)/vip3Aa20<br>HT (Gly)/mepsps | Syngenta |
| A165 | Maize<br>*Zea mays* | BT11 ×<br>MIR162 ×<br>MIR604 | SYN-BTØ11-1 ×<br>SYN-IR162-4 ×<br>SYN-IR6Ø4-5 | Agrisure ®<br>Viptera ™ 3100 | IR (BL)/cry1Ab<br>HT (Glu)/pat<br>IR (BL)/vip3Aa20<br>IR (Col)/mcry3a | Syngenta |
| A166 | Maize<br>*Zea mays* | Bt11 ×<br>MIR162 ×<br>MIR604 ×<br>GA21 | SYN-BTØ11-1 ×<br>SYN-IR162-4 ×<br>SYN-IR6Ø4-5 ×<br>MON-ØØØ21-9 | Agrisure ®<br>Viptera ™ 3111,<br>Agrisure ®<br>Viptera ™ 4 | IR (BL)/cry1Ab<br>HT (Glu)/pat<br>IR (BL)/vip3Aa20<br>IR (Col)/mcry3a<br>HT (Gly)/mepsps | Syngenta |
| A167 | Maize<br>*Zea mays* | Bt11 ×<br>MIR162 ×<br>TC1507 | SYN-BTØ11-1 ×<br>SYN-IR162-4 ×<br>DAS-Ø15Ø7-1 | not available | IR (BL)/cry1Ab<br>HT (Glu)/pat<br>IR (BL)/vip3Aa20<br>IR (BL)/cry1Fa2 | Syngenta |
| A168 | Maize<br>*Zea mays* | Bt11 ×<br>MIR162 ×<br>TC1507 ×<br>GA21 | SYN-BTØ11-1 ×<br>SYN-IR162-4 ×<br>DAS-Ø15Ø7-1 ×<br>MON-ØØØ21-9 | Agrisure ™<br>Viptera 3220 | IR (BL)/cry1Ab<br>HT (Glu)/pat<br>IR (BL)/vip3Aa20<br>IR (BL)/cry1Fa2<br>HT (Gly)/mepsps | Syngenta |
| A169 | Maize<br>*Zea mays* | Bt11 ×<br>MIR604 | SYN-BTØ11-1 ×<br>SYN-IR6Ø4-5 | Agrisure ™<br>CB/LL/RW | IR (BL)/cry1Ab<br>HT (Glu)/pat<br>IR (Col)/mcry3a | Syngenta |
| A170 | Maize<br>*Zea mays* | BT11 ×<br>MIR604 ×<br>GA21 | SYN-BTØ11-1 ×<br>SYN-IR6Ø4-5 ×<br>MON-ØØØ21-9 | Agrisure ™<br>3000GT | IR (BL)/cry1Ab<br>HT (Glu)/pat<br>IR (Col)/mcry3a<br>HT (Gly)/mepsps | Syngenta |
| A171 | Maize<br>*Zea mays* | Bt11 ×<br>MIR604 ×<br>TC1507 | SYN-BTØ11-1 ×<br>SYN-IR6Ø4-5 ×<br>DAS-Ø15Ø7-1 | not available | IR (BL)/cry1Ab<br>HT (Glu)/pat<br>IR (Col)/mcry3a<br>IR (BL)/cry1Fa2 | Syngenta |
| A172 | Maize<br>*Zea mays* | Bt11 ×<br>TC1507 | SYN-BTØ11-1 ×<br>DAS-Ø15Ø7-1 | not available | IR (BL)/cry1Ab<br>HT (Glu)/pat<br>IR (BL)/cry1Fa2 | Syngenta |
| A173 | Maize<br>*Zea mays* | Bt11 ×<br>TC1507 ×<br>GA21 | SYN-BTØ11-1 ×<br>DAS-Ø15Ø7-1 ×<br>MON-ØØØ21-9 | not available | IR (BL)/cry1Ab<br>HT (Glu)/pat<br>IR (BL)/cry1Fa2<br>HT (Gly)/mepsps | Syngenta |

TABLE A-continued

| No. | Crop, latin name | Event Name | Event Code | Tradename | Trait (Trait type)/Gene | Company |
|---|---|---|---|---|---|---|
| A174 | Maize Zea mays | Bt176 (176) | SYN-EV176-9 | NaturGard KnockOut ™, Maximizer ™ | IR (BL)/cry1Ab HT (Glu)/bar | Syngenta |
| A175 | Maize Zea mays | BVLA430101 | not available | not available | ST (P)/phyA2 | Origin Agritech (China) |
| A176 | Maize Zea mays | CBH-351 | ACS-ZMØØ4-3 | Starlink ™ Maize | IR (BL)/cry9c HT (Glu)/bar | Bayer Crop Sciences |
| A177 | Maize Zea mays | DAS40278 | DAS-4Ø278-9 | Enlist ™ Maize | HT (2,4-D)/aad1 | Dow |
| A178 | Maize Zea mays | DAS40278 × NK603 | DAS-4Ø278-9 × MON-ØØ6Ø3-6 | not available | HT (2,4-D)/aad1 HT (Gly)/cp4 epsps (aroA:CP4) | Dow |
| A179 | Maize Zea mays | DBT418 | DKB-89614-9 | Bt Xtra ™ Maize | IR (BL)/Cry1Ac IR (BL)/pinII HT (Glu)/bar | Monsanto |
| A180 | Maize Zea mays | DLL25 (B16) | DKB-8979Ø-5 | not available | HT (Glu)/bar | Monsanto |
| A181 | Maize Zea mays | GA21 | MON-ØØØ21-9 | Roundup Ready ™ Maize, Agrisure ™ GT | HT (Gly)/mepsps | Monsanto |
| A182 | Maize Zea mays | GA21 × MON810 | MON-ØØØ21-9 × MON-ØØ81Ø-6 | Roundup Ready ™ YieldGard ™ maize | IR (BL)/cry1Ab HT (Gly)/mepsps | Monsanto |
| A183 | Maize Zea mays | GA21 × T25 | MON-ØØØ21-9 × ACS-ZMØØ3-2 | not available | HT (Gly)/mepsps HT (Glu)/pat (syn) | Syngenta |
| A184 | Maize Zea mays | HCEM485 | HCEM485 | not available | HT (Gly)/2mepsps | Stine Seed Farm, Inc (USA) |
| A185 | Maize Zea mays | LY038 | REN-ØØØ38-3 | Mavera ™ Maize | ST (AA)/cordapA | Renessen LLC (Netherlands) |
| A186 | Maize Zea mays | LY038 × MON810 | REN-ØØØ38-3 × MON-ØØ81Ø-6 | Mavera ™ YieldGard ™ Maize | ST (AA)/cordapA IR (BL)/cry1Ab | Renessen LLC (Netherlands) & Monsanto |
| A187 | Maize Zea mays | MIR162 | SYN-IR162-4 | Agrisure ™ Viptera | IR (BL)/vip3Aa20 | Syngenta |
| A188 | Maize Zea mays | MIR162 × GA21 | SYN-IR162-4 × MON-ØØØ21-9 | not available | IR (BL)/vip3Aa20 HT (Gly)/mepsps | Syngenta |
| A189 | Maize Zea mays | MIR162 × MIR604 | SYN-IR162-4 × SYN-IR6Ø4-5 | not available | IR (BL)/vip3Aa20 IR (Col)/mcry3a | Syngenta |
| A190 | Maize Zea mays | MIR162 × MIR604 × GA21 | SYN-IR162-4 × SYN-IR6Ø4-5 × MON-ØØØ21-9 | not available | IR (BL)/vip3Aa20 IR (Col)/mcry3a HT (Gly)/mepsps | Syngenta |
| A191 | Maize Zea mays | MIR162 × TC1507 | SYN-IR162-4 × DAS-Ø15Ø7-1 | not available | IR (BL)/vip3Aa20 IR (BL)/cry1Fa2 HT (Glu)/pat | Syngenta |
| A192 | Maize Zea mays | MIR162 × TC1507 × GA21 | SYN-IR162-4 × DAS-Ø15Ø7-1 × MON-ØØØ21-9 | not available | IR (BL)/vip3Aa20 IR (BL)/cry1Fa2 HT (Glu)/pat HT (Gly)/mepsps | Syngenta |
| A193 | Maize Zea mays | MIR604 | SYN-IR6Ø4-5 | Agrisure ™ RW | IR (Col)/mcry3a | Syngenta |
| A194 | Maize Zea mays | MIR604 × GA21 | SYN-IR6Ø4-5 × MON-ØØØ21-9 | Agrisure ™ GT/RW | IR (Col)/mcry3a HT (Gly)/mepsps | Syngenta |
| A195 | Maize Zea mays | MIR604 × NK603 | SYN-IR6Ø4-5 × MON-ØØ6Ø3-6 | not available | IR (Col)/mcry3a HT (Gly)/cp4 epsps (aroA:CP4) | Dupont |
| A196 | Maize Zea mays | MIR604 × TC1507 | SYN-IR6Ø4-5 × DAS-Ø15Ø7-1 | not available | IR (Col)/mcry3a IR (BL)/cry1Fa2 HT (Glu)/pat | Syngenta |
| A197 | Maize Zea mays | MON801 (MON80100) | MON801 | not available | IR (BL)/cry1Ab | Monsanto |
| A198 | Maize Zea mays | MON802 | MON-8Ø2ØØ-7 | not available | IR (BL)/cry1Ab | Monsanto |
| A199 | Maize Zea mays | MON809 | PH-MON-8Ø9-2 | not available | IR (BL)/cry1Ab | Monsanto & Dupont |
| A200 | Maize Zea mays | MON810 | MON-ØØ81Ø-6 | YieldGard ™, MaizeGard ™ | IR (BL)/cry1Ab | Monsanto |
| A201 | Maize Zea mays | MON810 × MON88017 | MON-ØØ81Ø-6 × MON-88Ø17-3 | YieldGard ™ VT Triple | IR (BL)/cry1Ab IR (Col)/cry3Bb1 HT (Gly)/cp4 epsps (aroA:CP4) | Monsanto |
| A202 | Maize Zea mays | MON832 | not available | Roundup Ready ™ Maize | HT (Gly)/gov247 HT (Gly)/cp4 epsps (aroA:CP4) | Monsanto |

TABLE A-continued

| No. | Crop, latin name | Event Name | Event Code | Tradename | Trait (Trait type)/Gene | Company |
|---|---|---|---|---|---|---|
| A203 | Maize Zea mays | MON863 | MON-00863-5 | YieldGard ™ Rootworm RW, MaxGard ™ | IR (Col)/cry3Bb1 | Monsanto |
| A204 | Maize Zea mays | MON863 × MON810 | MON-00863-5 × MON-00810-6 | YieldGard ™ Plus | IR (BL)/cry1Ab IR (Col)/cry3Bb1 | Monsanto |
| A205 | Maize Zea mays | MON863 × MON810 × NK603 | MON-00603-6 × MON-00810-6 × MON-00863-5 | YieldGard ™ Plus with RR | IR (BL)/cry1Ab IR (Col)/cry3Bb1 HT (Gly)/cp4 epsps (aroA:CP4) | Monsanto |
| A206 | Maize Zea mays | MON863 × NK603 | MON-00863-5 × MON-00603-6 | YieldGard ™ RW + RR | IR (Col)/cry3Bb1 HT (Gly)/cp4 epsps (aroA:CP4) | Monsanto |
| A207 | Maize Zea mays | MON87411 | MON-87411-9 | Not available | IR (Col)/cry3Bb1 HT (Gly)/cp4 epsps (aroA:CP4) IR (Rw)/dvsnf7 | Monsanto |
| A208 | Maize Zea mays | MON87427 | MON-87427-7 | Roundup Ready ™ Maize | HT (Gly)/cp4 epsps (aroA:CP4) | Monsanto |
| A209 | Maize Zea mays | MON87427 × MON89034 × MON88017 | MON-87427-7 × MON-89034-3 × MON-88017-3 | not available | HT (Gly)/cp4 epsps (aroA:CP4) IR (BL)/cry2Ab2 IR (BL)/cry1A.105 IR (Col)/cry3Bb1 | Monsanto |
| A210 | Maize Zea mays | MON87427 × MON89034 × NK603 | MON-87427-7 × MON-89034-3 × MON-00603-6 | not available | HT (Gly)/cp4 epsps (aroA:CP4) IR (BL)/cry2Ab2 IR (BL)/cry1A.105 | Monsanto |
| A211 | Maize Zea mays | MON87427 × MON89034 × TC1507 × MON88017 × 59122 | MON-87427-7 × MON-89034-3 × DAS-01507-1 × MON-88017-3 × DAS-59122-7 | not available | HT (Gly)/cp4 epsps (aroA:CP4) IR (Col)/cry34Ab1 IR (Col)/cry35Ab1 IR (BL)/cry1Fa2 HT (Glu)/pat IR (BL)/cry2Ab2 | Monsanto |
| A212 | Maize Zea mays | MON87460 | MON-87460-4 | Genuity ® DroughtGard ™ | YS (DT)/cspB | Monsanto & BASF |
| A213 | Maize Zea mays | MON87460 × MON89034 × MON88017 | MON-87460-4 × MON-89034-3 × MON-88017-3 | not available | YS (DT)/cspB IR (BL)/cry1A.105 IR (BL)/cry2Ab2 IR (Col)/cry3Bb1 HT (Gly)/cp4 epsps (aroA:CP4) | Monsanto |
| A214 | Maize Zea mays | MON87460 × MON89034 × NK603 | MON-87460-4 × MON-89034-3 × MON-00603-6 | not available | YS (DT)/cspB IR (BL)/cry1A.105 IR (BL)/cry2Ab2 HT (Gly)/cp4 epsps (aroA:CP4) | Monsanto |
| A215 | Maize Zea mays | MON87460 × NK603 | MON-87460-4 × MON-00603-6 | not available | YS (DT)/cspB HT (Gly)/cp4 epsps (aroA:CP4) | Monsanto |
| A216 | Maize Zea mays | MON88017 | MON-88017-3 | YieldGard ™ VT ™ Rootworm ™ RR2 | IR (Col)/cry3Bb1 HT (Gly)/cp4 epsps (aroA:CP4) | Monsanto |
| A217 | Maize Zea mays | MON89034 | MON-89034-3 | YieldGard ™ VT Pro ™ | IR (BL)/cry1A.105 | Monsanto |
| A218 | Maize Zea mays | MON89034 × 59122 | MON-89034-3 × DAS-59122-7 | not available | HT (Glu)/pat IR (Col)/cry34Ab1 IR (Col)/cry35Ab1 IR (BL)/cry1A.105 IR (BL)/cry2Ab2 | Monsanto |
| A219 | Maize Zea mays | MON89034 × 59122 × MON88017 | MON-89034-3 × DAS-59122-7 × MON-88017-3 | not available | HT (Glu)/pat IR (Col)/cry34Ab1 IR (Col)/cry35Ab1 IR (Col)/cry3Bb1 HT (Gly)/cp4 epsps (aroA:CP4) IR (BL)/cry1A.105 IR (BL)/cry2Ab2 | Monsanto |
| A220 | Maize Zea mays | MON89034 × MON88017 | MON-89034-3 × MON-88017-3 | Genuity ® VT Triple Pro ™ | IR (BL)/cry1A.105 IR (BL)/cry2Ab2 IR (Col)/cry3Bb1 HT (Gly)/cp4 epsps (aroA:CP4) | Monsanto |

TABLE A-continued

| No. | Crop, latin name | Event Name | Event Code | Tradename | Trait (Trait type)/Gene | Company |
|---|---|---|---|---|---|---|
| A221 | Maize *Zea mays* | MON89034 × NK603 | MON-89Ø34-3 × MON-ØØ6Ø3-6 | Genuity ® VT Double Pro ™ | IR (BL)/cry1A.105 IR (BL)/cry2Ab2 HT (Gly)/cp4 epsps (aroA:CP4) | Monsanto |
| A222 | Maize *Zea mays* | MON89034 × TC1507 | MON-89Ø34-3 × DAS-Ø15Ø7-1 | not available | IR (BL)/cry1A.105 IR (BL)/cry2Ab2 IR (BL)/cry1Fa2 HT (Glu)/pat | Monsanto |
| A223 | Maize *Zea mays* | MON89034 × TC1507 × 59122 | MON-89Ø34-3 × DAS-Ø15Ø7-1 × DAS-59122-7 | not available | HT (Glu)/pat IR (Col)/cry34Ab1 IR (Col)/cry35Ab1 IR (BL)/cry1A.105 IR (BL)/cry2Ab2 IR (BL)/cry1Fa2 | Monsanto |
| A224 | Maize *Zea mays* | MON89034 × TC1507 × MON88017 | MON-89Ø34-3 × DAS-Ø15Ø7-1 × MON-88Ø17-3 | not available | IR (Col)/cry3Bb1 HT (Gly)/cp4 epsps (aroA:CP4) IR (BL)/cry1A.105 IR (BL)/cry2Ab2 IR (BL)/cry1Fa2 HT (Glu)/pat | Monsanto & Dow |
| A225 | Maize *Zea mays* | MON89034 × TC1507 × MON88017 × 59122 | MON-89Ø34-3 × DAS-Ø15Ø7-1 × MON-88Ø17-3 × DAS-59122-7 | Genuity ® SmartStax ™ | HT (Glu)/pat IR (Col)/cry34Ab1 IR (Col)/cry35Ab1 IR (Col)/cry3Bb1 HT (Gly)/cp4 epsps (aroA:CP4) IR (BL)/cry1A.105 IR (BL)/cry2Ab2 IR (BL)/cry1Fa2 | Monsanto & Dow |
| A226 | Maize *Zea mays* | MON89034 × TC1507 × MON88017 × 59122 × DAS40278 | MON-89Ø34-3 × DAS-Ø15Ø7-1 × MON-88Ø17-3 × DAS-59122-7 × DAS-4Ø278-9 | not available | HT (Glu)/pat IR (Col)/cry34Ab1 IR (Col)/cry35Ab1 IR (Col)/cry3Bb1 HT (Gly)/cp4 epsps (aroA:CP4) IR (BL)/cry1A.105 IR (BL)/cry2Ab2 IR (BL)/cry1Fa2 HT (2,4-D)/aad1 | Dow |
| A227 | Maize *Zea mays* | MON89034 × TC1507 × MON88017 × DAS40278 | MON-89Ø34-3 × DAS-Ø15Ø7-1 × MON-88Ø17-3 × DAS-59122-7 × DAS-4Ø278-9 | not available | IR (Col)/cry3Bb1 HT (Gly)/cp4 epsps (aroA:CP4) IR (BL)/cry1A.105 IR (BL)/cry2Ab2 IR (BL)/cry1Fa2 HT (Glu)/pat HT (2,4-D)/aad1 | Dow |
| A228 | Maize *Zea mays* | MON89034 × TC1507 × NK603 | MON-89Ø34-3 × DAS-Ø15Ø7-1 × MON-ØØ6Ø3-6 | Power Core ™ | IR (BL)/cry1A.105 IR (BL)/cry2Ab2 IR (BL)/cry1Fa2 HT (Gly)/cp4 epsps (aroA:CP4) HT (Glu)/pat | Monsanto & Dow |
| A229 | Maize *Zea mays* | MON89034 × TC1507 × NK603 × DAS40278 | MON-89Ø34-3 × DAS-Ø15Ø7-1 × MON-ØØ6Ø3-6 × DAS-4Ø278-9 | not available | IR (BL)/cry1A.105 IR (BL)/cry2Ab2 IR (BL)/cry1Fa2 HT (Gly)/cp4 epsps (aroA:CP4) HT (Glu)/pat HT (2,4-D)/aad1 | Dow |
| A230 | Maize *Zea mays* | MS3 | ACS-ZMØØ1-9 | InVigor ™ Maize | PC (MS)/barnase | Bayer Crop Science |
| A231 | Maize *Zea mays* | MS6 | ACS-ZMØØ5-4 | InVigor ™ Maize | PC (MS)/barnase | Bayer Crop Science |
| A232 | Maize *Zea mays* | NK603 | MON-ØØ6Ø3-6 | Roundup Ready ™ 2 Maize | HT (Gly)/cp4 epsps (aroA:CP4) | Monsanto |
| A233 | Maize *Zea mays* | NK603 × MON810 × 4114 × MIR 604 | MON-00603-6 × MON-00810-6 × DP004114-3 × SYN-IR604-4 | Not available | HT (Gly)/cp4 epsps (aroA:CP4) IR (BL)/cry1Ab IR (BL)/cry1F IR (Col)/cry34Ab1 IR (Col)/cry35Ab1 HT (Glu)/pat | Syngenta & Monsanto |
| A234 | Maize *Zea mays* | NK603 × MON810 | MON-ØØ6Ø3-6 × MON-ØØ81Ø-6 | YieldGard ™ CB + RR | IR (BL)/cry1Ab HT (Gly)/cp4 epsps (aroA:CP4) | Monsanto |

TABLE A-continued

| No. | Crop, latin name | Event Name | Event Code | Tradename | Trait (Trait type)/Gene | Company |
|---|---|---|---|---|---|---|
| A235 | Maize Zea mays | NK603 × T25 | MON-00603-6 × ACS-ZMØØ3-2 | Roundup Ready ™ Liberty Link ™ Maize | HT (Gly)/cp4 epsps (aroA:CP4) HT (Glu)/pat (syn) | Monsanto |
| A236 | Maize Zea mays | T14 | ACS-ZMØØ2-1 | Liberty Link ™ Maize | HT (Glu)/pat (syn) | Bayer Crop Science |
| A237 | Maize Zea mays | T25 | ACS-ZMØØ3-2 | Liberty Link ™ Maize | HT (Glu)/pat (syn) | Bayer Crop Science |
| A238 | Maize Zea mays | T25 × MON810 | ACS-ZMØØ3-2 × MON-ØØ81Ø-6 | Liberty Link ™ Yieldgard ™ Maize | IR (BL)/cry1Ab HT (Glu)/pat (syn) | Bayer Crop Science & Monsanto |
| A239 | Maize Zea mays | TC1507 | DAS-Ø15Ø7-1 | Herculex ™ I, Herculex ™ CB | IR (BL)/cry1Fa2 HT (Glu)/pat | Dow & Dupont |
| A240 | Maize Zea mays | TC1507 × 59122 × MON810 × MIR604 × NK603 | DAS-Ø15Ø7-1 × DAS-59122-7 × MON-ØØ81Ø-6 × SYN-IR6Ø4-5 × MON-ØØ6Ø3-6 | Optimum ™ Intrasect Xtreme | IR (BL)/cry1Fa2 HT (Glu)/pat IR (Col)/cry34Ab1 IR (Col)/cry35Ab1 | Dupont |
| A241 | Maize Zea mays | TC1507 × MON810 × MIR604 × NK603 | DAS-Ø15Ø7-1 × MON-ØØ81Ø-6 × SYN-IR6Ø4-5 × MON-ØØ6Ø3-6 | not available | IR (Col)/mcry3A IR (BL)/cry1Fa2 HT (Glu)/pat IR (BL)/cry1Ab HT (Gly)/cp4 epsps (aroA:CP4) | Dupont |
| A242 | Maize Zea mays | TC1507 × 59122 | DAS-Ø15Ø7-1 × DAS-59122-7 | Herculex XTRA ™ | IR (BL)/cry1Fa2 HT (Glu)/pat IR (Col)/cry34Ab1 IR (Col)/cry35Ab1 | Dow & Dupont |
| A243 | Maize Zea mays | TC1507 × 59122 × MON810 | DAS-Ø15Ø7-1 × DAS-59122-7 × MON-ØØ81Ø-6 | not available | IR (BL)/cry1Fa2 HT (Glu)/pat IR (Col)/cry34Ab1 IR (Col)/cry35Ab1 IR (BL)/cry1Ab | Dupont |
| A244 | Maize Zea mays | TC1507 × 59122 × MON810 × NK603 | DAS-Ø15Ø7-1 × DAS-59122-7 × MON-ØØ81Ø-6 × MON-ØØ6Ø3-6 | Optimum ™ Intrasect XTRA | IR (BL)/cry1Fa2 HT (Glu)/pat IR (Col)/cry34Ab1 IR (Col)/cry35Ab1 HT (Gly)/cp4 epsps (aroA:CP4) IR (BL)/cry1Ab | Dupont |
| A245 | Maize Zea mays | TC1507 × 59122 × MON88017 | DAS-Ø15Ø7-1 × DAS-59122-7 × MON-88Ø17-3 | not available | IR (BL)/cry1Fa2 HT (Glu)/pat IR (Col)/cry34Ab1 IR (Col)/cry35Ab1 IR (Col)/cry3Bb1 HT (Gly)/cp4 epsps (aroA:CP4) | Monsanto & Dow |
| A246 | Maize Zea mays | TC1507 × 59122 × NK603 | DAS-Ø15Ø7-1 × DAS-59122-7 × MON-ØØ6Ø3-6 | Herculex XTRA ™ RR | IR (BL)/cry1Fa2 HT (Glu)/pat IR (Col)/cry34Ab1 IR (Col)/cry35Ab1 HT (Gly)/cp4 epsps (aroA:CP4) | Dow & Dupont |
| A247 | Maize Zea mays | TC1507 × GA21 | DAS-Ø15Ø7-1 × MON-ØØØ21-9 | not available | IR (BL)/cry1Fa2 HT (Glu)/pat HT (Gly)/mepsps | Dupont |
| A248 | Maize Zea mays | TC1507 × MIR604 × NK603 | DAS-Ø15Ø7-1 × SYN-IR6Ø4-5 × MON-ØØ6Ø3-6 | Optimum ™ TRIsect | IR (BL)/cry1Fa2 HT (Glu)/pat HT (Gly)/cp4 epsps (aroA:CP4) IR (Col)/mcry3A | Dupont |
| A249 | Maize Zea mays | TC1507 × MON810 | DAS-Ø15Ø7-1 × MON-ØØ81Ø-6 | not available | IR (BL)/cry1Fa2 HT (Glu)/pat IR (BL)/cry1Ab | Dow & Dupont |
| A250 | Maize Zea mays | TC1507 × MON810 × MIR162 × NK603 | DAS-Ø15Ø7-1 × MON-ØØ81Ø-6 × SYN-IR162-4 × MON-ØØ6Ø3-6 | not available | IR (BL)/cry1Fa2 HT (Glu)/pat IR (BL)/cry1Ab HT (Gly)/cp4 epsps (aroA:CP4) IR (BL)/vip3Aa20 | Dupont |
| A251 | Maize Zea mays | TC1507 × MON810 × NK603 | DAS-Ø15Ø7-1 × MON-ØØ81Ø-6 × MON-ØØ6Ø3-6 | Optimum ™ Intrasect | IR (BL)/cry1Fa2 HT (Glu)/pat IR (BL)/cry1Ab HT (Gly)/cp4 epsps (aroA:CP4) | Dupont |
| A252 | Maize Zea mays | TC1507 × MON88017 | DAS-Ø15Ø7-1 × MON-88Ø17-3 | not available | IR (BL)/cry1Fa2 HT (Glu)/pat IR (Col)/cry3Bb1 | Monsanto |

TABLE A-continued

| No. | Crop, latin name | Event Name | Event Code | Tradename | Trait (Trait type)/Gene | Company |
|---|---|---|---|---|---|---|
| A253 | Maize *Zea mays* | TC1507 × NK603 | DAS-Ø15Ø7-1 × MON-ØØ6Ø3-6 | Herculex ™ I RR | HT (Gly)/cp4 epsps (aroA:CP4) IR (BL)/cry1Fa2 HT (Glu)/pat HT (Gly)/cp4 epsps (aroA:CP4) | Dow |
| A254 | Maize *Zea mays* | TC6275 | DAS-Ø6275-8 | not available | IR (BL)/mocry1F HT (Glu)/bar | Dow |
| A255 | Maize *Zea mays* | VCO-Ø1981-5 | VCO-Ø1981-5 | not available | HT (Gly)/epsps grg23ace5 | Genective S.A. |
| A256 | Maize *Zea mays* | DK404SR | DK404SR | not available | HT (Cyc)/ACCase (mutant) | BASF |
| A257 | Maize *Zea mays* | EXP1910IT | EXP1910IT | not available | HT (Imi)/als (mutant) | Syngenta |
| A258 | Melon *Cucumis melo* | Melon A | not available | not available | ST (Ripe)/sam-k | Agritope Inc. (USA) |
| A259 | Melon *Cucumis melo* | Melon B | not available | not available | ST (Ripe)/sam-k | Agritope Inc. (USA) |
| A260 | Papaya *Carica papaya* | 55-1 | CUH-CP551-8 | Rainbow, SunUp | VR (PRSV)/prsv-cp | Cornell University and University of Hawaii |
| A261 | Papaya *Carica papaya* | 63-1 | CUH-CP631-7 | not available | VR (PRSV)/prsv-cp | Cornell University and University of Hawaii |
| A262 | Papaya *Carica papaya* | Huanong No. 1 | not available | Huanong No. 1 | VR (PRSV)/prsv-rep | South China Agricultural University |
| A263 | Papaya *Carica papaya* | X17-2 | UFL-X17CP-6 | not available | VR (PRSV)/prsv-cp | University of Florida |
| A264 | Petunia *Petunia hybrida* | Petunia-CHS | not available | not available | | Beijing University |
| A265 | Plum *Prunus domestica* | C-5 | ARS-PLMC5-6 | not available | VR (PPV)/ppv-cp | United States Department of Agriculture - Agricultural Research Service |
| A266 | Polish canola *Brassica rapa* | HCR-1 | not available | not available | HT (Glu)/pat | Bayer Crop Sciences |
| A267 | Polish canola *Brassica rapa* | ZSR500 | not available | Hysyn 101 RR Roundup-Ready ™ | HT (Gly)/cp4 epsps (aroA:CP4) HT (Gly)/gov247 | University of Florida |
| A268 | Polish canola *Brassica rapa* | ZSR502 | not available | Hysyn 101 RR Roundup-Ready ™ | HT (Gly)/cp4 epsps (aroA:CP4) HT (Gly)/gov247 | University of Florida |
| A269 | Polish canola *Brassica rapa* | ZSR503 | not available | Hysyn 101 RR Roundup-Ready ™ | HT (Gly)/cp4 epsps (aroA:CP4) HT (Gly)/gov247 | University of Florida |
| A270 | Poplar *Populus* sp. | Bt poplar, poplar 12 (*Populus nigra*) | not available | not available | IR (BL)/cry1Ac | Research Institute of Forestry (China) |
| A271 | Poplar *Populus* sp. | Hybrid poplar clone 741 | not available | not available | IR (BL)/cry1Ac IR (BRun)/API | Research Institute of Forestry (China) |
| A272 | Potato *Solanum tuberosum* | 1210 amk | not available | Lugovskoi plus | IR (Col)/cry3A | Centre Bioengineering, Russian Academy of Sciences |
| A273 | Potato *Solanum tuberosum* | 2904/1 kgs | not available | Elizaveta plus | IR (Col)/cry3A | Centre Bioengineering, Russian Academy of Sciences |
| A274 | Potato *Solanum tuberosum* | ATBT04-27 | NMK-89367-8 | Atlantic NewLeaf ™ potato | IR (Col)/cry3A | Monsanto |
| A275 | Potato *Solanum tuberosum* | ATBT04-30 | NMK-89613-2 | Atlantic NewLeaf ™ potato | IR (Col)/cry3A | Monsanto |

TABLE A-continued

| No. | Crop, latin name | Event Name | Event Code | Tradename | Trait (Trait type)/Gene | Company |
|---|---|---|---|---|---|---|
| A276 | Potato *Solanum tuberosum* | ATBT04-31 | NMK-89170-9 | Atlantic NewLeaf™ potato | IR (Col)/cry3A | Monsanto |
| A277 | Potato *Solanum tuberosum* | ATBT04-36 | NMK-89279-1 | Atlantic NewLeaf™ potato | IR (Col)/cry3A | Monsanto |
| A278 | Potato *Solanum tuberosum* | ATBT04-6 | NMK-89761-6 | Atlantic NewLeaf™ potato | IR (Col)/cry3A | Monsanto |
| A279 | Potato *Solanum tuberosum* | BT06 | NMK-89812-3 | New Leaf™ Russet Burbank potato | IR (Col)/cry3A | Monsanto |
| A280 | Potato *Solanum tuberosum* | BT10 | NMK-89175-5 | New Leaf™ Russet Burbank potato | IR (Col)/cry3A | Monsanto |
| A281 | Potato *Solanum tuberosum* | BT12 | NMK-89601-8 | New Leaf™ Russet Burbank potato | IR (Col)/cry3A | Monsanto |
| A282 | Potato *Solanum tuberosum* | BT16 | NMK-89167-6 | New Leaf™ Russet Burbank potato | IR (Col)/cry3A | Monsanto |
| A283 | Potato *Solanum tuberosum* | BT17 | NMK-89593-9 | New Leaf™ Russet Burbank potato | IR (Col)/cry3A | Monsanto |
| A284 | Potato *Solanum tuberosum* | BT18 | NMK-89906-7 | New Leaf™ Russet Burbank potato | IR (Col)/cry3A | Monsanto |
| A285 | Potato *Solanum tuberosum* | BT23 | NMK-89675-1 | New Leaf™ Russet Burbank potato | IR (Col)/cry3A | Monsanto |
| A286 | Potato *Solanum tuberosum* | EH92-527-1 | BPS-25271-9 | Amflora™ | ST (Starch)/gbss (antisense-fragment) | BASF |
| A287 | Potato *Solanum tuberosum* | HLMT15-15 | not available | Hi-Lite NewLeaf™ Y potato | IR (Col)/cry3A VR (PVY)/pvy-cp | Monsanto |
| A288 | Potato *Solanum tuberosum* | HLMT15-3 | not available | Hi-Lite NewLeaf™ Y potato | IR (Col)/cry3A VR (PVY)/pvy-cp | Monsanto |
| A289 | Potato *Solanum tuberosum* | HLMT15-46 | not available | Hi-Lite NewLeaf™ Y potato | IR (Col)/cry3A VR (PVY)/pvy-cp | Monsanto |
| A290 | Potato *Solanum tuberosum* | RBMT15-101 | NMK-89653-6 | New Leaf™ Y Russet Burbank potato | IR (Col)/cry3A VR (PVY)/pvy-cp | Monsanto |
| A291 | Potato *Solanum tuberosum* | RBMT21-129 | NMK-89684-1 | New Leaf™ Plus Russet Burbank potato | IR (Col)/cry3A VR (PLRV)/plrv-orf1 VR (PLRV)/plrv-orf2 | Monsanto |
| A292 | Potato *Solanum tuberosum* | RBMT21-152 | not available | New Leaf™ Plus Russet Burbank potato | IR (Col)/cry3A VR (PLRV)/plrv-orf1 VR (PLRV)/plrv-orf2 | Monsanto |
| A293 | Potato *Solanum tuberosum* | RBMT21-350 | NMK-89185-6 | New Leaf™ Plus Russet Burbank potato | IR (Col)/cry3A VR (PLRV)/plrv-orf1 VR (PLRV)/plrv-orf2 | Monsanto |
| A294 | Potato *Solanum tuberosum* | RBMT22-082 | NMK-89896-6 | New Leaf™ Plus Russet Burbank potato | IR (Col)/cry3A HT (Gly)/cp4 epsps (aroA:CP4) VR (PLRV)/plrv-orf1 VR (PLRV)/plrv-orf2 | Monsanto |
| A295 | Potato *Solanum tuberosum* | RBMT22-186 | not available | New Leaf™ Plus Russet Burbank potato | IR (Col)/cry3A HT (Gly)/cp4 epsps (aroA:CP4) VR (PLRV)/plrv-orf1 VR (PLRV)/plrv-orf2 | Monsanto |
| A296 | Potato *Solanum tuberosum* | RBMT22-238 | not available | New Leaf™ Plus Russet Burbank potato | IR (Col)/cry3A HT (Gly)/cp4 epsps (aroA:CP4) VR (PLRV)/plrv-orf1 VR (PLRV)/plrv-orf2 | Monsanto |
| A297 | Potato *Solanum tuberosum* | RBMT22-262 | not available | New Leaf™ Plus Russet Burbank potato | IR (Col)/cry3A HT (Gly)/cp4 epsps (aroA:CP4) VR (PLRV)/plrv-orf1 VR (PLRV)/plrv-orf2 | Monsanto |
| A298 | Potato *Solanum tuberosum* | SEMT15-02 | NMK-89935-9 | Shepody NewLeaf™ Y potato | IR (Col)/cry3A VR (PVY)/pvy-cp | Monsanto |

TABLE A-continued

| No. | Crop, latin name | Event Name | Event Code | Tradename | Trait (Trait type)/Gene | Company |
|---|---|---|---|---|---|---|
| A299 | Potato *Solanum tuberosum* | SEMT15-07 | not available | Shepody NewLeaf™ Y potato | IR (Col)/cry3A VR (PVY)/pvy-cp | Monsanto |
| A300 | Potato *Solanum tuberosum* | SEMT15-15 | NMK-8993Ø-4 | Shepody NewLeaf™ Y potato | IR (Col)/cry3A VR (PVY)/pvy-cp | Monsanto |
| A301 | Potato *Solanum tuberosum* | SPBT02-5 | NMK-89576-1 | Superior NewLeaf™ potato | IR (Col)/cry3A | Monsanto |
| A302 | Potato *Solanum tuberosum* | SPBT02-7 | NMK-89724-5 | Superior NewLeaf™ potato | IR (Col)/cry3A | Monsanto |
| A303 | Potato *Solanum tuberosum* | E12 | SPS-ØØE12-8 | Innate ™ Russet Burbank Potato | ST (AA)/asn1 ST (Starch)/pPhL ST (BSB)/ppo5 ST (Starch)/pR1 | J.R. Simplot Co. |
| A304 | Potato *Solanum tuberosum* | E24 | SPS-ØØE24-2 | Innate ™ Russet Burbank Potato | ST (AA)/asn1 ST (Starch)/pPhL ST (BSB)/ppo5 ST (Starch)/pR1 | J.R. Simplot Co. |
| A305 | Potato *Solanum tuberosum* | F10 | SPS-ØØF10-7 | Innate ™ Ranger Russet Potato | ST (AA)/asn1 ST (Starch)/pPhL ST (BSB)/ppo5 ST (Starch)/pR1 | J.R. Simplot Co. |
| A306 | Potato *Solanum tuberosum* | F37 | SPS-ØØF37-7 | Innate ™ Ranger Russet Potato | ST (AA)/asn1 ST (Starch)/pPhL ST (BSB)/ppo5 ST (Starch)/pR1 | J.R. Simplot Co. |
| A307 | Potato *Solanum tuberosum* | G11 | SPS-ØØG11-9 | Innate ™ G Potato | ST (AA)/asn1 ST (BSB)/ppo5 | J.R. Simplot Co. |
| A308 | Potato *Solanum tuberosum* | H37 | SPS-ØØH37-9 | Innate ™ H Potato | ST (AA)/asn1 ST (Starch)/pPhL ST (BSB)/ppo5 ST (Starch)/pR1 | J.R. Simplot Co. |
| A309 | Potato *Solanum tuberosum* | H50 | SPS-ØØH50-4 | Innate ™ H Potato | ST (AA)/asn1 ST (Starch)/pPhL ST (BSB)/ppo5 ST (Starch)/pR1 | J.R. Simplot Co. |
| A310 | Potato *Solanum tuberosum* | J3 | SPS-ØØØJ3-4 | Innate ™ Atlantic Potato | ST (AA)/asn1 ST (Starch)/pPhL ST (BSB)/ppo5 ST (Starch)/pR1 | J.R. Simplot Co. |
| A311 | Potato *Solanum tuberosum* | J55 | SPS-ØØJ55-2 | Innate ™ Atlantic Potato | ST (AA)/asn1 ST (Starch)/pPhL ST (BSB)/ppo5 ST (Starch)/pR1 | J.R. Simplot Co. |
| A312 | Potato *Solanum tuberosum* | J78 | SPS-ØØJ78-7 | Innate ™ Atlantic Potato | ST (AA)/asn1 ST (BSB)/ppo5 | J.R. Simplot Co. |
| A313 | Rice *Oryza sativa* | 7Crp#10 | not available | not available | ST (All)/7crp | National Institute of Agrobiological Sciences (Japan) |
| A314 | Rice *Oryza sativa* | GM Shanyou 63 | not available | BT Shanyou 63 | IR (BL)/cry1Ab IR (BL)/cry1Ac | Huazhong Agricultural University (China) |
| A315 | Rice *Oryza sativa* | Huahui-1/ TT51-1 | not available | Huahui-1 | IR (BL)/cry1Ab IR (BL)/cry1Ac | Huazhong Agricultural University (China) |
| A316 | Rice *Oryza sativa* | LLRICE06 | ACS-OSØØ1-4 | Liberty Link ™ rice | HT (Glu)/bar | Bayer Crop Science |
| A317 | Rice *Oryza sativa* | LLRICE601 | BCS-OSØØ3-7 | Liberty Link ™ rice | HT (Glu)/bar | Bayer Crop Science |
| A318 | Rice *Oryza sativa* | LLRICE62 | ACS-OSØØ2-5 | Liberty Link ™ rice | HT (Glu)/bar | Bayer Crop Science |
| A319 | Rice *Oryza sativa* | Tarom molaii + cry1Ab | not available | not available | IR (BL)/cry1Ab (truncated) | Agricultural Biotech Research Institute (Iran) |
| A320 | Rice *Oryza sativa* | CL121, CL141, CFX51 | CL121, CL141, CFX51 | Clearfield Rice | HT (Imi)/als (mutant) | BASF |
| A321 | Rice *Oryza sativa* | IMINTA-1, IMINTA-4 | IMINTA-1, IMINTA-4 | Clearfield Rice | HT (Imi)/als (mutant) | BASF |
| A322 | Rice *Oryza sativa* | PWC16 | PWC16 | not available | HT (Imi)/als (mutant) | BASF |

TABLE A-continued

| No. | Crop, latin name | Event Name | Event Code | Tradename | Trait (Trait type)/Gene | Company |
|---|---|---|---|---|---|---|
| A323 | Rose *Rosa hybrida* | WKS82/130-4-1 | IFD-524Ø1-4 | not available | ST (Color)/5AT ST (Color)/bp40 (f3'5'h) | Suntory Limited (Japan) |
| A324 | Rose *Rosa hybrida* | WKS92/130-9-1 | IFD-529Ø1-9 | not available | ST (Color)/5AT ST (Color)/bp40 (f3'5'h) | Suntory Limited (Japan) |
| A325 | Soybean *Glycine max* | 260-05 (G94-1, G94-19, G168) | DD-Ø26Ø05-3 | not available | ST (Oil)/gm-fad2-1 (silencing locus) | Dupont |
| A326 | Soybean *Glycine max* | A2704-12 | ACS-GMØØ5-3 | Liberty Link ™ soybean | HT (Glu)/pat | Bayer Crop Science |
| A327 | Soybean *Glycine max* | A2704-21 | ACS-GMØØ4-2 | Liberty Link ™ soybean | HT (Glu)/pat | Bayer Crop Science |
| A328 | Soybean *Glycine max* | A5547-127 | ACS-GMØØ6-4 | Liberty Link ™ soybean | HT (Glu)/pat | Bayer Crop Science |
| A329 | Soybean *Glycine max* | A5547-35 | ACS-GMØØ8-6 | Liberty Link ™ soybean | HT (Glu)/pat | Bayer Crop Science |
| A330 | Soybean *Glycine max* | CV127 | BPS-CV127-9 | Cultivance | HT (Imi)/csr1-2 | BASF |
| A331 | Soybean *Glycine max* | DAS44406-6 | DAS-444Ø6-6 | not available | HT (2,4-D)/aad-12 HT (Gly)/2mepsps HT (Glu)/pat | Dow |
| A332 | Soybean *Glycine max* | DAS68416-4 | DAS-68416-4 | Enlist ™ Soybean | HT (2,4-D)/aad-12 HT (Glu)/pat | Dow |
| A333 | Soybean *Glycine max* | DAS68416-4 × MON89788 | DAS-68416-4 × MON-89788-1 | not available | HT (2,4-D)/aad-12 HT (Glu)/pat HT (Gly)/cp4 epsps (aroA:CP4) | Dow |
| A334 | Soybean *Glycine max* | DAS81419 | DAS-81419-2 | not available | IR (BL)/cry1Ac IR (BL)/cry1F HT (Glu)/pat | Dow |
| A335 | Soybean *Glycine max* | DP305423 | DP-3Ø5423-1 | Treus ™, Plenish ™ | ST (Oil)/gm-fad2-1 (partial sequence) | Dupont |
| A336 | Soybean *Glycine max* | DP305423 × GTS 40-3-2 | DP-3Ø5423-1 × MON-Ø4Ø32-6 | not available | ST (Oil)/gm-fad2-1 (partial sequence) HT (Gly)/cp4 epsps (aroA:CP4) | Dupont |
| A337 | Soybean *Glycine max* | DP356043 | DP-356Ø43-5 | Optimum GAT ™ | HT (Gly)/gat4601 HT (SU)/gm-hra | Dupont |
| A338 | Soybean *Glycine max* | FG72 (FGØ72-2, FGØ72-3) | MST-FGØ72-3 | not available | HT (Gly)/2mepsps HT (HPPD)/hppdPF W336 | Bayer Crop-Science and MS Technologies LLC |
| A339 | Soybean *Glycine max* | GTS 40-3-2 (40-3-2) | MON-Ø4Ø32-6 | Roundup Ready ™ soybean | HT (Gly)/cp4 epsps (aroA:CP4) | Monsanto |
| A340 | Soybean *Glycine max* | GU262 | ACS-GMØØ3-1 | Liberty Link ™ soybean | HT (Glu)/pat | Bayer Crop Science |
| A341 | Soybean *Glycine max* | MON 87712 | MON-87712-4 | Not available | Y&S (Y)/bbx32 | Monsanto |
| A342 | Soybean *Glycine max* | MON87701 | MON-877Ø1-2 | not available | IR (BL)/cry1Ac | Monsanto |
| A343 | Soybean *Glycine max* | MON87701 × MON89788 | MON-877Ø1-2 × MON-89788-1 | Intacta ™ Roundup Ready ™ 2 Pro | IR (BL)/cry1Ac HT (Gly)/cp4 epsps (aroA:CP4) | Monsanto |
| A344 | Soybean *Glycine max* | MON87705 | MON-877Ø5-6 | Vistive Gold ™ | ST (Oil)/fatb1-A (sense and anti-sense segments) ST (Oil)/fatb2-1-A (sense and anti-sense) HT (Gly)/cp4 epsps (aroA:CP4) | Monsanto |
| A345 | Soybean *Glycine max* | MON87705 × MON89788 | MON-877Ø5-6 × MON-89788-1 | not available | ST (Oil)/fatb1-A (sense and anti-sense segments) ST (Oil)/fatb2-1-A (sense and anti-sense) HT (Gly)/cp4 epsps (aroA:CP4) | Monsanto |
| A346 | Soybean *Glycine max* | MON87708 | MON-877Ø8-9 | Genuity ® Roundup Ready ™ 2 Xtend ™ | HT (Dic)/dmo | Monsanto |

TABLE A-continued

| No. | Crop, latin name | Event Name | Event Code | Tradename | Trait (Trait type)/Gene | Company |
|---|---|---|---|---|---|---|
| A347 | Soybean Glycine max | MON87708 × MON89788 | MON-877Ø8-9 × MON-89788-1 | not available | HT (Dic)/dmo HT (Gly)/cp4 epsps (aroA:CP4) | Monsanto |
| A348 | Soybean Glycine max | MON87751 | MON-87751-7 | not available | IR (BL)/cry1A.105 IR (BL)/cry2Ab2 | Monsanto |
| A349 | Soybean Glycine max | MON87769 | MON87769-7 | not available | ST (Oil)/Pj.D6D ST (Oil)/Nc.fad3 | Monsanto |
| A350 | Soybean Glycine max | MON87769 × MON89788 | MON-87769-7 × MON-89788-1 | not available | ST (Oil)/Pj.D6D ST (Oil)/Nc.fad3 HT (Gly)/cp4 epsps (aroA:CP4) | Monsanto |
| A351 | Soybean Glycine max | MON89788 | MON-89788-1 | Genuity ® Roundup Ready 2 Yield ™ | HT (Gly)/cp4 epsps (aroA:CP4) | Monsanto |
| A352 | Soybean Glycine max | SYHTØH2 | SYN-ØØØH2-5 | Herbicide-tolerant Soybean line | HT (Glu)/pat HT (HPPD)/avhppd-03 | Bayer Crop Science & Syngenta |
| A353 | Soybean Glycine max | W62 | ACS-GMØØ2-9 | Liberty Link ™ soybean | HT (Glu)/bar | Bayer Crop Science |
| A354 | Soybean Glycine max | W98 | ACS-GMØØ1-8 | Liberty Link ™ soybean | HT (Glu)/bar | Bayer Crop Science |
| A355 | Soybean Glycine max | OT96-15 | OT96-15 | not available | ST (Oil)/fan1 (mutant) | Agriculture & Agri-Food Canada |
| A356 | Squash Cucurbita pepo | CZW3 | SEM-ØCZW3-2 | not available | VR (CMV)/cmv-cp VR (zymv)/zymv-cp VR (wmv)/wmv-cp | Seminis Vegetable Seeds (Canada) and Monsanto Company (As-grow) |
| A357 | Squash Cucurbita pepo | ZW20 | SEM-ØZW2Ø-7 | not available | VR (CYMV)/zymv-cp VR (WMV)/wmv-cp | Seminis Vegetable Seeds (Canada) and Monsanto Company (As-grow) |
| A358 | Sugar beet Beta vulgaris | GTSB77 (T9100152) | SY-GTSB77-8 | InVigor ™ sugarbeet | HT (Gly)/cp4 epsps (aroA:CP4) HT (Gly)/gov247 | Novartis Seeds and Monsanto Company |
| A359 | Sugar beet Beta vulgaris | H7-1 | KM-ØØØH71-4 | Roundup Ready ™ sugar beet | HT (Gly)/cp4 epsps (aroA:CP4) | Monsanto |
| A360 | Sugar beet Beta vulgaris | T120-7 | ACS-BVØØ1-3 | Liberty Link ™ sugarbeet | HT (Glu)/pat | Bayer Crop Science |
| A361 | Sugarcane Saccharum sp. | NXI-1T | NXI-1T | not available | Y&S (DT)/EcBetA | PT Perkebunan Nusantara XI (Persero) |
| A362 | Sugarcane Saccharum sp. | NXI-4T | NXI-4T | not available | Y&S (DT)/RmBetA | PT Perkebunan Nusantara XI (Persero) |
| A363 | Sugarcane Saccharum sp. | NXI-6T | NXI-6T | not available | Y&S (DT)/RmBetA | PT Perkebunan Nusantara XI (Persero) |
| A364 | Sunflower Helianthus annuus | X81359 | X81359 | Clearfield Sunflower | HT (Imi)/als (mutant) | BASF |
| A365 | Sweet pepper Capsicum annuum | PK-SP01 | not available | not available | VR (CMV)/cmv-cp | Beijing University |
| A366 | Tobacco Nicotiana tabacum | C/F/93/08-02 | not available | not available | HT (Ox)/bxn | SEITA S.A. (France) |
| A367 | Tobacco Nicotiana tabacum | Vector 21-41 | not available | not available | ST (Nic)/NtQPT1 (antisense) | Vector Tobacco Inc. (USA) |
| A368 | Tomato Lycopersicon esculentum | 1345-4 | not available | not available | ST (Ripe)/acc (truncated) | DNA Plant Technology Corporation (USA) |
| A369 | Tomato Lycopersicon esculentum | 35-1-N | not available | not available | ST (Ripe)/sam-k | Agritope Inc. (USA) |

TABLE A-continued

| No. | Crop, latin name | Event Name | Event Code | Tradename | Trait (Trait type)/Gene | Company |
|---|---|---|---|---|---|---|
| A370 | Tomato *Lycopersicon esculentum* | 5345 | not available | not available | IR (BL)/cry1Ac | Monsanto |
| A371 | Tomato *Lycopersicon esculentum* | 8338 | CGN-89322-3 | not available | ST (Ripe)/accd | Monsanto |
| A372 | Tomato *Lycopersicon esculentum* | B | SYN-ØØØØB-6 | not available | ST (Ripe)/pg (sense or antisense) | Zeneca Plant Science and Petoseed Company |
| A373 | Tomato *Lycopersicon esculentum* | Da | SYN-ØØØDA-9 | not available | ST (Ripe)/pg (sense or antisense) | Zeneca Plant Science and Petoseed Company |
| A374 | Tomato *Lycopersicon esculentum* | Da Dong No 9 | not available | not available | | Institute of Microbiology, CAS (China) |
| A375 | Tomato *Lycopersicon esculentum* | F (1401F, h38F, 11013F, 7913F) | SYN-ØØØØF-1 | not available | ST (Ripe)/pg (sense or antisense) | Zeneca Plant Science and Petoseed Company |
| A376 | Tomato *Lycopersicon esculentum* | FLAVR SAVR ™ | CGN-89564-2 | FLAVR SAVR | ST (Ripe)/pg (sense or antisense) | Monsanto |
| A377 | Tomato *Lycopersicon esculentum* | Huafan No 1 | not available | not available | ST (Ripe)/anti-efe | Huazhong Agricultural University (China) |
| A378 | Tomato *Lycopersicon esculentum* | PK-TM8805R (8805R) | not available | not available | VR (CMV)/cmv-cp | Beijing University |
| A379 | Wheat *Triticum aestivum* | MON71800 | MON-718ØØ-3 | Roundup Ready ™ wheat | HT (Gly)/cp4 epsps (aroA:CP4) | Monsanto |
| A380 | Wheat *Triticum aestivum* | AP205CL | AP205CL | Clearfield Wheat | HT (Imi)/als (mutant) | BASF |
| A381 | Wheat *Triticum aestivum* | AP602CL | AP602CL | Clearfield Wheat | HT (Imi)/als (mutant) | BASF |
| A382 | Wheat *Triticum aestivum* | BW255-2, BW238-3 | BW255-2, BW238-3 | Clearfield Wheat | HT (Imi)/als (mutant) | BASF |
| A383 | Wheat *Triticum aestivum* | BW7 | BW7 | Clearfield Wheat | HT (Imi)/als (mutant) | BASF |
| A384 | Wheat *Triticum aestivum* | Teal 11A | Teal 11A | Clearfield Wheat | HT (Imi)/als (mutant) | BASF |
| A385 | Wheat *Triticum aestivum* | SWP965001 | SWP965001 | not available | HT (Imi)/als (mutant) | American Cyanamid |

Explanations:

| TRAIT | TRAIT - full name | TRAIT TYPE | TRAIT TYPE - full name |
|---|---|---|---|
| HT | Herbicide Tolerance | HT (Gly) | glyphosate tolerance |
| | | HT (Glu) | glufosinate tolerance |
| | | HT (SU) | sulfonylurea tolerance |
| | | HT (Imi) | imidazolinone tolerance |
| | | HT (2,4-D) | resistance against 2,4-D Choline |
| | | HT (Dic) | dicamba tolerance |
| | | HT (Gly + Dicamba) | glyphosate & dicamba tolerance |
| | | HT (HPPD) | HPPD inhibitor resistance |
| | | HT (Ox) | oxynil herbicide tolerance (e.g. bronnoxynil) |
| | | HT (Cyc) | cyclohexanone herbicide tolerance (e.g. sethoxydim) |
| | | 2HT | two genes for same HT-trait |
| IR | Insect resistance (including Nematodes) | IR (BL) | broad spectrum resistance against lepidopterans (above ground worms) |
| | | IR (Col) | resistance against Coleopterans (beetles) |
| | | IR (SCN) | soybean Cyst Nematode resistance |
| | | IR (CB) | corn borer resistance |
| | | IR (BRun) | broad range resistance, not further specified |
| | | IR (Rw) | resistance against root worm |

| TRAIT | TRAIT - full name | TRAIT TYPE | TRAIT TYPE - full name |
|---|---|---|---|
| PC | Pollination control and male sterility systems | PC (FR) | fertility restoration |
| | | PC (MS) | male sterility |
| FR | Fungal resistance | FR (SR) | stalk rot resistance |
| VR | Viral resistance | VR (BGMV) | resistance to Bean Golden Mosaic Virus |
| | | VR (PRSV) | resistance to papaya ringspot virus |
| | | VR (PPV) | resistance to plum pox virus |
| | | VR (PVY) | resistance to potato virus Y |
| | | VR (PLRV) | resistance to potato leafroll virus |
| | | VR (CMV) | resistance to cucumber mosaic cucumovirus |
| | | VR (ZYMV) | resistance to zucchini yellow mosaic potyvirus |
| | | VR (WMV) | resistance to watermelon mosaic potyvirus 2 |
| Y&S | Yield and Stress | Y&S (DT) | drought tolerance |
| | | Y&S (Y) | yield increase |
| | | Y&S (NUE) | nitrogen use efficiency |
| ST | Specialty Trait (includes Feed, Food, Quality) | ST (Lignin) | altered lignin production |
| | | ST (OIL) | altered oil content |
| | | ST (starch) | altered starch content |
| | | ST (CA) | corn amylase |
| | | ST (P) | phytase production |
| | | ST (Color) | modified color |
| | | ST (Ripe) | delayed/altered ripening |
| | | ST (AA) | altered amino-acid content |
| | | ST (All) | anti-allergy |
| | | ST (Nic) | altered nicotin content |
| | | ST (BSB) | reduced black spot bruise formation |
| SM | Selectable marker | | |

Preferably, the plant, which has been modified by mutagenesis or genetic engineering, is selected from the group consisting of wheat, maize, rice, soybean, and cotton, and is more preferably a soybean plant, particularly any one of the soybean plants according to rows A-325 to A355 of table A.

In a preferred embodiment of the use or method as defined above, the plant, which has been modified by mutagenesis or genetic engineering, is a soybean plant exhibiting insect resistance, in particular Lepidopteran resistance, and optionally at least one further trait, preferably herbicide tolerance, e.g. glyphosate tolerance or glufosinate tolerance.

Preferred soybean plants include the soybean plants according to one row of table B.

TABLE B

| No | Trait(s) | Event name | Developer/ commercial plants |
|---|---|---|---|
| B-1 | Glufosinate tolerance + Lepidopteran resistance | DAS81419 | Dow AgroSciences LLC |
| B-2 | Lepidopteran resistance | MON87701 | Monsanto Company |
| B-3 | Glyphosate tolerance + Lepidopteran resistance | MON87701 × MON89788 | available, Monsanto Company; Intacta ™ Roundup Ready ™ 2 Pro |
| B-4 | Lepidopteran resistance | MON87751 | Monsanto Company |

In another preferred embodiment of the use or method as defined above, the plant, which has been modified by mutagenesis or genetic engineering, is a soybean plant, which has been modified by genetic engineering by integrating one or more genes into the genetic material of the soybean, wherein insect resistance is provided by one or more genes selected from the group consisting of cry1Ac, cry1F, cry1A.105, cry2Ab2, and combinations thereof, preferably by cry1Ac, cry1F, or a combination thereof, and more preferably by cry1Ac. Optionally, herbicide tolerance is additionally provided by one or more genes selected from the group consisting of pat, bar, 2mepsps, cp4 epsps, and mepsps.

Preferred soybean plants include soybean plants, which have been modified by integrating at least one gene or gene combination according to one row of Table C.

TABLE C

| No | Gene for lepidopteran resistance | Gene for lepidopteran resistance | Gene for lepidopteran resistance | Gene for herbicide tolerance |
|---|---|---|---|---|
| C-1 | cry1Ac | | | |
| C-2 | cry1A.105 | | | |
| C-3 | cry2Ab2 | | | |
| C-4 | cry1F | | | |
| C-5 | cry1Ac | cry1A.105 | | |
| C-6 | cry1Ac | cry2Ab2 | | |
| C-7 | cry1Ac | cry1F | | |
| C-8 | cry1A.105 | cry2Ab2 | | |
| C-9 | cry1A.105 | cry1F | | |
| C-10 | cry2Ab2 | cry1F | | |
| C-11 | cry1Ac | cry1A.105 | cry2Ab2 | |
| C-12 | cry1F | cry1A.105 | cry2Ab2 | |
| C-13 | cry1Ac | cry1F | cry2Ab2 | |
| C-14 | cry1Ac | cry1A.105 | cry1F | |
| C-15 | cry1Ac | | | pat |
| C-16 | cry1A.105 | | | pat |
| C-17 | cry2Ab2 | | | pat |
| C-18 | cry1F | | | pat |
| C-19 | cry1Ac | cry1A.105 | | pat |
| C-20 | cry1Ac | cry2Ab2 | | pat |
| C-21 | cry1Ac | cry1F | | pat |
| C-22 | cry1A.105 | cry2Ab2 | | pat |
| C-23 | cry1A.105 | cry1F | | pat |
| C-24 | cry2Ab2 | cry1F | | pat |
| C-25 | cry1Ac | cry1A.105 | cry2Ab2 | pat |
| C-26 | cry1F | cry1A.105 | cry2Ab2 | pat |
| C-27 | cry1Ac | cry1F | cry2Ab2 | pat |
| C-28 | cry1Ac | cry1A.105 | cry1F | pat |
| C-29 | cry1Ac | | | bar |
| C-30 | cry1A.105 | | | bar |
| C-31 | cry2Ab2 | | | bar |
| C-32 | cry1F | | | bar |
| C-33 | cry1Ac | cry1A.105 | | bar |
| C-34 | cry1Ac | cry2Ab2 | | bar |
| C-35 | cry1Ac | cry1F | | bar |

TABLE C-continued

| No | Gene for lepidopteran resistance | Gene for lepidopteran resistance | Gene for lepidopteran resistance | Gene for herbicide tolerance |
|---|---|---|---|---|
| C-36 | cry1A.105 | cry2Ab2 | | bar |
| C-37 | cry1A.105 | cry1F | | bar |
| C-38 | cry2Ab2 | cry1F | | bar |
| C-39 | cry1Ac | cry1A.105 | cry2Ab2 | bar |
| C-40 | cry1F | cry1A.105 | cry2Ab2 | bar |
| C-41 | cry1Ac | cry1F | cry2Ab2 | bar |
| C-42 | cry1Ac | cry1A.105 | cry1F | bar |
| C-43 | cry1Ac | | | 2mepsps |
| C-44 | cry1A.105 | | | 2mepsps |
| C-45 | cry2Ab2 | | | 2mepsps |
| C-46 | cry1F | | | 2mepsps |
| C-47 | cry1Ac | cry1A.105 | | 2mepsps |
| C-48 | cry1Ac | cry2Ab2 | | 2mepsps |
| C-49 | cry1Ac | cry1F | | 2mepsps |
| C-50 | cry1A.105 | cry2Ab2 | | 2mepsps |
| C-51 | cry1A.105 | cry1F | | 2mepsps |
| C-52 | cry2Ab2 | cry1F | | 2mepsps |
| C-53 | cry1Ac | cry1A.105 | cry2Ab2 | 2mepsps |
| C-54 | cry1F | cry1A.105 | cry2Ab2 | 2mepsps |
| C-55 | cry1Ac | cry1F | cry2Ab2 | 2mepsps |
| C-56 | cry1Ac | cry1A.105 | cry1F | 2mepsps |
| C-57 | cry1Ac | | | cp4 epsps |
| C-58 | cry1A.105 | | | cp4 epsps |
| C-59 | cry2Ab2 | | | cp4 epsps |
| C-60 | cry1F | | | cp4 epsps |
| C-61 | cry1Ac | cry1A.105 | | cp4 epsps |
| C-62 | cry1Ac | cry2Ab2 | | cp4 epsps |
| C-63 | cry1Ac | cry1F | | cp4 epsps |
| C-64 | cry1A.105 | cry2Ab2 | | cp4 epsps |
| C-65 | cry1A.105 | cry1F | | cp4 epsps |
| C-66 | cry2Ab2 | cry1F | | cp4 epsps |
| C-67 | cry1Ac | cry1A.105 | cry2Ab2 | cp4 epsps |
| C-68 | cry1F | cry1A.105 | cry2Ab2 | cp4 epsps |
| C-69 | cry1Ac | cry1F | cry2Ab2 | cp4 epsps |
| C-70 | cry1Ac | cry1A.105 | cry1F | cp4 epsps |
| C-71 | cry1Ac | | | mepsps |
| C-72 | cry1A.105 | | | mepsps |
| C-73 | cry2Ab2 | | | mepsps |
| C-74 | cry1F | | | mepsps |
| C-75 | cry1Ac | cry1A.105 | | mepsps |
| C-76 | cry1Ac | cry2Ab2 | | mepsps |
| C-77 | cry1Ac | cry1F | | mepsps |
| C-78 | cry1A.105 | cry2Ab2 | | mepsps |
| C-79 | cry1A.105 | cry1F | | mepsps |
| C-80 | cry2Ab2 | cry1F | | mepsps |
| C-81 | cry1Ac | cry1A.105 | cry2Ab2 | mepsps |
| C-82 | cry1F | cry1A.105 | cry2Ab2 | mepsps |
| C-83 | cry1Ac | cry1F | cry2Ab2 | mepsps |
| C-84 | cry1Ac | cry1A.105 | cry1F | mepsps |

In view of the above preferences regarding pests and plants, the following embodiments of the use or method of the invention comprising the application of the mixture of the invention are particularly preferred.

In one preferred embodiment of the invention, the present invention relates to the use or method comprising the application of the mixture of the invention as defined above, wherein the pests are selected from the group consisting of *Anticarsia gemmatalis, Chrysodeixis includens* (=*Pseudoplusia includens*), *Helicoverpa armigera* (=*Heliothlis armigera*), *Spodoptera frugiperda, Spodoptera eridania, Spodoptera cosmioides*, and combinations thereof, and the plant is a soybean plant, which has been modified by mutagenesis or genetic engineering, and is preferably selected from the soybean plants A-325 to A-355, B-1 to B-4, or C-1 to C-84.

In one particularly preferred embodiment, the pests are *Anticarsia gemmatalis* and the plant is a soybean plant selected from the soybean plants A-325 to A-355, B-1 to B-4, or C-1 to C-84.

In one particularly preferred embodiment, the pests are *Chrysodeixis includens* (=*Pseudoplusia includens*) and the plant is a soybean plant selected from the soybean plants A325 to A-355, B-1 to B-4, or C-1 to C-84.

In one particularly preferred embodiment, the pests are *Helicoverpa armigera* (=*Heliothlis armigera*) and the plant is a soybean plant selected from the soybean plants A-325 to A-355, B-1 to B-4, or C-1 to C-84.

In one particularly preferred embodiment, the pests are *Spodoptera frugiperda* and the plant is a soybean plant selected from the soybean plants A-325 to A-355, B-1 to B-4, or C-1 to C-84.

In one particularly preferred embodiment, the pests are *Spodoptera eridania* and the plant is a soybean plant selected from the soybean plants A-325 to A-355, B-1 to B-4, or C-1 to C-84.

In one particularly preferred embodiment, the pests are *Spodoptera cosmioides* and the plant is a soybean plant selected from the soybean plants A-325 to A-355, B-1 to B-4, or C-1 to C-84.

As already indicated above, the present invention also relates to certain uses and methods comprising the application of the carboxamide compound I selected from compound i) of formula (I), compound ii) of formula (Ia) and mixtures comprising the carboxamide compounds i) and ii).

The following remarks as to preferred embodiments of these uses or methods are to be understood as preferred on their own as well as preferably in combination with each other.

In one aspect, the present invention relates to the use of the carboxamide compound compound i) of formula (I) in pesticidally effective amounts for protecting a soybean plant, the plant propagation material thereof, or its locus of growth, against the attack or infestation by pests selected from the group consisting of *Anticarsia gemmatalis, Chrysodeixis includens* (=*Pseudoplusia includens*), *Spodoptera cosmioides, Spodoptera eridania, Spodoptera frugiperda*, and combinations thereof.

In another aspect, the present invention relates to the use of the carboxamide compound ii) of formula (Ia) in pesticidally effective amounts for protecting a soybean plant, the plant propagation material thereof, or its locus of growth, against the attack or infestation by pests selected from the group consisting of *Anticarsia gemmatalis, Chrysodeixis includens* (=*Pseudoplusia includens*), *Spodoptera cosmioides, Spodoptera eridania, Spodoptera frugiperda*, and combinations thereof.

In another aspect, the present invention relates to the use of pesticidally effective amounts of mixtures comprising the carboxamide compounds i) and ii) for protecting a soybean plant, the plant propagation material thereof, or its locus of growth, against the attack or infestation by pests selected from the group consisting of *Anticarsia gemmatalis, Chlysodeixis includens* (=*Pseudoplusia includens*), *Spodoptera cosmioides, Spodoptera eridania, Spodoptera frugiperda*, and combinations thereof.

In another aspect, the present invention relates to a method for controlling pests, which method comprises the application of a pesticidally effective amount of the carboxamide compound i) of formula (I) to a soybean plant, the plant propagation material thereof, or its locus of growth; the pests or their food supply, habitat or breeding grounds, wherein the pests are selected from the group consisting of *Anticarsia gemmatalis, Chlysodeixis includens* (=*Pseudoplusia includens*), *Spodoptera cosmioides, Spodoptera eridania, Spodoptera frugiperda*, and combinations thereof.

In still another aspect, the present invention relates to a method for controlling pests, which method comprises the application of a pesticidally effective amount of the carboxamide compound ii) of formula (Ia) to a soybean plant, the plant propagation material thereof, or its locus of growth; the pests or their food supply, habitat or breeding grounds, wherein the pests are selected from the group consisting of *Anticarsia gemmatalis, Chrysodeixis includens (=Pseudoplusia includens), Spodoptera cosmioides, Spodoptera eridania, Spodoptera frugiperda*, and combinations thereof.

In still another aspect, the present invention relates to a method for controlling pests, which method comprises the application of a pesticidally effective amount of a mixture comprising the carboxamide compounds i) and ii) to a soybean plant, the plant propagation material thereof, or its locus of growth; the pests or their food supply, habitat or breeding grounds, wherein the pests are selected from the group consisting of *Anticarsia gemmatalis, Chrysodeixis includens (=Pseudoplusia includens), Spodoptera cosmioides, Spodoptera eridania, Spodoptera frugiperda*, and combinations thereof.

In a preferred embodiment of the above use or method comprising the application of the carboxamide compound i) of formula (I) the pests are selected from the group consisting of *Anticarsia gemmatalis, Chrysodeixis includens (=Pseudoplusia includens), Spodoptera cosmioides, Spodoptera frugiperda*, and combinations thereof.

For example, the use or method comprising the application of the carboxamide compound I, preferably compound i) of formula (I) may be preferred for pests, which are selected from the group consisting of *Anticarsia gemmatalis, Chlysodeixis includens (=Pseudoplusia includens)*, and a combination thereof.

In another preferred embodiment, the pests are *Anticarsia gemmatalis*.

In another preferred embodiment, the pests are *Chrysodeixis includens (=Pseudoplusia includens)*.

In another preferred embodiment, the pests are *Spodoptera frugiperda*.

In another preferred embodiment, the pests are *Spodoptera eridania*.

In another preferred embodiment, the pests are *Spodoptera cosmioides*.

In another embodiment of the above use or method comprising the application of the carboxamide compound ii) of formula (Ia) or of a mixture comprising the carboxamide compounds i) and ii), the pests are selected from the group consisting of *Anticarsia gemmatalis, Chrysodeixis includens (=Pseudoplusia includens), Spodoptera cosmioides, Spodoptera frugiperda*, and combinations thereof.

As outlined above, the above mentioned pests are of particular relevance in connection with soybean plants.

In one preferred embodiment of the above use or method comprising the application of the carboxamide compound i) of formula (I), the soybean plant is a soybean plant, which has been modified by conventional breeding, i.e. a soybean plant, which has not been modified by mutagenesis or genetic engineering.

In another embodiment of the above use or method comprising the application of the carboxamide compound compound ii) of formula (Ia) or of a mixture comprising the carboxamide compounds i) and ii), the soybean plant is a soybean plant, which has been modified by conventional breeding, i.e. a soybean plant, which has not been modified by mutagenesis or genetic engineering.

In another embodiment of the above use or method comprising the application of the carboxamide compound i) of formula (I), the soybean plant is a soybean plant, which has been modified by mutagenesis or genetic engineering.

In another embodiment of the above use or method comprising the application of the carboxamide compound ii) of formula (Ia) or of a mixture comprising the carboxamide compounds i) and ii), the soybean plant is a soybean plant, which has been modified by mutagenesis or genetic engineering.

Preferred soybean plants, which have been modified by mutagenesis or genetic engineering, have been defined above.

Preferably, the soybean plant has been modified by genetic engineering and exhibits insect resistance, in particular lepidopteran resistance, wherein insect resistance is provided by one or more genes selected from the group consisting of cry1Ac, cry1F, cry1A.105, cry2Ab2, and combinations thereof, preferably by cry1Ac, cry1F, or a combination thereof, and more preferably by cry1Ac. Optionally, the soybean plant exhibits at least one further trait, preferably herbicide tolerance, e.g. glyphosate tolerance or glufosinate tolerance, wherein herbicide tolerance is preferably provided by one or more genes selected from the group consisting of pat, bar, 2mepsps, cp4 epsps, and mepsps.

Particularly preferred soybean plants include soybean plants, which are selected from the soybean plants A-325 to A-355, B-1 to B-4, or C-1 to C-84 as defined above.

In view of the above preferences regarding pests and plants, the following embodiments of the use or method of the invention comprising the application of the carboxamide compound I, preferably compound i) of formula (I) are particularly preferred.

In a preferred embodiment of the invention, the present invention relates to a use or method as defined above, wherein the pests are selected from the group consisting of *Anticarsia gemmatalis, Chrysodeixis includens (=Pseudoplusia includens), Spodoptera frugiperda, Spodoptera eridania, Spodoptera cosmioides*, and combinations thereof, and the plant is a soybean plant, which has been modified by mutagenesis or genetic engineering, and is preferably selected from the soybean plants A-325 to A-355, B-1 to B-4, or C-1 to C-84.

In one particularly preferred embodiment, the pests are *Anticarsia gemmatalis* and the plant is a soybean plant selected from the soybean plants A-325 to A-355, B-1 to B-4, or C-1 to C-84.

In one particularly preferred embodiment, the pests are *Chrysodeixis includens (=Pseudoplusia includens)* and the plant is a soybean plant selected from the soybean plants A325 to A-355, B-1 to B-4, or C-1 to C-84.

In one particularly preferred embodiment, the pests are *Spodoptera frugiperda* and the plant is a soybean plant selected from the soybean plants A-325 to A-355, B-1 to B-4, or C-1 to C-84.

In one particularly preferred embodiment, the pests are *Spodoptera eridania* and the plant is a soybean plant selected from the soybean plants A-325 to A-355, B-1 to B-4, or C-1 to C-84.

In one particularly preferred embodiment, the pests are *Spodoptera cosmioides* and the plant is a soybean plant selected from the soybean plants A-325 to A-355, B-1 to B-4, or C-1 to C-84.

Mixtures

The remarks as to preferred embodiments of the carboxamide compound I, preferably compound i) of formula (I) are to be understood as preferred on their own as well as in combination with other pesticidal active ingredients and also in combination with the preferred embodiments regarding uses and methods comprising the application of the carboxamide compound I, preferably compound i) of formula (I) as defined herein, and in combination with preferred embodiments regarding the agrochemical composition as defined herein.

In one embodiment, the mixture of the invention is a binary mixture, i.e. a mixture, which does not comprise any further pesticidal compounds apart from the carboxamide compound i) of formula (I) and one other pesticidal active ingredient.

In another embodiment, the mixture of the invention is a binary mixture, i.e. a mixture, which does not comprise any further pesticidal compounds apart from the carboxamide compound ii) of formula (Ia) and one other pesticidal active ingredient.

In one embodiment, the mixture of the invention is a mixture, which does not comprise any further pesticidal compounds apart from the mixture comprising the carboxamide compounds i) and ii) and one other pesticidal active ingredient.

In another embodiment, the mixture of the present invention comprises a ternary mixture comprising the carboxamide compound i) of formula (I), a second pesticidal compound as component II and a third pesticidal compound as component III, wherein the pesticidal compounds II and III are both an insecticide or both a fungicide or one an insecticide and the other a fungicide.

In another embodiment, the mixture of the present invention comprises a ternary mixture comprising the carboxamide compound ii) of formula (Ia), a second pesticidal compound as component II and a third pesticidal compound as component III, wherein the pesticidal compounds II and III are both an insecticide or both a fungicide or one an insecticide and the other a fungicide.

In still another embodiment, the mixture of the present invention comprises a mixture comprising the carboxamides compounds i) and ii), another pesticidal compound as component II and still another pesticidal compound as component III, wherein the pesticidal compounds II and III are both an insecticide or both a fungicide or one an insecticide and the other a fungicide. In a further embodiment, the mixture of the present invention comprises a multinary mixture of the carboxamide compound i) of formula (I) and three or four or more other pesticidal compounds as components II, III, IV or V etc., wherein these further pesticidal compounds are insecticides and/or fungicides.

In a further embodiment, the mixture of the present invention comprises a multinary mixture of the carboxamide compound ii) of formula (Ia) and three or four or more other pesticidal compounds as components II, III, IV or V etc., wherein these further pesticidal compounds are insecticides and/or fungicides.

In a further embodiment, the mixture of the present invention comprises a multinary mixture of the carboxamide compounds i), ii) and three or four or more other pesticidal compounds as components II, III, IV or V etc., wherein these further pesticidal compounds are insecticides and/or fungicides.

The present invention also relates to an agrochemical composition, which comprises a mixture according to the present invention and an auxiliary.

Suitable formulations and auxiliaries are defined further below.

Mixing partners can be selected from pesticides, in particular insecticides, nematicides, and acaricides, fungicides, herbicides, plant growth regulators, fertilizers, and the like.

Preferred mixing partners are insecticides, nematicides and fungicides.

The following list M of pesticides, grouped and numbered according the Mode of Action Classification of the Insecticide Resistance Action Committee (IRAC), together with which the carboxamide compound i) of formula (I) can be used for the methods of the present invention, and with which potential synergistic effects might be produced between the combination of the active ingredients or with the active ingredients and the cultivated plants, is intended to illustrate the possible combinations, but not to impose any limitation:

M.1 Acetylcholine esterase (AChE) inhibitors from the class of: M.1A carbamates, for example aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb and triazamate; or from the class of M.1B organophosphates, for example acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon and vamidothion;

M.2. GABA-gated chloride channel antagonists such as: M.2A cyclodiene organochlorine compounds, as for example endosulfan or chlordane; or M.2B fiproles (phenylpyrazoles), as for example ethiprole, fipronil, flufiprole, pyrafluprole and pyriprole;

M.3 Sodium channel modulators from the class of M.3A pyrethroids, for example acrinathrin, allethrin, d-cis-trans allethrin, d-trans allethrin, bifenthrin, bioallethrin, bioallethrin S-cylclopentenyl, bioresmethrin, cycloprothrin, cyfluthrin, beta-cyfluthrin, cyhalothrin, lambdacyhalothrin, gamma-cyhalothrin, cypermethrin, alpha-cypermethrin, beta-cypermethrin, thetacypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, heptafluthrin, imiprothrin, meperfluthrin,metofluthrin, momfluorothrin, permethrin, phenothrin, prallethrin, profluthrin, pyrethrin (pyrethrum), resmethrin, silafluofen, tefluthrin, tetramethylfluthrin, tetramethrin, tralomethrin and transfluthrin; or M.3B sodium channel modulators such as DDT or methoxychlor;

M.4 Nicotinic acetylcholine receptor agonists (nAChR) from the class of M.4A neonicotinoids, for example acetamiprid, clothianidin, cycloxaprid, dinotefuran, imidacloprid, nitenpyram, thiacloprid and thiamethoxam; or the compounds M.4A.2: (2E-)-1-[(6-Chloropyridin-3-yl)methyl]-N'nitro-2-pentylidenehydrazinecarboximidamide; or M4.A.3: 1-[(6-Chloropyridin-3-yl)methyl]-7-methyl-8-nitro-5-propoxy-1,2,3,5,6,7-hexahydroimidazo[1,2-a]pyridine; or from the class M.4B nicotine;

M.5 Nicotinic acetylcholine receptor allosteric activators from the class of spinosyns, for example spinosad or spinetoram;

M.6 Chloride channel activators from the class of avermectins and milbemycins, for example abamectin, emamectin benzoate, ivermectin, lepimectin or milbemectin;

M.7 Juvenile hormone mimics, such as M.7A juvenile hormone analogues as hydroprene, kinoprene and methoprene; or others as M.7B fenoxycarb or M.7C pyriproxyfen;

M.8 miscellaneous non-specific (multi-site) inhibitors, for example M.8A alkyl halides as methyl bromide and other alkyl halides, or M.8B chloropicrin, or M.8C sulfuryl fluoride, or M.8D borax, or M.8E tartar emetic;

M.9 Selective homopteran feeding blockers, for example M.9B pymetrozine, or M.9C flonicamid;

M.10 Mite growth inhibitors, for example M.10A clofentezine, hexythiazox and diflovidazin, or M.10B etoxazole;

M.11 Microbial disruptors of insect midgut membranes, for example *Bacillus thuringiensis* or *Bacillus sphaericus* and the insecticdal proteins they produce such as *Bacillus thuringiensis* subsp. *israelensis, Bacillus sphaericus, Bacillus thuringiensis* subsp. *aizawai, Bacillus thuringiensis* subsp. *kurstaki* and *Bacillus thuringiensis* subsp. *tenebrionis*, or the Bt crop proteins: Cry1Ab, Cry1Ac, Cry1Fa, Cry2Ab, mCry3A, Cry3Ab, Cry3Bb and Cry34/35Ab1;

M.12 Inhibitors of mitochondrial ATP synthase, for example M.12A diafenthiuron, or M.12B organotin miticides such as azocyclotin, cyhexatin or fenbutatin oxide, or M.12C propargite, or M.12D tetradifon;

M.13 Uncouplers of oxidative phosphorylation via disruption of the proton gradient, for example chlorfenapyr, DNOC or sulfluramid;

M.14 Nicotinic acetylcholine receptor (nAChR) channel blockers, for example nereistoxin analogues as bensultap, cartap hydrochloride, thiocyclam or thiosultap sodium;

M.15 Inhibitors of the chitin biosynthesis type 0, such as benzoylureas as for example bistrifluron, chlorfluazuron, diflubenzuron, flucycloxuron, flufenoxuron, hexaflumuron, lufenuron, novaluron, noviflumuron, teflubenzuron, or triflumuron;

M.16 Inhibitors of the chitin biosynthesis type 1, as for example buprofezin;

M.17 Moulting disruptors, Dipteran, as for example cyromazine;

M.18 Ecdyson receptor agonists such as diacylhydrazines, for example methoxyfenozide, tebufenozide, halofenozide, fufenozide or chromafenozide;

M.19 Octopamin receptor agonists, as for example amitraz;

M.20 Mitochondrial complex III electron transport inhibitors, for example M.20A hydramethylnon, or M.20B acequinocyl, or M.20C fluacrypyrim;

M.21 Mitochondrial complex I electron transport inhibitors, for example M.21A METI acaricides and insecticides such as fenazaquin, fenpyroximate, pyrimidifen, pyridaben, tebufenpyrad or tolfenpyrad, or M.21B rotenone;

M.22 Voltage-dependent sodium channel blockers, for example M.22A indoxacarb, or M.22B metaflumizone, or M.22B.1: 2-[2-(4-Cyanophenyl)-1-[3-(trifluoromethyl)phenyl],ethylidene]-N-[4-(difluoromethoxy)phenyl]-hydrazinecarboxamide or M.22B.2: N-(3-Chloro-2-methylphenyl)-2-[(4-chloro-phenyl)[4-[methyl(methylsulfonyl)amino] phenyl],methylene]-hydrazinecarboxamide;

M.23 Inhibitors of the of acetyl CoA carboxylase, such as Tetronic and Tetramic acid derivatives, for example spirodiclofen, spiromesifen or spirotetramat;

M.24 Mitochondrial complex IV electron transport inhibitors, for example M.24A phosphine such as aluminium phosphide, calcium phosphide, phosphine or zinc phosphide, or M.24B cyanide;

M.25 Mitochondrial complex II electron transport inhibitors, such as beta-ketonitrile derivatives, for example cyenopyrafen or cyflumetofen;

M.28 Ryanodine receptor-modulators from the class of diamides, as for example flubendiamide, chlorantraniliprole (Rynaxypyr®), cyantraniliprole (Cyazypyr®), tetraniliprole, or the phthalamide compounds M.28.1: (R)-3-Chlor-N1-{2-methyl-4-[1,2,2,2-tetrafluor-1-(trifluormethyl)ethyl]phenyl}-N2-(1-methyl-2-methylsulfonylethyl)phthalamid and M.28.2: (S)-3-Chlor-N1-{2-methyl-4-[1,2,2,2-tetrafluor-1-(trifluormethyl)ethyl]phenyl}-N2-(1-methyl-2-methylsulfonylethyl)phthalamid, or the compound M.28.3: 3-bromo-N-{2-bromo-4-chloro-6-[(1-cyclopropylethyl)carbamoyl] phenyl}-1-(3-chlorpyridin-2-yl)-1H-pyrazole-5-carboxamide (proposed ISO name: cyclaniliprole), or the compound M.28.4: methyl-2-[3,5-dibromo-2-({[3-bromo-1-(3-chlorpyridin-2-yl)-1H-pyrazol-5-yl]carbonyl}amino) benzoyl]-1,2-dimethylhydrazinecarboxylate; or a compound selected from M.28.5a) to M.28.5d) and M.28.5h) to M.28.5l): M.28.5a) N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; M.28.5b) N-[4-chloro-2-[(diethyl-lambda-4-sulfanylidene)carbamoyl]-6-methyl-phenyl]-2-(3-chloro-2-pyridyl)-5-(trifluoromethyl) pyrazole-3-carboxamide; M.28.5c) N-[4-chloro-2-[(di-2-propyl-lambda-4-sulfanylidene)carbamoyl]-6-methyl-phenyl]-2-(3-chloro-2-pyridyl)-5-(trifluoromethyl) pyrazole-3-carboxamide; M.28.5d) N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; M.28.5h) N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide; M.28.5i) N-[2-(5-Amino-1,3,4-thiadiazol-2-yl)-4-chloro-6-methylphenyl]-3-bromo-1-(3-chloro-2-pyridinyl)-1H-pyrazole-5-carboxamide; M.28.5j) 3-Chloro-1-(3-chloro-2-pyridinyl)-N-[2,4-dichloro-6-[[(1-cyano-1-methylethyl) amino]carbonyl]phenyl]-1H-pyrazole-5-carboxamide; M.28.5k) 3-Bromo-N-[2,4-dichloro-6-(methylcarbamoyl) phenyl]-1-(3,5-dichloro-2-pyridyl)-1H-pyrazole-5-carboxamide; M.28.5l) N-[4-Chloro-2-[[(1,1-dimethylethyl) amino]carbonyl]-6-methylphenyl]-1-(3-chloro-2-pyridinyl)-3-(fluoromethoxy)-1H-pyrazole-5-carboxamide;

or M.28.6: cyhalodiamide; or

M.29: insecticidal active compounds of unknown or uncertain mode of action, as for example afidopyropen, afoxolaner, azadirachtin, amidoflumet, benzoximate, bifenazate, bromopropylate, chinomethionat, cryolite, dicloromezotiaz, dicofol, flufenerim, flometoquin, fluensulfone, fluhexafon, fluopyram, flupyradifurone, fluralaner, metoxadiazone, piperonyl butoxide, pyflubumide, pyridalyl, pyrifluquinazon, sulfoxaflor, tioxazafen, triflumezopyrim, or the compounds M.29.3: 11-(4-chloro-2,6-dimethylphenyl)-12-hydroxy-1, 4-dioxa-9-azadispiro[4.2.4.2]-tetradec-11-en-10-one, or the compound M.29.4: 3-(4'-fluoro-2,4-dimethylbiphenyl-3-yl)-4-hydroxy-8-oxa-1-azaspiro[4.5]dec-3-en-2-one, or the compound M.29.5: 1-[2-fluoro-4-methyl-5-[(2,2,2-trifluoroethyl) sulfinyl]phenyl]-3-(trifluoromethyl)-1H-1,2,4-triazole-5-amine, or actives on basis of *Bacillus firmus* (Votivo, 1-1582); or a compound selected from the group of M.29.6, wherein the compound is selected from M.29.6a) to M.29.6k): M.29.6a) (E/Z)-N-[1-[(6-chloro-3-pyridyl)methyl]-2-pyridylidene]-2,2,2-trifluoro-acetamide; M.29.6b) (E/Z)-N-[1-[(6-chloro-5-fluoro-3-pyridyl)methyl]-2-pyridylidene]-2,2,2-trifluoro-acetamide; M.29.6c) (E/Z)-2,2,2-trifluoro-N-[1-[(6-fluoro-3-pyridyl)methyl]-2-pyridylidene]acetamide; M.29.6d) (E/Z)-N-[1-[(6-bromo-3-pyridyl)methyl]-2-pyridylidene]-2,2,2-trifluoro-acetamide; M.29.6e) (E/Z)-N-[1-[1-(6-chloro-3-pyridyl)ethyl]-2-pyridylidene]-2,2,2-trifluoro-acetamide; M.29.6f) (E/Z)-N-[1-[(6-chloro-3-pyridyl)methyl]-2-pyridylidene]-2,2-difluoroacetamide; M.29.6g) (E/Z)-2-chloro-N-[1-[(6-chloro-3-pyridyl)methyl]-2-pyridylidene]-2,2-difluoroacetamide; M.29.6h) (E/Z)-N-[1-[(2-chloropyrimidin-5-yl)methyl]-2-pyridylidene]-2,2,2-trifluoro-acetamide; M.29.6i) (E/Z)-N-[1-[(6-chloro-3-pyridyl)methyl]-2-pyridylidene]-2,2,3,3,3-pentafluoropropanamide.); M.29.6j) N-[1-[(6-chloro-3-pyridyl)methyl]-2-pyridylidene]-2,2,2-trifluoro-thioacetamide; or M.29.6k) N-[1-[(6-chloro-3-pyridyl)methyl]-2-pyridylidene]-2,2,2-trifluoro-N'-isopropyl-acetamidine; or the compounds M.29.8: fluazaindolizine; or the compounds M.29.9.a): 4-[5-(3,5-dichlorophenyl)-5-(trifluoromethyl)-4H-isoxazol-3-yl]-2-methyl-N-(1-oxothietan-3-yl)benz-amide; or M.29.9.b): fluxametamide; or M.29.10: 5-[3-[2,6-dichloro-4-(3,3-dichloroallyloxy)phenoxy]propoxy]-1H-pyrazole; or a compound selected from the group of M.29.11, wherein the compound is selected from M.29.11b) to M.29.11p): M.29.11.b) 3-(benzoylmethylamino)-N-[2-bromo-4-[1,2,2,3,3,3-hexafluoro-1-(trifluoromethyl)propyl]-6-(trifluoromethyl)phenyl]-2-fluoro-benzamide; M.29.11.c) 3-(benzoylmethylamino)-2-fluoro-N-[2-iodo-4-[1,2,2,2-tetrafluoro-1-(trifluoromethyl)ethyl]-6-(trifluoromethyl)phenyl]-benzamide; M.29.11.d) N-[3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide; M.29.11.e) N-[3-[[[2-bromo-4-[1,2,2,2-tetrafluoro-1-(trifluoromethyl)ethyl]-6-(trifluoromethyl)phenyl]amino]carbonyl]-2-fluorophenyl]-4-fluoro-N-methyl-benzamide; M.29.11.f) 4-fluoro-N-[2-fluoro-3-[[[2-iodo-4-[1,2,2,2-tetrafluoro-1-(trifluoromethyl),ethyl]-6-(trifluoromethyl)phenyl]amino]carbonyl]phenyl]-N-methyl-benzamide; M.29.11.g) 3-fluoro-N-[2-fluoro-3-[[[2-iodo-4-[1,2,2,2-tetrafluoro-1-(trifluoromethyl),ethyl]-6-(trifluoromethyl)phenyl]amino]carbonyl]phenyl]-N-methyl-benzamide; M.29.11.h) 2-chloro-N-[3-[[[2-iodo-4-[1,2,2,2-tetrafluoro-1-(trifluoromethyl)ethyl]-6-(trifluoromethyl)phenyl]amino]carbonyl]phenyl]-3-pyridinecarboxamide; M.29.11.i) 4-cyano-N-[2-cyano-5-[[2,6-dibromo-4-[1,2,2,3,3,3-hexafluoro-1-(trifluoromethyl)propyl]phenyl]carbamoyl]phenyl]-2-methyl-benzamide; M.29.11.j) 4-cyano-3-[(4-cyano-2-methylbenzoyl)amino]-N-[2,6-dichloro-4-[1,2,2,3,3,3-hexafluoro-1-(trifluoromethyl)-propyl]phenyl]-2-fluoro-benzamide; M.29.11.k) N-[5-[[2-chloro-6-cyano-4-[1,2,2,3,3,3-hexafluoro-1-(trifluoromethyl)propyl]phenyl]carbamoyl]-2-cyano-phenyl]-4-cyano-2-methyl-benzamide; M.29.11.l) N-[5-[[2-bromo-6-chloro-4-[2,2,2-trifluoro-1-hydroxy-1-(trifluoromethyl)ethyl]phenyl]carbamoyl]-2-cyano-phenyl]-4-cyano-2-methyl-benzamide; M.29.11.m) N-[5-[[2-bromo-6-chloro-4-[1,2,2,3,3,3-hexafluoro-1-(trifluoromethyl)propyl]phenyl]carbamoyl]-2-cyano-phenyl]-4-cyano-2-methyl-benzamide; M.29.11.n) 4-cyano-N-[2-cyano-5-[[2,6-dichloro-4-[1,2,2,3,3,3-hexafluoro-1-(trifluoromethyl)propyl]phenyl]carbamoyl]phenyl]-2-methyl-benzamide; M.29.11.o) 4-cyano-N-[2-cyano-5-[[2,6-dichloro-4-[1,2,2,2-tetrafluoro-1-(trifluoromethyl)ethyl]phenyl]carbamoyl], phenyl]-2-methyl-benzamide; M.29.11.p) N-[5-[[2-bromo-6-chloro-4-[1,2,2,2-tetrafluoro-1-(trifluoromethyl)ethyl] phenyl]carbamoyl]-2-cyano-phenyl]-4-cyano-2-methyl-benzamide; or a compound selected from the group of M.29.12, wherein the compound is selected from M.29.12a) to M.29.12m): M.29.12.a) 2-(1,3-Dioxan-2-yl)-6-[2-(3-pyridinyl)-5-thiazolyl]-pyridine; M.29.12.b) 2-[6-[2-(5-Fluoro-3-pyridinyl)-5-thiazolyl]-2-pyridinyl]-pyrimidine; M.29.12.c) 2-[6-[2-(3-Pyridinyl)-5-thiazolyl]-2-pyridinyl]-pyrimidine; M.29.12.d) N-Methylsulfonyl-6-[2-(3-pyridyl)thiazol-5-yl]pyridine-2-carboxamide; M.29.12.e) N-Methylsulfonyl-6-[2-(3-pyridyl)thiazol-5-yl]pyridine-2-carboxamide; M.29.12.f) N-Ethyl-N-[4-methyl-2-(3-pyridyl)thiazol-5-yl]-3-methyl-thiopropanamide; M.29.12.g) N-Methyl-N-[4-methyl-2-(3-pyridyl)thiazol-5-yl]-3-methylthiopropanamide; M.29.12.h) N,2-Dimethyl-N-[4-methyl-2-(3-pyridyl)thiazol-5-yl]-3-methylthiopropanamide; M.29.12.i) N-Ethyl-2-methyl-N-[4-methyl-2-(3-pyridyl)thiazol-5-yl]-3-methylthiopropanamide; M.29.12.j) N-[4-Chloro-2-(3-pyridyl)thiazol-5-yl]-N-ethyl-2-methyl-3-methylthiopropanamide; M.29.12.k) N-[4-Chloro-2-(3-pyridyl)thiazol-5-yl]-N,2-dimethyl-3-methylthiopropanamide; M.29.12.l) N-[4-Chloro-2-(3-pyridyl)thiazol-5-yl]-N-methyl-3-methylthiopropanamide; M.29.12.m) N-[4-Chloro-2-(3-pyridyl)thiazol-5-yl]-N-ethyl-3-methylthiopropanamide; or the compounds M.29.14a) 1-[(6-Chloro-3-pyridinyl)methyl]-1,2,3,5,6,7-hexahydro-5-methoxy-7-methyl-8-nitroimidazo[1,2-a]pyridine; or M.29.14b) 1-[(6-Chloropyridin-3-yl)methyl]-7-methyl-8-nitro-1,2,3,5,6,7-hexahydroimidazo[1,2-a] pyridin-5-ol; or the compounds M.29.16a) 1-isopropyl-N,5-dimethyl-N-pyridazin-4-yl-pyrazole-4-carboxamide; or M.29.16b) 1-(1,2-dimethylpropyl)-N-ethyl-5-methyl-N-pyridazin-4-yl-pyrazole-4-carboxamide; M.29.16c) N,5-dimethyl-N-pyridazin-4-yl-1-(2,2,2-trifluoro-1-methyl-ethyl)pyrazole-4-carboxamide; M.29.16d) 1-[1-(1-cyanocyclopropyl)ethyl]-N-ethyl-5-methyl-N-pyridazin-4-yl-pyrazole-4-carboxamide; M.29.16e) N-ethyl-1-(2-fluoro-1-methyl-propyl)-5-methyl-N-pyridazin-4-yl-pyrazole-4-carboxamide; M.29.16f) 1-(1,2-dimethylpropyl)-N,5-dimethyl-N-pyridazin-4-yl-pyrazole-4-carboxamide; M.29.16g) 1-[1-(1-cyanocyclopropyl)ethyl]-N,5-dimethyl-N-pyridazin-4-yl-pyrazole-4-carboxamide; M.29.16h) N-methyl-1-(2-fluoro-1-methyl-propyl)-5-methyl-N-pyridazin-4-yl-pyrazole-4-carboxamide; M.29.16i) 1-(4,4-difluorocyclohexyl)-N-ethyl-5-methyl-N-pyridazin-4-yl-pyrazole-4-carboxamide; or M.29.16j) 1-(4,4-difluorocyclohexyl)-N,5-dimethyl-N-pyridazin-4-yl-pyrazole-4-carboxamide, or M.29.17 a compound selected from the compounds M.29.17a) to M.29.17j): M.29.17a) N-(1-methylethyl)-2-(3-pyridinyl)-2H-indazole-4-carboxamide; M.29.17b) N-cyclopropyl-2-(3-pyridinyl)-2H-indazole-4-carboxamide; M.29.17c) N-cyclohexyl-2-(3-pyridinyl)-2H-indazole-4-carboxamide; M.29.17d) 2-(3-pyridinyl)-N-(2,2,2-trifluoroethyl)-2H-indazole-4-carboxamide; M.29.17e) 2-(3-pyridinyl)-N-[(tetrahydro-2-furanyl)methyl]-2H-indazole-5-carboxamide; M.29.17f) methyl 2-[[2-(3-pyridinyl)-2H-indazol-5-yl]carbonyl]hydrazinecarboxylate; M.29.17g) N-[(2,2-difluorocyclopropyl)methyl]-2-(3-pyridinyl)-2H-indazole-5-carboxamide; M.29.17h) N-(2,2-difluoropropyl)-2-(3-pyridinyl)-2H-indazole-5-carboxamide; M.29.17i) 2-(3-pyridinyl)-N-(2-pyrimidinylmethyl)-2H-indazole-5-carboxamide; M.29.17j) N-[(5-methyl-2-pyrazinyl)methyl]-2-(3-pyridinyl)-2H-indazole-5-carboxamide, or M.29.18 a compound selected from the compounds M.29.18a) to M.29.18d): M.29.18a) N-[3-chloro-1-(3-pyridyl)pyrazol-4-yl]-N-ethyl-3-(3,3,3-trifluoropropylsulfanyl)propanamide; M.29.18b) N-[3-chloro-1-(3-pyridyl)pyrazol-4-yl]-N-ethyl-3-(3,3,3-trifluoropropylsulfinyl) propanamide; M.29.18c) N-[3-chloro-1-(3-pyridyl)pyrazol-4-yl]-3-[(2,2-difluorocyclopropyl)methylsulfanyl]-N-ethyl-propanamide; M.29.18d) N-[3-chloro-1-(3-pyridyl)pyrazol-4-yl]-3-[(2,2-difluorocyclopropyl)methylsulfinyl]-N-ethyl-propanamide; or the compound M.29.19 sarolaner, or the compound M.29.20 lotilaner.

The commercially available compounds of the group M listed above may be found in The Pesticide Manual, 16th Edition, C. MacBean, British Crop Protection Council (2013) among other publications. The online Pesticide Manual is updated regularly and is accessible through http://bcpcdata.com/pesticide-manual.html.

Another online data base for pesticides providing the ISO common names is http://www.alanwood.net/pesticides.

The M.4 neonicotinoid cycloxaprid is known from WO2010/069266 and WO2011/069456, the neonicotinoid M.4A.2, sometimes also to be named as guadipyr, is known from WO2013/003977, and the neonicotinoid M.4A.3 (approved as paichongding in China) is known from WO2007/101369. The metaflumizone analogue M.22B.1 is described in CN10171577 and the analogue M.22B.2 in CN102126994. The phthalamides M.28.1 and M.28.2 are both known from WO2007/101540. The anthranilamide M.28.3 is described in WO2005/077934. The hydrazide compound M.28.4 is described in WO2007/043677. The anthranilamides M.28.5a) to M.28.5d) and M.28.5h) are described in WO 2007/006670, WO2013/024009 and WO2013/024010, the anthranilamide M.28.5i) is described in WO2011/085575, M.28.5j) in WO2008/134969, M.28.5k) in US2011/046186 and M.28.5l) in WO2012/034403. The diamide compound M.28.6 can be found in W2012/034472. The spiroketal-substituted cyclic ketoenol derivative M.29.3 is known from WO2006/089633 and the biphenyl-substituted spirocyclic ketoenol derivative M.29.4 from WO2008/067911. The triazoylphenylsulfide M.29.5 is described in WO2006/043635, and biological control agents on the basis of *Bacillus firmus* are described in WO2009/124707. The compounds M.29.6a) to M.29.6i) listed under M.29.6 are described in WO2012/029672, and M.29.6j) and M.29.6k) in WO2013/129688. The nematicide M.29.8 is known from WO2013/055584. The isoxazoline M.29.9.a) is described in WO2013/050317. The isoxazoline M.29.9.b) is described in WO2014/126208. The pyridalyl-type analogue M.29.10 is known from WO2010/060379. The carboxamides M.29.11.b) to M.29.11.h) are described in WO2010/018714, and the carboxamides M.29.11i) to M.29.11.p) in WO2010/127926. The pyridylthiazoles M.29.12.a) to M.29.12.c) are known from WO2010/006713, M.29.12.d) and M.29.12.e) are known from WO2012/000896, and M.29.12.f) to M.29.12.m) from WO2010/129497. The compounds M.29.14a) and M.29.14b) are known from WO2007/101369. The pyrazoles M.29.16.a) to M.29.16h) are described in WO2010/034737, WO2012/084670, and WO2012/143317, respectively, and the pyrazoles M.29.16i) and M.29.16j) are described in U.S. 61/891,437. The pyridinylindazoles M.29.17a) to M.29.17.j) are described in WO2015/038503. The pyridylpyrazoles M.29.18a) to M.29.18d) are described in US2014/0213448. The isoxazoline M.29.19 is described in WO2014/036056. The isoxazoline M.29.20 is known from WO2014/090918.

In another embodiment of the invention, the carboxamide compound ii) of formula (Ia) and the pesticides of the above list M can be used together for the methods of the present invention.

In still another embodiment of the invention, the mixture comprising the carboxamide compounds i) and ii) and the pesticides of the above list M can be used together for the methods of the present invention.

The following list of fungicides, in conjunction with which the the carboxamide compound compound i) of formula (I) can be used, is intended to illustrate the possible combinations but does not limit them:

A) Respiration inhibitors

Inhibitors of complex III at Qo site (e. g. strobilurins): azoxystrobin (A.1.1), coumeth, oxystrobin (A.1.2), coumoxystrobin (A.1.3), dimoxystrobin (A.1.4), enestroburin (A.1.5), fenaminstrobin (A.1.6), fenoxy¬strobin/flufenoxystrobin (A.1.7), fluoxastro¬bin (A.1.8), kresoxim-methyl (A.1.9), mandestrobin (A.1.10), meto¬minostrobin (A.1.11), orysastrobin (A.1.12), picoxy¬strobin (A.1.13), pyraclostrobin (A.1.14), pyrametostrobin (A.1.15), pyraoxystrobin (A.1.16), tri-floxystrobin (A.1.17), 2 (2-(3-(2, 6-di¬chlorophenyl)-1-methyl-allylidene¬aminooxy¬methyl)-phenyl)-2-methoxyimino-N methyl-acetamide (A.1.18), pyribencarb (A.1.19), triclopyricarb/chlorodin¬carb (A.1.20), famoxadone (A.1.21), fenamidone (A.1.21), methyl-N-[2-[(1,4-dimethyl-5-phenyl-pyrazol-3-yl)oxylmethyl]phenyl]-N-methoxy-carbamate (A.1.22), 1-[3-chloro-2-[[1-(4-chlorophenyl)-1H-pyrazol-3-yl]oxymethyl]phenyl]-4-methyl-tetrazol-5-one (A.1.23), 1-[3-bromo-2-[[1-(4-chlorophenyl)pyrazol-3-yl]oxymethyl]phenyl]-4-methyltetrazol-5-one (A.1.24), 1-[2-[[1-(4-chlorophenyl)pyrazol-3-yl]oxymethyl]-3-methyl-phenyl]-4-methyl-tetrazol-5-one (A.1.25), 1-[2-[[1-(4-chlorophenyl)pyrazol-3-yl]oxymethyl]-3-fluoro-phenyl]-4-methyl-tetrazol-5-one (A.1.26), 1-[2-[[1-(2,4-dichlorophenyl)pyrazol-3-yl]oxymethyl]-3-fluoro-phenyl]-4-methyl-tetrazol-5-one (A.1.27), 1-[2-[[4-(4-chlorophenyl)thiazol-2-yl]oxymethyl]-3-methyl-phenyl]-4-methyl-tetrazol-5-one (A.1.28), 1-[3-chloro-2-[[4-(p-tolyl)thiazol-2-yl]-oxymethyl] phenyl]-4-methyl-tetrazol-5-one (A.1.29), 1-[3-cyclopropyl-2-[[2-methyl-4-(1-methylpyrazol-3-yl)phenoxy]methyl]phenyl]-4-methyl-tetrazol-5-one (A.1.30), 1-[3-(difluoromethoxy)-2-[[2-methyl-4-(1-methylpyrazol-3-yl)phenoxy]methyl]phenyl]-4-methyltetrazol-5-one (A.1.31), 1-methyl-4-[3-methyl-2-[[2-methyl-4-(1-methylpyrazol-3-yl)phenoxy]methyl] phenyl]tetrazol-5-one (A.1.32), 1-methyl-4-[3-methyl-2-[[1-[3-(trifluoromethyl)phenyl]-ethylideneamino] oxymethyl]phenyl]tetrazol-5-one (A.1.33), (Z,2E)-5-[1-(2,4-dichlorophenyl)pyrazol-3-yl]-oxy-2-methoxyimino-N,3-dimethyl-pent-3-enamide (A.1.34), (Z,2E)-5-[1-(4-chlorophenyl)pyrazol-3-yl]oxy-2-methoxyimino-N,3-dimethyl-pent-3-enamide (A.1.35), pyriminostrobin (A.1.36), bifujunzhi (A.1.37), 2-(ortho-((2,5-dimethylphenyl-oxymethylen)phenyl)-3-methoxy-acrylic acid methylester (A.1.38);

inhibitors of complex III at Qi site: cyazofamid (A.2.1), amisulbrom (A.2.2) [(6S,7R,8R)-8-benzyl-3-[(3-hydroxy-4-methoxy-pyridine-2-carbonyl)amino]-6-methyl-4,9-dioxo-1,5-dioxonan-7-yl] 2-methylpropanoate (A.2.3), [2-[[(7R,8R,9S)-7-benzyl-9-methyl-8-(2-methylpropanoyloxy)-2,6-dioxo-1,5-dioxonan-3-yl] carbamoyl]-4-methoxy-3-pyridyl]oxymethyl 2-methylpropanoate (A.2.4), [(6S,7R,8R)-8-benzyl-3-[[4-methoxy-3-(propanoyloxymethoxy)pyridine-2-carbonyl]amino]-6-methyl-4,9-dioxo-1,5-dioxonan-7-yl] 2-methylpropanoate (A.2.5);

inhibitors of complex II: benodanil (A.3.1), benzovindiflupyr (A.3.2), bixafen (A.3.3), boscalid (A.3.4), carboxin (A.3.5), fenfuram (A.3.6), fluopyram (A.3.7), flutolanil (A.3.8), fluxapyroxad (A.3.9), furametpyr (A.3.10), isofetamid (A.3.11), isopyrazam (A.3.12), mepronil (A.3.13), oxycarboxin (A.3.14), penflufen (A.3.15), penthiopyrad (A.3.16), sedaxane (A.3.19), tecloftalam (A.3.20), thifluzamide (A.3.21), 3-(difluoromethyl)-1-methyl-N-(1,1,3-trimethylindan-4-yl)pyrazole-4-carboxamide (A.3.22), 3-(trifluoromethyl)-1-methyl-N-(1,1,3-trimethylindan-4-yl)pyrazole-4-carboxamide (A.3.23), 1,3-dimethyl-N-(1,1,3-trimethylindan-4-yl)pyrazole-4-carboxamide (A.3.24), 3-(trifluoromethyl)-1,5-dimethyl-N-(1,1,3-trimethylindan-4-yl)pyrazole-4-carboxamide (A.3.25), 1,3,5-trimethyl-N-(1,1,3-trimethylindan-4-yl)pyrazole-4-carboxamide (A.3.26), 3-(difluoromethyl)-1,5-dimethyl-N-(1,1,3-trimethylindan-4-yl)pyrazole-4-carboxamide (A.3.27), 3-(difluoromethyl)-N-(7-fluoro-1,1,3-trimethyl-indan-4-yl)-1-methyl-pyrazole-4-carboxamide (A.3.28), methyl (E)-2-[2-[[(5-cyano-2-methyl-phenoxy)methyl]phenyl]-3-methoxyprop-2-enoate (A.3.30);

other respiration inhibitors: diflumetorim (A.4.1); nitrophenyl derivates: binapacryl (A.4.2), dinobuton (A.4.3), dinocap (A.4.4), fluazinam (A.4.5), ferimzone (A.4.7); organometal compounds: fentin salts, e. g. fentin-acetate (A.4.8), fentin chloride (A.4.9) or fentin hydroxide (A.4.10); ametoctradin (A.4.11); silthiofam (A.4.12);

B) Sterol Biosynthesis Inhibitors (SBI Fungicides)

C14 demethylase inhibitors: triazoles: azaconazole (B.1.1), bitertanol (B.1.2), bromuconazole (B.1.3), cyproconazole (B.1.4), difenoconazole (B.1.5), diniconazole (B.1.6), diniconazole-M (B.1.7), epoxiconazole (B.1.8), fenbuconazole (B.1.9), fluquinconazole (B.1.10), flusilazole (B.1.11), flutriafol (B.1.12), hexaconazole (B.1.13), imibenconazole (B.1.14), ipconazole (B.1.15), metconazole (B.1.17), myclobutanil (B.1.18), oxpoconazole (B.1.19), paclobutrazole (B.1.20), penconazole (B.1.21), propiconazole (B.1.22), prothioconazole (B.1.23), simeconazole (B.1.24), tebuconazole (B.1.25), tetraconazole (B.1.26), triadimefon (B.1.27), triadimenol (B.1.28), triticonazole (B.1.29), uniconazole (B.1.30), 1-[rel-(2S,3R)-3-(2-chlorophenyl)-2-(2,4-difluorophenyl)-oxiranylmethyl]-5-thiocyanato-1H-[1,2,4]triazole (B.1.31), 2-[rel-(2S,3R)-3-(2-chlorophenyl)-2-(2,4-difluorophenyl)-oxiranylmethyl]-2H-[1,2,4]triazole-3-thiol (B.1.32), 2-[2-chloro-4-(4-chlorophenoxy)phenyl]-1-(1,2,4-triazol-1-yl)pentan-2-ol (B.1.33), 1-[4-(4-chlorophenoxy)-2-(trifluoromethyl)phenyl]-1-cyclopropyl-2-(1,2,4-triazol-1-yl)ethanol (B.1.34), 2-[4-(4-chlorophenoxy)-2-(trifluoromethyl)phenyl]-1-(1,2,4-triazol-1-yl)butan-2-ol (B.1.35), 2-[2-chloro-4-(4-chlorophenoxy)phenyl]-1-(1,2,4-triazol-1-yl)butan-2-ol (B.1.36), 2-[4-(4-chlorophenoxy)-2-(trifluoromethyl)phenyl]-3-methyl-1-(1,2,4-triazol-1-yl)butan-2-ol (B.1.37), 2-[4-(4-chlorophenoxy)-2-(trifluoromethyl)phenyl]-1-(1,2,4-triazol-1-yl)propan-2-ol (B.1.38), 2-[2-chloro-4-(4-chlorophenoxy)phenyl]-3-methyl-1-(1,2,4-triazol-1-yl)butan-2-ol (B.1.39), 2-[4-(4-chlorophenoxy)-2-(trifluoromethyl)phenyl]-1-(1,2,4-triazol-1-yl)pentan-2-ol (B.1.40), 2-[4-(4-fluorophenoxy)-2-(trifluoromethyl)phenyl]-1-(1,2,4-triazol-1-yl)propan-2-ol (B.1.41), 2-[2-chloro-4-(4-chlorophenoxy)phenyl]-1-(1,2,4-triazol-1-yl)pent-3-yn-2-ol (B.1.42), 2-(chloromethyl)-2-methyl-5-(p-tolylmethyl)-1-(1,2,4-triazol-1-ylmethyl)cyclopentanol (B.1.43); imidazoles: imazalil (B.1.44), pefurazoate (B.1.45), prochloraz (B.1.46), triflumizol (B.1.47); pyrimidines, pyridines and piperazines: fenarimol (B.1.49), pyrifenox (B.1.50), triforine (B.1.51), [3-(4-chloro-2-fluorophenyl)-5-(2,4-difluorophenyl)isoxazol-4-yl]-(3-pyridyl)methanol (B.1.52);

Delta14-reductase inhibitors: aldimorph (B.2.1), dodemorph (B.2.2), dodemorph-acetate (B.2.3), fenpropimorph (B.2.4), tridemorph (B.2.5), fenpropidin (B.2.6), piperalin (B.2.7), spiroxamine (B.2.8);

Inhibitors of 3-keto reductase: fenhexamid (B.3.1);

Other Sterol biosynthesis inhibitors: chlorphenomizole (B.4.1);

C) Nucleic Acid Synthesis Inhibitors phenylamides or acyl amino acid fungicides: benalaxyl (C.1.1), benalaxyl-M (C.1.2), kiralaxyl (C.1.3), metalaxyl (C.1.4), metalaxyl-M (C.1.5), ofurace (C.1.6), oxadixyl (C.1.7);

other nucleic acid synthesis inhibitors: hymexazole (C.2.1), octhilinone (C.2.2), oxolinic acid (C.2.3), bupirimate (C.2.4), 5-fluorocytosine (C.2.5), 5-fluoro-2-(p-tolylmethoxy)pyrimidin-4-amine (C.2.6), 5-fluoro-2-(4-fluorophenylmethoxy)pyrimidin-4-amine (C.2.7), 5-fluoro-2-(4-chlorophenylmethoxy)pyrimidin-4 amine (C.2.8);

D) Inhibitors of Cell Division and Cytoskeleton tubulin inhibitors: benomyl (D.1.1), carbendazim (D.1.2), fuberidazole (D1.3), thiabendazole (D.1.4), thiophanate-methyl(D.1.5),3-chloro-4-(2,6-difluorophenyl)-6-methyl-5-phenyl-pyridazine (D.1.6),3-chloro-6-methyl-5-phenyl-4-(2,4,6-trifluorophenyl)pyridazine (D.1.7), N-ethyl-2-[(3-ethynyl-8-methyl-6-quinolyl)oxy]butanamide (D.1.8), N-ethyl-2-[(3-ethynyl-8-methyl-6-quinolyl)oxy]-2-methylsulfanyl-acetamide (D.1.9),2-[(3-ethynyl-8-methyl-6-quinolyl)oxy]-N-(2-fluoroethyl)butanamide (D.1.10),2-[(3-ethynyl-8-methyl-6-quinolyl)oxy]-N-(2-fluoroethyl)-2-methoxyacetamide (D.1.11),2-[(3-ethynyl-8-methyl-6-quinolyl)oxy]-N-propyl-butanamide (D.1.12),2-[(3-ethynyl-8-methyl-6-quinolyl)oxy]-2-methoxy-N-propyl-acetamide (D.1.13), 2-[(3-ethynyl-8-methyl-6-quinolyl)oxy]-2-methylsulfanyl-N-propyl-acetamide (D.1.14), 2-[(3-ethynyl-8-methyl-6-quinolyl)oxy]-N-(2-fluoroethyl)-2-methylsulfanyl-acetamide (D.1.15), 4-(2-bromo-4-fluoro-phenyl)-N-(2-chloro-6-fluoro-phenyl)-2,5-dimethyl-pyrazol-3-amine (D.1.16);

other cell division inhibitors: diethofencarb (D.2.1), ethaboxam (D.2.2), pencycuron (D.2.3), fluopicolide (D.2.4), zoxamide (D.2.5), metrafenone (D.2.6), pyriofenone (D.2.7);

E) Inhibitors of Amino Acid and Protein Synthesis methionine synthesis inhibitors: cyprodinil (E.1.1), mepanipyrim (E.1.2), pyrimethanil (E.1.3);

protein synthesis inhibitors: blasticidin-S (E.2.1), kasugamycin (E.2.2), kasugamycin hydrochloride-hydrate (E.2.3), mildiomycin (E.2.4), streptomycin (E.2.5), oxytetracyclin (E.2.6);

F) Signal Transduction Inhibitors
MAP/histidine kinase inhibitors: fluoroimid (F.1.1), iprodione (F.1.2), procymidone (F.1.3), vinclozolin (F.1.4), fludioxonil (F.1.5);
G protein inhibitors: quinoxyfen (F.2.1);
G) Lipid and Membrane Synthesis Inhibitors
Phospholipid biosynthesis inhibitors: edifenphos (G.1.1), iprobenfos (G.1.2), pyrazophos (G.1.3), isoprothiolane (G.1.4);
lipid peroxidation: dicloran (G.2.1), quintozene (G.2.2), tecnazene (G.2.3), tolclofos-methyl (G.2.4), biphenyl (G.2.5), chloroneb (G.2.6), etridiazole (G.2.7);
phospholipid biosynthesis and cell wall deposition: dimethomorph (G.3.1), flumorph (G.3.2), mandipropamid (G.3.3), pyrimorph (G.3.4), benthiavalicarb (G.3.5), iprovalicarb (G.3.6), valifenalate (G.3.7);
compounds affecting cell membrane permeability and fatty acides: propamocarb (G.4.1);
inhibitors of oxysterol binding protein: oxathiapiprolin (G.5.1), 2-{3-[2-(1-{[3,5-bis(difluoromethyl-1H-pyrazol-1-yl]acetyl}piperidin-4-yl)-1,3-thiazol-4-yl]-4,5-dihydro-1,2-oxazol-5-yl}-phenyl methanesulfonate (G.5.2), 2-{3-[2-(1-{[3,5-bis(difluoromethyl)-1H-pyrazol-1-yl]-acetyl}piperidin-4-yl) 1,3-thiazol-4-yl]-4,5-dihydro-1,2-oxazol-5-yl]-3-chlorophenyl methanesulfonate (G.5.3), 4-[1-[2-[3-(difluoromethyl)-5-methyl-pyrazol-1-yl]acetyl]-4-piperidyl]-N-tetralin-1-yl-pyridine-2-carboxamide (G.5.4), 4-[1-[2-[3,5-bis (difluoromethyl)pyrazol-1-yl]acetyl]-4-piperidyl]-N-tetralin-1-yl-pyridine-2-carboxamide (G.5.5), 4-[1-[2-[3-(difluoromethyl)-5-(trifluoromethyl)pyrazol-1-yl]acetyl]-4-piperidyl]-N-tetralin-1-yl-pyridine-2-carboxamide (G.5.6), 4-[1-[2-[5-cyclopropyl-3-(difluoromethyl)pyrazol-1-yl]acetyl]-4-piperidyl]-N-tetralin-1-ylpyridine-2-carboxamide (G.5.7), 4-[1-[2-[5-methyl-3-(trifluoromethyl)pyrazol-1-yl]acetyl]-4-piperidyl]-N-tetralin-1-yl-pyridine-2-carboxamide (G.5.8), 4-[1-[2-[5-(difluoromethyl)-3-(trifluoromethyl)pyrazol-1-yl]acetyl]-4-piperidyl]-N-tetralin-1-yl-pyridine-2-carboxamide (G.5.9), 4-[1-[2-[3,5-bis(trifluoromethyl)pyrazol-1-yl]acetyl]-4-piperidyl]-N-tetralin-1-yl-pyridine-2-carboxamide (G.5.10), (4-[1-[2-[5-cyclopropyl-3-(trifluoromethyl)pyrazol-1-yl]acetyl]-4-piperidyl]-N-tetralin-1-yl-pyridine-2-carboxamide (G.5.11);
H) Inhibitors with Multi Site Action
inorganic active substances: Bordeaux mixture (H.1.1), copper (H.1.2), copper acetate (H.1.3), copper hydroxide (H.1.4), copper oxychloride (H.1.5), basic copper sulfate (H.1.6), sulfur (H.1.7);
thio- and dithiocarbamates: ferbam (H.2.1), mancozeb (H.2.2), maneb (H.2.3), metam (H.2.4), metiram (H.2.5), propineb (H.2.6), thiram (H.2.7), zineb (H.2.8), ziram (H.2.9);
organochlorine compounds: anilazine (H.3.1), chlorothalonil (H.3.2), captafol (H.3.3), captan (H.3.4), folpet (H.3.5), dichlofluanid (H.3.6), dichlorophen (H.3.7), hexachlorobenzene (H.3.8), pentachlorphenole (H.3.9) and its salts, phthalide (H.3.10), tolylfluanid (H.3.11);
guanidines and others: guanidine (H.4.1), dodine (H.4.2), dodine free base (H.4.3), guazatine (H.4.4), guazatine-acetate (H.4.5), iminoctadine (H.4.6), iminoctadine-triacetate (H.4.7), iminoctadine-tris(albesilate) (H.4.8), dithianon (H.4.9), 2,6-dimethyl-1H,5H[1,4]dithiino[2,3-c:5,6-c']dipyrrole-1,3,5,7(2H,6H)-tetraone (H.4.10);

I) Cell Wall Synthesis Inhibitors
inhibitors of glucan synthesis: validamycin (I.1.1), polyoxin B (I.1.2);
melanin synthesis inhibitors: pyroquilon (I.2.1), tricyclazole (I.2.2), carpropamid (I.2.3), dicyclomet (I.2.4), fenoxanil (I.2.5);
J) Plant Defence Inducers
acibenzolar-S-methyl (J.1.1), probenazole (J.1.2), isotianil (J.1.3), tiadinil (J.1.4), prohexadione-calcium (J.1.5); phosphonates: fosetyl (J.1.6), fosetyl-aluminum (J.1.7), phosphorous acid and its salts (J.1.8), potassium or sodium bicarbonate (J.1.9);
K) Unknown Mode of Action
bronopol (K.1.1), chinomethionat (K.1.2), cyflufenamid (K.1.3), cymoxanil (K.1.4), dazomet (K.1.5), debacarb (K.1.6), diclocymet (K.1.7), diclomezine (K.1.8), difenzoquat (K.1.9), difenzoquat-methylsulfate (K.1.10), diphenylamin (K.1.11), fenitropan (K.1.12), fenpyrazamine (K.1.13), flumetover (K.1.14), flusulfamide (K.1.15), flutianil (K.1.16), harpin (K.1.17), methasulfocarb (K.1.18), nitrapyrin (K.1.19), nitrothal-isopropyl (K.1.20), tolprocarb (K.1.21), oxincopper (K.1.22), proquinazid (K.1.23), tebufloquin (K.1.24), tecloftalam (K.1.25), triazoxide (K.1.26), N'-(4-(4-chloro-3-trifluoromethyl-phenoxy)-2,5-dimethyl-phenyl)-N-ethyl-N-methyl formamidine (K.1.27), N'-(4-(4-fluoro-3-trifluoromethyl-phenoxy)-2,5-dimethyl-phenyl)-N-ethyl-N-methyl formamidine (K.1.28), N'-[4-[[3-[(4-chlorophenyl)methyl]-1,2,4-thiadiazo-5-yl]oxy]-2,5-dimethyl-phenyl]-N-ethyl-N-methyl-formamidine (K.1.29), N'-(5-bromo-6-indan-2-yloxy-2-methyl-3-pyridyl)-N-ethyl-N-methyl-formamidine (K.1.30), N'-[5-bromo-6-[1-(3,5-difluorophenyl)ethoxy]-2-methyl-3-pyridyl]-N-ethyl-N-methyl-formamidine (K.1.31), N'-[5-bromo-6-(4-isopropylcyclohexoxy)-2-methyl-3-pyridyl]-N-ethyl-N-methyl-formamidine (K.1.32), N'-[5-bromo-2-methyl-6-(1-phenylethoxy)-3-pyridyl]-N-ethyl-N-methyl-formamidine (K.1.33), N'-(2-methyl-5-trifluoromethyl-4-(3-trimethylsilanyl-propoxy)-phenyl)-N-ethyl-N-methyl formamidine (K.1.34), N'(5-difluoromethyl-2-methyl-4-(3-trimethylsilanyl-propoxy)-phenyl)-N-ethyl-N-methyl formamidine (K.1.35), 2-(4-chloro-phenyl)-N-[4-(3,4-dimethoxy-phenyl)-isoxazol-5-yl]-2-prop-2-ynyloxy-acetamide (K.1.36), 3-[5-(4-chloro-phenyl)-2,3-dimethyl-isoxazolidin-3-yl]-pyridine (pyrisoxazole) (K.1.37), 3-[5-(4-methylphenyl)-2,3-dimethyl-isoxazolidin-3 yl]-pyridine (K.1.38), 5-chloro-1-(4,6-dimethoxy-pyrimidin-2-yl)-2-methyl-1H-benzoimidazole (K.1.39), ethyl (Z)-3-amino-2-cyano-3-phenyl-prop-2-enoate (K.1.40), picarbutrazox (K.1.41), pentyl N-[6-[[(Z)-[(1-methyltetrazol-5-yl)phenyl-methylene]amino]oxymethyl]-2-pyridyl]carbamate (K.1.42), 2-[2-[(7,8-difluoro-2-methyl-3-quinolyl)oxy]-6-fluoro-phenyl]propan-2-ol (K.1.44), 2-[2-fluoro-6-[(8-fluoro-2-methyl-3-quinolyl)oxy]phen-yl]propan-2-ol (K.1.45), 3-(5-fluoro-3,3,4,4-tetramethyl-3,4-dihydroisoquinolin-1-yl)quinoline (K.1.46), 3-(4,4-difluoro-3,3-dimethyl-3,4-dihydroisoquinolin-1-yl)quinoline (K.1.47), 3-(4,4,5-trifluoro-3,3-dimethyl-3,4-dihydroisoquinolin-1-yl)quinoline (K.1.48), 9-fluoro-2,2-dimethyl-5-(3-quinolyl)-3H-1,4-benzoxazepine (K.1.49), 2-(6-benzyl-2-pyridyl)quinazoline (K.1.50), 2-[6-(3-fluoro-4-methoxy-phenyl)-5-methyl-2-pyridyl]quinazoline (K.1.51), 3-[(3,4-dichloroisothiazol-5-yl)methoxy]-1,2-benzothiazole 1,1-dioxide (K.1.52), N'-(2,5-dimethyl-4-phenoxy-phenyl)-N-ethyl-N-methyl-formamidine (K.1.53);

The fungicides described by common names, their preparation and their activity e.g. against harmful fungi is known (cf.: http://www.alanwood.net/pesticides/); these substances are commercially available.

The fungicides described by IUPAC nomenclature, their preparation and their pesticidal activity is also known (cf. Can. J. Plant Sci. 48(6), 587-94, 1968; EP-A 141 317; EP-A 152 031; EP-A 226 917; EPA 243 970; EPA 256 503; EP-A 428 941; EP-A 532 022; EP-A 1 028 125; EP-A 1 035 122; EPA 1 201 648; EPA 1 122 244, JP 2002316902; DE 19650197; DE 10021412; DE 102005009458; U.S. Pat. Nos. 3,296,272; 3,325,503; WO 98/46608; WO 99/14187; WO 99/24413; WO 99/27783; WO 00/29404; WO 00/46148; WO 00/65913; WO 01/54501; WO 01/56358; WO 02/22583; WO 02/40431; WO 03/10149; WO 03/11853; WO 03/14103; WO 03/16286; WO 03/53145; WO 03/61388; WO 03/66609; WO 03/74491; WO 04/49804; WO 04/83193; WO 05/120234; WO 05/123689; WO 05/123690; WO 05/63721; WO 05/87772; WO 05/87773; WO 06/15866; WO 06/87325; WO 06/87343; WO 07/82098; WO 07/90624, WO 11/028657, WO2012/168188, WO 2007/006670, WO 2011/77514; WO13/047749, WO 10/069882, WO 13/047441, WO 03/16303, WO 09/90181, WO13/007767, WO 13/010862, WO 13/127704, WO 13/024009, WO 13/024010 and WO 13/047441, WO 13/162072, WO 13/092224, WO 11/135833).

In another embodiment of the invention, the carboxamide compound ii) of formula (Ia) and the fungicides of the above list with sections A) to K) can be used together for the methods of the present invention.

In still another embodiment of the invention, the mixture comprising the carboxamide compounds i) and ii) and the fungicides of the above list with sections A) to K) can be used together for the methods of the present invention.

With regard the use of the carboxamide compound I, preferably compound i) of formula (I), in mixtures together with one or more other active ingredients in the methods according to the present invention on cultivated plants, some combinations are especially preferred.

With regard to the use in a pesticidal mixture of the present invention, a compound II selected from group of AChE-inhibitors as defined above is preferred, in particular selected from the group of carbamates, especially preferred carbofuran, benfuracarb or methomyl.

Mixtures of the carboxamide compound i) of formula (I) as component I with carbofuran as component II are particularly preferred.

Mixtures of the carboxamide compound ii) of formula (Ia) as component I with carbofuran as component II are another embodiment of this invention.

Mixtures of carboxamide mixtures comprising the carboxamide compounds i) and ii) as component I with carbofuran as component II are another embodiment of this invention.

With regard to the use in a pesticidal mixture of the present invention, a compound II selected from group of AChE-inhibitors as defined above is preferred, in particular selected from the group organophosphates, especially preferred chlorpyrifos and acephate.

Mixtures of the carboxamide compound i) of formula (I) as component I with acephate as component II are particularly preferred.

Mixtures of the carboxamide compound ii) of formula (Ia) as component I with acephate as component II are another embodiment of this invention.

Mixtures of carboxamide mixtures comprising the carboxamide compounds i) and ii) as component I with acephate as component II are another embodiment of this invention.

Mixtures of the carboxamide compound i) of formula (I) as component I with chlorpyrifos as component II are particularly preferred.

Mixtures of the carboxamide compound ii) of formula (Ia) as component I with chlorpyrifos as component II are another embodiment of this invention.

Mixtures of carboxamide mixtures comprising the carboxamide compounds i) and ii) as component I with chlorpyrifos as component II are another embodiment of this invention.

With regard to the use in a pesticidal mixture of the present invention, a compound II selected from group of GABA-gated chloride channel antagonists as defined above is preferred, in particular group fiproles, especially preferred ethiprole and fipronil.

Mixtures of the carboxamide compound i) of formula (I) as component I with fipronil as component II are particularly preferred.

Mixtures of the carboxamide compound ii) of formula (Ia) as component I with fipronil as component II are another embodiment of this invention.

Mixtures of carboxamide mixtures comprising the carboxamide compounds i) and ii) as component I with fipronil as component II are another embodiment of this invention.

With regard to the use in a pesticidal mixture of the present invention, a compound II selected from group of Sodium channel modulators as defined above is preferred, in particular pyrethroids, especially preferred alpha-cypermethrin, bifenthrin, tefluthrin and cyhalothrin.

Mixtures of the carboxamide compound i) of formula (I) as component I with alpha-cypermethrin as component II are particularly preferred.

Mixtures of the carboxamide compound ii) of formula (Ia) as component I with alpha-cypermethrin as component II are another embodiment of this invention.

Mixtures of carboxamide mixtures comprising the carboxamide compounds i) and ii) as component I with alpha-cypermethrin as component II are another embodiment of this invention.

Mixtures of the carboxamide compound i) of formula (I) as component I with bifenthrin as component II are especially preferred.

Mixtures of the carboxamide compound ii) of formula (Ia) as component I with bifenthrin as component II are another embodiment of this invention.

Mixtures of carboxamide mixtures comprising the carboxamide compounds i) and ii) as component I with bifenthrin as component II are another embodiment of this invention.

Mixtures of the carboxamide compound i) of formula (I) as component I with tefluthrin as component II are especially preferred.

Mixtures of the carboxamide compound ii) of formula (Ia) as component I with tefluthrin as component II are another embodiment of this invention.

Mixtures of carboxamide mixtures comprising the carboxamide compounds i) and ii) as component I with tefluthrin as component II are another embodiment of this invention.

Mixtures of the carboxamide preferably compound i) of formula (I) as component I with cyhalothrin as component II are particularly preferred.

Mixtures of the carboxamide compound ii) of formula (Ia) as component I with cyhalothrin as component II are another embodiment of this invention.

Mixtures of carboxamide mixtures comprising the carboxamide compounds i) and ii) as component I with cyhalothrin as component II are another embodiment of this invention.

With regard to the use in a pesticidal mixture of the present invention, a compound II selected from group of Neonicotinoids as defined above is preferred, in particular clothianidin, dinotefuran, imidacloprid, thiacloprid, or thiamethoxam.

Mixtures of the carboxamide compound i) of formula (I) as component I with thiamethoxam as component II are especially preferred.

Mixtures of the carboxamide compound ii) of formula (Ia) as component I with thiamethoxam as component II are another embodiment of this invention.

Mixtures of carboxamide mixtures comprising the carboxamide compounds i) and ii) as component I with thiamethoxam as component II are another embodiment of this invention.

Mixtures of the carboxamide compound i) of formula (I) as component I with clothianidin as component II are also preferred.

Mixtures of the carboxamide compound ii) of formula (Ia) as component I with clothianidin as component II are another embodiment of this invention.

Mixtures of carboxamide mixtures comprising the carboxamide compounds i) and ii) as component I with clothianidin as component II are another embodiment of this invention.

Mixtures of the carboxamide compound i) of formula (I) as component I with dinotefuran as component II are also preferred.

Mixtures of the carboxamide compound ii) of formula (Ia) as component I with dinotefuran as component II are another embodiment of this invention.

Mixtures of carboxamide mixtures comprising the carboxamide compounds i) and ii) as component I with dinotefuran as component II are another embodiment of this invention.

Mixtures of the carboxamide compound i) of formula (I) as component I with imidacloprid as component II are also preferred.

Mixtures of the carboxamide compound ii) of formula (Ia) as component I with imidacloprid as component II are another embodiment of this invention.

Mixtures of carboxamide mixtures comprising the carboxamide compounds i) and ii) as component I with imidacloprid as component II are another embodiment of this invention.

Mixtures of the carboxamide compound i) of formula (I) as component I with thiacloprid as component II are also preferred.

Mixtures of the carboxamide compound ii) of formula (Ia) as component I with thiacloprid as component II are another embodiment of this invention.

Mixtures of carboxamide mixtures comprising the carboxamide compounds i) and ii) as component I with thiacloprid as component II are another embodiment of this invention.

With regard to the use in a pesticidal mixture of the present invention, in an embodiment of the invention, the compound II is selected from group of Nicotinic acetylcholine receptor allosteric activators and is preferably spinosad or spinetoram.

Mixtures of the carboxamide compound i) of formula (I) as component I with spinosad as component II are also preferred.

Mixtures of the carboxamide compound ii) of formula (Ia) as component I with spinosad as component II are another embodiment of this invention.

Mixtures of carboxamide mixtures comprising the carboxamide compounds i) and ii) as component I with spinosad as component II are another embodiment of this invention.

Mixtures of the carboxamide compound i) of formula (I) as component I with spinetoram as component II are also preferred.

Mixtures of the carboxamide compound ii) of formula (Ia) as component I with spinetoram as component II are another embodiment of this invention.

Mixtures of carboxamide mixtures comprising the carboxamide compounds i) and ii) as component I with spinetoram as component II are another embodiment of this invention.

With regard to the use in a pesticidal mixture of the present invention, in an embodiment of the invention, the compound II is selected from group of Chloride channel activators and is preferably an avermectin.

Mixtures of the carboxamide compound i) of formula (I) as component I with emamectin as component II are especially preferred.

Mixtures of the carboxamide compound ii) of formula (Ia) as component I with emamectin as component II are another embodiment of this invention.

Mixtures of carboxamide mixtures comprising the carboxamide compounds i) and ii) as component I with emamectin as component II are another embodiment of this invention.

Mixtures of the carboxamide compound i) of formula (I) as component I with abamectin as component II are especially preferred.

Mixtures of the carboxamide compound ii) of formula (Ia) as component I with abamectin as component II are another embodiment of this invention.

Mixtures of carboxamide mixtures comprising the carboxamide compounds i) and ii) as component I with abamectin as component II are another embodiment of this invention.

With regard to the use in a pesticidal mixture of the present invention, in an embodiment of the invention, the compound II is selected from group of Selective homopteran feeding blockers and is preferably pymetrozine or flonicamid.

Mixtures of the carboxamide compound i) of formula (I) as component I with pymetrozine as component II are especially preferred.

Mixtures of the carboxamide compound ii) of formula (Ia) as component I with pymetrozine as component II are another embodiment of this invention.

Mixtures of carboxamide mixtures comprising the carboxamide compounds i) and ii) as component I with pymetrozine as component II are another embodiment of this invention.

Mixtures of the carboxamide compound i) of formula (I) as component I with flonicamid as component II are especially preferred.

Mixtures of the carboxamide compound ii) of formula (Ia) as component I with flonicamid as component II are another embodiment of this invention.

Mixtures of carboxamide mixtures comprising the carboxamide compounds i) and ii) as component I with flonicamid as component II are another embodiment of this invention.

With regard to the use in a pesticidal mixture of the present invention, in an embodiment of the invention, the component II is selected from group of Mite growth inhibitors and is preferably etoxazole.

With regard to the use in a pesticidal mixture of the present invention, in an embodiment of the invention, the component II is selected from the group of Uncouplers of oxidative phosphorylation via disruption of the proton gradient and is preferably chlorfenapyr.

Mixtures of the carboxamide compound i) of formula (I) as component I with chlorfenapyr as component II are especially preferred.

Mixtures of the carboxamide compound ii) of formula (Ia) as component I with chlorfenapyr as component II are another embodiment of this invention.

Mixtures of carboxamide mixtures comprising the carboxamide compounds i) and ii) as component I with chlorfenapyr as component II are another embodiment of this invention.

With regard to the use in a pesticidal mixture of the present invention, in an embodiment of the invention, the component II is selected from group of Inhibitors of the chitin biosynthesis type 1) and is preferably buprofezin.

With regard to the use in a pesticidal mixture of the present invention, in an embodiment of the invention, the component II is selected from group of Voltage-dependent sodium channel blockers) and is preferably metaflumizone or indoxacarb.

Mixtures of the carboxamide compound i) of formula (I) as component I with metaflumizone as component II are especially preferred.

Mixtures of the carboxamide compound ii) of formula (Ia) as component I with metaflumizone as component II are another embodiment of this invention.

Mixtures of carboxamide mixtures comprising the carboxamide compounds i) and ii) as component I with metaflumizone as component II are another embodiment of this invention.

With regard to the use in a pesticidal mixture of the present invention, in an embodiment of the invention, the component II is selected from group of Inhibitors of the of acetyl CoA carboxylase and is preferably a Tetronic or Tetramic acid derivative, spirodiclofen, spiromesifen or spirotetramat.

Mixtures of the carboxamide compound i) of formula (I) as component I with Tetronic Acid as component II are preferred.

Mixtures of the carboxamide compound ii) of formula (Ia) as component I with Tetronic Acid as component II are another embodiment of this invention.

Mixtures of carboxamide mixtures comprising the carboxamide compounds i) and ii) as component I with Tetronic Acid as component II are another embodiment of this invention.

Mixtures of the carboxamide compound i) of formula (I) as component I with Tetramic Acid as component II are also preferred.

Mixtures of the carboxamide compound ii) of formula (Ia) as component I with Tetramic Acid as component II are another embodiment of this invention.

Mixtures of carboxamide mixtures comprising the carboxamide compounds i) and ii) as component I with Tetramic Acid as component II are another embodiment of this invention.

Mixtures of the carboxamide compound i) of formula (I) as component I with spirodiclofen as component II are also preferred Mixtures of the carboxamide compound ii) of formula (Ia) as component I with spirodiclofen as component II are another embodiment of this invention.

Mixtures of carboxamide mixtures comprising the carboxamide compounds i) and ii) as component I with spirodiclofen as component II are another embodiment of this invention.

Mixtures of the carboxamide compound i) of formula (I) as component I with spiromesifen as component II are also preferred.

Mixtures of the carboxamide compound ii) of formula (Ia) as component I with spiromesifen as component II are another embodiment of this invention.

Mixtures of carboxamide mixtures comprising the carboxamide compounds i) and ii) as component I with spiromesifen as component II are another embodiment of this invention.

Mixtures of the carboxamide compound i) of formula (I) as component I with spirotetramat as component II are also preferred.

Mixtures of the carboxamide compound ii) of formula (Ia) as component I with spirotetramat as component II are another embodiment of this invention.

Mixtures of carboxamide mixtures comprising the carboxamide compounds i) and ii) as component I with spirotetramat as component II are another embodiment of this invention.

With regard to the use in a pesticidal mixture of the present invention, in an embodiment of the invention, the compound II is selected from group of Mitochondrial complex II electron transport inhibitors and is preferably cyflumetofen.

With regard to the use in a pesticidal mixture of the present invention, in an embodiment of the invention, the compound II is selected from group of Ryanodine receptor-modulators and is preferably fubendiamid, chlorantraniliprole, cyclaniliprole, tetraniliprole or cyantraniliprole.

With regard to the use in a pesticidal mixture of the present invention, in another embodiment of the invention, the compound II selected from group of Ryanodine receptor-modulators may also be selected from a compound listed in and coded as M.28.5a) to M.28.5d), namely M.28.5a) N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; M.28.5b) N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; M.28.5c) N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide; M.28.5d) N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide;

M.28.5h) to M.28.5l): M.28.5a) N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; M.28.5b) N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; M.28.5c) N-[4-chloro-2-[(di-2-propyl-lambda-4-sulfanylidene)carbamoyl]-6-methyl-phenyl]-2-(3-chloro-2- pyridyl)-5-(trifluoromethyl)pyrazole-3-carboxamide; M.28.5d) N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; M.28.5h) N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide; M.28.5i) N-[2-(5-Amino-1,3,4-thiadiazol-2-yl)-4-chloro-6-methylphenyl]-3-bromo-1-(3-chloro-2-pyridinyl)-1H-pyrazole-5-carboxamide; M.28.5j) 3-Chloro-1-(3-chloro-2-pyridinyl)-N-[2,4-dichloro-6-[[(1-cyano-1-methylethyl)amino]carbonyl]phenyl]-1H-pyrazole-5-carboxamide; M.28.5k) 3-Bromo-N-[2,4-dichloro-6-(methylcarbamoyl)phenyl]-1-(3,5-dichloro-2-pyridyl)-1H-pyrazole-5-carboxamide; M.28.5l) N-[4-Chloro-2-[[(1,1-dimethylethyl)amino]carbonyl]-6-methylphenyl]-1-(3-chloro-2-pyridinyl)-3-(fluoromethoxy)-1H-pyrazole-5-carboxamide; or M.28.6: cyhalodiamide;

Mixtures of the carboxamide compound i) of formula (I) as component I with flubendiamid as component II are especially preferred.

Mixtures of the carboxamide compound ii) of formula (Ia) as component I with flubendiamid as component II are another embodiment of this invention.

Mixtures of carboxamide mixtures comprising the carboxamide compounds i) and ii) as component I with flubendiamid as component II are another embodiment of this invention.

Mixtures of the carboxamide compound i) of formula (I) as component I with chlorantraniliprole as component II are especially preferred.

Mixtures of the carboxamide compound ii) of formula (Ia) as component I with chlorantraniliprole as component II are another embodiment of this invention.

Mixtures of carboxamide mixtures comprising the carboxamide compounds i) and ii) as component I with chlorantraniliprole as component II are another embodiment of this invention.

Mixtures of the carboxamide compound i) of formula (I) as component I with cyantraniliprole as component II are especially preferred.

Mixtures of the carboxamide compound ii) of formula (Ia) as component I with cyantraniliprole as component II are another embodiment of this invention.

Mixtures of carboxamide mixtures comprising the carboxamide compounds i) and ii) as component I with cyantraniliprole as component II are another embodiment of this invention.

Mixtures of the carboxamide compound i) of formula (I) as component I with cyclaniliprole as component II are especially preferred.

Mixtures of the carboxamide compound ii) of formula (Ia) as component I with cyclaniliprole as component II are another embodiment of this invention.

Mixtures of carboxamide mixtures comprising the carboxamide compounds i) and ii) as component I with cyclaniliprole as component II are another embodiment of this invention.

Mixtures of the carboxamide compound i) of formula (I) as component I with tetraniliprole as component II are especially preferred.

Mixtures of the carboxamide compound ii) of formula (Ia) as component I with tetraniliprole as component II are another embodiment of this invention.

Mixtures of carboxamide mixtures comprising the carboxamide compounds i) and ii) as component I with tetraniliprole as component II are another embodiment of this invention.

Mixtures of the carboxamide compound i) of formula (I) as component I with N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide as component II are especially preferred.

Mixtures of the carboxamide compound ii) of formula (Ia) as component I with N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide as component II are another embodiment of this invention.

Mixtures of carboxamide mixtures comprising the carboxamide compounds i) and ii) as component I with N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide as component II are another embodiment of this invention.

Mixtures of the carboxamide compound i) of formula (I) as component I with N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide as component II are especially preferred.

Mixtures of the carboxamide compound ii) of formula (Ia) as component I with N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide as component II are another embodiment of this invention.

Mixtures of carboxamide mixtures comprising the carboxamide compounds i) and ii) as component I with N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide as component II are another embodiment of this invention.

Mixtures of the carboxamide compound i) of formula (I) as component I with N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide as component II are especially preferred.

Mixtures of the carboxamide compound ii) of formula (Ia) as component I with N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide as component II are another embodiment of this invention.

Mixtures of carboxamide mixtures comprising the carboxamide compounds i) and ii) as component I with N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide as component II are another embodiment of this invention.

Mixtures of the carboxamide compound i) of formula (I) as component I with N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide as component II are especially preferred.

Mixtures of the carboxamide compound ii) of formula (Ia) as component I with N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide as component II are another embodiment of this invention.

Mixtures of carboxamide mixtures comprising the carboxamide compounds i) and ii) as component I with N-[4,6-dichloro-2-[(di-2-propyl-lambda-4-sulfanylidene)carbamoyl]-phenyl]-2-(3-chloro-2-pyridyl)-5-(trifluoro¬methyl)

pyrazole-3-carboxamide as component II are another embodiment of this invention.

Mixtures of the carboxamide compound i) of formula (I) as component I with triflumezopyrim as component II are especially preferred.

Mixtures of the carboxamide compound ii) of formula (Ia) as component I with triflumezopyrim as component II are another embodiment of this invention.

Mixtures of carboxamide mixtures comprising the carboxamide compounds i) and ii) as component I with triflumezopyrim as component II are another embodiment of this invention.

Mixtures of the carboxamide compound i) of formula (I) as component I with sulfoxaflor as component II are also preferred.

Mixtures of the carboxamide compound ii) of formula (Ia) as component I with sulfoxaflor as component II are another embodiment of this invention.

Mixtures of carboxamide mixtures comprising the carboxamide compounds i) and ii) as component I with sulfoxaflor as component II are another embodiment of this invention.

Mixtures of the carboxamide compound i) of formula (I) as component I with afidopyropen as component II are also preferred.

Mixtures of the carboxamide compound ii) of formula (Ia) as component I with afidopyropen as component II are another embodiment of this invention.

Mixtures of carboxamide mixtures comprising the carboxamide compounds i) and ii) as component I with afidopyropen as component II are another embodiment of this invention.

Mixtures of the carboxamide compound i) of formula (I) as component I with pyrifluquinazon as component II are also preferred.

Mixtures of the carboxamide compound ii) of formula (Ia) as component I with pyrifluquinazon as component II are another embodiment of this invention.

Mixtures of carboxamide mixtures comprising the carboxamide compounds i) and ii) as component I with pyrifluquinazon as component II are another embodiment of this invention.

Mixtures of the carboxamide compound i) of formula (I) as component I with flupyradifuron as component II are also preferred.

Mixtures of the carboxamide compound ii) of formula (Ia) as component I with flupyradifuron as component II are another embodiment of this invention.

Mixtures of carboxamide mixtures comprising the carboxamide compounds i) and ii) as component I with flupyradifuron as component II are another embodiment of this invention.

With regard to the use in a pesticidal mixture of the present invention, a compound II selected from the group of the azoles is preferred, especially prochloraz, prothioconazole, tebuconazole and triticonazole, especially prothioconazole and triticonazole.

Mixtures of the carboxamide compound i) of formula (I) as component I, with triticonazole as component II are particularly preferred.

Mixtures of the carboxamide compound ii) of formula (Ia) as component I with triticonazole as component II are another embodiment of this invention.

Mixtures of carboxamide mixtures comprising the carboxamide compounds i) and ii) as component I with triticonazole as component II are another embodiment of this invention.

Mixtures of the carboxamide compound i) of formula (I) as component I, with prothioconazole as component II are particularly preferred.

Mixtures of the carboxamide compound ii) of formula (Ia) as component I with prothioconazole as component II are another embodiment of this invention.

Mixtures of carboxamide mixtures comprising the carboxamide compounds i) and ii) as component I with prothioconazole as component II are another embodiment of this invention.

With regard to the use in a pesticidal mixture of the present invention, preferred is a compound II selected from the group of benomyl, carbendazim, epoxiconazole, fluquinconazole, flutriafol, flusilazole, metconazole, prochloraz, prothioconazole, tebuconazole, triticonazole, pyraclostrobin, trifloxystrobin, boscalid, dimethomorph, penthiopyrad, dodemorph, famoxadone, fenpropimorph, proquinazid, pyrimethanil, tridemorph, maneb, mancozeb, metiram, thiram, chlorothalonil, dithianon, flusulfamide, metrafenone, fluxapyroxad (N-(3',4',5' trifluorobiphenyl-2 yl)-3-difluoromethyl-1-methyl-1H-pyrazole-4 carboxamide), bixafen, penflufen, sedaxane, isopyrazam, metalaxyl, thiophanate-methyl.

Especially preferred is metalaxyl, thiophanate-methyl, pyraclostrobin and fluxapyroxad.

Mixtures of the carboxamide compound i) of formula (I) as component I, with metalaxyl as component II are particularly preferred.

Mixtures of the carboxamide compound ii) of formula (Ia) as component I with metalaxyl as component II are another embodiment of this invention.

Mixtures of carboxamide mixtures comprising the carboxamide compounds i) and ii) as component I with metalaxyl as component II are another embodiment of this invention.

Mixtures of the carboxamide compound i) of formula (I) as component I with thiophanate-methyl as component II are particularly preferred.

Mixtures of the carboxamide compound ii) of formula (Ia) as component I with thiophanate-methyl as component II are another embodiment of this invention.

Mixtures of carboxamide mixtures comprising the carboxamide compounds i) and ii) as component I with thiophanate-methyl as component II are another embodiment of this invention.

Mixtures of the carboxamide compound i) of formula (I) as component I with pyraclostrobin as component II are particularly preferred.

Mixtures of the carboxamide compound ii) of formula (Ia) as component I with pyraclostrobin as component II are another embodiment of this invention.

Mixtures of carboxamide mixtures comprising the carboxamide compounds i) and ii) as component I with pyraclostrobin as component II are another embodiment of this invention.

Mixtures of the carboxamide compound i) of formula (I) as component I with fluxapyroxad as component II are particularly preferred.

Mixtures of the carboxamide compound ii) of formula (Ia) as component I with fluxapyroxad as component II are another embodiment of this invention.

Mixtures of carboxamide mixtures comprising the carboxamide compounds i) and ii) as component I with fluxapyroxad as component II are another embodiment of this invention.

In a particular preferred embodiment, the mixture comprise as an additional component a compound against which the cultivated plant is resistant.

Cultivated Plants

Not only the use of the carboxamide compound I, preferably compound i) of formula (I), alone may display a synergistic effect between the trait of the cultivated plant and the applied compound, but also the use of mixtures of (1) the carboxamide compound I, preferably compound i) of formula (I), as component I, with (2) compounds II as defined herein as component II, in cultivated plants may display synergistic effects between the trait of the cultivated plant and the applied compounds.

Thus, the present invention relates to methods for controlling pests of a cultivated plant, comprising the application of the carboxamide compound i) of formula (I), or a mixture of (1) the carboxamide compound i) of formula (I) as component I with (2) at least one compound II as component II as defined above to a cultivated plant, parts of such plant, plant propagation material, or at its locus of growth.

The present invention further also relates to methods for controlling pests of a cultivated plant, comprising the application of the carboxamide compound ii) of formula (Ia), or a mixture of (1) the carboxamide compound ii) of formula (Ia) as component I with (2) at least one compound II as component II as defined above to a cultivated plant, parts of such plant, plant propagation material, or at its locus of growth.

The present invention further also relates to methods for controlling pests of a cultivated plant, comprising the application of the mixture comprising the carboxamide compounds i) and ii), or a mixture of (1) the mixture comprising the carboxamide compounds i) and ii) as component I with (2) at least one compound II as component II as defined above to a cultivated plant, parts of such plant, plant propagation material, or at its locus of growth.

It has also been found that the application of the carboxamide compound i) of formula (I) as defined above on cultivated plants provides enhanced plant health effects, compared to the plant health effects that are possible by application of the carboxamide compound i) of formula (I) on non-cultivated plants.

It has further also been found that the application of the carboxamide compound ii) of formula (Ia) as defined above on cultivated plants provides enhanced plant health effects, compared to the plant health effects that are possible by application of the carboxamide compound ii) of formula (Ia) on non-cultivated plants.

It has still further also been found that the application of the mixture comprising the carboxamide compounds i) and ii) as defined above on cultivated plants provides enhanced plant health effects, compared to the plant health effects that are possible by application of the mixture comprising the carboxamide compounds i) and ii) on non-cultivated plants.

It has also been found that the application of a mixture of (1) the carboxamide compound i) of formula (I) as component I with (2) at least one compound II as defined above as component II on cultivated plants provides enhanced plant health effects, compared to the plant health effects that are possible by application of a mixture of (1) the carboxamide compound i) of formula (I) as component I with (2) at least one compound II as component II on non-cultivated plants.

It has further also been found that the application of a mixture of (1) the carboxamide compound ii) of formula (Ia) as component I with (2) at least one compound II as defined above as component II on cultivated plants provides enhanced plant health effects, compared to the plant health effects that are possible by application of a mixture of (1) the carboxamide compound ii) of formula (Ia) as component I with (2) at least one compound II as component II on non-cultivated plants.

It has further also been found that the application of a mixture of (1) the mixture comprising the carboxamide compounds i) and ii) as component I with (2) at least one compound II as defined above as component II on cultivated plants provides enhanced plant health effects, compared to the plant health effects that are possible by application of a mixture of (1) the mixture comprising the carboxamide compounds i) and ii) as component I with (2) at least one compound II as component II on non-cultivated plants.

The term "health of a plant" or "plant health" is defined as a condition of the plant and/or its products which is determined by several aspects alone or in combination with each other such as yield, plant vigor, quality and tolerance to abiotic and/or biotic stress.

It has to be emphasized that the above mentioned plant health effects are also present when the cultivated plant is not under biotic stress and in particular when the cultivated plant is not under pest pressure. It is evident that a cultivated plant suffering from fungal or insecticidal attack produces a smaller biomass and leads to a reduced yield as compared to a cultivated plant which has been subjected to curative or preventive treatment against the pathogenic fungus or any other relevant pest and which can grow without the damage caused by the biotic stress factor. However, the methods according to the invention lead to an enhanced plant health even in the absence of any biotic stress. This means that increased plant health cannot be explained just by the insecticidal (or herbicidal) activities of the carboxamide compound I, preferably compound i) of formula (I), or a mixture comprising the carboxamide compound I, preferably compound i) of formula (I) as component I with at least one compound II as component II, but are based on further activity profiles. Thus, the method of the present invention also be carried out in the absence of pest pressure.

Each listed plant health indicator listed below, and which is selected from the groups consisting of yield, plant vigor, quality and tolerance to abiotic and/or biotic stress, is to be understood as a preferred embodiment of the present invention either each on its own or preferably in combination with each other.

According to the present invention, "increased yield" of a cultivated plant means that the yield of a product of the respective cultivated plant is increased via application of the carboxamide compound I, preferably compound i) of formula (I), or a mixture of the carboxamide compound I, preferably compound i) of formula (I) as component I with at least one compound II as component II by a measurable amount over the yield of the same product of the respective control plant produced under the same conditions and also under application of the carboxamide compound I, preferably compound i) of formula (I) or a mixture comprising the carboxamide compound I, preferably compound i) of formula (I) as component I with at least one compound II as component II.

Increased yield can be characterized, among others, by the following improved properties of the cultivated plant: increased plant weight, increased plant height, increased biomass such as higher overall fresh weight (FW), increased number of flowers per plant, higher grain and/or fruit yield, more tillers or side shoots (branches), larger leaves, increased shoot growth, increased protein content, increased oil content, increased starch content, increased pigment content, increased chlorophyll content (chlorophyll content has a positive correlation with the plant's photosynthesis rate and accordingly, the higher the chlorophyll content the higher the yield of a plant)

"Grain" and "fruit" are to be understood as any cultivated plant product which is further utilized after harvesting, e.g. fruits in the proper sense, vegetables, nuts, grains, seeds, wood (e.g. in the case of silviculture plants), flowers (e.g. in the case of gardening plants, ornamentals) etc., that is anything of economic value that is produced by the plant.

According to the present invention, the yield is increased by at least 4%, preferable by 5 to 10%, more preferable by 10 to 20%, or even 20 to 30%. In general, the yield increase may even be higher.

Another indicator for the condition of the cultivated plant is the plant vigor. The plant vigor becomes manifest in several aspects such as the general visual appearance.

Improved plant vigor can be characterized, among others, by the following improved properties of the cultivated plant: improved vitality of the cultivated plant, improved plant growth, improved plant development, improved visual appearance, improved plant stand (less plant verse/lodging), improved emergence, enhanced root growth and/or more developed root system, enhanced nodulation, in particular rhizobial nodulation, bigger leaf blade, bigger size, increased plant height, increased tiller number, increased number of side shoots, increased number of flowers per plant, increased shoot growth, enhanced photosynthetic activity (e.g. based on increased stomatal conductance and/or increased $CO_2$ assimilation rate), enhanced pigment content-, earlier flowering, earlier fruiting, earlier and improved germination, earlier grain maturity, less non-productive tillers, less dead basal leaves, less input needed (such as fertilizers or water), greener leaves, complete maturation under shortened vegetation periods, less seeds needed, easier harvesting, faster and more uniform ripening, longer shelf-life, longer panicles, delay of senescence, stronger and/or more productive tillers, better extractability of ingredients, improved quality of seeds (for being seeded in the following seasons for seed production) and/or reduced production of ethylene and/or the inhibition of its reception by the cultivated plant.

Another indicator for the condition of the cultivated plant is the "quality" of a cultivated plant and/or its products. According to the present invention, enhanced quality means that certain plant characteristics such as the content or composition of certain ingredients are increased or improved by a measurable or noticeable amount over the same factor of the control plant produced under the same conditions. Enhanced quality can be characterized, among others, by following improved properties of the cultivated plant or its product: increased nutrient content, increased protein content, increased content of fatty acids, increased metabolite content, increased carotenoid content, increased sugar content, increased amount of essential amino acids, improved nutrient composition, improved protein composition, improved composition of fatty acids, improved metabolite composition, improved carotenoid composition, improved sugar composition, improved amino acids composition, improved or optimal fruit color, improved leaf color, higher storage capacity, higher processability of the harvested products.

Another indicator for the condition of the cultivated plant is the plants tolerance or resistance to biotic and/or abiotic stress factors. Biotic and abiotic stress, especially over longer terms, can have harmful effects on cultivated plants. Biotic stress is caused by living organisms while abiotic stress is caused for example by environmental extremes. According to the present invention, "enhanced tolerance or resistance to biotic and/or abiotic stress factors" means (1.) that certain negative factors caused by biotic and/or abiotic stress are diminished in a measurable or noticeable amount as compared to control plants exposed to the same conditions and (2.) that the negative effects are not diminished by a direct action of the carboxamide compound I, preferably compound i) of formula (I), or a mixture of (i) the carboxamide compound I, preferably compound i) of formula (I) as component I with (ii) at least one compound II as component II on the stress factors, e.g. by its insecticidal action, but rather by a stimulation of the cultivated plants' own defensive reactions against said stress factors.

Negative factors caused by biotic stress such as pathogens and pests are widely known and range from dotted leaves to total destruction of the cultivated plant. Biotic stress can be caused by living organisms, such as competing plants (for example weeds), microorganisms (such as phythopathogenic fungi and/or bacteria) and/or viruses.

Negative factors caused by abiotic stress are also well-known and can often be observed as reduced plant vigor (see above), for example: dotted leaves, "burned leaves", reduced growth, less flowers, less biomass, less crop yields, reduced nutritional value of the crops, later crop maturity, to give just a few examples. Abiotic stress can be caused for example by: extremes in temperature such as heat or cold (heat stress/cold stress), strong variations in temperature, temperatures unusual for the specific season, drought (drought stress), extreme wetness, high salinity (salt stress), radiation (for example by increased UV radiation due to the decreasing ozone layer), increased ozone levels (ozone stress), organic pollution (for example by phyto-toxic amounts of pesticides), inorganic pollution (for example by heavy metal contaminants).

As a result of biotic and/or abiotic stress factors, the quantity and the quality of the stressed cultivated plants, their crops and fruits decrease. As far as quality is concerned, reproductive development is usually severely affected with consequences on the crops which are important for fruits or seeds. Synthesis, accumulation and storage of proteins are mostly affected by temperature; growth is slowed by almost all types of stress; polysaccharide synthesis, both structural and storage is reduced or modified: these effects result in a decrease in biomass (yield) and in changes in the nutritional value of the product.

Advantageous properties, obtained especially from treated seeds, are e.g. improved germination and field establishment, better vigor and/or a more homogen field establishment.

As pointed out above, the above identified indicators for the health condition of a cultivated plant may be interdependent and may result from each other. For example, an increased resistance to biotic and/or abiotic stress may lead to a better plant vigor, e.g. to better and bigger crops, and thus to an increased yield. Inversely, a more developed root system may result in an increased resistance to biotic and/or abiotic stress. However, these interdependencies and interactions are neither all known nor fully understood and therefore the different indicators are described separately.

In one embodiment the methods of the present invention effectuate an increased yield of a cultivated plant or its product.

In another embodiment the methods of the present invention effectuate an increased vigor of a cultivated plant or its product.

In another embodiment the methods of the present invention effectuate in an increased quality of a cultivated plant or its product.

In yet another embodiment the methods of the present invention effectuate an increased tolerance and/or resistance of a cultivated plant or its product against biotic stress.

In yet another embodiment the methods of the present invention effectuate an increased tolerance and/or resistance of a cultivated plant or its product against abiotic stress.

In a preferred embodiment of the invention, the methods of the present invention increase the yield of cultivated plants.

In a preferred embodiment of the invention, embodiment of the invention, the methods of the present invention increase the yield of cultivated plants such as the plant weight and/or the plant biomass (e.g. overall fresh weight) and/or the grain yield and/or the number of tillers.

In another preferred embodiment of the invention, embodiment of the invention, the methods of the present invention increase the plant vigor of cultivated plants.

In a more preferred embodiment of the invention, the methods of the present invention increase the yield of cultivated plants.

In a most preferred embodiment of the invention, the methods of the present invention increase the yield of cultivated plants such as the plant weight and/or the plant biomass (e.g. overall fresh weight) and/or the grain yield and/or the number of tillers.

Thus, the present invention also relates to methods increasing the plant health, in particular the yield of a cultivated plant as compared to the respective non-modified control plant, comprising the application of the carboxamide compound i) of formula (I), or a mixture of (1) the carboxamide compound i) of formula (I) as component I with (2) at least one compound II as component II to a cultivated plant, parts of such plant, its plant propagation material, or at its locus of growth.

Thus, the present invention also relates to methods increasing the plant health, in particular the yield of a cultivated plant as compared to the respective non-modified control plant, comprising the application of the carboxamide compound ii) of formula (aI), or a mixture of (1) the carboxamide compound ii) of formula (Ia) as component I with (2) at least one compound II as component II to a cultivated plant, parts of such plant, its plant propagation material, or at its locus of growth.

Thus, the present invention also relates to methods increasing the plant health, in particular the yield of a cultivated plant as compared to the respective non-modified control plant, comprising the application of a mixture comprising the carboxamide compounds i) and ii), or a mixture of (1) a mixture comprising the carboxamide compounds i) and ii) as component I with (2) at least one compound II as component II to a cultivated plant, parts of such plant, its plant propagation material, or at its locus of growth.

The present invention also comprises plant propagation material, preferably seed, of a cultivated plant treated with the carboxamide compound i) of formula (I), or a mixture of the carboxamide compound i) of formula (I) as component I with at least one compound II as component II.

The present invention further also comprises plant propagation material, preferably seed, of a cultivated plant treated with the carboxamide compound ii) of formula (Ia), or a mixture of the carboxamide compound ii) of formula (Ia) as component I with at least one compound II as component II.

The present invention further also comprises plant propagation material, preferably seed, of a cultivated plant treated with a mixture comprising the carboxamide compounds i) and ii), or a mixture comprising the carboxamide compounds i) and ii) as component I together with at least one compound II as component II.

The term cultivated plant(s) includes to "modified plant(s)" and "transgenic plant(s)".

In one embodiment of the invention, the term "cultivated plants" refers to "modified plants". In one embodiment of the invention, the term "cultivated plants" refers to "transgenic plants". "Modified plants" are those which have been modified by conventional breeding techniques. The term "modification" means in relation to modified plants a change in the genome, epigenome, transcriptome or proteome of the modified plant, as compared to the control, wild type, mother or parent plant whereby the modification confers a trait (or more than one trait) or confers the increase of a trait (or more than one trait) as listed below. Preferably, the term "cultivated plant" refers to a plant, which has been modified by mutagenesis or genetic engineering.

The modification may result in the modified plant to be a different, for example a new plant variety than the parental plant.

"Transgenic plants" are those, which genetic material has been modified by the use of recombinant DNA techniques that under natural circumstances can not readily be obtained by cross breeding, mutations or natural recombination, whereby the modification confers a trait (or more than one trait) or confers the increase of a trait (or more than one trait) as listed below as compared to the wild-type plant. Preferably, the term "transgenic plant" refers to a plant, which has been modified by genetic engineering.

In one embodiment, one or more genes have been integrated into the genetic material of a genetically modified plant in order to improve certain properties of the plant, preferably increase a trait as listed below as compared to the wild-type plant. Such genetic modifications also include but are not limited to targeted post-translational modification of protein(s), or to posttranscriptional modifications of oligo- or polypeptides e.g. by glycosylation or polymer additions such as prenylated, acetylated, phosphorylated or farnesylated moieties or PEG moieties.

In one embodiment under the term "modification" when referring to a transgenic plant or parts thereof is understood that the activity, expression level or amount of a gene product or the metabolite content is changed, e.g. increased or decreased, in a specific volume relative to a corresponding volume of a control, reference or wild-type plant or plant cell, including the de novo creation of the activity or expression.

In one embodiment the activity of a polypeptide is increased or generated by expression or overexpression of the gene coding for said polypeptide which confers a trait or confers the increase of a trait as listed below as compared to the control plant. The term "expression" or "gene expression" means the transcription of a specific gene or specific genes or specific genetic construct. The term "expression" or "gene expression" in particular means the transcription of a gene or genes or genetic construct into structural RNA (rRNA, tRNA), regulatory RNA (e.g. miRNA, RNAi, RNAa) or mRNA with or without subsequent translation of the latter into a protein. In another embodiment the term "expression" or "gene expression" in particular means the transcription of a gene or genes or genetic construct into structural RNA (rRNA, tRNA) or mRNA with or without subsequent translation of the latter into a protein. In yet another embodiment it means the transcription of a gene or genes or genetic construct into mRNA.

The process includes transcription of DNA and processing of the resulting mRNA product. The term "increased expression" or "overexpression" as used herein means any form of expression that is additional to the original wild-type expression level.

The term "expression of a polypeptide" is understood in one embodiment to mean the level of said protein or polypeptide, preferably in an active form, in a cell or organism.

In one embodiment the activity of a polypeptide is decreased by decreased expression of the gene coding for said polypeptide which confers a trait or confers the increase of a trait as listed below as compared to the control plant. Reference herein to "decreased expression" or "reduction or substantial elimination" of expression is taken to mean a decrease in endogenous gene expression and/or polypeptide levels and/or polypeptide activity relative to control plants. It comprises further reducing, repressing, decreasing or deleting of an expression product of a nucleic acid molecule.

The terms "reduction", "repression", "decrease" or "deletion" relate to a corresponding change of a property in an organism, a part of an organism such as a tissue, seed, root, tuber, fruit, leave, flower etc. or in a cell. Under "change of a property" it is understood that the activity, expression level or amount of a gene product or the metabolite content is changed in a specific volume or in a specific amount of protein relative to a corresponding volume or amount of protein of a control, reference or wild type. Preferably, the overall activity in the volume is reduced, decreased or deleted in cases if the reduction, decrease or deletion is related to the reduction, decrease or deletion of an activity of a gene product, independent whether the amount of gene product or the specific activity of the gene product or both is reduced, decreased or deleted or whether the amount, stability or translation efficacy of the nucleic acid sequence or gene encoding for the gene product is reduced, decreased or deleted.

The terms "reduction", "repression", "decrease" or "deletion" include the change of said property in only parts of the subject of the present invention, for example, the modification can be found in compartment of a cell, like an organelle, or in a part of a plant, like tissue, seed, root, leave, tuber, fruit, flower etc. but is not detectable if the overall subject, i.e. complete cell or plant, is tested. Preferably, the "reduction", "repression", "decrease" or "deletion" is found cellular, thus the term "reduction, decrease or deletion of an activity" or "reduction, decrease or deletion of a metabolite content" relates to the cellular reduction, decrease or deletion compared to the wild type cell. In addition the terms "reduction", "repression", "decrease" or "deletion" include the change of said property only during different growth phases of the organism used in the inventive process, for example the reduction, repression, decrease or deletion takes place only during the seed growth or during blooming. Furthermore the terms include a transitional reduction, decrease or deletion for example because the used method, e.g. the antisense, RNAi, snRNA, dsRNA, siRNA, miRNA, ta-siRNA, cosuppression molecule, or ribozyme, is not stable integrated in the genome of the organism or the reduction, decrease, repression or deletion is under control of a regulatory or inducible element, e.g. a chemical or otherwise inducible promoter, and has therefore only a transient effect.

Methods to achieve said reduction, decrease or deletion in an expression product are known in the art, for example from the international patent application WO 2008/034648, particularly in paragraphs [0020.1.1.1], [0040.1.1.1], [0040.2.1.1] and [0041.1.1.1].

Reducing, repressing, decreasing or deleting of an expression product of a nucleic acid molecule in modified plants is known. Examples are canola i.e. double nill oilseed rape with reduced amounts of erucic acid and sinapins.

Such a decrease can also be achieved for example by the use of recombinant DNA technology, such as antisense or regulatory RNA (e.g. miRNA, RNAi, RNAa) or siRNA approaches. In particular RNAi, snRNA, dsRNA, siRNA, miRNA, ta-siRNA, cosuppression molecule, ribozyme, or antisense nucleic acid molecule, a nucleic acid molecule conferring the expression of a dominant-negative mutant of a protein or a nucleic acid construct capable to recombine with and silence, inactivate, repress or reduces the activity of an endogenous gene may be used to decrease the activity of a polypeptide in a transgenic plant or parts thereof or a plant cell thereof used in one embodiment of the methods of the invention. Examples of transgenic plants with reduced, repressed, decreased or deleted expression product of a nucleic acid molecule are *Carica papaya* (Papaya plants) with the event name X17-2 of the University of Florida, *Prunus domestica* (Plum) with the event name—C5 of the United States Department of Agriculture—Agricultural Research Service, or those listed in rows T9-48 and T9-49 of table 9 below. Also known are plants with increased resistance to nematodes for example by reducing, repressing, decreasing or deleting of an expression product of a nucleic acid molecule, e.g. from the PCT publication WO 2008/095886.

The reduction or substantial elimination is in increasing order of preference at least 10%, 20%, 30%, 40% or 50%, 60%, 70%, 80%, 85%, 90%, or 95%, 96%, 97%, 98%, 99% or more reduced compared to that of control plants. Reference herein to an "endogenous" gene not only refers to the gene in question as found in a plant in its natural form (i.e., without there being any human intervention), but also refers to that same gene (or a substantially homologous nucleic acid/gene) in an isolated form subsequently (re)introduced into a plant (a transgene). For example, a transgenic plant containing such a transgene may encounter a substantial reduction of the transgene expression and/or substantial reduction of expression of the endogenous gene.

The terms "control" or "reference" are exchangeable and can be a cell or a part of a plant such as an organelle like a chloroplast or a tissue, in particular a plant, which was not modified or treated according to the herein described process according to the invention. Accordingly, the plant used as control or reference corresponds to the plant as much as possible and is as identical to the subject matter of the invention as possible. Thus, the control or reference is treated identically or as identical as possible, saying that only conditions or properties might be different which do not influence the quality of the tested property other than the treatment of the present invention.

It is possible that control or reference plants are wild-type plants. However, "control" or "reference" may refer to plants carrying at least one genetic modification, when the plants employed in the process of the present invention carry at least one genetic modification more than said control or reference plants. In one embodiment control or reference plants may be transgenic but differ from transgenic plants employed in the process of the present invention only by said modification contained in the transgenic plants employed in the process of the present invention.

The term "wild type" or "wild-type plants" refers to a plant without said genetic modification. These terms can refer to a cell or a part of a plant such as an organelle like a chloroplast or a tissue, in particular a plant, which lacks said genetic modification but is otherwise as identical as possible to the plants with at least one genetic modification employed in the present invention. In a particular embodiment the "wild-type" plant is not transgenic.

Preferably, the wild type is identically treated according to the herein described process according to the invention. The person skilled in the art will recognize if wild-type plants will not require certain treatments in advance to the process of the present invention, e.g. non-transgenic wild-type plants will not need selection for transgenic plants for example by treatment with a selecting agent such as a herbicide.

The control plant may also be a nullizygote of the plant to be assessed. The term "nullizygotes" refers to a plant that has undergone the same production process as a transgenic, yet has lost the once acquired genetic modification (e.g. due to mendelian segregation) as the corresponding transgenic. If the starting material of said production process is transgenic, then nullizygotes are also transgenic but lack the additional genetic modification introduced by the production process. In the process of the present invention the purpose of wild-type and nullizygotes is the same as the one for control and reference or parts thereof. All of these serve as controls in any comparison to provide evidence of the advantageous effect of the present invention.

Preferably, any comparison is carried out under analogous conditions. The term "analogous conditions" means that all conditions such as, for example, culture or growing conditions, soil, nutrient, water content of the soil, temperature, humidity or surrounding air or soil, assay conditions (such as buffer composition, temperature, substrates, pathogen strain, concentrations and the like) are kept identical between the experiments to be compared. The person skilled in the art will recognize if wild-type, control or reference plants will not require certain treatments in advance to the process of the present invention, e.g. non-transgenic wild-type plants will not need selection for transgenic plants for example by treatment with herbicide.

In case that the conditions are not analogous the results can be normalized or standardized based on the control.

The "reference", "control", or "wild type" is preferably a plant, which was not modified or treated according to the herein described process of the invention and is in any other property as similar to a plant, employed in the process of the present invention of the invention as possible. The reference, control or wild type is in its genome, transcriptome, proteome or metabolome as similar as possible to a plant, employed in the process of the present invention of the present invention. Preferably, the term "reference-" "control-" or "wild-type-" plant, relates to a plant, which is nearly genetically identical to the organelle, cell, tissue or organism, in particular plant, of the present invention or a part thereof preferably 90% or more, e.g. 95%, more preferred are 98%, even more preferred are 99.00%, in particular 99.10%, 99.30%, 99.50%, 99.70%, 99.90%, 99.99%, 99.999% or more. Most preferable the "reference", "control", or "wild type" is a plant, which is genetically identical to the plant, cell, a tissue or organelle used according to the process of the invention except that the responsible or activity conferring nucleic acid molecules or the gene product encoded by them have been amended, manipulated, exchanged or introduced in the organelle, cell, tissue, plant, employed in the process of the present invention.

Preferably, the reference and the subject matter of the invention are compared after standardization and normalization, e.g. to the amount of total RNA, DNA, or protein or activity or expression of reference genes, like housekeeping genes, such as ubiquitin, actin or ribosomal proteins.

The genetic modification carried in the organelle, cell, tissue, in particular plant used in the process of the present invention is in one embodiment stable e.g. due to a stable transgenic integration or to a stable mutation in the corresponding endogenous gene or to a modulation of the expression or of the behaviour of a gene, or transient, e.g. due to an transient transformation or temporary addition of a modulator such as an agonist or antagonist or inducible, e.g. after transformation with a inducible construct carrying a nucleic acid molecule under control of a inducible promoter and adding the inducer, e.g. tetracycline.

In one embodiment preferred plants, from which "modified plants" and/or "transgenic plants" are be selected from the group consisting of cereals, such as maize (corn), wheat, barley sorghum, rice, rye, millet, triticale, oat, pseudocereals (such as buckwheat and quinoa), alfalfa, apples, banana, beet, broccoli, Brussels sprouts, cabbage, canola (rapeseed), carrot, cauliflower, cherries, chickpea, Chinese cabbage, Chinese mustard, collard, cotton, cranberries, creeping bentgrass, cucumber, eggplant, flax, grape, grapefruit, kale, kiwi, kohlrabi, melon, mizuna, mustard, papaya, peanut, pears, pepper, persimmons, pigeonpea, pineapple, plum, potato, raspberry, rutabaga, soybean, squash, strawberries, sugar beet, sugarcane, sunflower, sweet corn, tobacco, tomato, turnip, walnut, watermelon and winter squash, more preferably from the group consisting of alfalfa, canola (rapeseed), cotton, rice, maize, cereals (such as wheat, barley, rye, oat), soybean, fruits and vegetables (such as potato, tomato, melon, papaya), pome fruits (such as apple and pear), vine, sugarbeet, sugarcane, rape, citrus fruits (such as citron, lime, orange, pomelo, grapefruit, and mandarin) and stone fruits (such as cherry, apricot and peach), most preferably from cotton, rice, maize, cerals (such as wheat, barley, rye, oat), sorghum, squash, soybean, potato, vine, pome fruits (such as apple), citrus fruits (such as citron and orange), sugarbeet, sugarcane, rape, oilseed rape and tomatoes, utmost preferably from cotton, rice, maize, wheat, barley, rye, oat, soybean, potato, vine, apple, pear, citron and orange.

In another embodiment of the invention the cultivated plant is a gymnosperm plant, especially a spruce, pine or fir.

In some preferred embodiments, the invention relates to methods and uses, wherein the carboxamide compound i) of formula (I) is applied in an application type which corresponds in each case to one row of Table AP-T.

In some preferred embodiments, the invention relates to methods and uses, wherein the carboxamide compound i) of formula (I) as component I and at least one compound II as defined above as component II, are applied in an application type which corresponds in each case to one row of Table AP-T.

In some other embodiments, the invention relates to methods and uses, wherein the carboxamide compound ii) of formula (Ia) is applied in an application type which corresponds in each case to one row of Table AP-T.

In still some other embodiments, the invention relates to methods and uses, wherein a mixture comprising the carboxamide compounds i) and ii) is applied in an application type which corresponds in each case to one row of Table AP-T.

TABLE AP-T

| Appl. type | Crop | Pest |
|---|---|---|
| AP-T-1 | Soybeans | Spodoptera littoralis |
| AP-T-2 | Soybeans | Anticarsia gemmatalis |
| AP-T-3 | Soybeans | Spodoptera exigua |
| AP-T-4 | Soybeans | Stinkbug |
| AP-T-5 | Soybeans | Helicoverpa sp. |
| AP-T-6 | Soybeans | Spodoptera eridania |
| AP-T-7 | Corn | Spodoptera Frugiperta |
| AP-T-8 | Corn | Spodoptera exigua |
| AP-T-9 | Rice | Sesamia inferens |
| AP-T-10 | Rice | Cnaphalocerus medinalis |
| AP-T-11 | Rice | Chilo suppressalis |
| AP-T-12 | Rice | Leptocorisa oratorius |
| AP-T-13 | Rice | Brown plant hopper |
| AP-T-14 | Cotton | Spodoptera littoralis |
| AP-T-15 | Cotton | Thrips spp. |
| AP-T-16 | Cotton | Spodoptera eridania |
| AP-T-17 | Cotton | Helicoverpa sp. |

The cultivated plants are plants, which comprise at least one trait. The term "trait" refers to a property, which is present in the plant either by genetic engineering or by conventional breeding techniques. Each trait has to be assessed in relation to its respective control. Examples of traits are: herbicide tolerance, insect resistance by expression of bacterial toxins, fungal resistance or viral resistance or bacterial resistance, antibiotic resistance, stress tolerance, maturation alteration, content modification of chemicals present in the cultivated plant, preferably increasing the content of fine chemicals advantageous for applications in the field of the food and/or feed industry, the cosmetics industry and/or the pharmaceutical industry, modified nutrient uptake, preferably an increased nutrient use efficiency and/or resistance to conditions of nutrient deficiency, improved fiber quality, plant vigor, modified colour, fertility restoration, and male sterility.

Principally, cultivated plants may also comprise combinations of the aforementioned traits, e.g. they may be tolerant to the action of herbicides and express bacterial toxins.

Principally, all cultivated plants may also provide combinations of the aforementioned properties, e.g. they may be tolerant to the action of herbicides and express bacterial toxins.

In the detailed description below, the term "plant" refers to a cultivated plant.

Tolerance to herbicides can be obtained by creating insensitivity at the site of action of the herbicide by expression of a target enzyme which is resistant to herbicide; rapid metabolism (conjugation or degradation) of the herbicide by expression of enzymes which inactivate herbicide; or poor uptake and translocation of the herbicide. Examples are the expression of enzymes which are tolerant to the herbicide in comparison to wild type enzymes, such as the expression of 5-enolpyruvylshikimate-3-phosphate synthase (EPSPS), which is tolerant to glyphosate (see e.g. Heck et. al, Crop Sci. 45, 2005, 329-339; Funke et. al, PNAS 103, 2006, 13010-13015; U.S. Pat. Nos. 5,188,642, 4,940,835, 5,633, 435, 5,804,425, 5,627,061), the expression of glutamine synthase which is tolerant to glufosinate and bialaphos (see e.g. U.S. Pat. Nos. 5,646,024, 5,561,236) and DNA constructs coding for dicamba-degrading enzymes (see e.g. U.S. Pat. No. 7,105,724). Gene constructs can be obtained, for example, from micro-organism or plants, which are tolerant to said herbicides, such as the *Agrobacterium* strain CP4 EPSPS which is resistant to glyphosate; *Streptomyces* bacteria which are resistance to glufosinate; *Arabidopsis, Daucus carota, Pseudomonoas* spp. or *Zea mais* with chimeric gene sequences coding for HDDP (see e.g. WO 1996/38567, WO 2004/55191); *Arabidopsis thaliana* which is resistant to protox inhibitors (see e.g. US 2002/0073443).

Tolerance to glyphosate can also be achieved by any one of the genes 2mepsps, epsps, gat4601, goxv247 or mepsps.

Tolerance to glufosinate can be achieved by any one of the genes bar, pat or pat(syn).

Preferaby, the herbicide tolerant plant can be selected from cereals such as wheat, barley, rye, oat; canola, sorghum, soybean, rice, oil seed rape, sugar beet, sugarcane, grapes, lentils, sunflowers, alfalfa, pome fruits; stone fruits; peanuts; coffee; tea; strawberries; turf; vegetables, such as tomatoes, potatoes, cucurbits and lettuce, more preferably, the plant is selected from soybean, maize (corn), rice, cotton, oilseed rape in particular canola, tomatoes, potatoes, sugarcane, vine, apple, pear, citron, orange and cereals such as wheat, barley, rye and oat. More preferably, the cultivated plant is selected from the group consisting of *Gossypium hirsutum* L. (cotton), *Zea mays* L. (maize), *Glycine max* L. (soybean), *Triticum aestivum* (wheat), and *Oryza sativa* L. (rice), preferably from the group consisting of *Gossypium hirsutum* L. (cotton), *Zea mays* L. (maize) and *Glycine max* L. (soybean). Particularly preferably, the cultivated plant is *Glycine max* L. (soybean).

Examples of commercial available transgenic plants with tolerance to herbicides, are the corn varieties "Roundup Ready Corn", "Roundup Ready 2" (Monsanto), "Agrisure GT", "Agrisure GT/CB/LL", "Agrisure GT/RW", "Agrisure 3000GT" (Syngenta), "YieldGard VT Rootworm/RR2" and "YieldGard VT Triple" (Monsanto) with tolerance to glyphosate; the corn varieties "Liberty Link" (Bayer), "Herculex I", "Herculex RW", "Herculex Xtra" (Dow, Pioneer), "Agrisure GT/CB/LL" and "Agrisure CB/LL/RW" (Syngenta) with tolerance to glufosinate; the soybean varieties "Roundup Ready Soybean" (Monsanto) and "Optimum GAT" (DuPont, Pioneer) with tolerance to glyphosate; the cotton varieties "Roundup Ready Cotton" and "Roundup Ready Flex" (Monsanto) with tolerance to glyphosate; the cotton variety "FiberMax Liberty Link" (Bayer) with tolerance to glufosinate; the cotton variety "BXN" (Calgene) with tolerance to bromoxynil; the canola varieties "Navigator" and "Compass" (Rhone-Poulenc) with bromoxynil tolerance; the canola variety"Roundup Ready Canola" (Monsanto) with glyphosate tolerance; the canola variety "InVigor" (Bayer) with glufosinate tolerance; the rice variety "Liberty Link Rice" (Bayer) with glulfosinate tolerance and the alfalfa variety "Roundup Ready Alfalfa" with glyphosate tolerance. Further transgenic plants with herbicide tolerance are commonly known, for instance alfalfa, apple, eucalyptus, flax, grape, lentils, oil seed rape, peas, potato, rice, sugar beet, sunflower, tobacco, tomatom turf grass and wheat with tolerance to glyphosate (see e.g. U.S. Pat. Nos. 5,188,642, 4,940,835, 5,633,435, 5,804,425, 5,627,061); beans, soybean, cotton, peas, potato, sunflower, tomato, tobacco, corn, sorghum and sugarcane with tolerance to dicamba (see e.g. U.S. Pat. Nos. 7,105,724 and 5,670,454); pepper, apple, tomato, millet, sunflower, tobacco, potato, corn, cucumber, wheat and sorghum with tolerance to 2,4-D (see e.g. U.S. Pat. Nos. 6,153,401, 6,100,446, WO 2005107437, U.S. Pat. Nos. 5,608,147 and 5,670,454); sugarbeet, potato, tomato and tobacco with tolerance to glufosinate (see e.g. U.S. Pat. Nos. 5,646,024, 5,561,236); canola, barley, cotton, lettuce, melon, millet, oats, potato, rice, rye, sorghum, soybean, sugarbeet, sunflower, tobacco, tomato and wheat with tolerance to acetolactate synthase (ALS) inhibiting herbicides, such as triazolopyrimidine sulfonamides, sulfonylureas and imidazolinones (see e.g. U.S. Pat. No. 5,013,659, WO 2006060634, U.S. Pat. Nos. 4,761,373, 5,304,732, 6,211,438, 6,211,439 and 6,222,100); cereals, sugar cane, rice, corn, tobacco, soybean, cotton, rapeseed, sugar beet and potato with tolerance to HPPD inhibitor herbicides (see e.g. WO 2004/055191, WO 199638567, WO 1997049816 and U.S. Pat. No. 6,791,014); wheat, soybean, cotton, sugar beet, rape, rice, sorghum and sugar cane with tolerance to protoporphyrinogen oxidase (PPO) inhibitor herbicides (see e.g. US 2002/0073443, US 20080052798, Pest Management Science, 61, 2005, 277-285). The methods of producing such transgenic plants are generally known to the person skilled in the art and are described, for example, in the publications mentioned above.

Plants, which are capable of synthesising one or more selectively acting bacterial toxins, comprise for example at least one toxin from toxin-producing bacteria, especially those of the genus *Bacillus*, in particular plants capable of synthesising one or more insecticidal proteins from *Bacillus cereus* or *Bacillus* popliae; or insecticidal proteins from *Bacillus thuringiensis*, such as delta.-endotoxins, e.g. CryIA (b), CryIA(c), CryIF, CryIF(a2), CryIIA(b), CryIIIA, CryIIIB(b1) or Cry9c, or vegetative insecticidal proteins (VIP), e.g. VIP1, VIP2, VIP3 or VIP3A; or insecticidal proteins of bacteria colonising nematodes, for example *Photorhabdus* spp. or *Xenorhabdus* spp., such as *Photorhabdus luminescens, Xenorhabdus nematophilus*; toxins produced by animals, such as scorpion toxins, arachnid toxins, wasp toxins and other insect-specific neurotoxins; toxins produced by fungi, such as Streptomycetes toxins, plant lectins, such as pea lectins, barley lectins or snowdrop lectins; agglutinins; proteinase inhibitors, such as trypsine inhibitors, serine protease inhibitors, patatin, cystatin, papain inhibitors; ribosome-inactivating proteins (RIP), such as ricin, maize-RIP, abrin, luffin, saporin or bryodin; steroid metabolism enzymes, such as 3-hydroxysteroidoxidase, ecdysteroid-UDP-glycosyl-transferase, cholesterol oxidases, ecdysone inhibitors, HMG-COA-reductase, ion channel blockers, such as blockers of sodium or calcium channels, juvenile hormone esterase, diuretic hormone receptors, stilbene synthase, bibenzyl synthase, chitinases and glucanases.

In one embodiment a plant is capable of producing a toxin, lectin or inhibitor if it contains at least one cell comprising a nucleic acid sequence encoding said toxin, lectin, inhibitor or inhibitor producing enzyme, and said nucleic acid sequence is transcribed and translated and if appropriate the resulting protein processed and/or secreted in a constitutive manner or subject to developmental, inducible or tissue-specific regulation.

In the context of the present invention there are to be understood delta.-endotoxins, for example CryIA(b), CryIA (c), CryIF, CryIF(a2), CryIIA(b), CryIIIA, CryIIIB(b1) or Cry9c, or vegetative insecticidal proteins (VIP), for example VIP1, VIP2, VIP3 or VIP3A, expressly also hybrid toxins, truncated toxins and modified toxins. Hybrid toxins are produced recombinantly by a new combination of different domains of those proteins (see, for example, WO 02/15701). An example for a truncated toxin is a truncated CryIA(b), which is expressed in the Bt11 maize from Syngenta Seed SAS, as described below. In the case of modified toxins, one or more amino acids of the naturally occurring toxin are replaced. In such amino acid replacements, preferably non-naturally present protease recognition sequences are inserted into the toxin, such as, for example, in the case of CryIIIA055, a cathepsin-D-recognition sequence is inserted into a CryIIIA toxin (see WO 2003/018810).

Examples of such toxins or transgenic plants capable of synthesising such toxins are disclosed, for example, in EP-A-0 374 753, WO 93/07278, WO 95/34656, EP-A-0 427 529, EP-A451 878 and WO 2003/052073.

Examples of genes conferring resistance to coleopteran insects include cry34Ab1, cry35 Ab1, cry3A, cry3Bb1, dvsnf7, and mcry3A.

Examples of genes conferring resistance to lepidopteran insects include cry1A, cry1A.105, cry1Ab, cry1Ab-Ac, cry1Ac, cry1C, cry1F, cry1Fa2, cry2Ab2, cry2Ae, cry9c, mocry1F, pinII, vip3A(a), and vip3Aa20.

The processes for the preparation of such transgenic plants are generally known to the person skilled in the art and are described, for example, in the publications mentioned above. CryI-type deoxyribonucleic acids and their preparation are known, for example, from WO 95/34656, EP-A0 367 474, EP-A-0 401 979 and WO 1990/13651.

The toxin contained in the transgenic plants imparts to the plants tolerance to harmful insects. Such insects can occur in any taxonomic group of insects, but are especially commonly found in the beetles (Coleoptera), two-winged insects (*Diptera*) and butterflies (Lepidoptera).

Preferably, the plant capable of expression of bacterial toxins is selected from cereals such as wheat, barley, rye, oat; canola, cotton, eggplant, lettuce, sorghum, soybean, rice, oil seed rape, sugar beet, sugarcane, grapes, lentils, sunflowers, alfalfa, pome fruits; stone fruits; peanuts; coffee; tea; strawberries; turf; vegetables, such as tomatoes, potatoes, cucurbits and lettuce, more preferably, the plant is selected from cotton, soybean, maize (corn), rice, tomatoes, potatoes, oilseed rape and cereals such as wheat, barley, rye and oat, most preferably from cotton, soybean, maize, vine, apple, pear, citron, orange and cereals such as wheat, barley, rye and oat. More preferably, the cultivated plant is selected from the group consisting of *Gossypium hirsutum* L. (cotton), *Zea mays* L. (maize), *Glycine max* L. (soybean), *Triticum aestivum* (wheat), and *Oryza sativa* L. (rice), preferably from the group consisting of *Gossypium hirsutum* L. (cotton), *Zea mays* L. (maize) and *Glycine max* L. (soybean). Particularly preferably, the cultivated plant is *Glycine max* L. (soybean).

Examples of commercial available transgenic plants capable of expression of bacterial toxins are the corn varieties “YieldGard corn rootworm” (Monsanto), “YieldGard VT” (Monsanto), “Herculex RW” (Dow, Pioneer), “Herculex Rootworm” (Dow, Pioneer) and “Agrisure CRW” (Syngenta) with resistance against corn rootworm; the corn varieties “YieldGard corn borer” (Monsanto), “YieldGard VT Pro” (Monsanto), “Agrisure CB/LL” (Syngenta), “Agrisure 3000GT” (Syngenta), “Hercules I”, “Hercules II” (Dow, Pioneer), “KnockOut” (Novartis), “NatureGard” (Mycogen) and “StarLink” (Aventis) with resistance against corn borer, the corn varieties “Herculex I” (Dow, Pioneer) and “Herculex Xtra” (Dow, Pioneer) with resistance against western bean cutworm, corn borer, black cutworm and fall armyworm; the corn variety “YieldGard Plus” (Monsanto) with resistance against corn borer and corn rootworm; the cotton variety “Bollgard I”” (Monsanto) with resistance against tobacco budworm; the cotton varieties “Bollgard II” (Monsanto), “WideStrike” (Dow) and “VipCot” (Syngenta) with resistance against tobacco budworm, cotton bollworm, fall armyworm, beet armyworm, cabbage looper, soybean lopper and pink bollworm; the potato varieties “NewLeaf”, “NewLeaf Y” and “NewLeaf Plus” (Monsanto) with tobacco hornworm resistance and the eggplant varieties "Bt brinjal", "Dumaguete Long Purple", "Mara" with resistance against brinjal fruit and shoot borer, bruit borer and cotton bollworm (see e.g. U.S. Pat. No. 5,128,130). Further transgenic plants with insect resistance are commonly known, such as yellow stemborer resistant rice (see e.g. Molecular Breeding, Volume 18, 2006, Number 1), lepidopteran resistant lettuce (see e.g. U.S. Pat. No. 5,349,124), resistant soybean (see e.g. U.S. Pat. No. 7,432,421) and rice with resistance against Lepidopterans, such as rice stemborer, rice skipper, rice cutworm, rice caseworm, rice leaffolder and rice armyworm (see e.g. WO 2001021821). The methods of producing such transgenic plants are generally known to the person skilled in the art and are described, for example, in the publications mentioned above.

Preferably, plants, which are capable of synthesising antipathogenic substances are selected from soybean, maize (corn), rice, tomatoes, potato, banana, papaya, tobacco, grape, plum and cereals such as wheat, barley, rye and oat, most preferably from soybean, maize (corn), rice, cotton, tomatoes, potato, banana, papaya, oil seed rape, vine, apple, pear, citron, orange and cereals such as wheat, barley, rye and oat.

Plants, which are capable of synthesising antipathogenic substances having a selective action are for example plants expressing the so-called "pathogenesis-related proteins" (PRPs, see e.g. EP-A-0 392 225) or so-called "antifungal proteins" (AFPs, see e.g. U.S. Pat. No. 6,864,068). A wide range of antifungal proteins with activity against plant pathogenic fungi have been isolated from certain plant species and are common knowledge. Examples of such antipathogenic substances and transgenic plants capable of synthesising such antipathogenic substances are known, for example, from EP-A-0 392 225, WO 93/05153, WO 95/33818, and EP-A-0 353 191. Transgenic plants which are resistant against fungal, viral and bacterial pathogens are produced by introducing plant resistance genes. Numerous resistant genes have been identified, isolated and were used to improve plant resistant, such as the N gene which was introduced into tobacco lines that are susceptible to Tobacco Mosaic Virus (TMV) in order to produce TMV-resistant tobacco plants (see e.g. U.S. Pat. No. 5,571,706), the Prf gene, which was introduced into plants to obtain enhanced pathogen resistance (see e.g. WO 199802545) and the Rps2 gene from *Arabidopsis thaliana*, which was used to create resistance to bacterial pathogens including *Pseudomonas syringae* (see e.g. WO 199528423). Plants exhibiting systemic acquired resistance response were obtained by introducing a nucleic acid molecule encoding the TIR domain of the N gene (see e.g. U.S. Pat. No. 6,630,618). Further examples of known resistance genes are the Xa21 gene, which has been introduced into a number of rice cultivars (see e.g. U.S. Pat. Nos. 5,952,485, 5,977,434, WO 1999/09151, WO 1996/22375), the Rcg1 gene for colletotrichum resistance (see e.g. US 2006/225152), the prp1 gene (see e.g. U.S. Pat. No. 5,859,332, WO 2008/017706), the ppv-cp gene to introduce resistance against plum pox virus (see e.g. US PP15,154Ps), the P1 gene (see e.g. U.S. Pat. No. 5,968,828), genes such as Blb1, Blb2, Blb3 and RB2 to introduce resistance against *Phytophthora infestans* in potato (see e.g. U.S. Pat. No. 7,148,397), the LRPKml gene (see e.g. WO1999064600), the P1 gene for potato virus Y resistance (see e.g. U.S. Pat. No. 5,968,828), the HA5-1 gene (see e.g. U.S. Pat. Nos. 5,877,403 and 6,046,384), the PIP gene to indroduce a broad resistant to viruses, such as potato virus X (PVX), potato virus Y (PVY), potato leafroll virus (PLRV) (see e.g. EP 0707069) and genes such as *Arabidopsis* N116, ScaM4 and ScaM5 genes to obtain fungal resistance (see e.g. U.S. Pat. No. 6,706,952 and EP 1018553). The methods of producing such transgenic plants are generally known to the person skilled in the art and are described, for example, in the publications mentioned above.

Antipathogenic substances which can be expressed by such transgenic plants include, for example, ion channel blockers, such as blockers for sodium and calcium channels, for example the viral KP1, KP4 or KP6 toxins; stilbene synthases; bibenzyl synthases; chitinases; glucanases; the so-called "pathogenesis-related proteins" (PRPs; see e.g. EP-A-0 392 225); antipathogenic substances produced by microorganisms, for example peptide antibiotics or heterocyclic antibiotics (see e.g. WO 1995/33818) or protein or polypeptide factors involved in plant pathogen defense (so-called "plant disease resistance genes", as described in WO 2003/000906).

Antipathogenic substances produced by the plants are able to protect the plants against a variety of pathogens, such as fungi, viruses and bacteria. Useful plants of elevated interest in connection with present invention are cereals, such as wheat, barley, rye and oat; soybean; maize; rice; alfalfa, cotton, sugar beet, sugarcane, tobacco, potato, banana, oil seed rape; pome fruits; stone fruits; peanuts; coffee; tea; strawberries; turf; vines and vegetables, such as tomatoes, potatoes, cucurbits, papaya, melon, lenses and lettuce, more preferably selected from soybean, maize (corn), alfalfa, cotton, potato, banana, papaya, rice, tomatoes and cereals such as wheat, barley, rye and oat, most preferably from soybean, maize (corn), rice, cotton, potato, tomato, oilseed rape, vine, apple, pear, citron, orange and cereals such as wheat, barley, rye and oat. Transgenic plants with resistance against fungal pathogens, are, for examples, soybeans with resistance against Asian soybean rust (see e.g. WO 2008/017706); plants such as alfalfa, corn, cotton, sugar beet, oileed, rape, tomato, soybean, wheat, potato and tobacco with resistance against *Phytophtora infestans* (see e.g. U.S. Pat. Nos. 5,859,332, 7,148,397, EP 1334979); corn with resistance against leaf blights, ear rots and stalk rots (such as anthracnose leaf bligh, anthracnose stalk rot, diplodia ear rot, *Fusarium verticilioides, Gibberella zeae* and top dieback, see e.g. US 2006/225152); apples with resistance against apple scab (*Venturia inaequalis*, see e.g. WO 1999064600); plants such as rice, wheat, barley, rye, corn, oats, potato, melon, soybean and sorghum with resistance against fusarium diseases, such as *Fusarium graminearum, Fusarium sporotrichioides, Fusarium lateritium, Fusarium pseudograminearum Fusarium sambucinum, Fusarium culmorum, Fusarium poae, Fusarium acuminatum, Fusarium equiseti* (see e.g. U.S. Pat. No. 6,646,184, EP 1477557); plants, such as corn, soybean, cereals (in particular wheat, rye, barley, oats, rye, rice), tobacco, sorghum, sugarcane and potatoes with broad fungal resistance (see e.g. U.S. Pat. Nos. 5,689,046, 6,706,952, EP 1018553 and U.S. Pat. No. 6,020, 129).

Transgenic plants with resistance against bacterial pathogens and which are covered by the present invention, are, for examples, rice with resistance against *Xylella fastidiosa* (see e.g. U.S. Pat. No. 6,232,528); plants, such as rice, cotton, soybean, potato, sorghum, corn, wheat, barley, sugarcane, tomato and pepper, with resistance against bacterial blight (see e.g. WO 2006/42145, U.S. Pat. Nos. 5,952,485, 5,977, 434, WO 1999/09151, WO 1996/22375); tomato with resistance against *Pseudomonas syringae* (see e.g. Can. J. Plant Path., 1983, 5: 251-255).

Transgenic plants with resistance against viral pathogens, are, for examples, stone fruits, such as plum, almond, apricot, cherry, peach, nectarine, with resistance against plum pox virus (PPV, see e.g. US PP15,154Ps, EP 0626449); potatoes with resistance against potato virus Y (see e.g. U.S. Pat. No. 5,968,828); plants such as potato, tomato, cucumber and leguminosaes which are resistant against tomato spotted wilt virus (TSWV, see e.g. EP 0626449, U.S. Pat. No. 5,973,135); corn with resistance against maize streak virus (see e.g. U.S. Pat. No. 6,040,496); papaya with resistance against papaya ring spot virus (PRSV, see e.g. U.S. Pat. Nos. 5,877,403, 6,046,384); cucurbitaceae, such as cucumber, melon, watermelon and pumpkin, and solanaceae, such as potato, tobacco, tomato, eggplant, paprika and pepper, with resistance against cucumber mosaic virus (CMV, see e.g. U.S. Pat. No. 6,849,780); cucurbitaceae, such as cucumber, melon, watermelon and pumpkin, with resistance against watermelon mosaic virus and zucchini yellow mosaic virus (see e.g. U.S. Pat. No. 6,015,942); potatoes with resistance against potato leafroll virus (PLRV, see e.g. U.S. Pat. No. 5,576,202); potatoes with a broad resistance to viruses, such as potato virus X (PVX), potato virus Y (PVY), potato leafroll virus (PLRV) (see e.g. EP 0707069).

Further examples of deregulated or commercially available transgenic plants with modified genetic material capable of expression of antipathogenic substances are the following plants: *Carnica papaya* (*papaya*), Event: 55-1/63-1; Cornell University, *Carica papaya* (*Papaya*); Event: (X17-2); University of Florida, *Cucurbita pepo* (Squash); Event: (CZW-3); Asgrow (USA); Seminis Vegetable Inc. (Canada), *Cucurbita pepo* (Squash); Event: (ZW20); Upjohn (USA); Seminis Vegetable Inc. (Canada), *Prunus domestica* (Plum); Event: (C5); United States Department of Agriculture—Agricultural Research Service, *Solanum tuberosum* L. (Potato); Event: (RBMT15-101, SEMT15-02, SEMT15-15); Monsanto Company and *Solanum tuberosum* L. (Potato); Event: (RBMT21-129, RBMT21-350, RBMT22-082); Monsanto Company.

Transgenic plants with resistance against nematodes and which may be used in the methods of the present invention are, for examples, soybean plants with resistance to soybean cyst nematodes.

Methods have been proposed for the genetic transformation of plants in order to confer increased resistance to plant parasitic nematodes. U.S. Pat. Nos. 5,589,622 and 5,824,876 are directed to the identification of plant genes expressed specifically in or adjacent to the feeding site of the plant after attachment by the nematode.

Also known in the art are transgenic plants with reduced feeding structures for parasitic nematodes, e.g. plants resistant to herbicides except of those parts or those cells that are nematode feeding sites and treating such plant with a herbicide to prevent, reduce or limit nematode feeding by damaging or destroying feeding sites (e.g. U.S. Pat. No. 5,866,777).

Use of RNAi to target essential nematode genes has been proposed, for example, in PCT Publication WO 2001/96584, WO 2001/17654, US 2004/0098761, US 2005/0091713, US 2005/0188438, US 2006/0037101, US 2006/0080749, US 2007/0199100, and US 2007/0250947.

Transgenic nematode resistant plants have been disclosed, for example in the PCT publications WO 2008/095886 and WO 2008/095889.

Plants which are resistant to antibiotics, such as kanamycin, neomycin and ampicillin. The naturally occurring bacterial nptII gene expresses the enzyme that blocks the effects of the antibiotics kanamycin and neomycin. The ampicillin resistance gene ampR (also known as blaTEM1) is derived from the bacterium *Salmonella paratyphi* and is used as a marker gene in the transformation of micro-organisms and plants. It is responsible for the synthesis of the enzyme betalactamase, which neutralises antibiotics in the penicillin group, including ampicillin. Transgenic plants with resistance against antibiotics, are, for examples potato, tomato, flax, canola, oilseed rape and corn (see e.g. Plant Cell Reports, 20, 2001, 610-615. Trends in Plant Science, 11, 2006, 317-319. Plant Molecular Biology, 37, 1998, 287-296. Mol Gen Genet., 257, 1998, 606-13.). Plant Cell Reports, 6, 1987, 333-336. Federal Register (USA), Vol. 60, No. 113, 1995, page 31139. Federal Register (USA), Vol. 67, No. 226, 2002, page 70392. Federal Register (USA), Vol. 63, No. 88, 1998, page 25194. Federal Register (USA), Vol. 60, No. 141, 1995, page 37870. Canadian Food Inspection Agency, FD/OFB-095-264-A, October 1999, FD/OFB-099-127-A, October 1999. Preferably, the plant is selected from soybean, maize (corn), rice, cotton, oilseed rape, potato, sugarcane, alfalfa, tomatoes and cereals, such as wheat, barley, rye and oat, most preferably from soybean, maize (corn), rice, cotton, oilseed rape, tomato, potato, vine, apple, pear, citron, orange and cereals such as wheat, barley, rye and oat.

Plants which are tolerant to stress conditions (see e.g. WO 2000/04173, WO 2007/131699, CA 2521729 and US 2008/0229448) are plants, which show increased tolerance to abiotic stress conditions such as drought, high salinity, high light intensities, high UV irradiation, chemical pollution (such as high heavy metal concentration), low or high temperatures, limited supply of nutrients (i.e. nitrogen, phosphorous) and population stress. Preferably, transgenic plants with resistance to stress conditions, are selected from rice, corn, soybean, sugarcane, alfalfa, wheat, tomato, potato, barley, rapeseed, beans, oats, sorghum and cotton with tolerance to drought (see e.g. WO 2005/048693, WO 2008/002480 and WO 2007/030001); corn, soybean, wheat, cotton, rice, rapeseed and alfalfa with tolerance to low temperatures (see e.g. U.S. Pat. No. 4,731,499 and WO 2007/112122); rice, cotton, potato, soybean, wheat, barley, rye, sorghum, alfalfa, grape, tomato, sunflower and tobacco with tolerance to high salinity (see e.g. U.S. Pat. Nos. 7,256,326, 7,034,139, WO 2001/030990). The methods of producing such transgenic plants are generally known to the person skilled in the art and are described, for example, in the publications mentioned above. Preferably, the plant is selected from soybean, maize (corn), rice, cotton, sugarcane, alfalfa, sugar beet, potato, oilseed rape, tomatoes and cereals such as wheat, barley, rye and oat, most preferably from soybean, maize (corn), rice, cotton, oilseed rape, tomato, potato, sugarcane, vine, apple, pear, citron, orange and cereals such as wheat, barley, rye and oat.

Altered maturation properties, are for example delayed ripening, delayed softening and early maturity. Preferably, transgenic plants with modified maturation properties, are, selected from tomato, melon, raspberry, strawberry, muskmelon, pepper and *papaya* with delayed ripening (see e.g. U.S. Pat. Nos. 5,767,376, 7,084,321, 6,107,548, 5,981,831, WO 1995035387, U.S. Pat. Nos. 5,952,546, 5,512,466, WO 1997001952, WO 1992/008798, Plant Cell. 1989, 53-63. Plant Molecular Biology, 50, 2002). The methods of producing such transgenic plants are generally known to the person skilled in the art and are described, for example, in the publications mentioned above. Preferably, the plant is selected from fruits, such as tomato, vine, melon, *papaya*, banana, pepper, raspberry and strawberry; stone fruits, such as cherry, apricot and peach; pome fruits, such as apple and pear; and citrus fruits, such as citron, lime, orange, pomelo, grapefruit, and mandarin; more preferably from tomato, vine, apple, banana, orange and strawberry, most preferably tomatoes.

Content modification is synthesis of modified chemical compounds (if compared to the corresponding control plant) or synthesis of enhanced amounts of chemical (if compounds compared to the corresponding control plant) and corresponds to an increased or reduced amount of vitamins, amino acids, proteins and starch, different oils and a reduced amount of nicotine.

Commercial examples are the soybean varieties "Vistive II" and "Visitive III" with lowlinolenic/medium oleic content; the corn variety "Mavera high-value corn" with increased lysine content; and the soybean variety "Mavera high value soybean" with yielding 5% more protein compared to conventional varieties when processed into soybean meal. Further transgenic plants with altered content are, for example, potato and corn with modified amylopectin content (see e.g. U.S. Pat. No. 6,784,338, US 20070261136); canola, corn, cotton, grape, catalpa, cattail, rice, soybean, wheat, sunflower, balsam pear and vernonia with a modified oil content (see e.g. U.S. Pat. Nos. 7,294,759, 7,157,621, 5,850,026, 6,441,278, 6,380,462, 6,365,802, 6,974,898, WO 2001/079499, US 2006/0075515 and U.S. Pat. No. 7,294,759); sunflower with increased fatty acid content (see e.g. U.S. Pat. No. 6,084,164); soybeans with modified allergens content (so called "hypoallergenic soybean, see e.g. U.S. Pat. No. 6,864,362); tobacco with reduced nicotine content (see e.g. US 20060185684, WO 2005000352 and WO 2007064636); canola and soybean with increased lysine content (see e.g. Bio/Technology 13, 1995, 577-582); corn and soybean with altered composition of methionine, leucine, isoleucine and valine (see e.g. U.S. Pat. Nos. 6,946,589, 6,905,877); soybean with enhanced sulfur amino acid content (see e.g. EP 0929685, WO 1997041239); tomato with increased free amino acid contents, such as asparagine, aspartic acid, serine, threonine, alanine, histidine and glutamic acid (see e.g. U.S. Pat. No. 6,727,411); corn with enhanced amino acid content (see e.g. WO 05077117); potato, corn and rice with modified starch content (see e.g. WO 1997044471 and U.S. Pat. No. 7,317,146); tomato, corn, grape, alfalfa, apple, beans and peas with modified flavonoid content (see e.g. WO 2000/04175); corn, rice, sorghum, cotton, soybeans with altered content of phenolic compounds (see e.g. US 20080235829). The methods of producing such transgenic plants are generally known to the person skilled in the art and are described, for example, in the publications mentioned above. Preferably, the plant is selected from soybean, maize (corn), rice, cotton, sugarcane, potato, tomato, oilseed rape, flax and cereals such as wheat, barley, rye and oat, most preferably soybean, maize (corn), rice, oilseed rape, potato, tomato, cotton, vine, apple, pear, citron, orange and cereals such as wheat, barley, rye and oat.

Enhanced nutrient utilization is e.g. assimilation or metabolism of nitrogen or phosphorous. Preferably, transgenic plants with enhanced nitrogen assimilatory and utilization capacities are selected from for example, canola, corn, wheat, sunflower, rice, tobacco, soybean, cotton, alfalfa, tomato, wheat, potato, sugar beet, sugar cane and rapeseed (see e.g. WO 1995/009911, WO 1997/030163, U.S. Pat. Nos. 6,084,153, 5,955,651 and 6,864,405). Plants with improved phosphorous uptake are, for example, tomato and potato (see e.g. U.S. Pat. No. 7,417,181). The methods of producing such transgenic plants are generally known to the person skilled in the art and are described, for example, in the publications mentioned above. Preferably, the plant is selected from soybean, maize (corn), rice, cotton, sugarcane, alfalfa, potato, oilseed rape and cereals such as wheat, barley, rye and oat, most preferably from soybean, maize (corn), rice, cotton, oilseed rape, tomato, potato, vine, apple, pear, citron, orange and cereals such as wheat, barley.

Transgenic plants with male sterility are preferably selected from canola, corn, tomato, rice, Indian mustard, wheat, soybean and sunflower (see e.g. U.S. Pat. Nos. 6,720,481, 6,281,348, 5,659,124, U.S. Pat. Nos. 6,399,856, 7,345,222, 7,230,168, 6,072,102, EP1 135982, WO 2001/092544 and WO 1996/040949). The methods of producing such transgenic plants are generally known to the person skilled in the art and are described, for example, in the publications mentioned above. Preferably, the plant is selected from soybean, maize (corn), rice, cotton, oilseed rape, tomato, potato, vine, apple, pear, citron, orange and cereals such as wheat, barley.

Further examples of deregulated or commercially available transgenic plants with modified genetic material being male sterile are

*Brassica napus* (Argentine Canola: (Event: MS1, RF1=>PGS1; Bayer CropScience (formerly Plant Genetic Systems); *Brassica napus* (Event: MS1, RF2=>PGS2; Bayer CropScience (formerly Plant Genetic Systems); *Brassica napus* (Event: MS8xRF3; Bayer CropScience (Aventis CropScience(AgrEvo)); *Brassica napus* (Event: PHY14, PHY35; Bayer CropScience (formerly Plant Genetic Systems); *Brassica napus* (Event: PHY36; Bayer CropScience (formerly Plant Genetic Systems); *Cichorium intybus* (Chicory: (Event: RM3-3, RM3-4, RM3-6; Bejo Zaden BV; *Zea mays* L. (Maize: (Event: 676, 678, 680; Pioneer Hi-Bred International Inc.; *Zea mays* L. (Event: MS3; Bayer CropScience (Aventis CropScience(AgrEvo)) and *Zea mays* L. (Event: MS6; Bayer CropScience (Aventis CropScience (AgrEvo)).

Plants, which produce higher quality fiber are e.g. transgenic cotton plants. The such improved quality of the fiber is related to improved micronaire of the fiber, increased strength, improved staple length, improved length unifomity and color of the fibers (see e.g. WO 1996/26639, U.S. Pat. Nos. 7,329,802, 6,472,588 and WO 2001/17333). The methods of producing such transgenic plants are generally known to the person skilled in the art and are described, for example, in the publications mentioned above.

As set forth above, cultivated plants may comprise one or more traits, e.g. selected from the group consisting of herbicide tolerance, insect resistance, fungal resistance, viral resistance, bacterial resistance, stress tolerance, maturation alteration, content modification, modified nutrient uptake and male sterility (see e.g. WO 2005033319 and U.S. Pat. No. 6,376,754).

Examples of commercial available transgenic plants with two combined properties are the corn varieties "YieldGard Roundup Ready" and YieldGard Roundup Ready 2" (Monsanto) with glyphosate tolerance and resistance to corn borer; the corn variety "Agrisure CB/LL" (Syntenta) with glufosinate tolerance and corn borer resistance; the corn variety "Yield Gard VT Rootworm/RR2" with glyphosate tolerance and corn rootworm resistance; the corn variety "Yield Gard VT Triple" with glyphosate tolerance and resistance against corn rootworm and corn borer; the corn variety "Herculex I" with glufosinate tolerance and lepidopteran resistance (Cry1F), i.e. against western bean cutworm, corn borer, black cutworm and fall armyworm; the corn variety "YieldGard Corn Rootworm/Roundup Ready 2" (Monsanto) with glyphosate tolerance and corn rootworm resistance; the corn variety "Agrisure GT/RW" (Syngenta) with gluphosinate tolerance and lepidopteran resistance (Cry3A), i.e. against western corn rootworm, northern corn rootworm and Mexican corn rootworm; the corn variety "Herculex RW" (Dow, Pioneer) with glufosinate tolerance and lepidopteran resistance (Cry34/35Ab1), i.e. against western corn rootworm, northern corn rootworm and Mexican corn rootworm; the corn variety "Yield Gard VT Rootworm/RR2" with glyphosate tolerance and corn rootworm resistance; the soybean variety "Optimum GAT" (DuPont, Pioneer) with glyphosate tolerance and ALS herbicide tolerance; the corn variety "Mavera high-value corn" with glyphosate tolerance, resistance to corn rootworm and European corn borer and high lysine trait.

Examples of commercial available transgenic plants with three traits are the corn variety "Herculex I/Roundup Ready 2" with glyphosate tolerance, gluphosinate tolerance and lepidopteran resistance (Cry1F), i.e. against western bean cutworm, corn borer, black cutworm and fall armyworm; the corn variety "YieldGard Plus/Roundup Ready 2" (Monsanto) with glyphosate tolerance, corn rootworm resistance and corn borer resistance; the corn variety "Agrisure GT/CB/LL" (Syngenta) with tolerance to glyphosate tolerance, tolerance to gluphosinate and corn borer resistance; the corn variety "Herculex Xtra" (Dow, Pioneer) with glufosinate tolerance and lepidopteran resistance (Cry1F+Cry34/35Ab1), i.e. against western corn rootworm, northern corn rootworm, Mexican corn rootworm, western bean cutworm, corn borer, black cutworm and fall armyworm; the corn varieties "Agrisure CB/LL/RW" (Syngenta) with glufosinate tolerance, corn borer resistance (Cry1Ab) and lepidopteran resistance (Cry3A), i.e. against western corn rootworm, northern corn rootworm and Mexican corn rootworm; the corn variety "Agrisure 3000GT" (Syngenta) with glyphosate tolerance+corn borer resistance (Cry1Ab) and lepidopteran resistance (Cry3A), i.e. against western corn rootworm, northern corn rootworm and Mexican corn rootworm. The methods of producing such transgenic plants are generally known to the person skilled in the art.

An example of a commercial available transgenic plant with four traits is "Hercules QuadStack" with glyphosate tolerance, glufosinate tolerance, corn borer resistance and corn rootworm resistance.

In one embodiment of the invention, the commercial transgenic plant is a soybean variety whith glyphosate tolerance and lepidopteran resistance, preferably with one trait of glyphosate tolerance and two traits of lepidopteran resistance. Preferably, the glyphosate tolerance is through expression of the EPSPS encoding gene from *A. tumefaciens* strain CP4, more preferably it is based on the transgenic event MON89788 (see A1-14, T1-100). Also preferably, the lepidopteran resistance is a resistance to lepidopteran pests of soybean, preferably through expression of the Cry1AC encoding gene from *B. thuringiensis*, preferably against velvetbean caterpillar (*Anticarsia gemmatalis*) and soybean looper (*Pseudoplusia includens*), more preferably it is based on the transgenic event MON87701.

More preferably, the glyphosate tolerance is based on the transgenic event MON89788 and the trait of lepidopteran resistance is achieved through expression of the Cry1AC encoding gene from *B. thuringiensis*, preferably against velvetbean caterpillar (*Anticarsia gemmatalis*) and soybean looper (*Pseudoplusia includens*), more preferably based on the transgenic event MON87701.

Most preferably, the commercial transgenic plant is "Intacta RR2 PRO" soybean (Monsanto) which claims to offer tolerance to glyphosate herbicide and protection against major soybean pests (velvetbean caterpillar, soybean looper, soybean budborer, bean shoot borer, bollworm, corn stalk borer, *Helicoverpa*, e.g. *Helicoverpa armigera*), along with increased yield potential.

In another embodiment, the commercial transgenic plant is a soybean variety selected from "Roundup Ready 2 Yield", "Intacta RR2 Pro" and "Vistive Gold" (all Monsanto), or "Stearidonic Acid (SDA) Omega-3" (higher content of SDA in soybean, Monsanto). In another embodiment, the trait is *Bacillus thuringiensis* Cry1A.105 and cry2Ab2 and Vector PV-GMIR13196, for Mon87751 soybean (Monsanto).

In a further embodiment, the commercial transgenic plant is a corn variety which has aboveground insect protection from "Genuity VT Triple PRO" or "Herculex Xtra" or both of them, and herbicide tolerance from "Roundup Ready 2" and Liberty Link, preferably corn varieties selected from "Genuity SmartStax", "Genuity VT Triple PRO" and "Genuity VT Double PRO" (all Monsanto), optionally as RIB (refuge-in-bag) solution. In a further embodiment, the commercial transgenic corn plant variety has a drought tolerance trait, preferably "Genuity DroughtGard". In another embodiment, the trait is double-stranded ribonucleic acid (dsRNA), *Bacillus thuringiensis* Cry3Bb1 protein and vector PV-ZMIR10871 for MON87411 corn.

In a further embodiment, the commercial transgenic plant is a cotton variety selected from "Bollgard II" (insect protection), "Roundup Ready Flex" (herbicide tolerance) and "Bollgard II with Roundup Ready Flex" (both), all Monsanto.

Preferably, the cultivated plants are plants, which comprise at least one trait selected from herbicide tolerance, insect resistance by expression of bacertial toxins, fungal resistance or viral resistance or bacterial resistance by expression of antipathogenic substances, stress tolerance, content modification of chemicals present in the cultivated plant compared to the corresponding control plant.

Most preferably, the cultivated plants are plants, which are tolerant to the action of herbicides and plants, which express bacterial toxins, which provides resistance against animal pests (such as insects or arachnids or nematodes), wherein the bacterial toxin is preferably a toxin from *Bacillus thuriginensis*. Herein, the plant is preferably selected from cotton, rice, maize, wheat, barley, rye, oat, soybean, potato, vine, apple, pear, citron and orange.

In one embodiment, the plant is soybean.

In one embodiment, the invention relates to a method for controlling pests and/or increasing the plant health of a cultivated plant with at least one modification as compared to the respective non-modified control plant, wherein the plant is soybean, which method comprises applying the carboxamide compound i) of formula (I), or a mixture of (1) the carboxamide compound i) of formula (I) as component I with (2) at least one compound II as component II.

In another embodiment, the invention relates to a method for controlling pests and/or increasing the plant health of a cultivated plant with at least one modification as compared to the respective non-modified control plant, wherein the plant is soybean, which method comprises applying the carboxamide compound ii) of formula (Ia), or a mixture of (1) the carboxamide compound ii) of formula (Ia) as component I with (2) at least one compound II as component II.

In another embodiment, the invention relates to a method for controlling pests and/or increasing the plant health of a cultivated plant with at least one modification as compared to the respective non-modified control plant, wherein the plant is soybean, which method comprises applying a mixture comprising the carboxamide compounds i) and ii), or a mixture of (1) a mixture comprising the carboxamide compounds i) and ii) as component I with (2) at least one compound II as component II.

In an utmost preferred embodiment, the cultivated plants are plants, which are tolerant to the action of herbicides. Further guidance for specific combinations within this utmost preferred embodiment can be found in tables 1, 2, 14 and tables A, B and C.

If such plants are used in the methods according to the present invention, the mixture comprising the carboxamide compound i) of formula (I), or the mixture of (1) the carboxamide compound i) of formula (I) with (2) at least one compound II may additionally comprise a herbicide III, to which the plant is tolerant.

If such plants are used in the methods according to the present invention, the mixture comprising the carboxamide compound ii) of formula (Ia), or the mixture of (1) the carboxamide compound ii) of formula (Ia) with (2) at least one compound II may additionally comprise a herbicide III, to which the plant is tolerant.

If such plants are used in the methods according to the present invention, the mixture comprising a mixture comprising the carboxamide compounds i) and ii), or the mixture of (1) the mixture comprising the carboxide compounds i) and ii) with (2) at least one compound II may additionally comprise a herbicide III, to which the plant is tolerant.

For example, if the cultivated plant is a cultivated plant tolerant to glyphosate, the mixture comprising the carboxamide compound i) of formula (I), or the mixture of (1) the carboxamide compound i) of formula (I) with (2) at least one compound II may additionally comprise glyphosate.

For example, if the cultivated plant is a cultivated plant tolerant to glyphosate, the mixture comprising the carboxamide compound ii) of formula (Ia), or the mixture of (1) the carboxamide compound ii) of formula (Ia) with (2) at least one compound II may additionally comprise glyphosate.

For example, if the cultivated plant is a cultivated plant tolerant to glyphosate, the mixture comprising a mixture comprising the carboxamide compounds i) and ii), or the mixture of (1) a mixture comprising the carboxamide compounds i) and ii) with (2) at least one compound II may additionally comprise glyphosate.

For example, if the cultivated plant is a cultivated plant tolerant to glufonsinate, the mixture comprising the carboxamide compound i) of formula (I), or the mixture of (i) the carboxamide compound i) of formula (I) with (ii) at least one compound II may additionally comprise glufonisate.

For example, if the cultivated plant is a cultivated plant tolerant to glufonsinate, the mixture comprising the carboxamide compound ii) of formula (Ia), or the mixture of (1) the carboxamide compound ii) of formula (Ia) with (2) at least one compound II may additionally comprise glufonsinate.

For example, if the cultivated plant is a cultivated plant tolerant to glufonsinate, the mixture comprising a mixture comprising the carboxamide compounds i) and ii), or the mixture of (1) a mixture comprising the carboxamide compounds i) and ii) with (2) at least one compound II may additionally comprise glufonsinate.

For example, if the cultivated plant is a cultivated plant tolerant to a imidazolinone herbicide, the mixture comprising the carboxamide compound i) of formula (I), or the mixture of (i) the carboxamide compound i) of formula (I) with (ii) at least one compound II may additionally comprise at least one imidazolinone herbicide. Herein, the imidazolinone herbicide is selected from imazamox, imazethapyr, imazapic, imazapyr, imazamethabenz or imazaquin.

For example, if the cultivated plant is a cultivated plant tolerant to a imidazolinone herbicide, the mixture comprising the carboxamide compound ii) of formula (Ia), or the mixture of (1) the carboxamide compound i) of formula (I) with (2) at least one compound II may additionally comprise at least one imidazolinone herbicide. Herein, the imidazolinone herbicide is selected from imazamox, imazethapyr, imazapic, imazapyr, imazamethabenz or imazaquin.

For example, if the cultivated plant is a cultivated plant tolerant to a imidazolinone herbicide, the mixture comprising a mixture comprising the carboxamide compounds i) and ii), or the mixture of (1) a mixture comprising the carboxamide compounds i) and ii) with (2) at least one compound II may additionally comprise at least one imidazolinone herbicide. Herein, the imidazolinone herbicide is selected from imazamox, imazethapyr, imazapic, imazapyr, imazamethabenz or imazaquin.

For example, if the cultivated plant is a cultivated plant tolerant to dicamba, the mixture comprising the carboxamide compound i) of formula (I), or the mixture of (1) the carboxamide compound i) of formula (I) with (2) at least one compound II may additionally comprise dicamba.

For example, if the cultivated plant is a cultivated plant tolerant to dicamba, the mixture comprising the carboxamide compound ii) of formula (Ia), or the mixture of (1) the carboxamide compound ii) of formula (Ia) with (2) at least one compound II may additionally comprise dicamba.

For example, if the cultivated plant is a cultivated plant tolerant to dicamba, the mixture comprising a mixture comprising the carboxamide compounds i) and ii), or the mixture of (1) a mixture comprising the carboxamide compounds i) and ii) with (2) at least one compound II may additionally comprise dicamba.

For example, if the cultivated plant is a cultivated plant tolerant to sethoxidim, the mixture comprising the carboxamide compound i) of formula (I), or the mixture of (1) the carboxamide compound i) of formula (I) with (2) at least one compound II may additionally comprise sethoxidim.

For example, if the cultivated plant is a cultivated plant tolerant to sethoxidim, the mixture comprising the carboxamide compound ii) of formula (Ia), or the mixture of (1) the carboxamide compound ii) of formula (Ia) with (2) at least one compound II may additionally comprise sethoxidim.

For example, if the cultivated plant is a cultivated plant tolerant to sethoxidim, the mixture comprising a mixture comprising the carboxamide compounds i) and ii), or the mixture of (1) a mixture comprising the carboxamide compounds i) and ii) with (2) at least one compound II may additionally comprise sethoxidim.

For example, if the cultivated plant is a cultivated plant tolerant to cycloxidim, the mixture comprising the carboxamide compound i) of formula (I), or the mixture of (1) the carboxamide compound i) of formula (I) with (2) at least one compound II may additionally comprise cyloxidim.

For example, if the cultivated plant is a cultivated plant tolerant to cycloxidim, the mixture comprising the carboxamide compound ii) of formula (Ia), or the mixture of (1) the carboxamide compound ii) of formula (Ia) with (2) at least one compound II may additionally comprise cycloxidim.

For example, if the cultivated plant is a cultivated plant tolerant to cycloxidim, the mixture comprising a mixture comprising the carboxamide compounds i) and ii), or the mixture of (1) a mixture comprising the carboxamide compounds i) and ii) with (2) at least one compound II may additionally comprise cycloxidim.

Thus, the present invention also relates to ternary mixtures, comprising the carboxamide compound i) of formula (I), an insecticide II and a herbicide III. The present invention also relates to ternary mixtures, comprising the carboxamide compound ii) of formula (Ia), an insecticide II and a herbicide III. The present invention also relates to ternary mixtures, comprising the mixture comprising the carboxamide compounds i) and ii), an insecticide II and a herbicide III.

In particular, the present invention also relates to ternary mixtures comprising two insecticides and a fungicide.

In another particular embodiment, the present invention also relates to ternary mixtures comprising two fungicides and one insecticide.

In another particular embodiment, the present invention also relates to ternary mixtures comprising an insectide, a fungicide and a herbicide.

In dependence to the application methods of the present inventions, some mixture partners may be especially preferred.

For example, in the mixtures for foliar application comprising at least one other active compound II as component II, that compound II is preferably selected from teflubenzuron, chlorefenapyr or from the class of diamides Thus for foliar application, mixtures, wherein the at least one compound II is teflubenzuron can be preferred.

Alternatively or additionally, mixtures, wherein the at least one compound II is chlorfenapyr can be preferred.

Alternatively or additionally, mixtures, wherein the at least one compound II is a ryanodine receptor-modulator selected from flubendiamid, chlorantraniliprole, cyclaniliprole, tetraniliprole, cyantraniliprole or from a group consisting of N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl) pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide. Most preferably the ryanodine receptor-modulator is N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide.

For example regarding other application methods, in the mixtures for seed treatment application comprising at least one other active compound II as component II, that compound II is preferably selected from thiamethoxam, fipronil or from the class of diamides Thus for foliar application, mixtures, wherein the at least one compound II is thiamethoxam can be preferred.

Alternatively or additionally, mixtures, wherein the at least one compound II is fipronil can be preferred.

Alternatively or additionally, mixtures, wherein the at least one compound II is a ryanodine receptor-modulator selected from flubendiamid, chlorantraniliprole, cyclaniliprole, tetraniliprole, cyantraniliprole or from a group consisting of N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl) pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide. Most preferably the ryanodine receptor-modulator is N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide.

Preferably, the cultivated plants are plants, which comprise at least one trait selected from herbicide tolerance, insect resistance for example by expression of one or more bacterial toxins, fungal resistance or viral resistance or bacterial resistance by expression of one or more antipathogenic substances, stress tolerance, nutrient uptake, nutrient use efficiency, content modification of chemicals present in the cultivated plant compared to the corresponding control plant.

More preferably, the cultivated plants are plants, which comprise at least one trait selected from herbicide tolerance, insect resistance by expression of one or more bacterial toxins, fungal resistance or viral resistance or bacterial resistance by expression of one or more antipathogenic substances, stress tolerance, content modification of one or more chemicals present in the cultivated plant compared to the corresponding control plant.

Most preferably, the cultivated plants are plants, which are tolerant to the action of herbicides and plants, which express one or more bacterial toxins, which provides resistance against one or more animal pests (such as insects or arachnids or nematodes), wherein the bacterial toxin is preferably a toxin from *Bacillus thuringiensis*. Herein, the cultivated plant is preferably selected from soybean, maize (corn), rice, cotton, sugarcane, alfalfa, potato, oilseed rape, tomatoes and cereals such as wheat, barley, rye and oat, most preferably from soybean, maize (corn), cotton, rice and cereals such as wheat, barley, rye and oat.

Preference is given to cultivated plants, which are tolerant to the action of herbicides.

Thus, in one preferred embodiment, the present invention relates to a method of controlling harmful insects and/or increasing the health of cultivated plants by treating cultivated plants, parts of such plants, plant propagation materials, or at their locus of growth with the mixture of the carboxamide compound i) of formula (I) as component I and at least one compound II as component II, wherein the plant is a plant, which is rendered tolerant to herbicides, more preferably to herbicides such as glutamine synthetase inhibitors, 5-enol-pyrovyl-shikimate-3-phosphate-synthase inhibitors, acetolactate synthase (ALS) inhibitors, protoporphyrinogen oxidase (PPO) inhibitors, auxine type herbicides, most preferably to herbicides such as glyphosate, glufosinate, imazapyr, imazapic, imazamox, imazethapyr, imazaquin, imazamethabenz methyl, dicamba and 2,4-D.

In another embodiment, the present invention relates to a method of controlling harmful insects and/or increasing the health of cultivated plants by treating cultivated plants, parts of such plants, plant propagation materials, or at their locus of growth with the mixture of the carboxamide compound ii) of formula (Ia) as component I and at least one compound II as component II, wherein the plant is a plant, which is rendered tolerant to herbicides, more preferably to herbicides such as glutamine synthetase inhibitors, 5-enol-pyrovyl-shikimate-3-phosphate-synthase inhibitors, acetolactate synthase (ALS) inhibitors, protoporphyrinogen oxidase (PPO) inhibitors, auxine type herbicides, most preferably to herbicides such as glyphosate, glufosinate, imazapyr, imazapic, imazamox, imazethapyr, imazaquin, imazamethabenz methyl, dicamba and 2,4-D.

In still another embodiment, the present invention relates to a method of controlling harmful insects and/or increasing the health of cultivated plants by treating cultivated plants, parts of such plants, plant propagation materials, or at their locus of growth with the mixture of 1) a mixture comprising the carboxamide compounds i) and ii) as component I and 2) at least one compound II as component II, wherein the plant is a plant, which is rendered tolerant to herbicides, more preferably to herbicides such as glutamine synthetase inhibitors, 5-enol-pyrovyl-shikimate-3-phosphate-synthase inhibitors, acetolactate synthase (ALS) inhibitors, protoporphyrinogen oxidase (PPO) inhibitors, auxine type herbicides, most preferably to herbicides such as glyphosate, glufosinate, imazapyr, imazapic, imazamox, imazethapyr, imazaquin, imazamethabenz methyl, dicamba and 2,4-D.

In a further one preferred embodiment, the present invention relates to a method of controlling harmful insects and/or increasing the health of cultivated plants by treating cultivated plants, parts of such plants, plant propagation materials, or at their locus of growth with the mixture of the carboxamide compound i) of formula (I) as component I and at least one compound II as component II, wherein the plant is a plant, which express at least one insecticidal toxin, preferably a toxin from *Bacillus* species, more preferably from *Bacillus thuringiensis*.

In another embodiment, the present invention relates to a method of controlling harmful insects and/or increasing the health of cultivated plants by treating cultivated plants, parts of such plants, plant propagation materials, or at their locus of growth with the mixture of the carboxamide compound ii) of formula (Ia) as component I and at least one compound II as component II, wherein the plant is a plant, which express at least one insecticidal toxin, preferably a toxin from *Bacillus* species, more preferably from *Bacillus thuringiensis*.

In still another embodiment, the present invention relates to a method of controlling harmful insects and/or increasing the health of cultivated plants by treating cultivated plants, parts of such plants, plant propagation materials, or at their locus of growth with the mixture of 1) a mixture comprising the carboxamide compounds i) and ii) as component I and 2) at least one compound II as component II, wherein the plant is a plant, which express at least one insecticidal toxin, preferably a toxin from *Bacillus* species, more preferably from *Bacillus thuringiensis*.

In the cases, where the cultivated plant has an arthropodicidal, preferably insecticidal, trait, it often occurs that the pest that should be combatted becomes resistant to that trait.

Resistance may be defined as 'a heritable change in the sensitivity of a pest population that is reflected in the repeated failure of a product to achieve the expected level of control when used according to the label recommendation for that pest species'. (IRAC) Resistance therefore means that the original activity of a pesticide against the target organisms (arthropods, insects) decreases or is even lost, due to genetic or metabolic adaptation of the target organism.

"Resistant" to an insecticide is understood to mean resistant to at least one insecticide or insecticidal trait, i.e. the insect may be resistant to only one, but also to several insecticides or insecticidal traits.

In the present context of cultivated plants with at least one insecticidal trait, the resistance is against an insecticidal effect which is due to a genetic modification of a plant (modified or transgenic plant), which caused a resistance of the plant or crop to certain pests, especially insect pests, in susceptible insects.

This is to be understood to include plants that are by the use of recombinant DNA techniques capable to synthesize one or more insecticidal proteins, especially those mentioned herein, especially those known from the bacterial genus *Bacillus*, particularly from *Bacillus thuringiensis*, such as endotoxins, e. g. CryIA(b), CryIA(c), CryIF, CryIF (a2), CryIIA(b), CryIIIA, CryIIIB(b1) or Cry9c; vegetative insecticidal proteins (VIP), e. g. VIP1, VIP2, VIP3 or VIP3A; insecticidal proteins of bacteria colonizing nematodes, for example *Photorhabdus* spp. or *Xenorhabdus* spp., and so on.

Therefore, in a most preferred embodiment, the present invention relates to a method of controlling harmful insects by treating cultivated plants, parts of such plants or their locus of growth with the carboxamide compound i) of formula (I), wherein the plant has at least one insecticidal trait, and wherein the harmful insects are resistant to that at least one insecticidal trait of the plant.

In another embodiment, the present invention relates to a method of controlling harmful insects by treating cultivated plants, parts of such plants or their locus of growth with the carboxamide compound ii) of formula (Ia), wherein the plant has at least one insecticidal trait, and wherein the harmful insects are resistant to that at least one insecticidal trait of the plant.

In still another embodiment, the present invention relates to a method of controlling harmful insects by treating cultivated plants, parts of such plants or their locus of growth with a mixture comprising the carboxamide compound i) and ii), wherein the plant has at least one insecticidal trait, and wherein the harmful insects are resistant to that at least one insecticidal trait of the plant.

Preferably, the present invention relates to a method of controlling harmful insects by treating cultivated plants, parts of such plants or their locus of growth with the carboxamide compound i) of formula (I), wherein the plant has at least one lepidopteran or coleopteran trait, and wherein the harmful insects are resistant to that lepidopteran or coleopteran insecticidal trait of the plant.

The present invention also relates to a method of controlling harmful insects by treating cultivated plants, parts of such plants or their locus of growth with the carboxamide compound ii) of formula (Ia), wherein the plant has at least one lepidopteran or coleopteran trait, and wherein the harmful insects are resistant to that lepidopteran or coleopteran insecticidal trait of the plant.

The present invention also relates to a method of controlling harmful insects by treating cultivated plants, parts of such plants or their locus of growth with a mixture comprising the carboxamide compounds i) and ii), wherein the plant has at least one lepidopteran or coleopteran trait, and wherein the harmful insects are resistant to that lepidopteran or coleopteran insecticidal trait of the plant.

Methods and uses of the invention as described herein may also involve a step of assessing whether insects are resistant to certain insecticides.

This step will in general involve collecting a sample of insects from the area (e.g. crop, field, habitat) to be treated, before actually applying the carboxamide compound I, preferably compound i) of formula (I), and testing (for example using any suitable phenotypic, biochemical or molecular biological technique applicable) for resistance/sensitivity.

In one embodiment, the present invention relates to a method of controlling harmful insects by treating cultivated plants, parts of such plants or their locus of growth with the carboxamide compound i) of formula (I), wherein the plant has at least one insecticidal trait, e.g. as listed in table A14 or B, and wherein the harmful insects are resistant to an insecticidal trait of the plant.

In another embodiment, the present invention relates to a method of controlling harmful insects by treating cultivated plants, parts of such plants or their locus of growth with the carboxamide compound ii) of formula (Ia), wherein the plant has at least one insecticidal trait, e.g. as listed in table A14 or B, and wherein the harmful insects are resistant to an insecticidal trait of the plant.

In still another embodiment, the present invention relates to a method of controlling harmful insects by treating cultivated plants, parts of such plants or their locus of growth with a mixture comprising the carboxamide compounds i) and ii), wherein the plant has at least one insecticidal trait, e.g. as listed in table A14 or B, and wherein the harmful insects are resistant to an insecticidal trait of the plant.

In a further preferred embodiment, the present invention relates to a method of controlling harmful insects and/or increasing the health of cultivated plants by treating cultivated plants, parts of such plants, plant propagation materials, or at their locus of growth with the carboxamide compound i) of formula (I) as component I and at least one compound II as component II, wherein the plant is a plant, which shows increased resistance against fungal, viral and bacterial diseases, more preferably a plant, which expresses antipathogenic substances, such as antifungal proteins, or which has systemic acquired resistance properties.

In another embodiment, the present invention relates to a method of controlling harmful insects and/or increasing the health of cultivated plants by treating cultivated plants, parts of such plants, plant propagation materials, or at their locus of growth with the carboxamide compound ii) of formula (Ia) as component I and at least one compound II as component II, wherein the plant is a plant, which shows increased resistance against fungal, viral and bacterial diseases, more preferably a plant, which expresses antipathogenic substances, such as antifungal proteins, or which has systemic acquired resistance properties.

In still another embodiment, the present invention relates to a method of controlling harmful insects and/or increasing the health of cultivated plants by treating cultivated plants, parts of such plants, plant propagation materials, or at their locus of growth with a mixture comprising carboxamide compounds i) and ii) as component I and at least one compound II as component II, wherein the plant is a plant, which shows increased resistance against fungal, viral and bacterial diseases, more preferably a plant, which expresses antipathogenic substances, such as antifungal proteins, or which has systemic acquired resistance properties.

In another utmost preference, the cultivated plants are plants, which are given in table A.

In a more preferred embodiment, the present invention relates to a method of controlling harmful insects and/or increasing the health of cultivated plants by treating cultivated plants, parts of such plants, plant propagation materials, or at their locus of growth with the mixture of the carboxamide compound i) of formula (I) as component I and at least one compound II as component II, wherein the plant corresponds to a row of table A as defined above.

In a more preferred embodiment, the present invention relates to a method of controlling harmful insects and/or increasing the health of cultivated plants by treating plant propagation materials, preferably seeds with the mixture of the carboxamide compound i) of formula (I) as component I and at least one compound II as component II, wherein the plant corresponds to a row of table A as defined above.

In another embodiment, the present invention relates to a method of controlling harmful insects and/or increasing the health of cultivated plants by treating cultivated plants, parts of such plants, plant propagation materials, or at their locus of growth with the mixture of the carboxamide compound ii) of formula (Ia) as component I and at least one compound II as component II, wherein the plant corresponds to a row of table A as defined above.

In another embodiment, the present invention relates to a method of controlling harmful insects and/or increasing the health of cultivated plants by treating plant propagation materials, preferably seeds with the mixture of the carboxamide compound ii) of formula (Ia) as component I and at least one compound II as component II, wherein the plant corresponds to a row of table A as defined above.

In another embodiment more preferred embodiment, the present invention relates to a method of controlling harmful insects and/or increasing the health of cultivated plants by treating cultivated plants, parts of such plants, plant propagation materials, or at their locus of growth with the mixture of 1) a mixture comprising the carboxamide compounds i) and ii) as component I and 2) at least one compound II as component II, wherein the plant corresponds to a row of table A as defined above.

In another embodiment, the present invention relates to a method of controlling harmful insects and/or increasing the health of cultivated plants by treating plant propagation materials, preferably seeds with the mixture of 1) a mixture comprising the carboxamide compounds i) and ii) as component I and 2) at least one compound II as component II, wherein the plant corresponds to a row of table A as defined above.

For the purpose of the present invention, the cultivated plant is preferably selected from the group consisting of soybean, cotton and maize, wherein the plant has been made tolerant to the action of certain herbicides as described above. It is particularly preferred that the cultivated plant is selected from the group consisting of soybean, cotton and maize, wherein the plant has been made tolerant to the action of glyphosate herbicides.

In one embodiment, the cultivated plant is a plant, which has been made tolerant to the action of glyphosate herbicides. In addition to the tolerance to glyphosate herbicides, the plant may have been made tolerant to other herbicides and/or resistant to certain insects, and/or the plant may have been genetically modified otherwise, e.g. in terms of abiotic stress tolerance, altered growth/yield, disease resistance, modified product quality or pollination control system.

In a particularly preferred embodiment, the present invention therefore relates to a method of controlling harmful insects and/or increasing the health of plants by treating cultivated plants, parts of such plants or their locus of growth with the mixture comprising the carboxamide compound i) of formula (I) as component I and at least one compound II as component II, wherein the plant is a glyphosate herbicide tolerant plant and corresponds to a row of table A14.

In a particularly preferred embodiment, the present invention therefore relates to a method of controlling harmful insects and/or increasing the health of plants by treating plant propagation material, preferably seeds with the mixture comprising the carboxamide compound i) of formula (I) as component I and at least one compound II as component II, wherein the plant is a glyphosate herbicide tolerant plant and corresponds to a row of table A14.

In particular, the present invention relates to a method of controlling harmful insects by treating cultivated plants, parts of such plants or their locus of growth with the carboxamide compound i) of formula (I), wherein the plant having the insecticidal trait corresponds to a row of table A14, and wherein the harmful insects are resistant to an insecticidal trait of the plant.

TABLE A14

| No | traits | event | crop | Developer/commercial plants |
|---|---|---|---|---|
| A14-1 | Glufosinate tolerance + Glyphosate tolerance + 2,4-D herbicide tolerance | DAS44406-6 | *Glycine max* L. (soybean) | Dow AgroSciences LLC |
| A14-2 | Glufosinate tolerance + Glyphosate tolerance + 2,4-D herbicide tolerance | DAS68416-4 × MON89788 | *Glycine max* L. (soybean) | Dow AgroSciences LLC |
| A14-3 | Glyphosate tolerance + Isoxaflutole tolerance | FG72 (FGØ72-2, FGØ72-3) | *Glycine max* L. (soybean) | Bayer CropScience and MS Technologies LLC |
| A14-4 | Glyphosate tolerance + Enhanced Photosynthesis/Yield | MON 87712 | *Glycine max* L. (soybean) | Monsanto Company |
| A14-5 | Glyphosate tolerance + Lepidopteran resistance | MON87701 × MON89788 | *Glycine max* L. (soybean) | available, Monsanto Company; Intacta ™ Roundup Ready ™ 2 Pro |
| A14-6 | Glyphosate tolerance + Modified oil/fatty acid | MON87705 | *Glycine max* L. (soybean) | available, Monsanto Company; Vistive Gold ™ |
| A14-7 | Glyphosate tolerance + Modified oil/fatty acid | MON87705 × MON89788 | *Glycine max* L. (soybean) | Monsanto Company |
| A14-8 | Glyphosate tolerance + Dicamba tolerance | MON87708 | *Glycine max* L. (soybean) | available, Monsanto Company, Genuity ® Roundup Ready ™ 2 Xtend ™ |
| A14-9 | Glyphosate tolerance + Dicamba tolerance | MON87708 × MON89788 | *Glycine max* L. (soybean) | Monsanto Company |
| A14-10 | Glyphosate tolerance + Modified oil/fatty acid | MON87769 | *Glycine max* L. (soybean) | Monsanto Company |
| A14-11 | Glyphosate tolerance + Modified oil/fatty acid | MON87769 × MON89788 | *Glycine max* L. (soybean) | Monsanto Company |
| A14-12 | Glyphosate tolerance + Lepidopteran resistance + Antibiotic resistance + Visual marker | COT102 × MON15985 × MON88913 | *Gossypium hirsutum* L. (cotton) | available, Monsanto Company; Bollgard ® III × Roundup Ready ™ Flex ™ |
| A14-13 | Glufosinate tolerance + Glyphosate tolerance + Lepidopteran resistance + Antibiotic resistance | 3006-210-23 × 281-24-236 × MON88913 × COT102 | *Gossypium hirsutum* L. (cotton) | available, Dow AgroSciences LLC; Widestrike ™ × Roundup Ready Flex ™ × VIPCOT ™ Cotton |
| A14-14 | Glyphosate tolerance + Lepidopteran resistance + Antibiotic resistance | COT102 × COT67B × MON88913 | *Gossypium hirsutum* L. (cotton) | available, Syngenta and Monsanto Company; VIPCOT ™ Roundup Ready Flex ™ Cotton |
| A14-15 | Glufosinate tolerance + Glyphosate tolerance | GHB614 × LLCotton25 | *Gossypium hirsutum* L. (cotton) | available, Bayer CropScience; GlyTol ™ Liberty Link ™ |
| A14-16 | Glufosinate tolerance + Glyphosate tolerance + Lepidopteran resistance + Antibiotic resistance + Visual marker | GHB614 × LLCotton25 × MON15985 | *Gossypium hirsutum* L. (cotton) | Bayer CropScience |
| A14-17 | Glyphosate tolerance + Lepidopteran resistance | GHB614 × MON15985 | *Gossypium hirsutum* L. (cotton) | Bayer CropScience |
| A14-18 | Glufosinate tolerance + Glyphosate tolerance + Lepidopteran resistance | GHB614 × T304-40 × GHB119 | *Gossypium hirsutum* L. (cotton) | available, Bayer CropScience; GlyTol ™ Liberty Link ™ |

TABLE A14-continued

| No | traits | event | crop | Developer/commercial plants |
|---|---|---|---|---|
| A14-19 | Glyphosate tolerance + Antibiotic resistance | MON1698 | *Gossypium hirsutum* L. (cotton) | available, Monsanto Company; Roundup Ready ™ Cotton |
| A14-20 | Glufosinate tolerance + Glyphosate tolerance + Lepidopteran resistance + Modified alpha amylase + Mannose metabolism | 3272 × Bt11 × GA21 | *Zea mays* L. (corn, maize) | Syngenta |
| A14-21 | Glufosinate tolerance + Glyphosate tolerance + Coleopteran resistance + Lepidopteran resistance + Modified alpha amylase + Mannose metabolism | 3272 × BT11 × MIR604 × GA21 | *Zea mays* L. (corn, maize) | Syngenta |
| A14-22 | Glyphosate tolerance + Modified alpha amylase + Mannose metabolism | 3272 × GA21 | *Zea mays* L. (corn, maize) | Syngenta |
| A14-23 | Glyphosate tolerance + Coleopteran resistance + Modified alpha amylase + Mannose metabolism | 3272 × MIR604 × GA21 | *Zea mays* L. (corn, maize) | Syngenta |
| A14-24 | Glufosinate tolerance + Glyphosate tolerance + Coleopteran resistance + Lepidopteran resistance + Modified alpha amylase + Mannose metabolism | 5307 × MIR604 × Bt11 × TC1507 × GA21 | *Zea mays* L. (corn, maize) | available, Syngenta; Agrisure ® Duracade ™ 5122 |
| A14-25 | Glufosinate tolerance + Glyphosate tolerance + Coleopteran resistance + Lepidopteran resistance + Modified alpha amylase + Mannose metabolism | 5307 × MIR604 × Bt11 × TC1507 × GA21 × MIR162 | *Zea mays* L. (corn, maize) | available, Syngenta; Agrisure ® Duracade ™ 5222 |
| A14-26 | Glufosinate tolerance + Glyphosate tolerance + Coleopteran resistance | 59122 × GA21 | *Zea mays* L. (corn, maize) | Syngenta |
| A14-27 | Glufosinate tolerance + Glyphosate tolerance + Coleopteran resistance + Mannose metabolism | 59122 × MIR604 × GA21 | *Zea mays* L. (corn, maize) | Syngenta |
| A14-28 | Glufosinate tolerance + Glyphosate tolerance + Coleopteran resistance + Lepidopteran resistance + Mannose metabolism | 59122 × MIR604 × TC1507 × GA21 | *Zea mays* L. (corn, maize) | Syngenta |
| A14-29 | Glufosinate tolerance + Glyphosate tolerance + Coleopteran resistance + Lepidopteran resistance | 59122 × MON810 × NK603 | *Zea mays* L. (corn, maize) | DuPont (Pioneer Hi-Bred International Inc.) |
| A14-30 | Glufosinate tolerance + Glyphosate tolerance + Coleopteran resistance | 59122 × MON88017 | *Zea mays* L. (corn, maize) | Monsanto Company |
| A14-31 | Glufosinate tolerance + Glyphosate tolerance + Coleopteran resistance + Lepidopteran resistance | 59122 × TC1507 × GA21 | *Zea mays* L. (corn, maize) | Syngenta |
| A14-32 | Glufosinate tolerance + Glyphosate tolerance + Sulfonylurea tolerance + Coleopteran resistance | 98140 × 59122 | *Zea mays* L. (corn, maize) | Dow AgroSciences LLC and DuPont (Pioneer Hi-Bred International Inc.) |
| A14-33 | Glufosinate tolerance + Glyphosate tolerance + Sulfonylurea tolerance + Lepidopteran resistance | 98140 × TC1507 | *Zea mays* L. (corn, maize) | Dow AgroSciences LLC and DuPont (Pioneer Hi-Bred International Inc.) |
| A14-34 | Glufosinate tolerance + Glyphosate tolerance + Sulfonylurea tolerance + Coleopteran resistance + Lepidopteran resistance | 98140 × TC1507 × 59122 | *Zea mays* L. (corn, maize) | Dow AgroSciences LLC and DuPont (Pioneer Hi-Bred International Inc.) |
| A14-35 | Glufosinate tolerance + Glyphosate tolerance + Coleopteran resistance + Lepidopteran resistance | Bt11 × 59122 × GA21 | *Zea mays* L. (corn, maize) | Syngenta |
| A14-36 | Glufosinate tolerance + Glyphosate tolerance + Coleopteran resistance + | Bt11 × 59122 × MIR604 × GA21 | *Zea mays* L. (corn, maize) | Syngenta |

TABLE A14-continued

| No | traits | event | crop | Developer/commercial plants |
|---|---|---|---|---|
| A14-37 | Glufosinate tolerance + Glyphosate tolerance + Coleopteran resistance + Lepidopteran resistance + Mannose metabolism | BT11 × 59122 × MIR604 × TC1507 × GA21 | Zea mays L. (corn, maize) | available, Syngenta; Agrisure ® 3122 |
| A14-38 | Glufosinate tolerance + Glyphosate tolerance + Coleopteran resistance + Lepidopteran resistance | Bt11 × 59122 × TC1507 × GA21 | Zea mays L. (corn, maize) | Syngenta |
| A14-39 | Glufosinate tolerance + Glyphosate tolerance + Lepidopteran resistance + Mannose metabolism resistance | Bt11 × MIR162 × GA21 | Zea mays L. (corn, maize) | available, Syngenta; Agrisure ® Viptera ™ 3110 |
| A14-40 | Glufosinate tolerance + Glyphosate tolerance + Coleopteran resistance + Lepidopteran resistance + Mannose metabolism | Bt11 × MIR162 × MIR604 × GA21 | Zea mays L. (corn, maize) | available, Syngenta; Agrisure ® Viptera ™ 3111, Agrisure ® Viptera ™ 4 |
| A14-41 | Glufosinate tolerance + Glyphosate tolerance + Lepidopteran resistance + Mannose metabolism | Bt11 × MIR162 × TC1507 × GA21 | Zea mays L. (corn, maize) | available, Syngenta; Agrisure ™ Viptera 3220 |
| A14-42 | Glufosinate tolerance + Glyphosate tolerance + Lepidopteran resistance | Bt11 × TC1507 × GA21 | Zea mays L. (corn, maize) | Syngenta |
| A14-43 | Glyphosate tolerance + 2,4-D herbicide tolerance | DAS40278 × NK603 | Zea mays L. (corn, maize) | Dow AgroSciences LLC |
| A14-44 | Glyphosate tolerance | HCEM485 | Zea mays L. (corn, maize) | Stine Seed Farm, Inc (USA) |
| A14-45 | Glyphosate tolerance + Lepidopteran resistance + Mannose metabolism | MIR162 × GA21 | Zea mays L. (corn, maize) | Syngenta |
| A14-46 | Glyphosate tolerance + Coleopteran resistance + Lepidopteran resistance + Mannose metabolism | MIR162 × MIR604 × GA21 | Zea mays L. (corn, maize) | Syngenta |
| A14-47 | Glyphosate tolerance + Coleopteran resistance + Lepidopteran resistance + Mannose metabolism | MIR162 × TC1507 × GA21 | Zea mays L. (corn, maize) | Syngenta |
| A14-48 | Glyphosate tolerance + Coleopteran resistance + Mannose metabolism | MIR604 × GA21 | Zea mays L. (corn, maize) | available, Syngenta; Agrisure ™ GT/RW |
| A14-49 | Glyphosate tolerance + Coleopteran resistance + Mannose metabolism | MIR604 × NK603 | Zea mays L. (corn, maize) | DuPont (Pioneer Hi-Bred International Inc.) |
| A14-50 | Glyphosate tolerance + Lepidopteran resistance + antibiotic resistance | MON801 (MON80100) | Zea mays L. (corn, maize) | Monsanto Company |
| A14-51 | Glyphosate tolerance + Lepidopteran resistance + antibiotic resistance | MON810 | Zea mays L. (corn, maize) | available, Monsanto Company; Yield-Card ™, Maize-Gard ™ |
| A14-52 | Glyphosate tolerance + Coleopteran resistance | MON87411 | Zea mays L. (corn, maize) | Monsanto Company |
| A14-53 | Glyphosate tolerance | MON87427 | Zea mays L. (corn, maize) | available, Monsanto Company; Roundup Ready ™ Maize |
| A14-54 | Glyphosate tolerance + Coleopteran resistance + Lepidopteran resistance | MON87427 × MON89034 × MON88017 | Zea mays L. (corn, maize) | Monsanto Company |
| A14-55 | Glyphosate tolerance + + Lepidopteran resistance | MON87427 × MON89034 × NK603 | Zea mays L. (corn, maize) | Monsanto Company |
| A14-56 | Glufosinate tolerance + Glyphosate tolerance + Coleopteran resistance + Lepidopteran resistance | MON87427 × MON89Ø34 × TC15Ø7 × MON88Ø17 × 59122 | Zea mays L. (corn, maize) | Monsanto Company |
| A14-57 | Glyphosate tolerance + Coleopteran resistance + Lepidopteran resistance + Drought stress tolerance + Antibiotic resistance | MON87460 × MON89034 × MON88017 | Zea mays L. (corn, maize) | Monsanto Company |

TABLE A14-continued

| No | traits | event | crop | Developer/commercial plants |
|---|---|---|---|---|
| A14-58 | Glyphosate tolerance + + Lepidopteran resistance + Drought stress tolerance + Antibiotic resistance | MON87460 × MON89034 × NK603 | Zea mays L. (corn, maize) | Monsanto Company |
| A14-59 | Glyphosate tolerance + Drought stress tolerance + Antibiotic resistance | MON87460 × NK603 | Zea mays L. (corn, maize) | Monsanto Company |
| A14-60 | Glufosinate tolerance + Glyphosate tolerance + Coleopteran resistance + Lepidopteran resistance | MON89034 × 59122 × MON88017 | Zea mays L. (corn, maize) | Monsanto Company |
| A14-61 | Glufosinate tolerance + Glyphosate tolerance + Coleopteran resistance + Lepidopteran resistance | MON89034 × TC1507 × MON88017 | Zea mays L. (corn, maize) | Monsanto Company |
| A14-62 | Glufosinate tolerance + Glyphosate tolerance + Coleopteran resistance + Lepidopteran resistance | MON89034 × TC1507 × MON88017 × 59122 | Zea mays L. (corn, maize) | available, Monsanto Company; Genuity ® SmartStax ™ |
| A14-63 | Glufosinate tolerance + Glyphosate tolerance + Coleopteran resistance + Lepidopteran resistance + 2,4-D herbicide tolerance | MON89034 × TC1507 × MON88017 × 59122 × DAS40278 | Zea mays L. (corn, maize) | Dow AgroSciences LLC |
| A14-64 | Glufosinate tolerance + Glyphosate tolerance + Coleopteran resistance + Lepidopteran resistance + 2,4-D herbicide tolerance | MON89034 × TC1507 × MON88017 × DAS40278 | Zea mays L. (corn, maize) | Dow AgroSciences LLC |
| A14-65 | Glufosinate tolerance + Glyphosate tolerance + Lepidopteran resistance | MON89034 × TC1507 × NK603 | Zea mays L. (corn, maize) | available, Monsanto Company and Dow AgroSciences LLC; Power Core ™ |
| A14-66 | Glufosinate tolerance + Glyphosate tolerance + Lepidopteran resistance + 2,4-D herbicide tolerance | MON89034 × TC1507 × NK603 × DAS40278 | Zea mays L. (corn, maize) | Dow AgroSciences LLC |
| A14-67 | Glufosinate tolerance + Glyphosate tolerance + Coleopteran resistance + Lepidopteran resistance + Antibiotic resistance + Mannose metabolism | NK603 × MON810 × 4114 × MIR604 | Zea mays L. (corn, maize) | Syngenta and Monsanto Company |
| A14-68 | Glufosinate tolerance + Glyphosate tolerance + Antibiotic resistance | NK603 × T25 | Zea mays L. (corn, maize) | available, Monsanto Company; Roundup Ready ™ Liberty Link ™ Maize |
| A14-69 | Glufosinate tolerance + Glyphosate tolerance + Coleopteran resistance + Lepidopteran resistance + Mannose metabolism | TC1507 × 59122 × MON810 × MIR604 × NK603 | Zea mays L. (corn, maize) | available, DuPont (Pioneer Hi-Bred International Inc.); Optimum ™ Intrasect Xtrenne |
| A14-70 | Glufosinate tolerance + Glyphosate tolerance + Coleopteran resistance + Lepidopteran resistance + Antibiotic resistance + Mannose metabolism | TC1507 × MON810 × MIR604 × NK603 | Zea mays L. (corn, maize) | DuPont (Pioneer Hi-Bred International Inc.) |
| A14-71 | Glufosinate tolerance + Glyphosate tolerance + Coleopteran resistance + Lepidopteran resistance | TC1507 × 59122 × MON810 × NK603 | Zea mays L. (corn, maize) | available, DuPont (Pioneer Hi-Bred International Inc.); Optimum ™ Intrasect XTRA |
| A14-72 | Glufosinate tolerance + Glyphosate tolerance + Coleopteran resistance + Lepidopteran resistance | TC1507 × 59122 × MON88017 | Zea mays L. (corn, maize) | Monsanto Company and Dow AgroSciences LLC |
| A14-73 | Glufosinate tolerance + Glyphosate tolerance + Coleopteran resistance + Lepidopteran resistance | TC1507 × 59122 × NK603 | Zea mays L. (corn, maize) | available, Dow AgroSciences LLC and DuPont (Pioneer Hi-Bred International Inc.); Herculex XTRA ™ RR |
| A14-74 | Glufosinate tolerance + Glyphosate tolerance + Lepidopteran resistance | TC1507 × GA21 | Zea mays L. (corn, maize) | DuPont (Pioneer Hi-Bred International Inc.) |

TABLE A14-continued

| No | traits | event | crop | Developer/commercial plants |
|---|---|---|---|---|
| A14-75 | Glufosinate tolerance + Glyphosate tolerance + Coleopteran resistance + Lepidopteran resistance + Mannose metabolism | TC1507 × MIR604 × NK603 | Zea mays L. (corn, maize) | available, DuPont (Pioneer Hi-Bred International Inc.); Optimum ™ TRIsect |
| A14-76 | Glufosinate tolerance + Glyphosate tolerance + Lepidopteran resistance + Mannose metabolism | TC1507 × MON810 × MIR162 × NK603 | Zea mays L. (corn, maize) | DuPont (Pioneer Hi-Bred International Inc.) |
| A14-77 | Glufosinate tolerance + Glyphosate tolerance + Lepidopteran resistance | TC1507 × MON810 × NK603 | Zea mays L. (corn, maize) | available, DuPont (Pioneer Hi-Bred International Inc.); Optimum ™ Intrasect |
| A14-78 | Glufosinate tolerance + Glyphosate tolerance + Coleopteran resistance + Lepidopteran resistance | TC1507 × MON88017 | Zea mays L. (corn, maize) | Monsanto Company and Dow AgroSciences LLC |
| A14-79 | Glyphosate tolerance | VCO-Ø1981-5 | Zea mays L. (corn, maize) | Genective S. A. |

In another embodiment, the present invention relates to a method of controlling harmful insects and/or increasing the health of plants by treating cultivated plants, parts of such plants or their locus of growth with the mixture comprising the carboxamide compound ii) of formula (Ia) as component I and at least one compound II as component II, wherein the plant is a glyphosate herbicide tolerant plant and corresponds to a row of table A14.

In a particularly preferred embodiment, the present invention therefore relates to a method of controlling harmful insects and/or increasing the health of plants by treating plant propagation material, preferably seeds with the mixture comprising the carboxamide compound ii) of formula (Ia) as component I and at least one compound II as component II, wherein the plant is a glyphosate herbicide tolerant plant and corresponds to a row of table A14.

In particular, the present invention relates to a method of controlling harmful insects by treating cultivated plants, parts of such plants or their locus of growth with the carboxamide compound ii) of formula (Ia), wherein the plant having the insecticidal trait corresponds to a row of table A14, and wherein the harmful insects are resistant to an insecticidal trait of the plant.

In still another embodiment, the present invention relates to a method of controlling harmful insects and/or increasing the health of plants by treating cultivated plants, parts of such plants or their locus of growth with the mixture comprising 1) a mixture comprising the carboxamide compounds i) and ii) as component I and 2) at least one compound II as component II, wherein the plant is a glyphosate herbicide tolerant plant and corresponds to a row of table A14.

In a particularly preferred embodiment, the present invention therefore relates to a method of controlling harmful insects and/or increasing the health of plants by treating plant propagation material, preferably seeds with the mixture comprising 1) a mixture comprising the carboxamide compounds i) and ii) as component I and 2) at least one compound II as component II, wherein the plant is a glyphosate herbicide tolerant plant and corresponds to a row of table A14.

In particular, the present invention relates to a method of controlling harmful insects by treating cultivated plants, parts of such plants or their locus of growth with a mixture comprising the carboxamide compounds i) and ii), wherein the plant having the insecticidal trait corresponds to a row of table A14, and wherein the harmful insects are resistant to an insecticidal trait of the plant.

Insect resistance, in particular lepidopteran resistance is of growing importance in GMO crops. Furthermore, it has been found that insects often become resistant to the crops, which have been modified in terms of insect resistance. It has been found that the carboxamide compound I, preferably compound i) of formula (I) are particularly suitable for combating insects, which have become resistant to the crops, which have been modified in terms of insect resistance. In particular, the carboxamide compound I, preferably compound i) of formula (I) may advantageously be applied in soybeans, which habe been made resistant to insects.

In one embodiment, the cultivated plant is soybean, which has been made resistant to lepidoperan insects. In addition to the resistance to lepidoperan insects, the soybean may have been made tolerant to certain herbicides and/or resistant to other insects, and/or the soybean may have been genetically modified otherwise, e.g. in terms of abiotic stress tolerance, altered growth/yield, disease resistance, modified product quality or pollination control system.

In a particularly preferred embodiment, the present invention relates to a method of controlling harmful insects and/or increasing the health of plants by treating cultivated plants, parts of such plants or their locus of growth with the carboxamide compound i) of formula (I), wherein the plant is a lepidopteran insect resistant soybean and corresponds to a row of table B as provided above.

In a particularly preferred embodiment, the present invention therefore relates to a method of controlling harmful insects and/or increasing the health of plants by treating plant propagation material, preferably seeds with the carboxamide compound i) of formula (I), wherein the plant is a lepidopteran insect resistant soybean and corresponds to a row of table B as provided above.

In another embodiment, the present invention relates to a method of controlling harmful insects and/or increasing the health of plants by treating cultivated plants, parts of such plants or their locus of growth with the carboxamide compound ii) of formula (Ia), wherein the plant is a lepidopteran insect resistant soybean and corresponds to a row of table B as provided above.

In another embodiment, the present invention therefore relates to a method of controlling harmful insects and/or increasing the health of plants by treating plant propagation material, preferably seeds with the carboxamide compound I, preferably compound ii) of formula (Ia), wherein the plant is a lepidopteran insect resistant soybean and corresponds to a row of table B as provided above.

In another embodiment, the present invention relates to a method of controlling harmful insects and/or increasing the health of plants by treating cultivated plants, parts of such plants or their locus of growth with a mixture comprising the carboxamide compounds i) and ii), wherein the plant is a lepidopteran insect resistant soybean and corresponds to a row of table B as provided above.

In another embodiment, the present invention therefore relates to a method of controlling harmful insects and/or increasing the health of plants by treating plant propagation material, preferably seeds with a mixture comprising the carboxamide compounds i) and ii), wherein the plant is a lepidopteran insect resistant soybean and corresponds to a row of table B as provided above.

Lepidopteran resistance of soybeans is typically achieved by introducing a gene selected from the group consisting of: cry1Ac (gene source: *Bacillus thuringiensis* subsp. *Kurstaki* strain H D73), cry1F (gene source: *Bacillus thuringiensis* var. *aizawai*), cry1A.105 (gene source: *Bacillus thuringiensis* subsp. *Kumamotoensis*), cry2Ab2 (gene source: *Bacillus thuringiensis* subsp. *Kumamotoensis*), and combinations thereof. In addition, the soybeans may be modified e.g. in terms of herbicide tolerance by introducing a suitable gene such as pat (gene source: *Streptomyces viridochromogenes*), which provides glufosinate tolerance or cp4 epsps (aroA: CP4) (gene source: *Agrobacterium tumefaciens* strain CP4), which provides glyphosate tolerance. Preferably, the soybeans are additionally modified in terms of glyphosate tolerance by introducing the gene cp4 epsps (aroA:CP4).

In a particularly preferred embodiment, the present invention therefore relates to a method of controlling harmful insects and/or increasing the health of plants by treating cultivated plants, parts of such plants or their locus of growth with the carboxamide compound i) of formula (I), wherein the plant is a lepidopteran insect resistant soybean, which has been modified by introducing at least one gene or at least one gene combination, which corresponds to a row of table C as provided above.

In a particularly preferred embodiment, the present invention therefore relates to a method of controlling harmful insects and/or increasing the health of plants by treating plant propagation material, preferably seeds with the carboxamide compound i) of formula (I), wherein the plant is a lepidopteran insect resistant soybean, which has been modified by introducing at least one gene or at least one gene combination, which corresponds to a row of table C as provided above. of formula In another embodiment, the present invention therefore relates to a method of controlling harmful insects and/or increasing the health of plants by treating cultivated plants, parts of such plants or their locus of growth with the carboxamide compound ii) of formula (Ia), wherein the plant is a lepidopteran insect resistant soybean, which has been modified by introducing at least one gene or at least one gene combination, which corresponds to a row of table C as provided above.

In another embodiment, the present invention therefore relates to a method of controlling harmful insects and/or increasing the health of plants by treating plant propagation material, preferably seeds with the carboxamide compound ii) of formula (Ia), wherein the plant is a lepidopteran insect resistant soybean, which has been modified by introducing at least one gene or at least one gene combination, which corresponds to a row of table C as provided above.

In still another embodiment, the present invention relates to a method of controlling harmful insects and/or increasing the health of plants by treating cultivated plants, parts of such plants or their locus of growth with a mixture comprising the carboxamide compounds i) and ii), wherein the plant is a lepidopteran insect resistant soybean, which has been modified by introducing at least one gene or at least one gene combination, which corresponds to a row of table C as provided above.

In still another embodiment, the present invention relates to a method of controlling harmful insects and/or increasing the health of plants by treating plant propagation material, preferably seeds with a mixture comprising the carboxamide compounds i) and ii), wherein the plant is a lepidopteran insect resistant soybean, which has been modified by introducing at least one gene or at least one gene combination, which corresponds to a row of table C as provided above.

The present invention also relates to a method for controlling pests and/or increasing the plant health of a cultivated plant as compared to the respective non-modified control plant, comprising the application of the carboxamide compound i) of formula (I), to a plant with at least one modification, parts of such plant, plant propagation material, or at its locus of growth, wherein the cultivated plant is
  (i) *Gossypium hirsutum* L. (cotton) or *Zea mays* L. (maize) and comprises at least one gene selected from the group consisting of dvsnf7, cry1A, cry1Ab-Ac, cry1C, cry2Ab2, cry2Ae, mocry1F; or
  (ii) *Glycine max* L. (soybean), *Triticum aestivum* (wheat) or *Oryza sativa* L. (rice) and comprises at least one gene selected from the group consisting of cry34Ab1, cry35 Ab1, cry3A, cry3Bb1, dvsnf7, mcry3A, cry1A, cry1A.105, cry1Ab, cry1Ab-Ac, cry1Ac, cry1C, cry1F, cry1Fa2, cry2Ab2, cry2Ae, cry9c, mocry1F, pinII, vip3A(a), vip3Aa20.

The invention also relates to a method for controlling pests and/or increasing the plant health of a cultivated plant as compared to the respective non-modified control plant, comprising the application of the carboxamide compound ii) of formula (Ia), to a plant with at least one modification, parts of such plant, plant propagation material, or at its locus of growth, wherein the cultivated plant is
  (i) *Gossypium hirsutum* L. (cotton) or *Zea mays* L. (maize) and comprises at least one gene selected from the group consisting of dvsnf7, cry1A, cry1Ab-Ac, cry1C, cry2Ab2, cry2Ae, mocry1F; or
  (ii) *Glycine max* L. (soybean), *Triticum aestivum* (wheat) or *Oryza sativa* L. (rice) and comprises at least one gene selected from the group consisting of cry34Ab1, cry35 Ab1, cry3A, cry3Bb1, dvsnf7, mcry3A, cry1A, cry1A.105, cry1Ab, cry1Ab-Ac, cry1Ac, cry1C, cry1F, cry1Fa2, cry2Ab2, cry2Ae, cry9c, mocry1F, pinII, vip3A(a), vip3Aa20.

The invention also relates to a method for controlling pests and/or increasing the plant health of a cultivated plant as compared to the respective non-modified control plant, comprising the application of a mixture comprising the carboxamide compounds i) and ii) to a plant with at least one modification, parts of such plant, plant propagation material, or at its locus of growth, wherein the cultivated plant is
  (i) *Gossypium hirsutum* L. (cotton) or *Zea mays* L. (maize) and comprises at least one gene selected from the group consisting of dvsnf7, cry1A, cry1Ab-Ac, cry1C, cry2Ab2, cry2Ae, mocry1F; or (ii) *Glycine max* L. (soybean), *Triticum aestivum* (wheat) or *Oryza sativa* L. (rice) and comprises at least one gene selected from the group consisting of cry34Ab1, cry35 Ab1, cry3A, cry3Bb1, dvsnf7, mcry3A, cry1A, cry1A.105, cry1Ab, cry1Ab-Ac, cry1Ac, cry1C, cry1F, cry1Fa2, cry2Ab2, cry2Ae, cry9c, mocry1F, pinII, vip3A(a), vip3Aa20.

Preferably, present invention also relates to a method for controlling pests and/or increasing the plant health of a cultivated plant as compared to the respective non-modified control plant, comprising the application of the carboxamide compound i) of formula (I), to a plant with at least one modification, parts of such plant, plant propagation material, or at its locus of growth, wherein the cultivated plant is modified by at least one gene according to one row of table D.

TABLE D

| No. | crop | gene |
|---|---|---|
| D-1 | cotton | dvsnf7 |
| D-2 | cotton | cry1A |
| D-3 | cotton | cry1Ab-Ac |
| D-4 | cotton | cry1C |
| D-5 | cotton | cry2Ab2 |
| D-6 | cotton | cry2Ae |
| D-7 | cotton | mocry1F |
| D-8 | maize | dvsnf7 |
| D-9 | maize | cry1A |
| D-10 | maize | cry1Ab-Ac |
| D-11 | maize | cry1C |
| D-12 | maize | cry2Ab2 |
| D-13 | maize | cry2Ae |
| D-14 | maize | mocry1F |
| D-15 | soybean | cry34Ab1 |
| D-16 | soybean | cry35 Ab1 |
| D-17 | soybean | cry3A |
| D-18 | soybean | cry3Bb1 |
| D-19 | soybean | dvsnf7 |
| D-20 | soybean | mcry3A |
| D-21 | soybean | cry1A |
| D-22 | soybean | cry1A.105 |
| D-23 | soybean | cry1Ab |
| D-24 | soybean | cry1Ab-Ac |
| D-25 | soybean | cry1Ac |
| D-26 | soybean | cry1C |
| D-27 | soybean | cry1F |
| D-28 | soybean | cry1Fa2 |
| D-29 | soybean | cry2Ab2 |
| D-30 | soybean | cry2Ae |
| D-31 | soybean | cry9c |
| D-32 | soybean | mocry1F |
| D-33 | soybean | pinII |
| D-34 | soybean | vip3A(a) |
| D-35 | soybean | vip3Aa20 |
| D-36 | wheat | cry34Ab1 |
| D-37 | wheat | cry35 Ab1 |
| D-38 | wheat | cry3A |
| D-39 | wheat | cry3Bb1 |
| D-40 | wheat | dvsnf7 |
| D-41 | wheat | mcry3A |
| D-42 | wheat | cry1A |
| D-43 | wheat | cry1A.105 |
| D-44 | wheat | cry1Ab |
| D-45 | wheat | cry1Ab-Ac |
| D-46 | wheat | cry1Ac |
| D-47 | wheat | cry1C |
| D-48 | wheat | cry1F |
| D-49 | wheat | cry1Fa2 |
| D-50 | wheat | cry2Ab2 |
| D-51 | wheat | cry2Ae |
| D-52 | wheat | cry9c |
| D-53 | wheat | mocry1F |
| D-54 | wheat | pinII |
| D-55 | wheat | vip3A(a) |
| D-56 | wheat | vip3Aa20 |
| D-57 | rice | cry34Ab1 |
| D-58 | rice | cry35 Ab1 |
| D-59 | rice | cry3A |
| D-60 | rice | cry3Bb1 |
| D-61 | rice | dvsnf7 |
| D-62 | rice | mcry3A |
| D-63 | rice | cry1A |
| D-64 | rice | cry1A.105 |
| D-65 | rice | cry1Ab |
| D-66 | rice | cry1Ab-Ac |
| D-67 | rice | cry1Ac |
| D-68 | rice | cry1C |
| D-69 | rice | cry1F |
| D-70 | rice | cry1Fa2 |
| D-71 | rice | cry2Ab2 |
| D-72 | rice | cry2Ae |
| D-73 | rice | cry9c |
| D-74 | rice | mocry1F |
| D-75 | rice | pinII |
| D-76 | rice | vip3A(a) |
| D-77 | rice | vip3Aa20 |

In another embodiment, the invention also relates to a method for controlling pests and/or increasing the plant health of a cultivated plant as compared to the respective non-modified control plant, comprising the application of the carboxamide compound ii) of formula (Ia), to a plant with at least one modification, parts of such plant, plant propagation material, or at its locus of growth, wherein the cultivated plant is modified by at least one gene according to one row of table D.

In another embodiment, the invention also relates to a method for controlling pests and/or increasing the plant health of a cultivated plant as compared to the respective non-modified control plant, comprising the application of a mixture comprising the carboxamide compounds i) and ii) to a plant with at least one modification, parts of such plant, plant propagation material, or at its locus of growth, wherein the cultivated plant is modified by at least one gene according to one row of table D.

Further preferred embodiments of the invention are those methods of controlling harmful insects and/or increasing the health of plants by treating cultivated plants, parts of such plants or at their locus of growth with the mixture of the carboxamide compound i) of formula (I) as component I and at least one compound II as component II, wherein the plant expresses one or more genes selected from CP4 epsps, pat, bar, Cry1Ab, Cry1Ac, Cry3Bb1, Cry2Ab, Cry1F, Cry34Ab1 and Cry35Ab1.

Further embodiments of the invention are those methods of controlling harmful insects and/or increasing the health of plants by treating cultivated plants, parts of such plants or at their locus of growth with the mixture of the carboxamide compound ii) of formula (Ia) as component I and at least one compound II as component II, wherein the plant expresses one or more genes selected from CP4 epsps, pat, bar, Cry1Ab, Cry1Ac, Cry3Bb1, Cry2Ab, Cry1F, Cry34Ab1 and Cry35Ab1.

Further embodiments of the invention are those methods of controlling harmful insects and/or increasing the health of plants by treating cultivated plants, parts of such plants or at their locus of growth with the mixture of 1) a mixture comprising the carboxamide compounds i) and ii) as component I and 2) at least one compound II as component II, wherein the plant expresses one or more genes selected from CP4 epsps, pat, bar, Cry1Ab, Cry1Ac, Cry3Bb1, Cry2Ab, Cry1F, Cry34Ab1 and Cry35Ab1.

In a more preferred embodiment, the present invention relates of methods of controlling harmful insects and/or increasing the health of plants by foliar application on cultivated plants or on foliar parts of such plants of the mixture of the carboxamide compound i) of formula (I) as component I and at least one compound II as component II, wherein component II is teflubenzuron and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In another embodiment, the present invention relates of methods of controlling harmful insects and/or increasing the health of plants by foliar application on cultivated plants or on foliar parts of such plants of the mixture of the carboxamide compound ii) of formula (Ia) as component I and at least one compound II as component II, wherein component II is teflubenzuron and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In another embodiment, the present invention relates of methods of controlling harmful insects and/or increasing the health of plants by foliar application on cultivated plants or on foliar parts of such plants of the mixture of 1) a mixture comprising the carboxamide compounds i) and ii) as component I and 2) at least one compound II as component II, wherein component II is teflubenzuron and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In a more preferred embodiment, the present invention relates of methods of controlling harmful insects and/or increasing the health of plants by foliar application on cultivated plants or on foliar parts of such plants of the mixture of the carboxamide compound i) of formula (I) as component I and at least one compound II as component II, wherein component II is chlorfenapyr and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In another embodiment, the present invention relates of methods of controlling harmful insects and/or increasing the health of plants by foliar application on cultivated plants or on foliar parts of such plants of the mixture of the carboxamide compound ii) of formula (Ia) as component I and at least one compound II as component II, wherein component II is chlorfenapyr and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In another embodiment, the present invention relates of methods of controlling harmful insects and/or increasing the health of plants by foliar application on cultivated plants or on foliar parts of such plants of the mixture of 1) a mixture comprising the carboxamide compounds i) and ii) as component I and 2) at least one compound II as component II, wherein component II is chlorfenapyr and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In a more preferred embodiment, the present invention relates of methods of controlling harmful insects and/or increasing the health of plants by foliar application on cultivated plants or on foliar parts of such plants of the mixture of the carboxamide compound i) of formula (I) as component I and at least one compound II as component II, wherein component II is ryanodine receptor-modulator selected from flubendiamid, chlorantraniliprole, cyclaniliprole, tetraniliprole, cyantraniliprole or from a group consisting of N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1. Most preferably the ryanodine receptor-modulator is N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide.

In another embodiment, the present invention relates of methods of controlling harmful insects and/or increasing the health of plants by foliar application on cultivated plants or on foliar parts of such plants of the mixture of the carboxamide compound ii) of formula (Ia) as component I 5 and at least one compound II as component II, wherein component II is ryanodine receptor-modulator selected from flubendiamid, chlorantraniliprole, cyclaniliprole, tetraniliprole, cyantraniliprole or from a group consisting of N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1. Most preferably the ryanodine receptor-modulator is N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide.

In still another embodiment, the present invention relates of methods of controlling harmful insects and/or increasing the health of plants by foliar application on cultivated plants or on foliar parts of such plants of the mixture of 1) a mixture comprising the carboxamide compounds i) and ii) as component I and 2) at least one compound II as component II, wherein component II is ryanodine receptor-modulator selected from flubendiamid, chlorantraniliprole, cyclaniliprole, tetraniliprole, cyantraniliprole or from a group consisting of N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1. Most preferably the ryanodine receptor-modulator is N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide.

In a more preferred embodiment, the present invention relates of methods of controlling harmful insects and/or increasing the health of plants by treating plant propagation material of cultivated plants, especially seeds, with the mixture of the carboxamide compound i) of formula (I) as component I and at least one compound II as component II, wherein component II is thiamethoxam and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In another embodiment, the present invention relates of methods of controlling harmful insects and/or increasing the health of plants by treating plant propagation material of cultivated plants, especially seeds, with the mixture of the carboxamide compound ii) of formula (Ia) as component I and at least one compound II as component II, wherein component II is thiamethoxam and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In still another embodiment, the present invention relates of methods of controlling harmful insects and/or increasing the health of plants by treating plant propagation material of cultivated plants, especially seeds, with the mixture of 1) a mixture of the carboxamide compounds i) and ii) as component I and 2) at least one compound II as component II, wherein component II is thiamethoxam and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In a more preferred embodiment, the present invention relates of methods of controlling harmful insects and/or increasing the health of plants by treating plant propagation material of cultivated plants, especially seeds, with the mixture of the carboxamide compound i) of formula (I) as component I and at least one compound II as component II, wherein component II is fipronil and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In another embodiment, the present invention relates of methods of controlling harmful insects and/or increasing the health of plants by treating plant propagation material of cultivated plants, especially seeds, with the mixture of the carboxamide compound ii) of formula (Ia) as component I and at least one compound II as component II, wherein component II is fipronil and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In still another embodiment, the present invention relates of methods of controlling harmful insects and/or increasing the health of plants by treating plant propagation material of cultivated plants, especially seeds, with the mixture of 1) a mixture of the carboxamide compounds i) and ii) as component I and 2) at least one compound II as component II, wherein component II is fipronil and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1.

In a more preferred embodiment, the present invention relates of methods of controlling harmful insects and/or increasing the health of plants by treating plant propagation material of cultivated plants, especially seeds, with the mixture of the carboxamide compound i) of formula (I) as component I and at least one compound II as component II, wherein component II is ryanodine receptor-modulator selected from flubendiamid, chlorantraniliprole, cyclaniliprole, tetraniliprole, cyantraniliprole or from a group consisting of N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1. Most preferably the ryanodine receptor-modulator is N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide.

In another embodiment, the present invention relates of methods of controlling harmful insects and/or increasing the health of plants by treating plant propagation material of cultivated plants, especially seeds, with the mixture of the carboxamide compound ii) of formula (Ia) as component I and at least one compound II as component II, wherein component II is ryanodine receptor-modulator selected from flubendiamid, chlorantraniliprole, cyclaniliprole, tetraniliprole, cyantraniliprole or from a group consisting of N-[4,6-dichloro-2-[(diethyl-lambda-4-sulfanylidene)¬carbamoyl]-phenyl]-2-(3-chloro-2-pyridyl)-5-(trifluoromethyl) pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1. Most preferably the ryanodine receptor-modulator is N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene) carbamoyl]-phenyl]-2-(3-chloro-2-pyridyl)-5-(trifluoro¬methyl)pyrazole-3-carboxamide.

In another embodiment, the present invention relates of methods of controlling harmful insects and/or increasing the health of plants by treating plant propagation material of cultivated plants, especially seeds, with the mixture 1) a mixture of the carboxamide compounds i) and ii) as component I and 2) at least one compound II as component II, wherein component II is ryanodine receptor-modulator selected from flubendiamid, chlorantraniliprole, cyclaniliprole, tetraniliprole, cyantraniliprole or from a group consisting of N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl) pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide and the cultivated plant expresses one or more genes selected from CP4 epsps, pat, bar, Cry1Ab, Cry1Ac, Cry3Bb1, Cry2Ab, Cry1F, Cry34Ab1 and Cry35Ab1. Most preferably the ryanodine receptor-modulator is N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene) carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl) pyrazole-3-carboxamide or N-[4,6-dichloro-2-[(di-2-propyl-lambda-4-sulfanylidene)carbamoyl]-phenyl]-2-(3-chloro-2-pyridyl)-5-(trifluoro¬methyl)pyrazole-3-carboxamide.

In view of the above, some following embodiments are particularly preferred in connection with the methods of the invention relating to cultivated pants.

Preferred are e.g. methods for controlling pests and/or increasing the plant health of a cultivated plant as compared to the respective non-modified control plant, comprising the application of the carboxamide compound i) of formula (I), to a plant with at least one modification, parts of such plant, plant propagation material, or at its locus of growth.

Other embodiments of this invention are methods for controlling pests and/or increasing the plant health of a cultivated plant as compared to the respective non-modified control plant, comprising the application of the carboxamide compound ii) of formula (Ia), to a plant with at least one modification, parts of such plant, plant propagation material, or at its locus of growth. Other embodiments of this invention are e.g. methods for controlling pests and/or increasing the plant health of a cultivated plant as compared to the respective non-modified control plant, comprising the application of a mixture comprising the carboxamide compounds i) and ii) to a plant with at least one modification, parts of such plant, plant propagation material, or at its locus of growth.

Especially preferred are those methods, wherein the cultivated plant is a plant with at least one property selected from: herbicide tolerance, insect resistance, fungal resistance or viral resistance or bacterial resistance, stress tolerance, maturation alteration, content modification of chemicals present in the cultivated plant, modified nutrient uptake, antibiotic resistance and male sterility compared to the corresponding control plant respectively.

Especially more preferred are those methods, wherein the yield of the cultivated plant is increased.

In particular preferred are those methods, wherein the cultivated plant is
a plant with at least one trait of the category herbicide tolerance,
a plant with at least one trait of the category insect resistance, or
a plant with at least two traits, wherein at least one trait is of the category of herbicide tolerance and at least one trait is of the category of insect resistance.

In case the cultivated plant has at least one trait of the category herbicide tolerance, the herbicide resistance is preferably selected from the group consisting of glyphosate tolerance, glufosinate tolerance, and imidazolinone tolerance, and is particularly preferably glyphosate tolerance.

In case the cultivated plant has at least one trait of the category insect resistance, the insect resistance is preferably selected from the group consisting of lepidoperan resistance and coleopteran resistance, and is particularly preferably lepidopteran resistance.

In case the cultivated plant has at least one trait of the category insect resistance, preferably at least two genes confer insect resistance to the cultivated plant.

Furthermore those methods are preferably applied to cultivated plants, wherein the cultivated plant is selected from the group consisting of *Gossypium hirsutum* L. (cotton), *Zea mays* L. (maize), *Glycine max* L. (soybean), *Triticum aestivum* (wheat), and *Oryza sativa* L. (rice), preferably from the group consisting of *Gossypium hirsutum* L. (cotton), *Zea mays* L. (maize) and
*Glycine max* L. (soybean).

Among these cultivated plants preferably are selected: *Gossypium hirsutum* L. (cotton) or *Zea mays* L. (maize) and comprises at least one gene selected from the group consisting of dvsnf7, cry1A, cry1Ab-Ac, cry1C, cry2Ab2, cry2Ae, mocry1F; or
*Glycine max* L. (soybean), *Triticum aestivum* (wheat) or *Oryza sativa* L. (rice) and comprises at least one gene selected from the group consisting of cry34Ab1, cry35 Ab1, cry3A, cry3Bb1, dvsnf7, mcry3A, cry1A, cry1A.105, cry1Ab, cry1Ab-Ac, cry1Ac, cry1C, cry1F, cry1Fa2, cry2Ab2, cry2Ae, cry9c, mocry1F, pin", vip3A(a), vip3Aa20.

Regarding the modification of the preferred treated cultivated plants in the methods mentioned above, the modification is selected from the events provided in table A14.

A method for controlling pests and/or increasing the plant health of a cultivated plant as compared to the respective non-modified control plant, comprising the application of the carboxamide compound i) of formula (I) to a plant with at least one modification, parts of such plant, plant propagation material, or at its locus of growth, wherein the cultivated plant is a soybean variety with glyphosate tolerance and lepidopteran resistance, wherein the glyphosate tolerance is preferably through the expression of the cp4epsps gene, and more preferably based on the transgenic event MON89788, and wherein the lepidopteran resistance is preferably through expression of the Cry1AC encoding gene from *B. thuringiensis*, preferably against velvetbean caterpillar (*Anticarsia gemmatalis*) and soybean looper (*Pseudoplusia includens*), and more preferably based on the transgenic event MON87701.

Another method for controlling pests and/or increasing the plant health of a cultivated plant as compared to the respective non-modified control plant, comprising the application of the carboxamide compound ii) of formula (Ia) to a plant with at least one modification, parts of such plant, plant propagation material, or at its locus of growth, wherein the cultivated plant is a soybean variety with glyphosate tolerance and lepidopteran resistance, wherein the glyphosate tolerance is preferably through the expression of the cp4epsps gene, and more preferably based on the transgenic event MON89788, and wherein the lepidopteran resistance is preferably through expression of the Cry1AC encoding gene from *B. thuringiensis*, preferably against velvetbean caterpillar (*Anticarsia gemmatalis*) and soybean looper (*Pseudoplusia includens*), and more preferably based on the transgenic event MON87701.

Still another method for controlling pests and/or increasing the plant health of a cultivated plant as compared to the respective non-modified control plant, comprising the application of a mixture comprising the carboxamide compounds i) and ii) to a plant with at least one modification, parts of such plant, plant propagation material, or at its locus of growth, wherein the cultivated plant is a soybean variety with glyphosate tolerance and lepidopteran resistance, wherein the glyphosate tolerance is preferably through the expression of the cp4epsps gene, and more preferably based on the transgenic event MON89788, and wherein the lepidopteran resistance is preferably through expression of the Cry1AC encoding gene from *B. thuringiensis*, preferably against velvetbean caterpillar (*Anticarsia gemmatalis*) and soybean looper (*Pseudoplusia includens*), and more preferably based on the transgenic event MON87701.

Preferably the cultivated plant is "Intacta RR2 PRO" soybean (Monsanto), which claims to offer tolerance to glyphosate herbicide and protection against major soybean pests (velvetbean caterpillar, soybean looper, soybean budborer, bean shoot borer, bollworm, corn stalk borer, *Helicoverpa*, e.g. *Helicoverpa armigera*), along with increased yield potential.

Regarding the application of the carboxamide compound i) of formula (I) in those methods, the carboxamide compound i) of formula (I) is applied to the plant propagation material of the cultivated plant. Preferably the plant propagation material are the seeds.

Regarding the application of the carboxamide compound ii) of formula (Ia) in those methods, the carboxamide compound ii) of formula (Ia) is applied to the plant propagation material of the cultivated plant. Preferably the plant propagation material are the seeds.

Regarding the application of a mixture comprising the carboxamide compounds i) and ii) in those methods, the mixture comprising the carboxamide compounds i) and ii) is applied to the plant propagation material of the cultivated plant. Preferably the plant propagation material are the seeds.

In those methods described above, the carboxamide compound i) of formula (I) is applied in a mixture of (1) the carboxamide compound i) of formula (I), and (2) at least one further pesticidal compound II as component II, wherein the pesticidal compound II is an insecticide or a fungicide.

those methods described above, the carboxamide compound ii) of formula (Ia) is applied in a mixture of (1) the carboxamide compound ii) of formula (Ia), and (2) at least one further pesticidal compound II as component II, wherein the pesticidal compound II is an insecticide or a fungicide.

those methods described above, the carboxamide compound i) of formula (I) is applied in a mixture of (1) a mixture comprising the carboxamide compounds i) and ii) and (2) at least one further pesticidal compound II as component II, wherein the pesticidal compound II is an insecticide or a fungicide.

Formulations

In the following, suitable formulations and applications in connection with the present application are disclosed. These preferred embodiments relate (1) to the mixture of the invention comprising the carboxamide compound i) of formula (I) as well as uses and methods comprising the application of said mixture and (2) to uses and methods comprising the application of the carboxamide compound i) of formula (I) according to the invention.

When it is in the following referred to "the compound i) of formula (I)", to "the compound of the present invention" or "the mixture of the invention", it is to be understood that the embodiments are disclosed in combination with (1) the mixture of the invention as well as uses and methods comprising the application of said mixture and (2) uses and methods comprising the application of the carboxamide compound i) of formula (I) according to the invention, respectively.

The mixture of the invention or the carboxamide compound i) of formula (I) may be provided in the form of an agrochemical composition comprising the carboxamide compound i) of formula (I) together with one or more other pesticidal active ingredient(s) and an auxiliary.

An agrochemical composition comprises a pesticidally effective amount the carboxamide compound i) of formula (I), a pesticidally effective amount of the carboxamide compound ii) of formula (Ia) or a pesticidally effective amount of the mixture comprising the carboxamide compounds i) and ii).

Other embodiments relate (1) to the mixture of the invention comprising the carboxamide compound ii) of formula (Ia) as well as uses and methods comprising the application of said mixture and (2) to uses and methods comprising the application of the carboxamide compound ii) of formula (Ia) according to the invention.

When it is in the following referred to "the compound ii) of formula (Ia)", to "the compound of the present invention" or "the mixture of the invention", it is to be understood that the embodiments are disclosed in combination with (1) the mixture of the invention as well as uses and methods comprising the application of said mixture and (2) uses and methods comprising the application of the carboxamide compound ii) of formula (Ia) according to the invention, respectively.

The mixture of the invention or the carboxamide compound ii) of formula (Ia) may be provided in the form of an agrochemical composition comprising the carboxamide compound ii) of formula (Ia) together with one or more other pesticidal active ingredient(s) and an auxiliary.

Still other embodiments relate (1) to the mixture of the invention comprising the mixture comprising the carboxamide compounds i) and ii) as well as uses and methods comprising the application of said mixture and (2) to uses and methods comprising the application of the mixture comprising the carboxamide compounds i) and ii) according to the invention.

When it is in the following referred to "mixture comprising the carboxamide compounds i) and ii)", to "the compound of the present invention" or "the mixture of the invention", it is to be understood that those embodiments are disclosed in combination with (1) the mixture of the invention as well as uses and methods comprising the application of said mixture and (2) uses and methods comprising the application of a mixture comprising the carboxamide compounds i) and ii) according to the invention, respectively.

The mixture of the invention or the mixture comprising the carboxamide compounds i) and ii) may be provided in the form of an agrochemical composition comprising the mixture comprising the carboxamide compounds i) and ii) together with one or more other pesticidal active ingredient (s) and an auxiliary.

An agrochemical composition comprises a pesticidally effective amount the carboxamide compound i) of formula (I), a pesticidally effective amount of the carboxamide compound ii) of formula (Ia) or a pesticidally effective amount of the mixture comprising the carboxamide compounds i) and ii).

The term "pesticidally effective amount" is defined below.

The formulations comprising the carboxamide compound i) of formula (I), compound ii) of formula (Ia) or a mixture comprising the carboxamide compounds i) and ii) of the present invention can be converted into customary types of agrochemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Mono-graph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclo-ihexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyhnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the ative ingredients(s) on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), inorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:

i) Water-soluble concentrates (SL, LS)

10-60 wt % of the pesticidal active compound(s), and 5-15 wt % wetting agent (e.g. alcohol alkoxylates) are dissolved in water and/or in a water-soluble solvent (e.g. alcohols) up to 100 wt %. The active substance dissolves upon dilution with water.

ii) Dispersible concentrates (DC)

5-25 wt % of the pesticidal active compound(s), and 1-10 wt % dispersant (e. g. polyvinylpyrrolidone) are dissolved in up to 100 wt % organic solvent (e.g. cyclohexanone). Dilution with water gives a dispersion.

iii) Emulsifiable concentrates (EC)

15-70 wt % of the pesticidal active compound(s), and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.

iv) Emulsions (EW, EO, ES)

5-40 wt % of the pesticidal active compound(s), and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)

In an agitated ball mill, 20-60 wt % of the pesticidal active compound(s), are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active substance. For FS type composition up to 40 wt % binder (e.g. polyvinylalcohol) is added.

vi) Water-dispersible granules and water-soluble granules (WG, SG)

50-80 wt % of the pesticidal active compound(s), are ground finely with addition of up to 100 wt % dispersants and wetting agents (e.g. sodium lignosulfonate and alcohol ethoxylate) and prepared as water-dispersible or water-soluble granules by means of technical appliances (e. g. extrusion, spray tower, fluidized bed). Dilution with water gives a stable dispersion or solution of the active substance.

vii) Water-dispersible powders and water-soluble powders (WP, SP, WS)

50-80 wt % of the pesticidal active compound(s), are ground in a rotor-stator mill with ad-dition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dispersion or solution of the active substance.

viii) Gel (GW, GF)

In an agitated ball mill, 5-25 wt % of the pesticidal active compound(s), are comminuted with addition of 3-10 wt % dispersants (e.g. sodium lignosulfonate), 1-5 wt % thickener (e.g. carboxymethylcellulose) and up to 100 wt % water to give a fine suspension of the active substance. Dilution with water gives a stable suspension of the active substance.

ix) Microemulsion (ME)

5-20 wt % of the pesticidal active compound(s), are added to 5-30 wt % organic solvent blend (e.g. fatty acid dimethylamide and cyclohexanone), 10-25 wt % surfactant blend (e.g. alcohol ethoxylate and arylphenol ethoxylate), and water up to 100%. This mixture is stirred for 1 h to produce spontaneously a thermodynamically stable microemulsion.

x) Microcapsules (CS)

An oil phase comprising 5-50 wt % of the pesticidal active compound(s), 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radi-cal initiator results in the for-mation of poly(meth)acrylate microcapsules. Alternatively, an oil phase comprising 5-50 wt % of the pesticidal active compound(s), 0-40 wt % water insoluble organic solvent (e.g. aromatic hydrocarbon), and an isocyanate monomer (e.g. diphenylme-thene-4,4'-diisocyanatae) are dispersed into an aqueous solution of a protective colloid (e.g. polyvinyl alcohol). The addition of a polyamine (e.g. hexamethylenediamine) results in the for-mation of a polyurea microcapsule. The monomers amount to 1-10 wt %. The wt % relate to the total CS composition.

xi) Dustable powders (DP, DS)

1-10 wt % of pesticidal active compound(s), are ground finely and mixed intimately with up to 100 wt % solid carrier, e.g. finely divided kaolin.

xii) Granules (GR, FG)

0.5-30 wt % of v, is ground finely and associated with up to 100 wt % solid carrier (e.g. silicate). Granulation is achieved by extrusion, spray-drying or the fluidized bed.

xiii) Ultra-low volume liquids (UL)

1-50 wt % of pesticidal active compound(s), are dissolved in up to 100 wt % organic solvent, e.g. aromatic hydrocarbon.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, and most preferably between 0.5 and 75%, by weight of active substance. The active substances are employed in a purity of from 90% to 100%, preferably from 95% to 100% (according to NMR spectrum).

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage de-vice, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank and further auxiliaries may be added, if appropriate.

In a further embodiment, either individual components of the composition according to the invention or partially premixed components, e.g. components comprising pesticidal active compound(s), may be mixed by the user in a spray tank and further auxiliaries and additives may be added, if appropriate.

In a further embodiment, either individual components of the composition according to the invention or partially premixed components, e. g. components comprising pesticidal active compound(s), can be applied jointly (e.g. after tank mix) or consecutively.

Conventional seed treatment formulations include for example flowable concentrates FS, solutions LS, suspoemulsions (SE), powders for dry treatment DS, water dispersible powders for slurry treatment WS, water-soluble powders SS and emulsion ES and EC and gel formulation GF. These formulations can be applied to the seed diluted or undiluted. Application to the seeds is carried out before sowing, either directly on the seeds or after having pregerminated the latter. Preferably, the formulations are applied such that germination is not included.

The active substance concentrations in ready-to-use formulations, which may be obtained after two-to-tenfold dilution, are preferably from 0.01 to 60% by weight, more preferably from 0.1 to 40% by weight.

In a preferred embodiment a FS formulation is used for seed treatment. Typically, a FS formulation may comprise 1-800 g/l of active ingredient, 1-200 g/l Surfactant, 0 to 200 g/l antifreezing agent, 0 to 400 g/l of binder, 0 to 200 g/l of a pigment and up to 1 liter of a solvent, preferably water.

Especially preferred FS formulations of the compound I, preferably compound i) of formula (I), for seed treatment usually comprise from 0.1 to 80% by weight (1 to 800 g/l) of the active ingredient, from 0.1 to 20% by weight (1 to 200 g/l) of at least one surfactant, e.g. 0.05 to 5% by weight of a wetter and from 0.5 to 15% by weight of a dispersing agent, up to 20% by weight, e.g. from 5 to 20% of an anti-freeze agent, from 0 to 15% by weight, e.g. 1 to 15% by weight of a pigment and/or a dye, from 0 to 40% by weight, e.g. 1 to 40% by weight of a binder (sticker/adhesion agent), optionally up to 5% by weight, e.g. from 0.1 to 5% by weight of a thickener, optionally from 0.1 to 2% of an anti-foam agent, and optionally a preservative such as a biocide, antioxidant or the like, e.g. in an amount from 0.01 to 1% by weight and a filler/vehicle up to 100% by weight.

In the treatment of seed, the application rates of the carboxamide compound i) of formula (I), of the carboxamide compound ii) of formula (Ia) or of a mixture comprising the carboxamide compounds i) and ii), are generally from 0.1 g to 10 kg per 100 kg of seed, preferably from 1 g to 5 kg per 100 kg of seed, more preferably from 1 g to 1000 g per 100 kg of seed and in particular from 1 g to 200 g per 100 kg of seed, e.g. from 1 g to 100 g or from 5 g to 100 g per 100 kg of seed.

The invention therefore also relates to seed comprising one of the carboxamide compound i) of formula (I), the carboxamide compound ii) of formula (Ia) or the mixture comprising the carboxamide compounds i) and ii). The amount of the carboxamide compound i) of formula (I), the carboxamide compound ii) of formula (Ia) or the mixture comprising the carboxamide compounds i) and ii) will in general vary from 0.1 g to 10 kg per 100 kg of seed, preferably from 1 g to 5 kg per 100 kg of seed, in particular from 1 g to 1000 g per 100 kg of seed. For specific crops such as lettuce the rate can be higher.

Example

The present invention may be illustrated by the following example.

The interaction between the carboxamide compound of the present invention (or compositions comprising it) and the cultivated plant may be evaluated in different test systems. As well for the comparison to non-cultivated plants or to mixtures (comprising the carboxamide compound) synergism may be shown.

Synergism can be described as an interaction where the combined effect of two or more compounds is greater than the sum of the individual effects of each of the compounds. The presence of a synergistic effect in terms of percent control, between two mixing partners (X and Y) can be calculated using the Colby equation (Colby, S. R., 1967, Calculating Synergistic and Antagonistic Responses in Herbicide Combinations, Weeds, 15, 20-22):

When the observed combined control effect is greater than the expected combined control effect (E), then the combined effect is synergistic.

The following tests can demonstrate the control efficacy of compounds, mixtures or compositions of this invention on specific pests. However, the pest control protection afforded by the compounds, mixtures or compositions is not limited to the species described. In certain instances, combinations of a compound of this invention with other invertebrate pest control compounds or agents are found to exhibit synergistic effects against certain important invertebrate pests.

The analysis of synergism or antagonism between the mixtures or compositions is determined using Colby's equation.

B1: Test on Cultivated Soybeans

Trial is carried out under greenhouse conditions on soybean (genetically modified plant variety, e.g. roundup, growth stage 109). 12 treatments are compared in a complete randomized blocks (4 replications) with plot size of 1 m×3 meters. Only selected plants are considered for artificial infestation and evaluations.

Due to glyphosate timing for application on such cultivated soybeans, all treatments are applied in older plants (GS 109) otherwise a significant phytotoxicity is expected. Application is done, using 400 l/ha. All treatments are applied using a CO2 backpack (nozzle type TXVK-10). Temperature at the time of applications is around 25 to 30° C. and air humidity is between 30 and 100%. Soil condition is e.g. R4 (when <75% of surface is dried up) and the moisture is moist (normal).

Roundup Original® (Glyfosate-sal isopropilamina @360 g/L) is used in the rate of 867 g a.i./ha. Artificial infestation is done one day after the application. The species used is *Anticarsia gemmatalis* (Hübner) [*Thermesia elegantula* (Herrich-Schaffer, 1869)], Noctuidae. 5 plants/plot are infested with 3 larvae (stage L2) using an entomological metallic tweezers, totaling 15 larvae per repetition. Larvae used in this trial are e.g. provided by BASF in-house rearing laboratory, Campinas, Brazil.

A second infestation is held seven days after application in the same plants and using the same larval numbers. A third infestation might be done if necessary in order to observe residual activity.

The mortality (number) and eating damage (%) are evaluated with 01, 02, 05, 07, 14 and 21 DAA (days after application), comparing to untreated control plants.

Increased mortalities in combination with the application of roundup can be observed when compared to the untreated control plants:

Additionally, after 5 days after application at 12.5 g a.i./ha a reduction of feeding damage compared to the untreated controls can be observed. In another test, a non-cultivated (non-GM) soybean variety is treated with 12.5 g a.i./ha and showed less reduction in feeding damage compared to the untreated controls.

The invention claimed is:

1. A method for controlling pests on at least one of cultivated plants that have been modified by genetic engineering, their plant propagation material for the cultivated plants, and a locus of growth of the cultivated plants, the method comprising applying a pesticidal active carboxamide compound I selected from the group consisting of:

i) compound i) of formula (I)

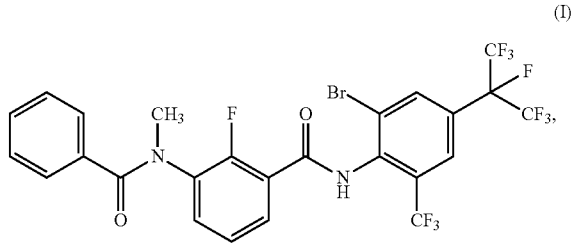 [SMILES: CN(C(=O)c1ccccc1)c1cccc(C(=O)Nc2c(Br)cc(C(F)(C(F)(F)F)C(F)(F)F)cc2C(F)(F)F)c1F]

(I)

ii) compound ii) of formula (Ia)

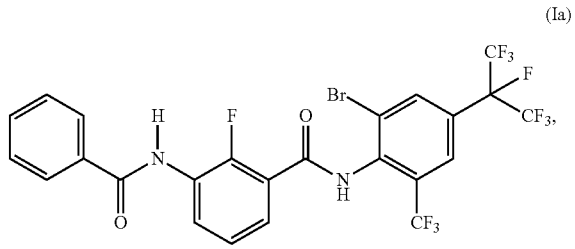 [SMILES: O=C(Nc1cccc(C(=O)Nc2c(Br)cc(C(F)(C(F)(F)F)C(F)(F)F)cc2C(F)(F)F)c1F)c1ccccc1]

(Ia)

and iii) mixtures comprising the carboxamide compounds i) and ii), to at least one of a plant, plant propagation material, a locus of growth of the plant, pests, food supply of the pests, habitat of the pests, and breeding grounds of the pests, wherein the cultivated plant is one of:
(a) a plant with at least one trait of herbicide tolerance selected from the group consisting of imidazolinone tolerance, glyphosate tolerance, glufosinate tolerance, 2-4-D tolerance, dicamba tolerance, HPPD tolerance, and PPO tolerance,
(b) a plant with at least one trait of insect resistance selected from a Bt gene, a dvsnf7 gene, and a pinII gene, and
(c) combinations thereof.

2. The method according to claim 1, wherein the pesticidal active carboxamide compound I is compound i) of formula (I).

3. The method according to claim 1, wherein the insect resistance is selected from the group consisting of lepidopteran resistance and coleopteran resistance.

4. The method according to claim 1, wherein the cultivated plant is a plant with insect resistance, wherein at least two genes confer the insect resistance to the cultivated plant.

5. The method according to claim 1, wherein the cultivated plant is selected from the group consisting of *Gossypium hirsutum* L. (cotton), *Zea mays* L. (maize), *Glycine max* L. (soybean), *Triticum aestivum* (wheat), and *Oryza sativa* L. (rice).

6. The method according to claim 1, wherein the pests are selected from insects from the order of one of Lepidoptera and Coleoptera.

7. The method according to claim 6, wherein the pests are selected from insects from the order of Lepidoptera.

8. The method according to claim 7, wherein the pests are selected from the group consisting of *Anticarsia gemmatalis, Chrysodeixis includens (Pseudoplusia includens), Hehcoverpa armigera (Hehothis armigera), Spodoptera frugiperda, Spodoptera eridania, Spodoptera cosmioides,* and combinations thereof.

9. The method according to claim 1 wherein the cultivated plant is a soybean plant exhibiting insect resistance.

10. The method according to claim 1, wherein the plant is a soybean plant that has been modified by genetic engineering, wherein the soybean plant exhibits insect resistance provided by one or more genes selected from the group consisting of cry1Ac, cry1F, cry1A.105, cry2Ab2, and combinations thereof.

11. The method according to claim 1, wherein applying the pesticidal active carboxamide compound I comprises applying the pesticidal active carboxamide compound I to foliage of the plants.

12. The method according to claim 1, wherein applying the pesticidal active carboxamide compound I comprises applying the pesticidal active carboxamide compound I to one of the seeds and the plant propagation material of the plants.

13. The method according to claim 11, wherein applying the pesticidal active carboxamide compound I further comprises applying the pesticidal active carboxamide compound I in an amount of from 1 g to 100 g per hectare.

14. The method according to claim 1, wherein the pesticidal active carboxamide compound I is component I of a mixture that comprises at least one further pesticidal compound II as component II, wherein the pesticidal compound II is selected from one of insecticides, fungicides, and biopesticides.

15. The method according to claim 14, wherein the mixture comprises the pesticidal active carboxamide compound I as component I and further comprises at least one fungicidal active ingredient selected from one of thiophanate-methyl, triticonazole, pyraclostrobin, and fluxapyroxad as component II.

16. The method according to claim 14, wherein the mixture comprises the pesticidal active carboxamide compound I as component I and further comprises at least one other insecticidal active ingredient selected from the group consisting of fipronil, acypermethrin, bifenthrin, tefluthrin, cyhalothrin, clothianidin, dinotefuran, imidacloprid, thiacloprid, thiamethoxam, spinosad, spientoram, emamectin, abamectin, pymetrozine, flonicamid, chlorfenapyr, buprofezin, metaflumizone, cyflumetofen, flubenidamid, chlorantraniliprole, tetraniliprole, cyantraniliprole, sulfoxalor, afidopyropen, flubendiamid, chlorantraniliprole, cyclaniliprole, tetraniliprole, cyantraniliprole, and another ryanodine receptor-modulators selected from N-[4,6-dichloro-2-[(diethyl-lambda-4-sulfanylidene)¬carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide, N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide, and N-[4,6-dichloro-2-[(di-2-propyl-lambda-4-sulfanylidene) carbamoyl]-phenyl]-2-(3-chloro-2-pyridyl)-5-(trifluoromethyl)pyrazole-3-carboxamide as component II.

17. A method for increasing the plant health of a cultivated plant as compared to a respective non-modified control plant, comprising applying at least one of a pesticidal active carboxamide compound I as defined in claim 1, and a mixture comprising the pesticidal active carboxamide compound I, to at least one of a plant with at least one modification, parts of the plant, plant propagation material, or a locus of growth of the plant.

18. The method according to claim 17, the applying causing an increase in a yield of the cultivated plant.

19. A method for at least one of controlling pests on a cultivated plant and increasing plant health of the cultivated plant as compared to a respective non-modified control plant, the method comprising applying at least one of a pesticidal active carboxamide compound I as defined in claim 1 and a mixture comprising the pesticidal active carboxamide compound I, to at least one of a plant with at least one modification, parts of the plant, plant propagation material, or a locus of growth of the plant, wherein the cultivated plant is at least one of:

at least one of *Gossypium hirsutum* L. (cotton) and *Zea mays* L. (maize) and comprises at least one gene selected from the group consisting of dvsnf7, cry1A, cry1Ab-Ac, cry1C, cry2Ab2, cry2Ae, and mocry1F; and (ii) at least one of *Glycine max* L. (soybean), *Triticum aestivum* (wheat), and *Oryza sativa* L. (rice) and comprises at least one gene selected from the group consisting of cry34Ab1, cry35 Ab1, cry3A, cry3Bb1, dvsnf7, mcry3A, cry1A, cry1A.105, cry1Ab, cry1Ab-Ac, cry1Ac, cry1C, cry1F, cry1Fa2, cry2Ab2, cry2Ae, cry9c, mocry1F, pinII, vip3A(a), and vip3Aa20.

20. A method for at least one of controlling pests on a cultivated plant and increasing plant health of the cultivated plant as compared to a respective non-modified control plant, the method comprising applying at least one of a pesticidal active carboxamide compound I as defined in claim 1, and a mixture comprising the pesticidal active carboxamide compound I, to at least one of a plant with at least one modification, parts of the plant, plant propagation material, or a locus of growth of the plant, wherein the cultivated plant is a soybean variety with glyphosate tolerance and lepidopteran resistance, wherein the glyphosate tolerance is through the expression of the cp4epsps gene and wherein the lepidopteran resistance is through expression of the Cry1AC encoding gene from *B. thuringiensis*, against velvetbean caterpillar (*Anticarsia gemmatalis*) and soybean looper (*Pseudoplusia includens*).

21. The method of claim 1, wherein the cultivated plant is selected from the group consisting of cotton, corn, and soybeans.

* * * * *